United States Patent

[11] 3,634,661

[72] Inventor Arthur O. Fitzner
    Fond du Lac, Wis.
[21] Appl. No. 762,836
[22] Filed Sept. 26, 1968
[45] Patented Jan. 11, 1972
[73] Assignee Giddings & Lewis, Inc.
    Fond du Lac, Wis.

[54] DATA PROCESSING METHOD FOR MINIMIZING POTENTIAL ERRORS OCCURRING DURING LINEAR AND CIRCULAR INTERPOLATION
17 Claims, 68 Drawing Figs.

[52] U.S. Cl.................................................. 235/151.11
[51] Int. Cl..................................................... G05b 19/30

[50] Field of Search............................................ 235/151.11,
    152; 318/20.130, 20.110, 20.108, 20.132 IE

[56] References Cited
UNITED STATES PATENTS
3,443,178  5/1969  Reuteler....................... 318/18

Primary Examiner—Eugene G. Botz
Attorney—Wolfe, Hubbard, Leydig, Voit & Osann

ABSTRACT: Successive linear or circular arc path segments are represented by successive "blocks" of data. A corrective change is made in the data block representing a given path segment if the preceding path segment did not terminate exactly at its designated end point.

THE LAST MACROMOVE OF A CIRCULAR PATH SEGMENT IN WHICH A LARGE OVERRUN HAS BEEN DETECTED, CAUSING SET-UP CALCULATIONS FOR ENTERING A LINEAR PATH SEGMENT

INVENTOR.
ARTHUR O. FITZNER
BY Wolfe, Hubbard, Voit, Osann
ATTORNEYS.

Fig. 5a.

Fig. 5b. (MOVE DURING ΔT)

$$\Delta D = V \Delta T \quad (1)$$
$$\Delta X = I \cdot \frac{V \cdot \Delta T}{\sqrt{I^2 + J^2}} \quad (6)$$
$$\Delta Y = J \cdot \frac{V \cdot \Delta T}{\sqrt{I^2 + J^2}} \quad (7)$$
$$IF \quad \frac{V \cdot \Delta T}{\sqrt{I^2 + J^2}} = Q \quad THEN \quad (8)$$
$$\Delta X = I \cdot Q \quad (9)$$
$$\Delta Y = J \cdot Q \quad (10)$$

$$\Delta D = V \cdot \Delta T = V \cdot \Delta T' \quad (15)$$
$$\Delta X_{02} = -J_1 \cdot \frac{V \cdot \Delta T}{\sqrt{I^2 + J^2}}$$

Fig. 6d.

$$\Delta Y_{13} = I_2 \frac{V \cdot \Delta T'}{\sqrt{I_2^2 + J_2^2}} \quad (16)$$

$$IF \quad \frac{V \cdot \Delta T}{\sqrt{I^2 + J^2}} = Q = \frac{V \cdot \Delta T'}{\sqrt{I^2 + J^2}}, \quad THEN \quad (8a)$$

$$\Delta X_{02} = -J_1 \cdot Q \quad (18) \quad AND \quad \Delta Y_{13} = I_2 \cdot Q \quad (19) \quad FOR \quad CW$$

(THE SIGNS CHANGE IN (18) AND (19) FOR CCW)

INVENTOR.
ARTHUR O. FITZNER
BY Wolfe, Hubbard, Voit, Osann
ATTORNEYS.

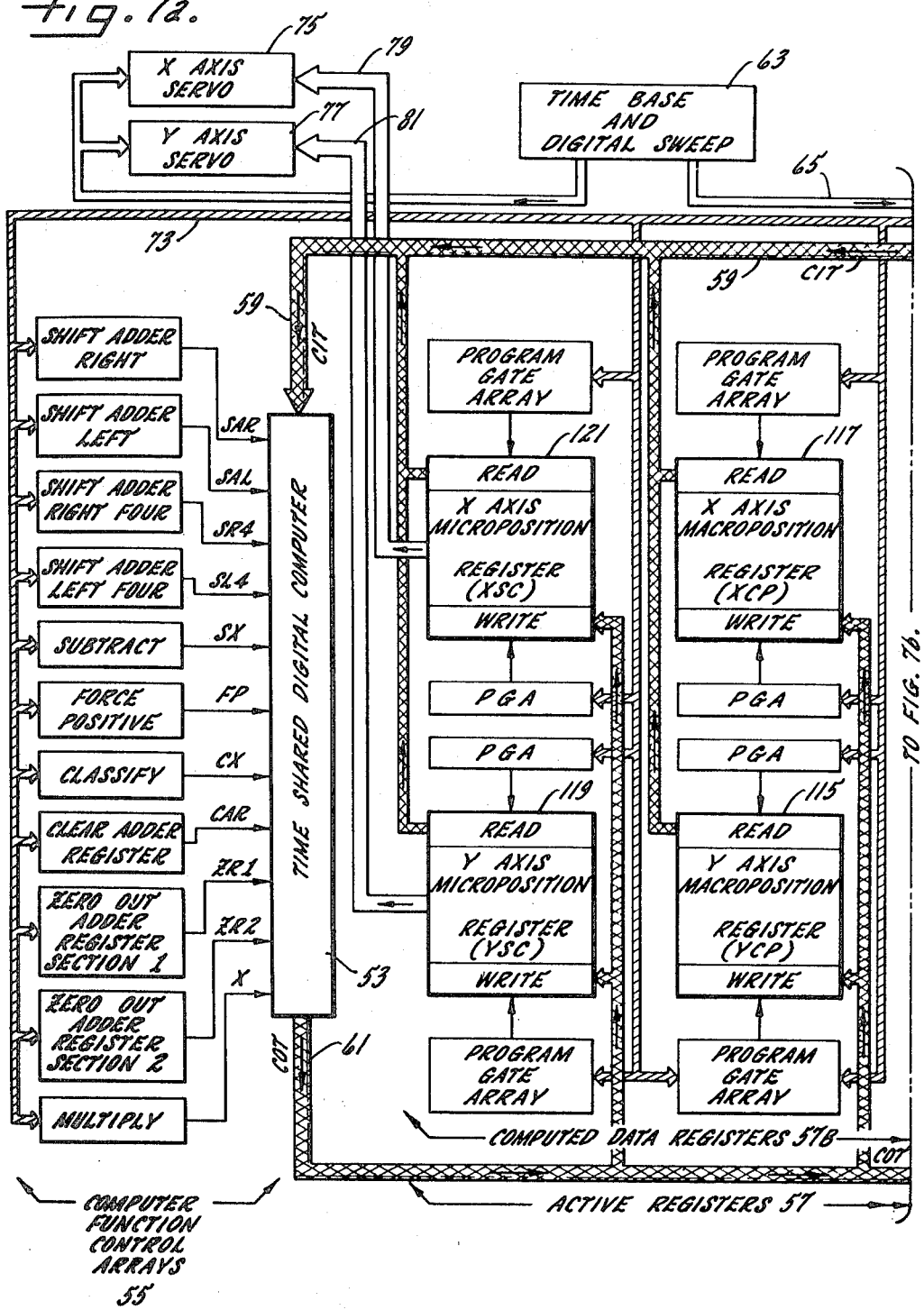

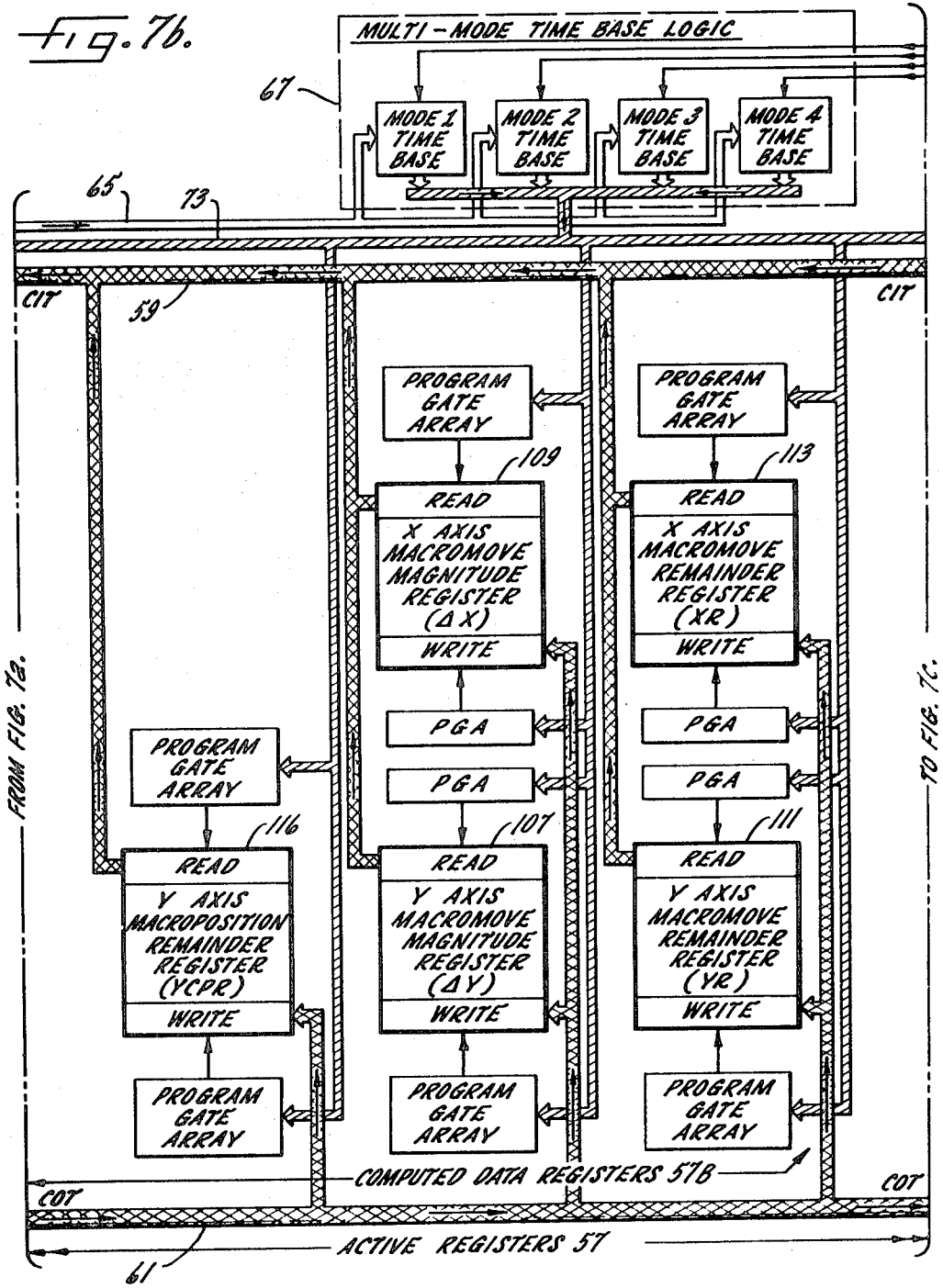

Fig. 7c.

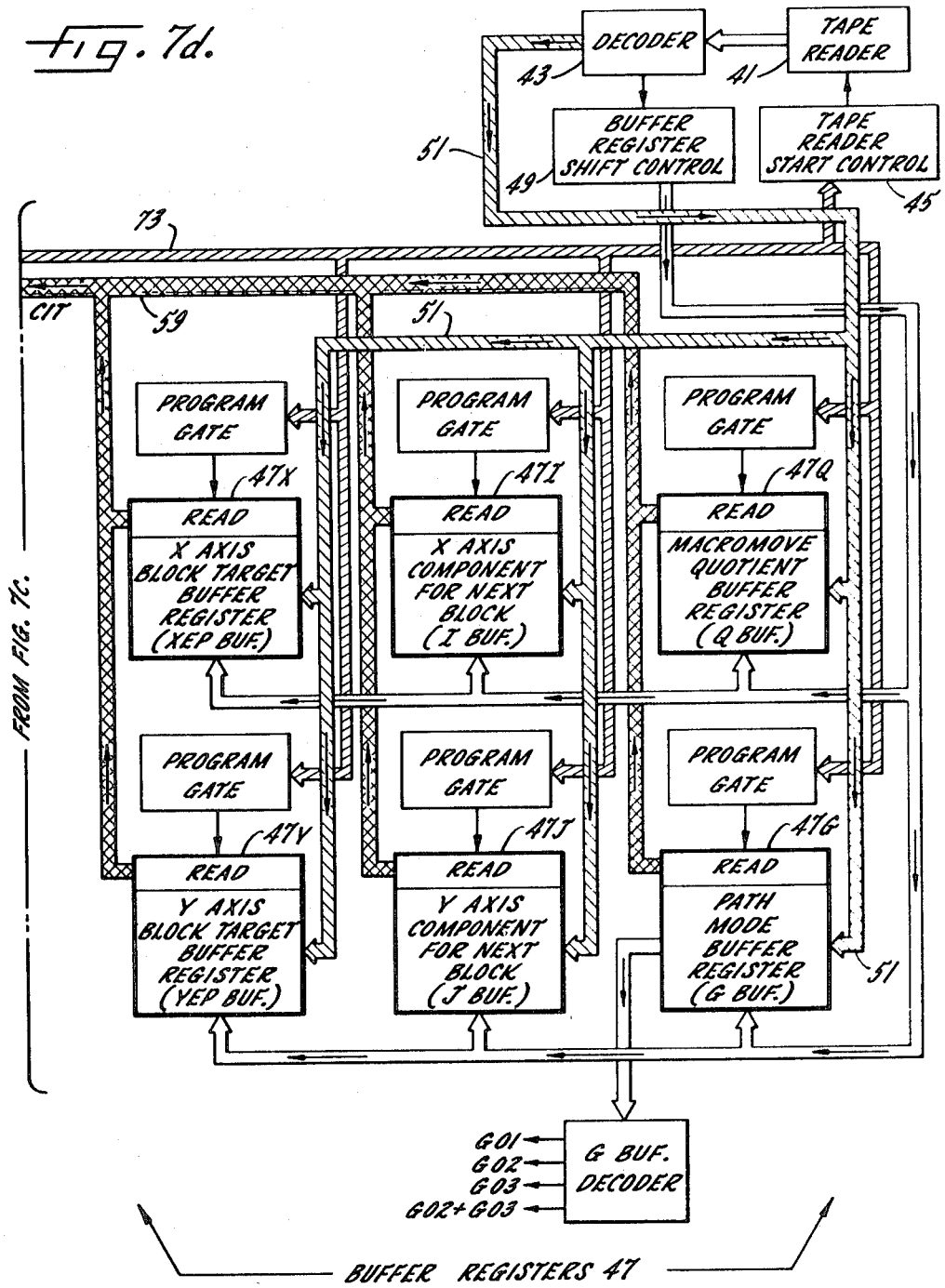

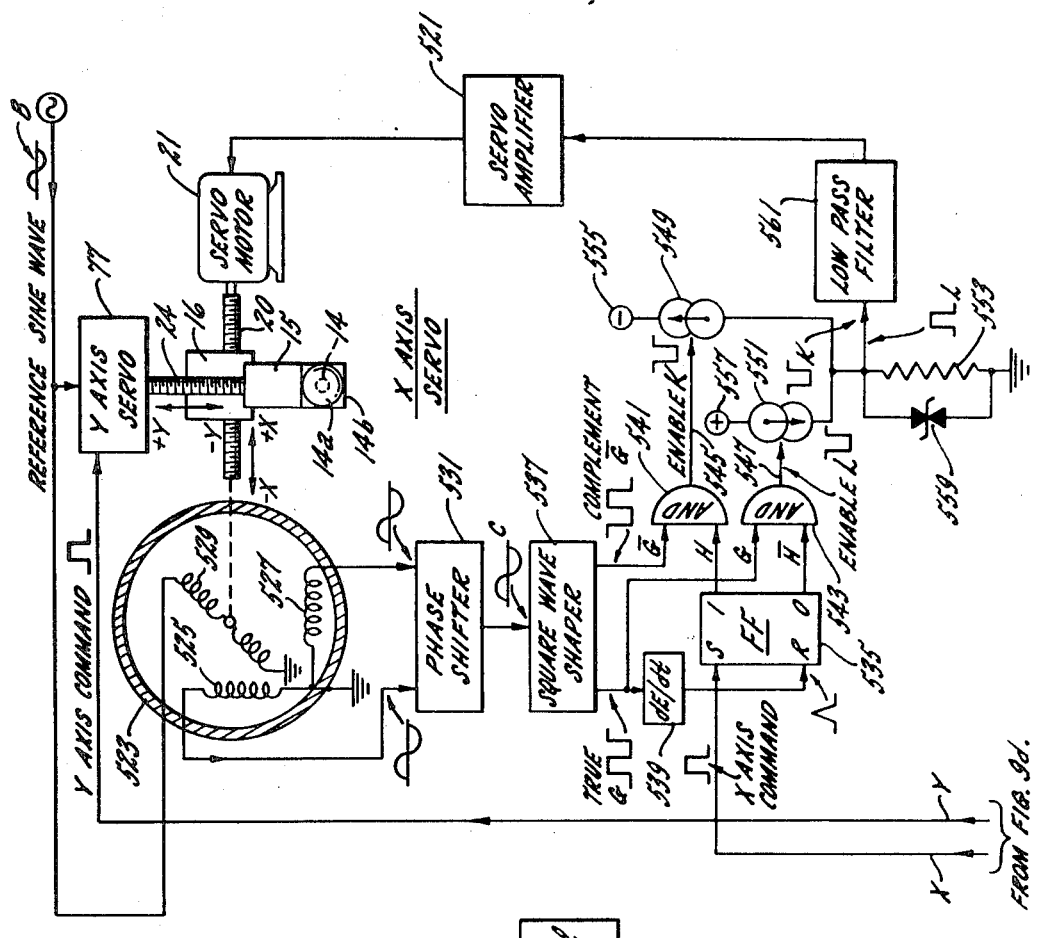

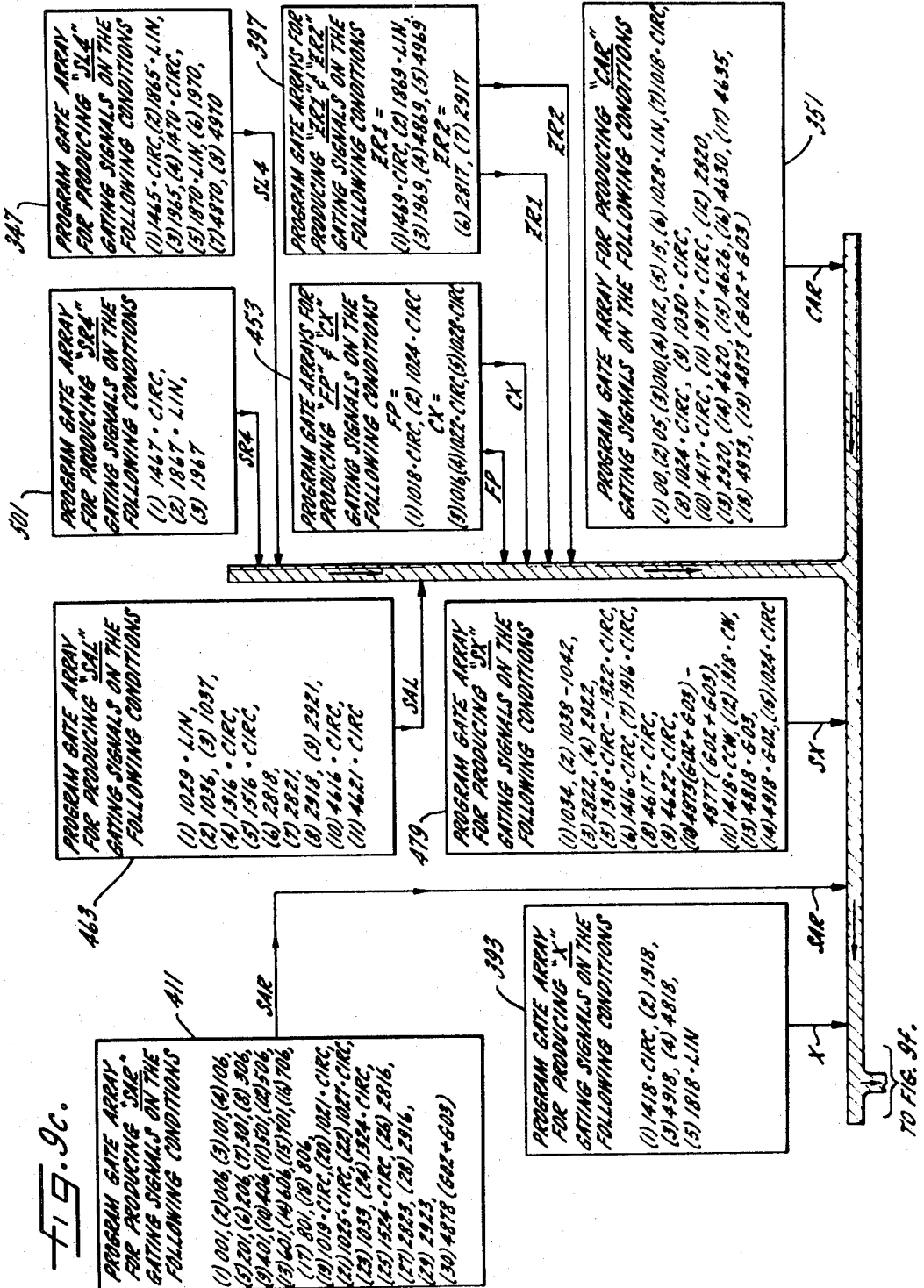

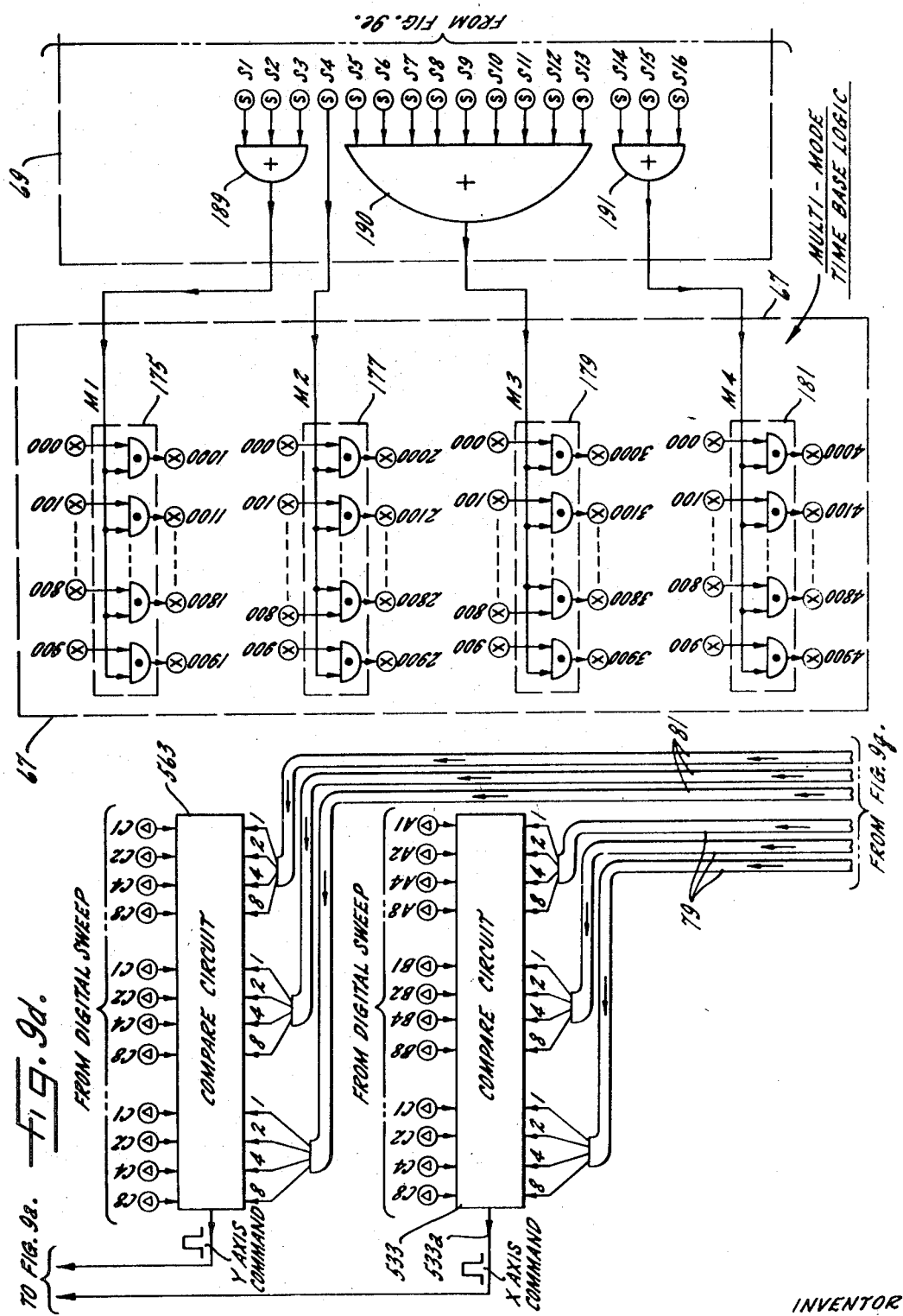

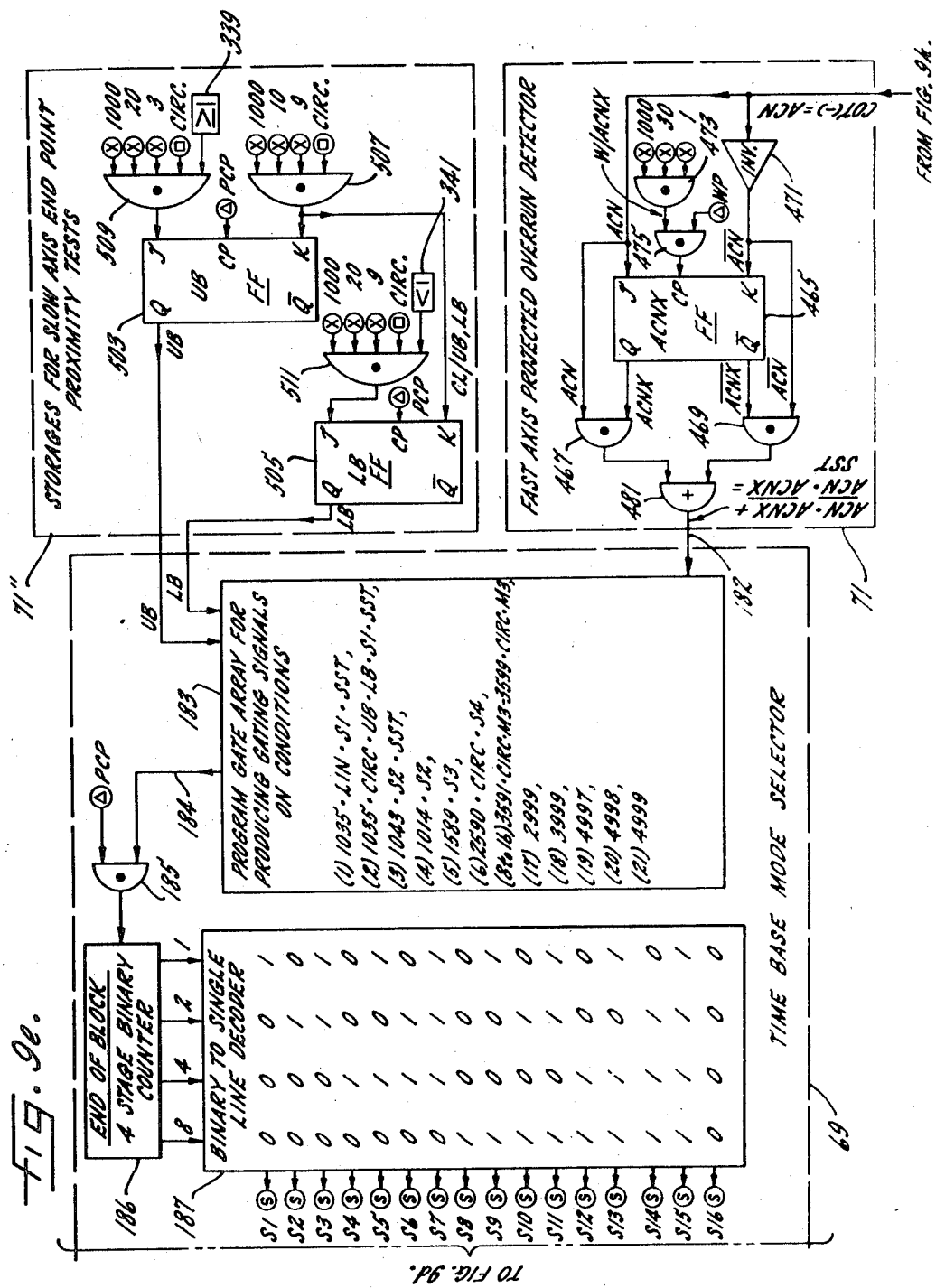

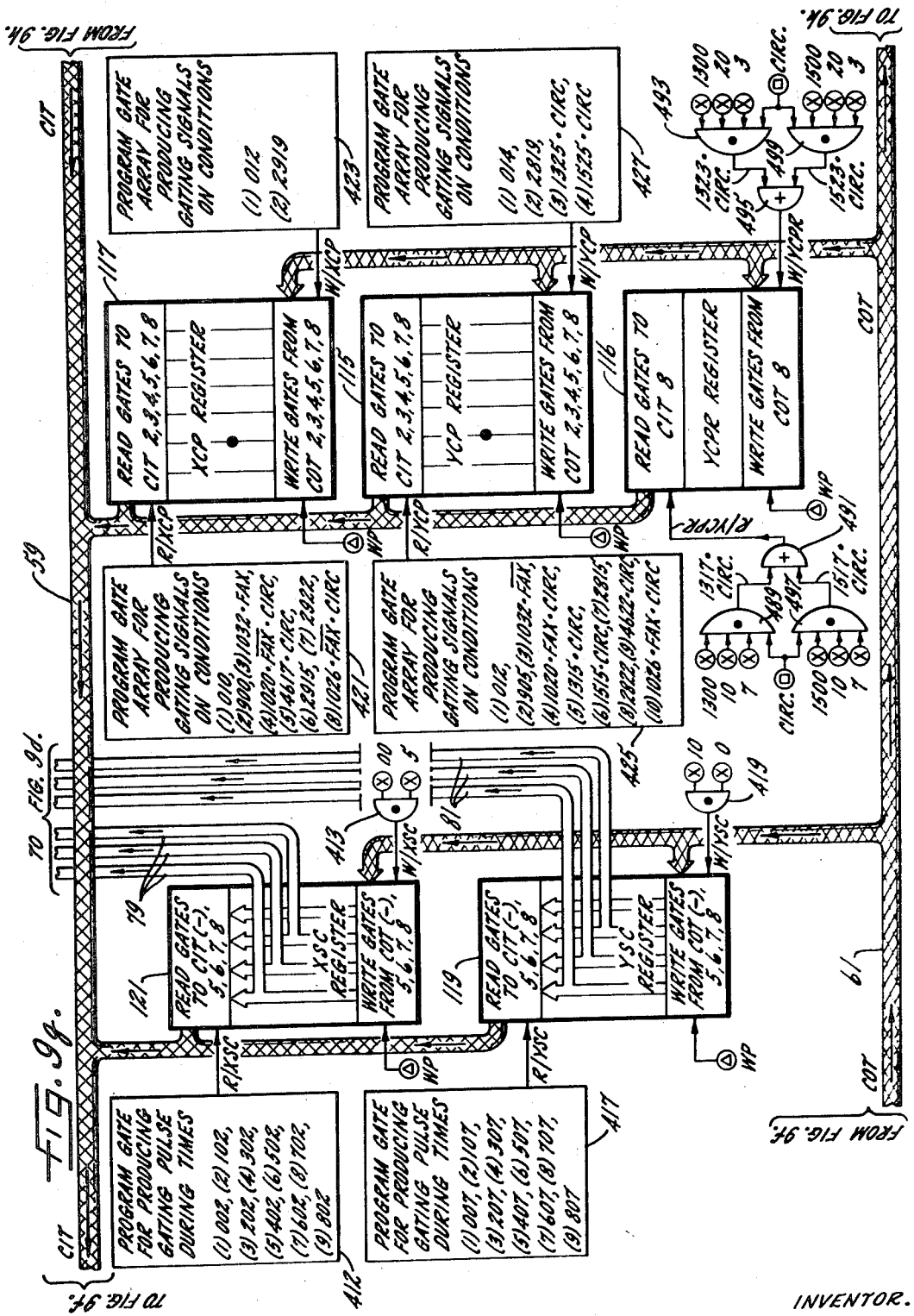

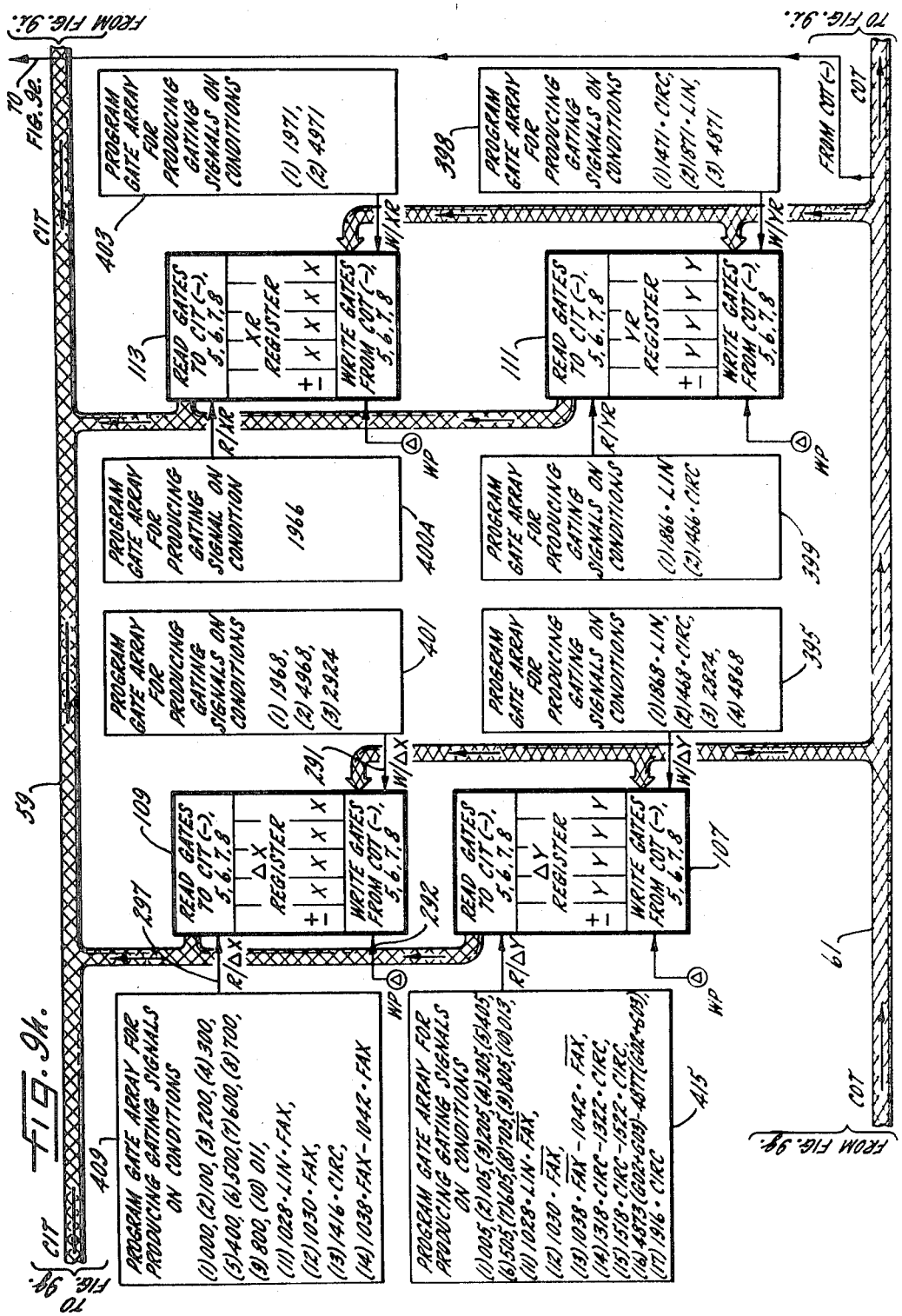

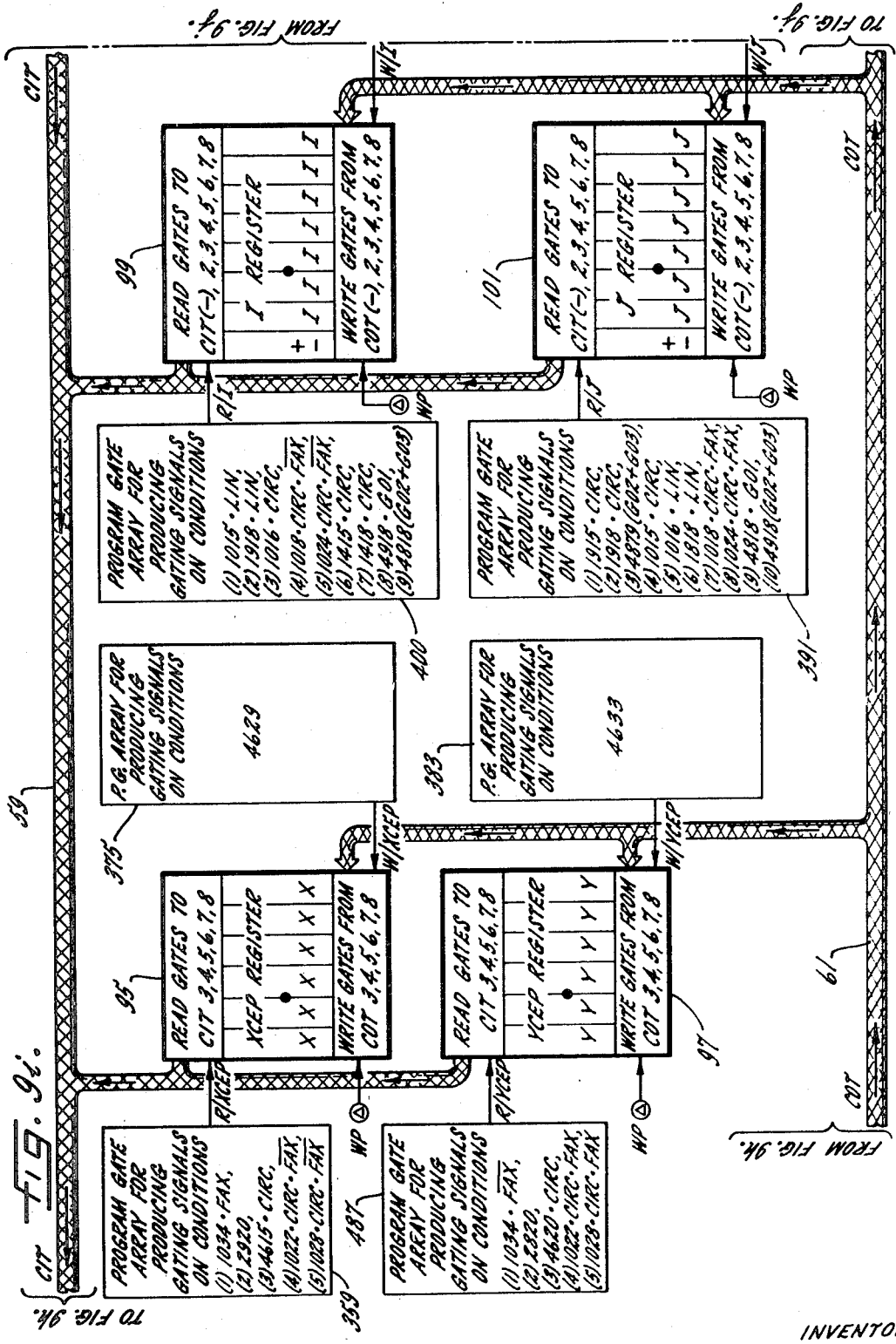

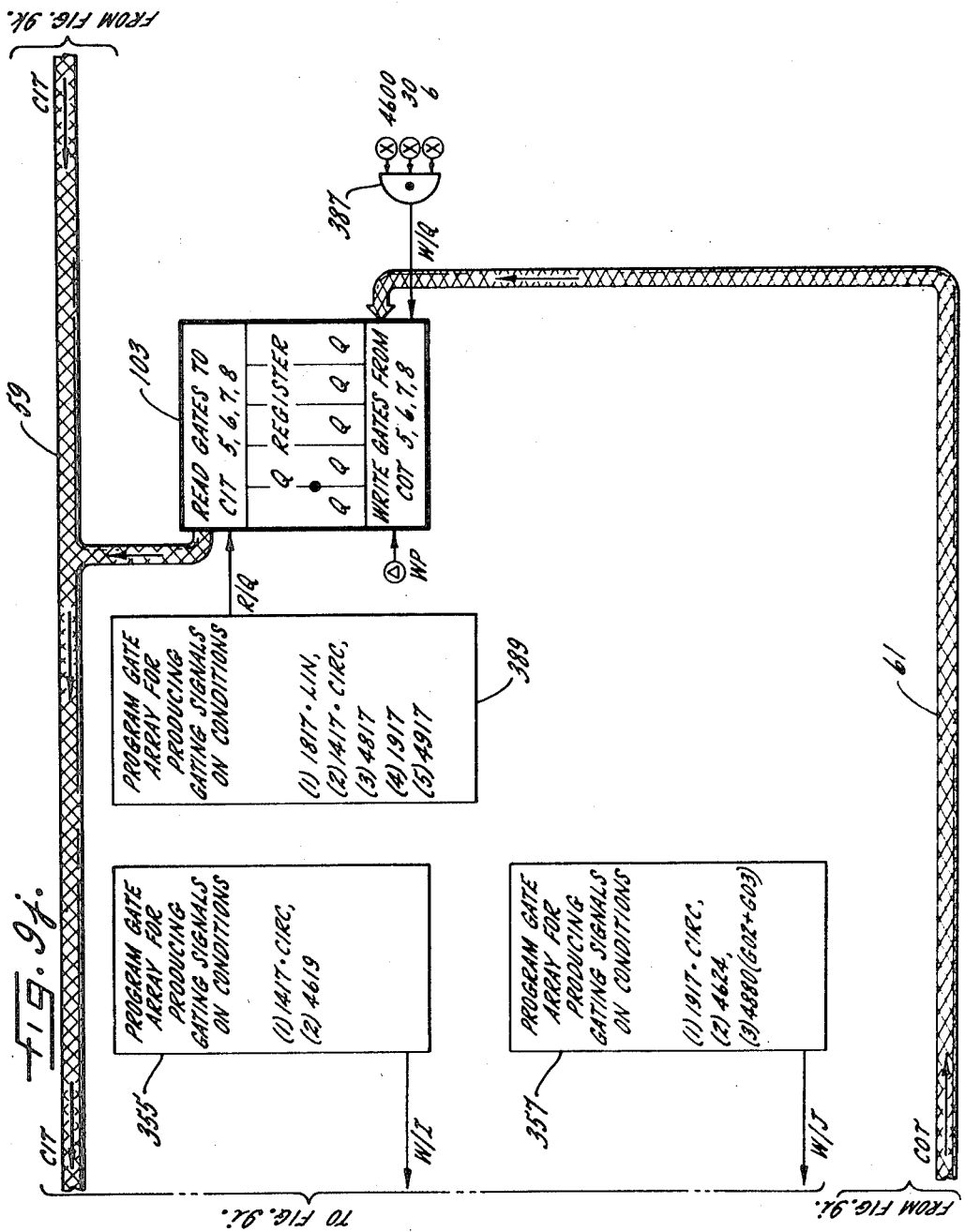

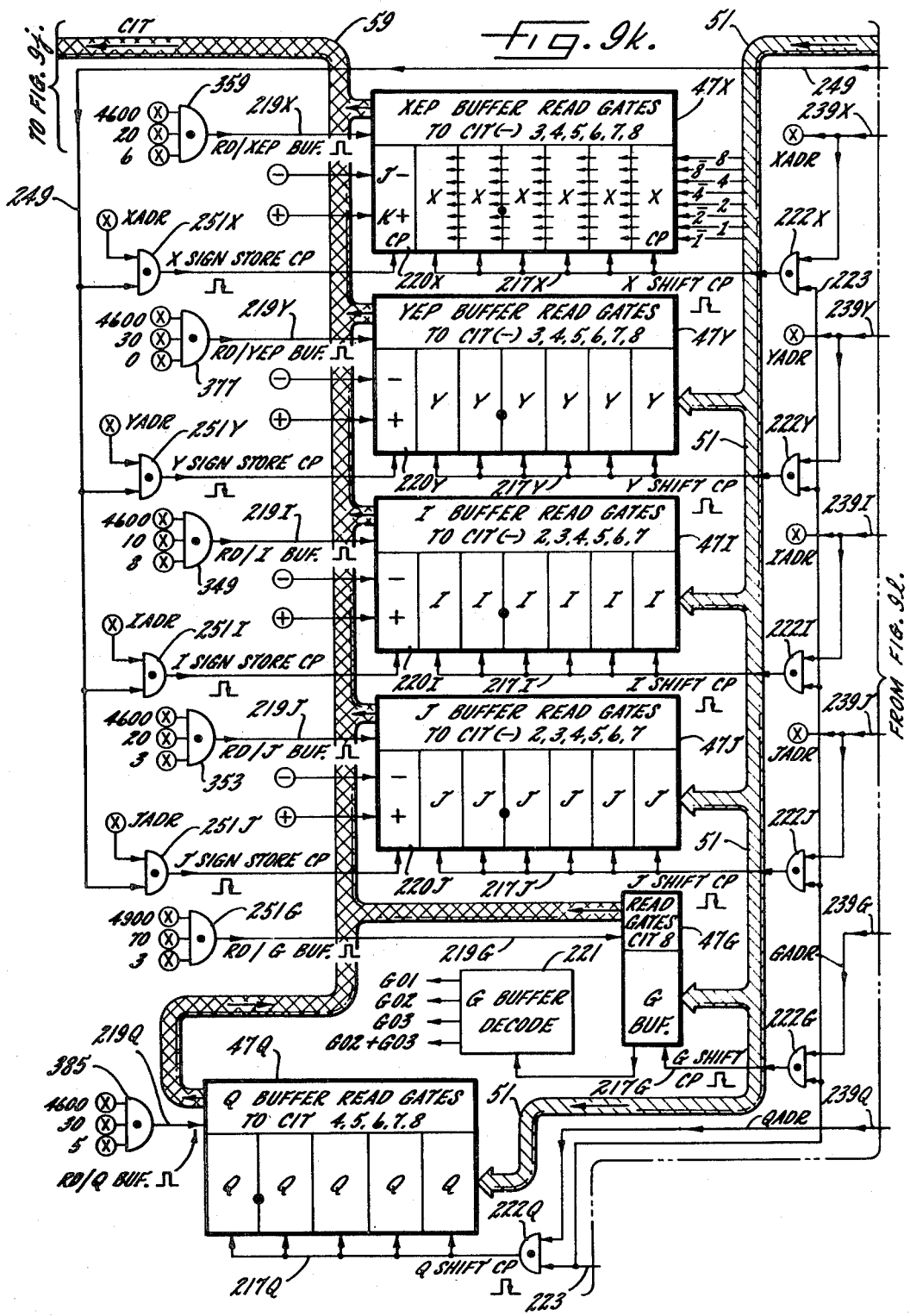

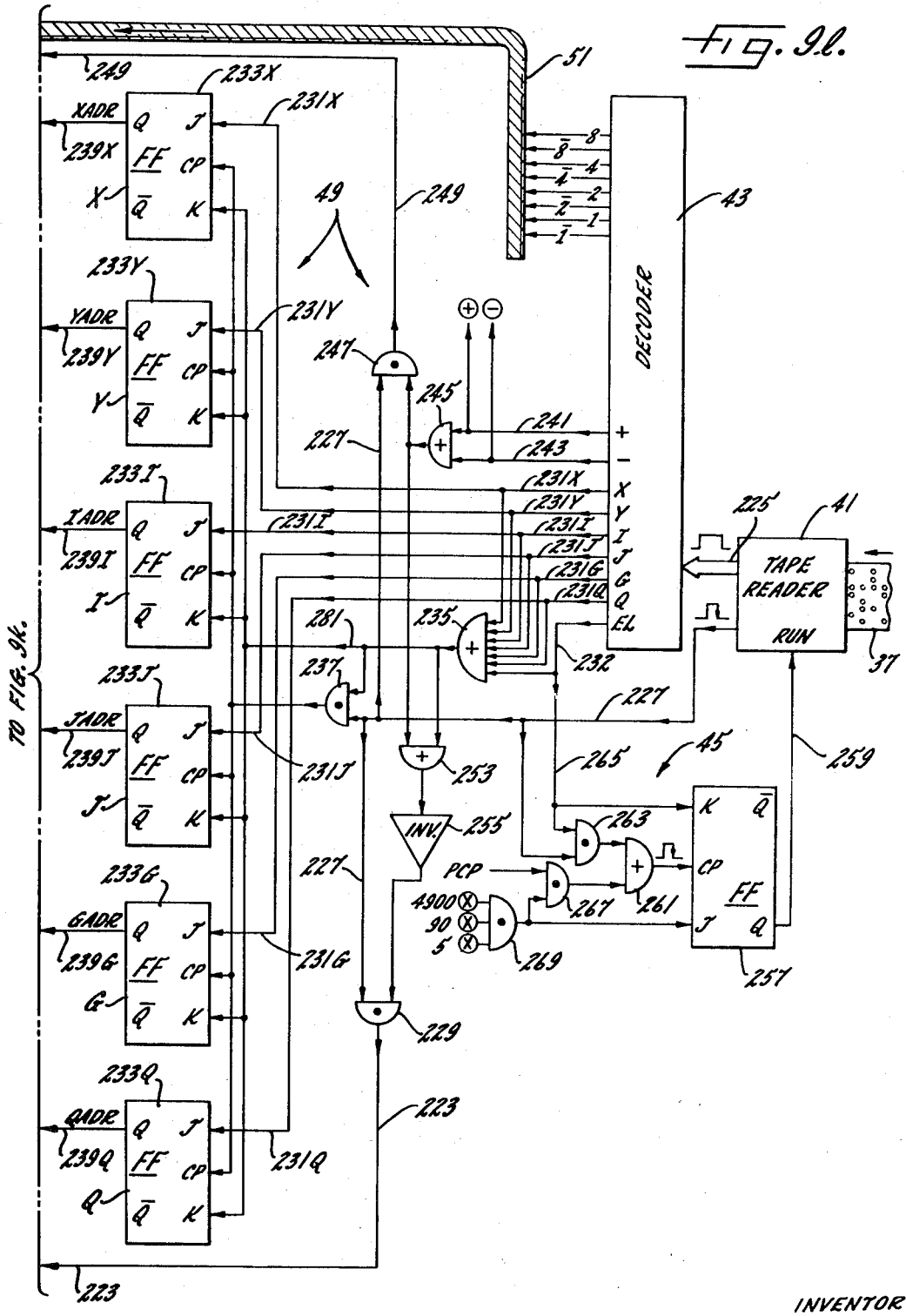

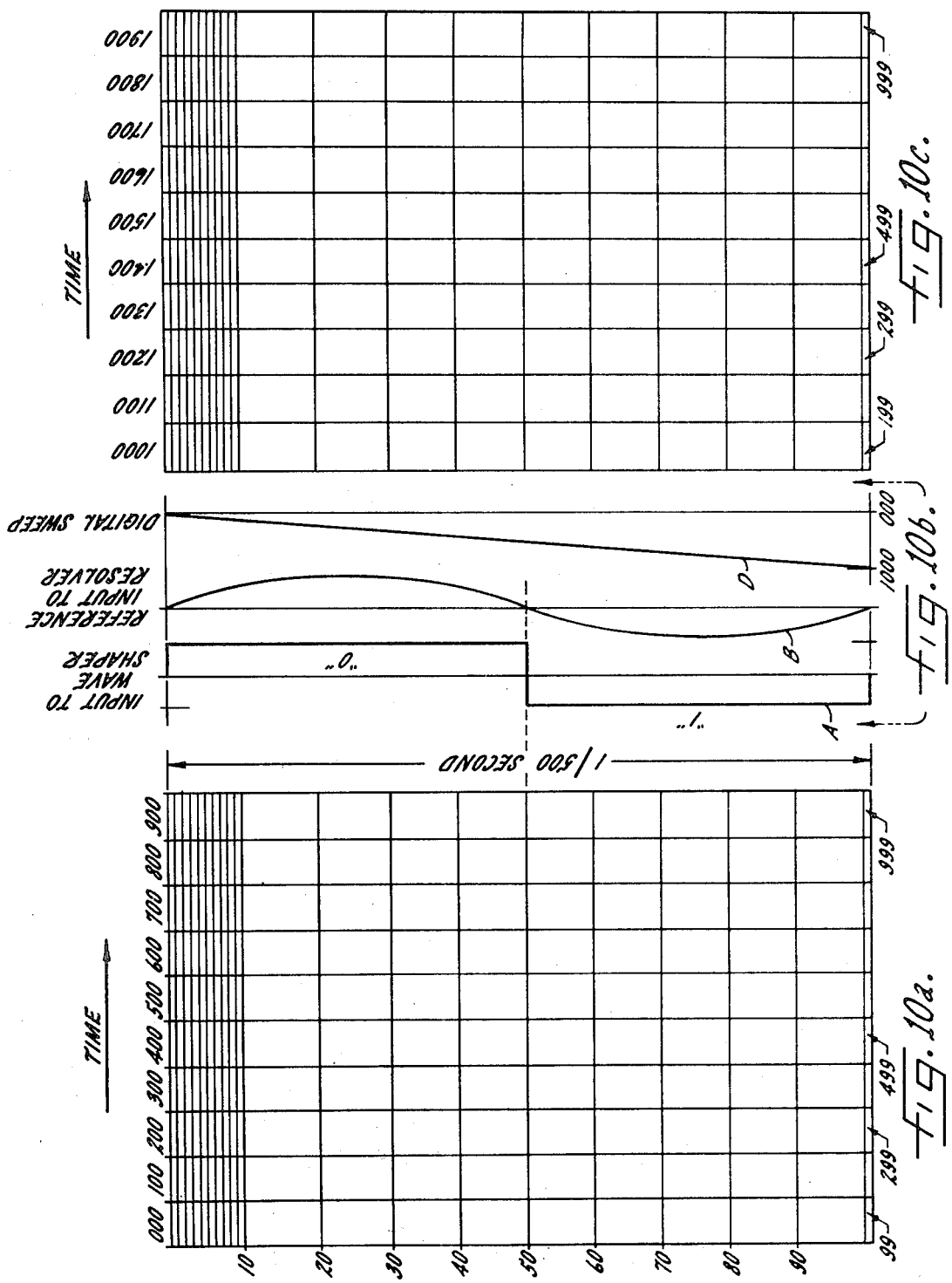

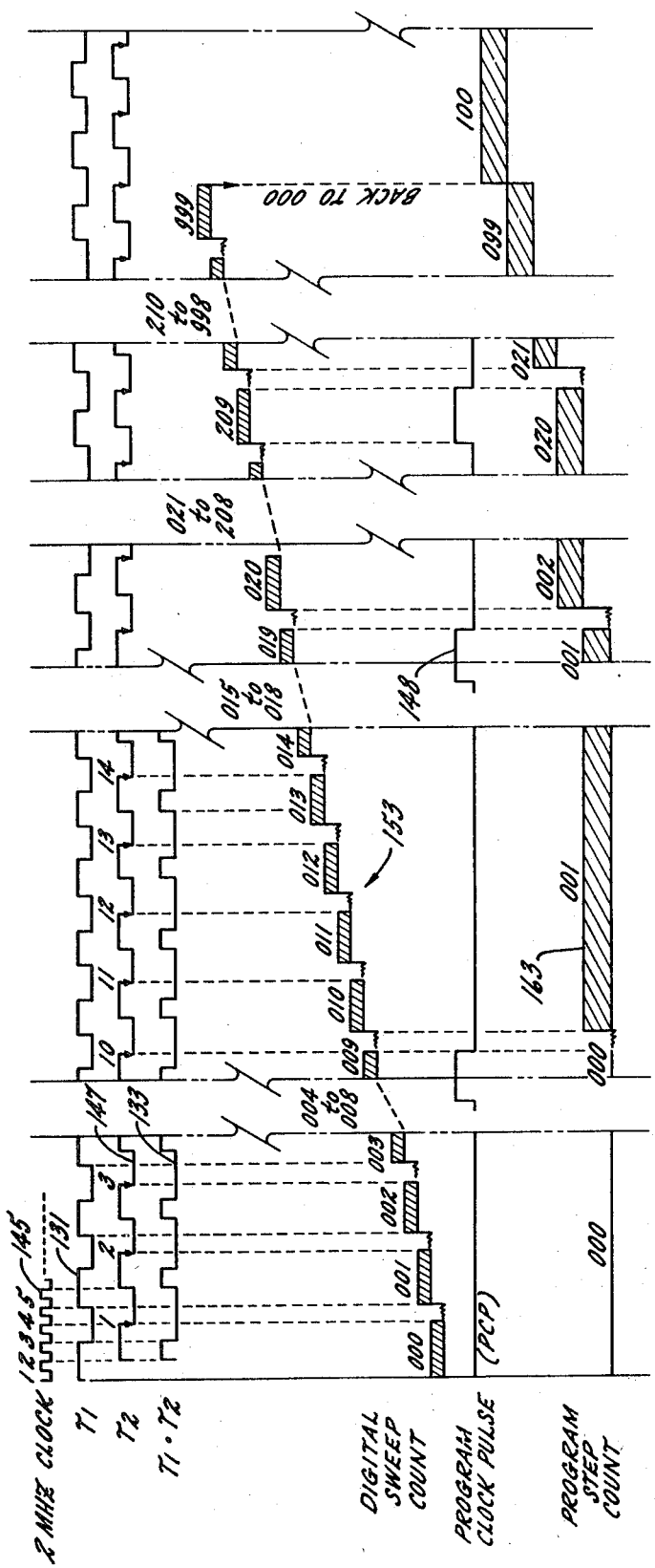
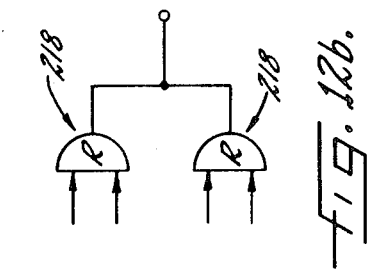
Fig. 11.
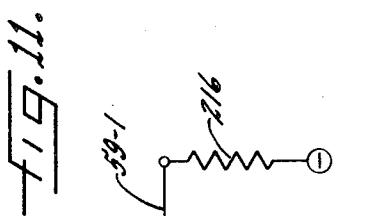
Fig. 12b.
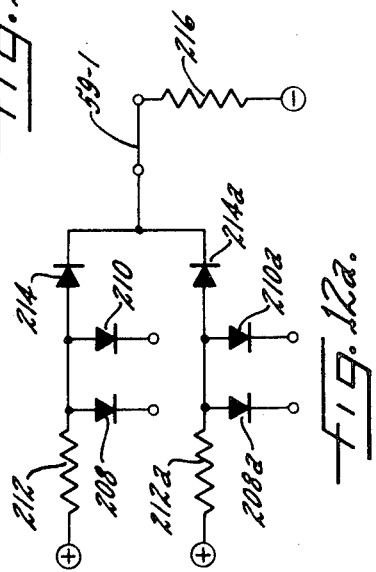
Fig. 12a.
INVENTOR.
ARTHUR O. FITZNER
BY Wolfe, Hubbard, Voit, Osann
ATTORNEYS.

Fig. 17. LAST (OR 10TH) ADJUSTED MACROMOVE OF A LINEAR PATH SEGMENT AND SET-UP CALCULATIONS FOR ENTERING ANOTHER LINEAR PATH SEGMENT

TYPICAL LINEAR MACROMOVE IN WHICH NO OVERRUN HAS BEEN DETECTED

1ST, 2ND, 3RD, 4TH, 5TH, 6TH, 7TH, 8TH and 9TH ADJUSTED MACROMOVES OF 10-MACROMOVE LINEAR END-OF-BLOCK SEQUENCE

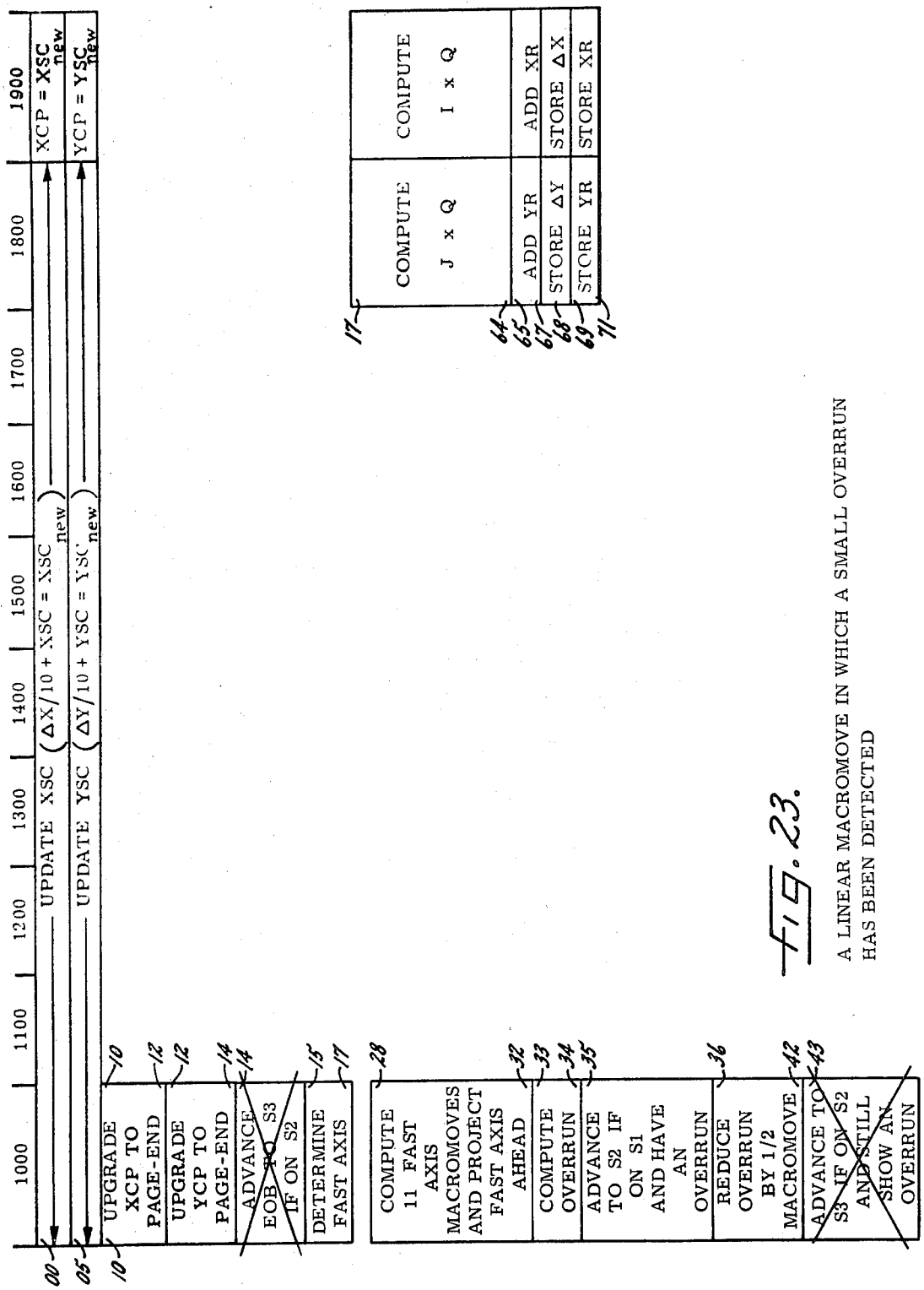
Fig. 23. A LINEAR MACROMOVE IN WHICH A SMALL OVERRUN HAS BEEN DETECTED

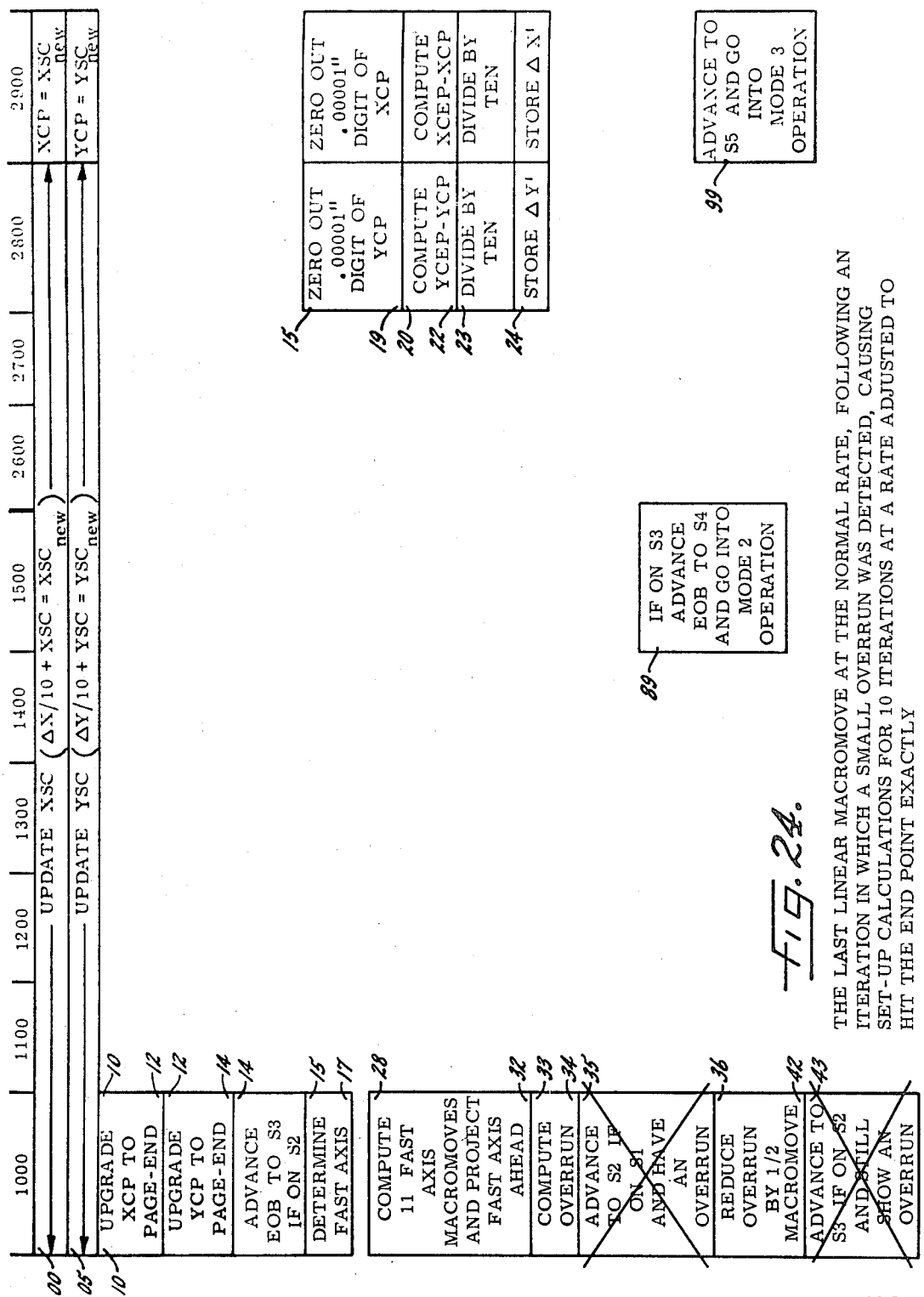

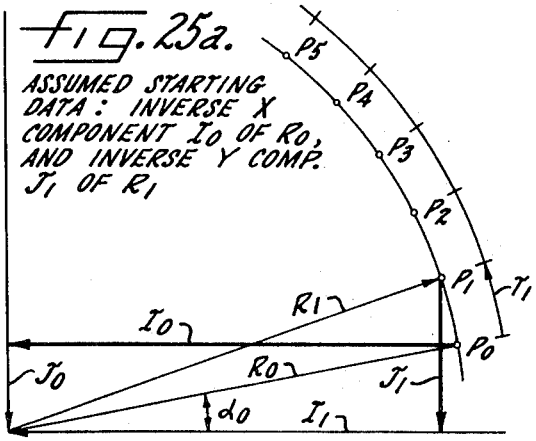
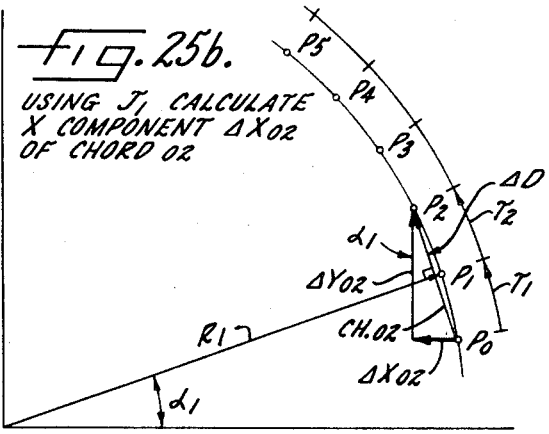
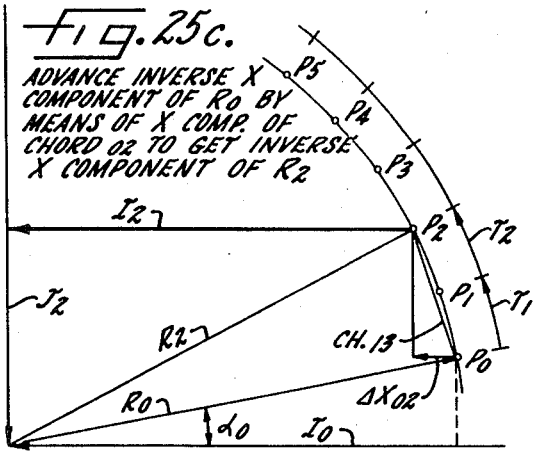
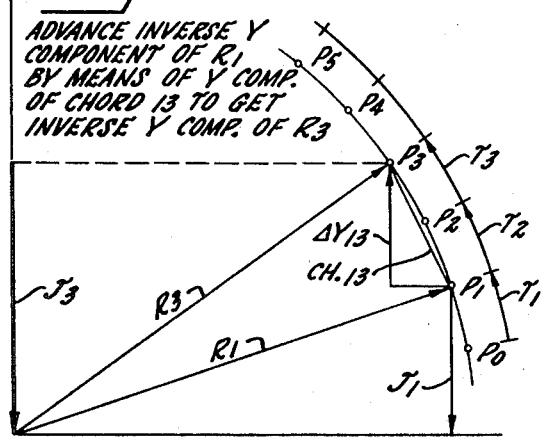
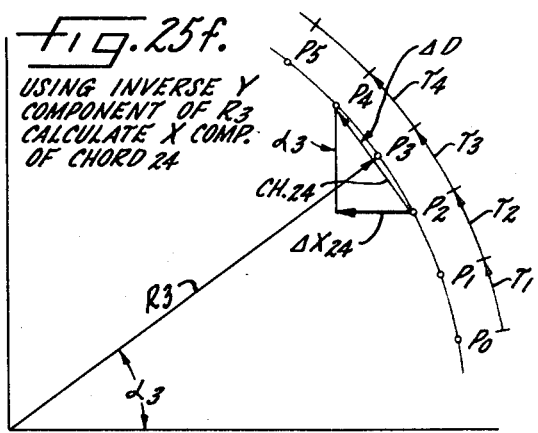

$J_1 = J_0 - \Delta Y_{01}$
$ERROR = J_0 - j_0$

LAST (OR 10TH) ADJUSTED MACROMOVE OF A LINEAR PATH SEGMENT AND SET-UP CALCULATIONS FOR ENTERING A CIRCULAR PATH SEGMENT

INVENTOR.
ARTHUR O. FITZNER
BY Wolfe, Hubbard, Voit & Osann
ATTORNEYS.

TYPICAL STAGGERED CIRCULAR MACROMOVE IN WHICH NO OVERRUN HAS BEEN DETECTED

THE LAST MACROMOVE OF A CIRCULAR PATH SEGMENT IN WHICH A LARGE OVERRUN HAS BEEN DETECTED, CAUSING SET-UP CALCULATIONS FOR ENTERING A LINEAR PATH SEGMENT

Fig. 34. THE LAST MACROMOVE OF A CIRCULAR PATH SEGMENT IN WHICH A LARGE OVERRUN HAS BEEN DETECTED, CAUSING SET-UP CALCULATIONS FOR ENTERING ANOTHER CIRCULAR PATH SEGMENT

INVENTOR.
ARTHUR O. FITZNER
BY Wolfe, Hubbard, Voit, Osann
ATTORNEYS.

Fig. 35. A STAGGERED CIRCULAR MACROMOVE IN WHICH A SMALL OVERRUN HAS BEEN DETECTED

THE LAST MACROMOVE OF A CIRCULAR PATH SEGMENT FOLLOWING AN ITERATION IN WHICH A SMALL OVERRUN WAS DETECTED, CAUSING SET-UP CALCULATIONS FOR ENTERING A LINEAR PATH SEGMENT

THE LAST MACROMOVE OF A CIRCULAR PATH SEGMENT FOLLOWING AN ITERATION IN WHICH A SMALL OVERRUN WAS DETECTED, CAUSING SET-UP CALCULATIONS FOR ENTERING ANOTHER CIRCULAR PATH SEGMENT

INVENTOR.
ARTHUR O. FITZNER
BY Wolfe, Hubbard, Voit & Osann
ATTORNEYS.

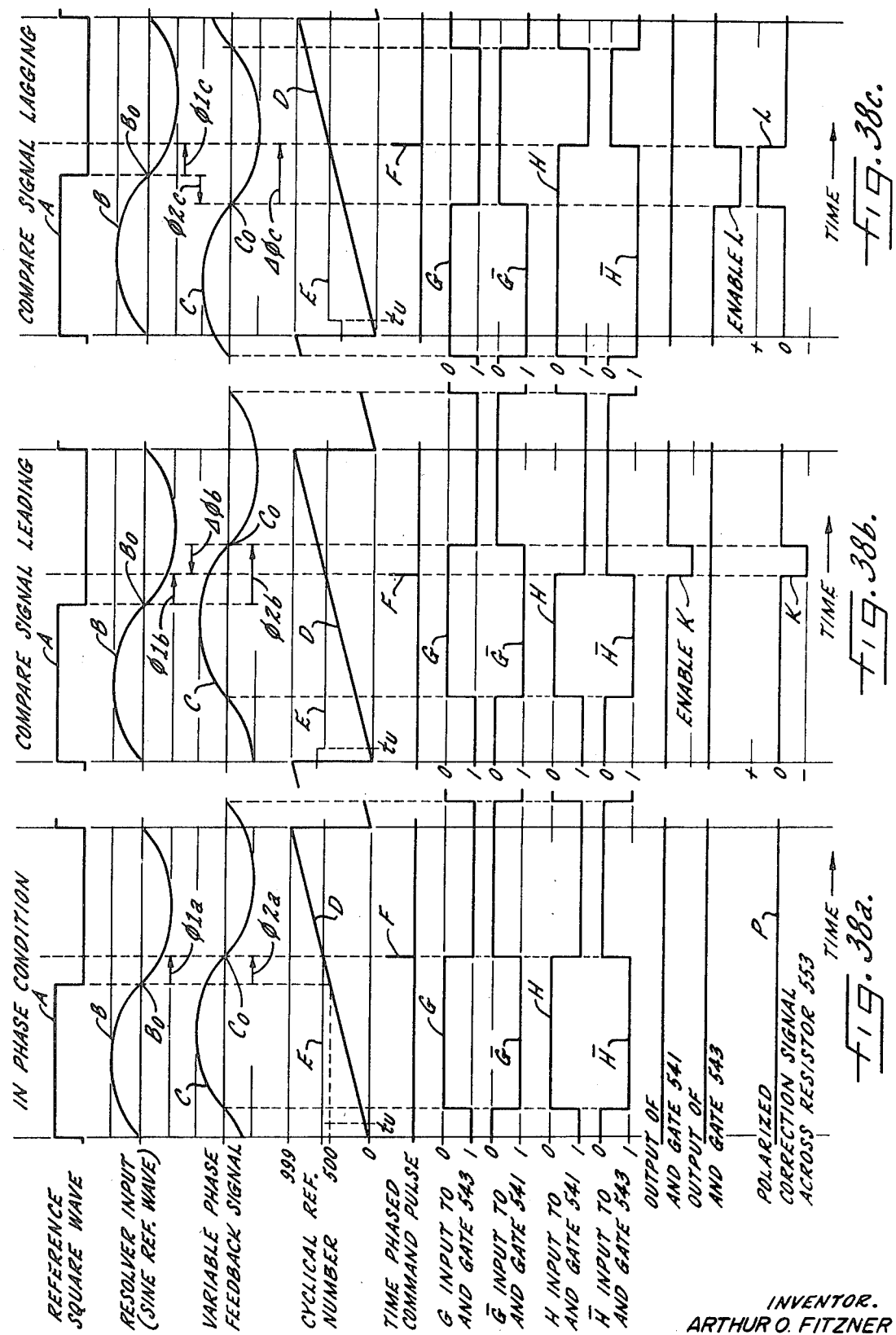

DATA PROCESSING METHOD FOR MINIMIZING POTENTIAL ERRORS OCCURRING DURING LINEAR AND CIRCULAR INTERPOLATION

TABLE OF CONTENTS

| | (Column) |
|---|---|
| A. Abstract of the Disclosure | Cover |
| B. Background and Objects of the Invention | 3 |
| C. Brief Description of the Drawings | 4 |
| D. An Examplary Machine Tool | 6 |
| E. General Discussion of Concepts and Methods | 6 |
|   1. Positioning controls v. path controls | 6 |
|   2. Contouring with the McGee system | 7 |
|   3. Macromove and micromove calculations | 9 |
|     a. Linear path generation | 9 |
|     b. Circular path generation | 11 |
|   4. The disclosed system | 13 |
|   5. Operation of the system disclosed generally in FIG. 7 | 15 |
| F. Detailed Description of Simultaneous Linear Path Generation | 19 |
|   1. The system in greater detail | 19 |
|     a. The central timing system | 19 |
|       (1) Producing the digital sweep | 19 |
|       (2) Producing gating pulses to assure utilization of the digital sweep while its count states are stable | 20 |
|       (3) Generating a basic series of program steps | 22 |
|       (4) Generating alternative series of program steps | 23 |
|       (5) The time base mode selector | 25 |
|       (6) Producing a reference signal for the servo drives | 26 |
|     b. Tape reader and buffer registers | 27 |
|     c. The active registers | 32 |
|     d. An exemplary time shared digital computer | 34 |
|     e. Path type indicator for the current path segment | 38 |
|     f. The program gate array (PGA) | 38 |
|   2. Operation of the system in generating a linear path | 39 |
|     a. Steps performed prior to the execution of the first macromove along a linear path to generate $\Delta X$ and $\Delta Y$ numbers | 39 |
|       (1) Transferring of data representing next path segment from buffer registers to active registers (Table I) | 40 |
|       (2) Converting the data transferred to the active registers into macromove and micromove numbers | 44 |
|         (a) Multiplying $J \times Q$ and splitting off the remainder (Table II) | 44 |
|         (b) Going into Mode 1 operation | 48 |
|     b. Upgrading and updating with macromove and micromove numbers to produce macropositions and micropositions (Table III) | 48 |
|     c. Geometrical analysis of look-ahead with macromoves adjusted to hit the end point | 53 |
|       (1) General discussion | 53 |
|       (2) The two tests for detecting the presence and sign of projected overrun | 54 |
|       (3) The first test | 55 |
|       (4) The second test | 55 |
|       (5) Calculating adjusted macromoves $\Delta X'$, $\Delta Y'$ for a large projected overrun | 55 |
|       (6) Calculating adjusted macromoves $\Delta X''$, $\Delta Y''$ for a small projected overrun | 56 |
|       (7) Summary and restatement in data processing terms | 56 |
|     d. Data processing steps carried out by the exemplary system in performing look-ahead and macromove adjustment | 58 |
|       (1) Sequence of iterations during generation of linear path segment | 58 |
|       (2) Data processing steps associated with detecting a projected overrun | 58 |
|         (a) Determining the fast axis (Table IV) | 58 |
|         (b) Producing the look-ahead point and performing the first test | 59 |
|         (c) "Retracting" the look-ahead point by $\frac{1}{2}$ macromove and performing the second test (Table IV A) | 63 |
|       (3) Changing system operation into Mode 2 in response to detection of a large projected overrun | 63 |
|       (4) Data processing steps associated with calculating adjusted macromoves (Table V) | 64 |
|       (5) Changing system operation into Mode 3 in order to execute adjusted macromoves during subsequent iterations | 67 |
|       (6) Operation of the system in Mode 3 | 67 |
|       (7) Changing the system to Mode 4 operation following execution of the 9th pair of adjused macromoves | 67 |
|       (8) Changing system operation from Mode 1 to Mode 2 in response to the detection of a small projected overrun | 68 |
| G. Detailed Description of Staggered Circular Path Generation | 69 |
|   1. The concept | 69 |
|     a. Assuming components of two radius vectors are given | 69 |
|     b. Assuming that components of only a single radius vector are given | 71 |
|   2. Staggered circular interpolation as carried out by the system of FIG. 9 | 72 |
|     a. In general | 72 |
|     b. The form of starting data for a circular path segment | 72 |
|     c. Generating successive I, J, $\Delta X$, and $\Delta Y$ numbers | 73 |
|     d. Data processing steps performed prior to the generation of signals representing a circular path | 75 |
|     e. A physical representation of macromoves and micromoves generated during the initial portion of a clockwise circular path segment | 77 |
|     f. Data processing steps and operations performed by the system in Mode 1 while executing a circular path segment | 78 |
|       (1) Y axis data used for updating YSC register changes midway through an iteration due to staggering | 78 |
|       (2) Upgraded YCP number modified during iteration using new $\Delta Y$ macromove number (Tables VI and VI A) | 79 |
|       (3) Computing the new $\Delta Y$ macromove number | 84 |
|     g. The particular advantages of a two-level interpolation process in generating a circular path segment | 86 |
|     h. Terminating the circular path segment | 86 |
|       (1) Macromoves are not adjusted and the path segment is not necessarily reached at the end of an iteration | 86 |
|       (2) Proximity to the end point must be tested for both axes | 87 |
|       (3) Testing for proximity of the path segment to its designated end point along the "slow" axis | 88 |
|       (4) Testing for a projected overrun by the path segment of its designated end point along the "fast" axis | 88 |
|       (5) Typical iterations for terminating a circular path segment | 89 |
|     i. Data processing steps directed to detecting a projected overrun by testing for proximity to the end point along both axes | 90 |
|       (1) Determining the fast axis | 90 |
|       (2) Proximity test for the slow axis | 91 |
|       (3) Proximity test for the fast axis | 94 |
|     j. Data processing steps directed to changing operation of the system from Mode 1 to Mode 4 | 96 |
|     k. The reason for and manner of modifying the data representing the next path segment | 97 |
|     l. Data processing steps directed to modifying the data representing the next path segment | 99 |
|     m. Return of the system to Mode 1 operation for executing the next path segment | 101 |
| H. Detailed Description of a Servomechanism for Executing a Path Segment in Accordance with Interpolated Microposition Numbers | 101 |

B. BACKGROUND AND OBJECTS OF THE INVENTION

The present invention relates in general to systems wherein information read from a punched tape or the like is supplied to data processing apparatus which in turn controls the operation of a utilization device. Such systems are exemplified by the well-known "numerical control" systems for machine tools or the like in which a numerically defined program of successive motions to be executed along a continuous path is represented on successive blocks of, and read from, a punched tape into a "director" which governs the servo drives of the movable elements of the machine tool.

In past numerical path controls for machine tools it has been customary to produce a separate stream of relatively evenly time spaced pulses for each separate axis of the machine tool and to assign a physical significance to each pulse so produced. For example, a common convention has been to regard each pulse as corresponding to an increment of movement such as 0.0001 inch.

Because of the extremely wide speed range required for each axis, the pulse repetition rate may vary from 0 to a maximum through a very large number of different pulse repetition frequencies. For a machine having a top speed of 200 inch per minute, the maximum pulse repetition rate at 0.0001 inch per pulse would be 33⅓ kHz.

A numerical path control built in accordance with past practice would, therefore, typically require the production of a separate stream of pulses for each of the separate axes, each of which can range from 0 to 33⅓ kHz. Equipment limitations have in many cases dictated the reduction of the maximum pulse repetition frequency in path controls to a lower value, with the result that, to maintain the top speed of the machine, each pulse had to be assigned a larger value, such as 0.0002 inch or 0.0004 inch, reducing the quality of obtainable surface finish.

To overcome these and other shortcomings there has been developed a new type of numerical control system which is described and claimed in a copending patent application Ser. No. 762,835 filed Sept. 26, 1968 by John K. McGee under the name of Linear and Circular Interpolation Contouring Control Using Repeated Computation, and assigned to he assignee of the present invention.

Briefly, there is described in the related patent application of John K. McGee a numerical control system capable of generating a series of closely spaced points in the form of electrical digital signals, these points lying along a series of path segments which may be either linear or circular. As a part of the process of generating the closely spaced points, the system performs at frequent intervals a test for determining whether or not the path which has been generated thus far has reached within a predetermined distance along one of the axes of the desired end point for the path segment. This single test is sufficient for a linear path segment, but suffers from an inherent ambiguity where the path segment is a circular one.

It is one of the principal objects of the present invention to eliminate the ambiguity which is inherent in a single axis test for proximity of a digitally signaled circular path to its designated end point. In this connection it is an object of the present invention to provide a test for rejecting an erroneous proximity indication based on the relative positions along a given axis of a digitally signaled circular path which is being generated and the end point to which that path is to be extended.

In accordance with an important feature of the system disclosed in the related patent application of John K. McGee, movement along a given path segment is divided into small increments, called macromoves, for the X and Y axes and the successive ones of such macromoves are executed during successive periods ΔT of equal duration. Although means are provided in the system for terminating movement along the path segment at the end of that time period ΔT which will terminate the path segment closest to the designated end point, a small overrun or underrun can still occur.

Accordingly, it is another principal object of the present invention to minimize the effect of an overrun or an underrun at the end of the generation and execution of a path segment by a numerical control system of the type disclosed by John K. McGee in the aforesaid patent application. More specifically, it is an object of the present invention to eliminate the accumulation of errors which results when a numerical control system of the type disclosed by John K. McGee does not terminate a path segment exactly at its designated end point, and it is a specific object of the present invention to do so by modifying the data representing the following path segment so as to compensate for the error introduced at the termination of the preceding path segment.

C. BRIEF DESCRIPTION OF THE DRAWINGS

FIGS. 5a and 5b illustrate the vector quantities represented by numerical commands produced in the process of generating a linear path.

FIGS. 6a through 6b illustrate generally the vector quantities represented by numerical commands generated in the process of producing a circular path in accordance with features of the invention.

Figure 7C:
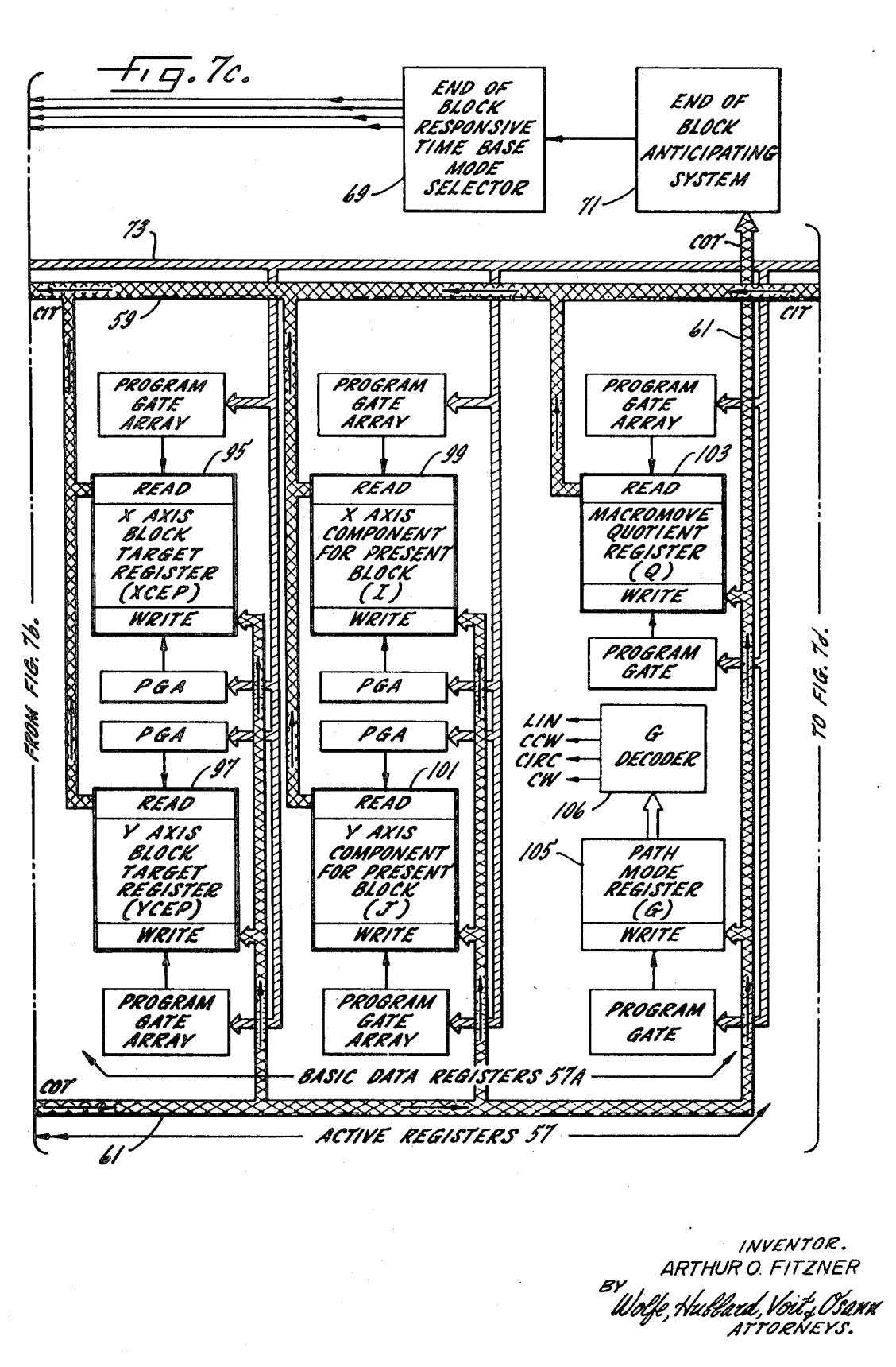

FIG. 7 formed of FIGS. 7a–7d when joined as indicated thereon is a general block diagram of a system embodying features of the present invention.

Figure 9B:
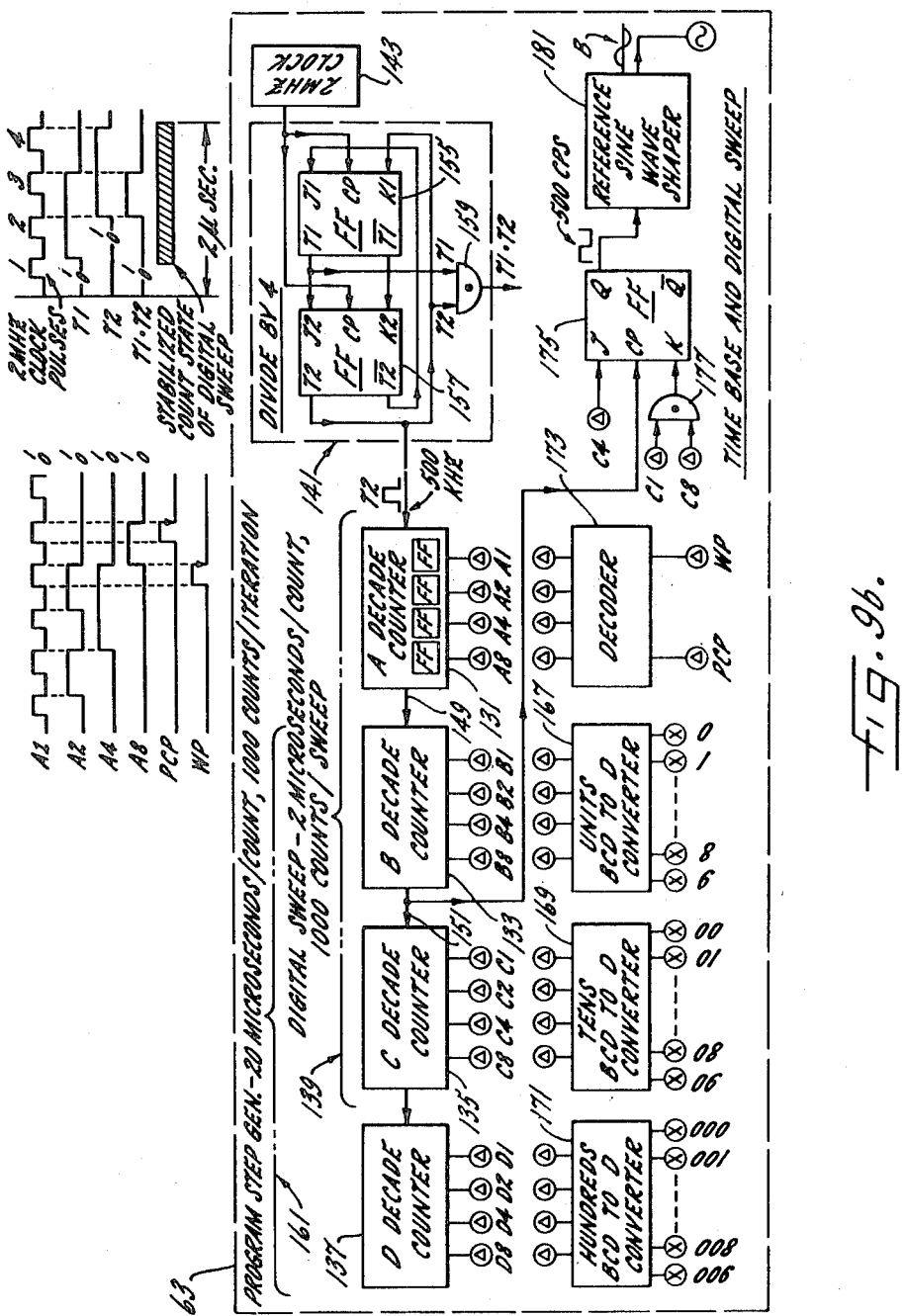
Figure 9F:
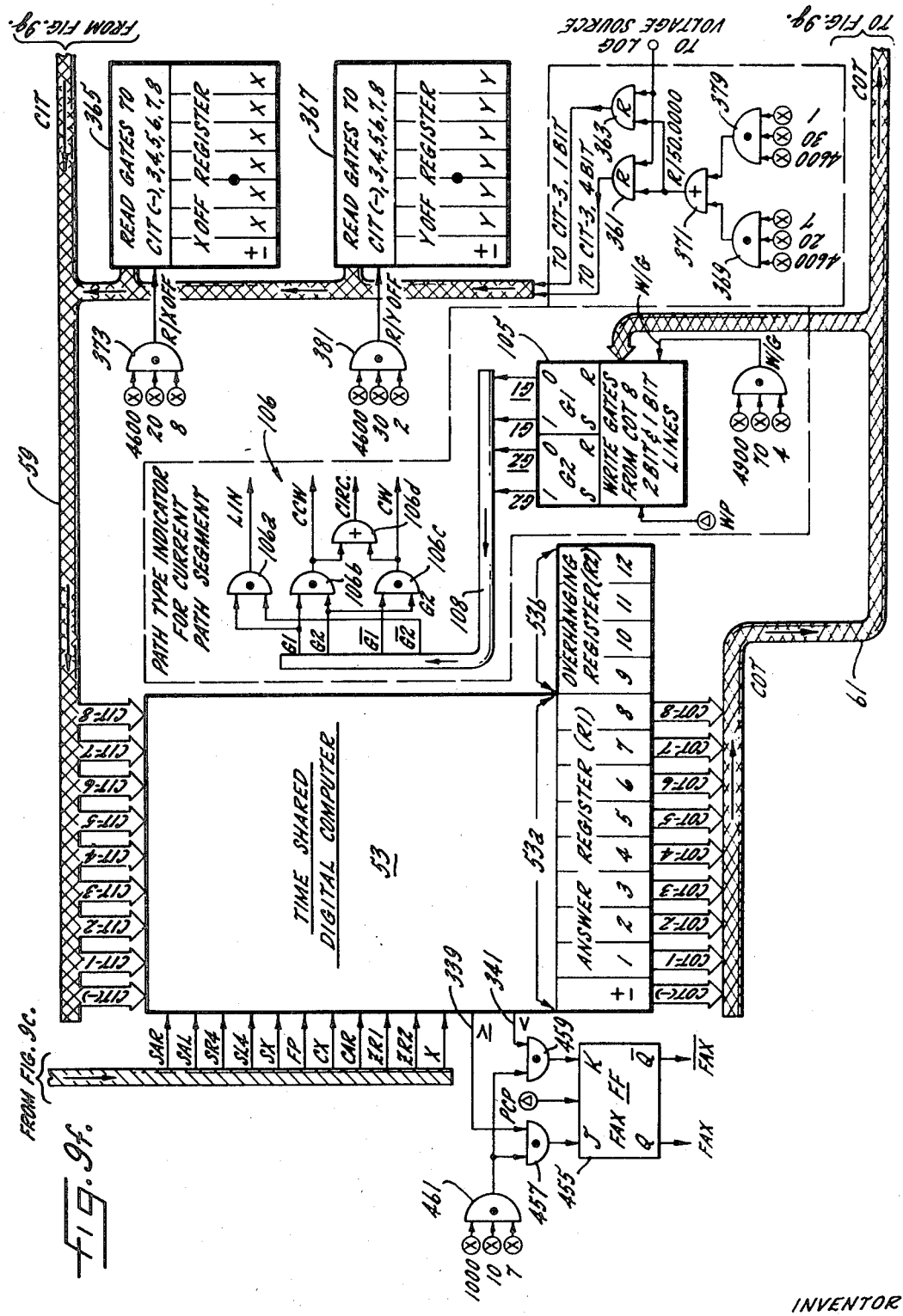

FIG. 8 is a guide for assembling FIG. 9 constituted of FIGS. 9a–9la.

FIG. 9 when assembled as shown in FIG. 8 is a detailed block diagram of a system organized in the manner shown in FIG. 7.

FIG. 10 illustrates the relationship between programming charts used to cause the system of FIG. 9 to operate in different modes during corresponding series of time periods.

FIG. 11 is a set of waveforms showing the time relationships between various timing pulses generated in the system of FIG. 9.

Figure 12:
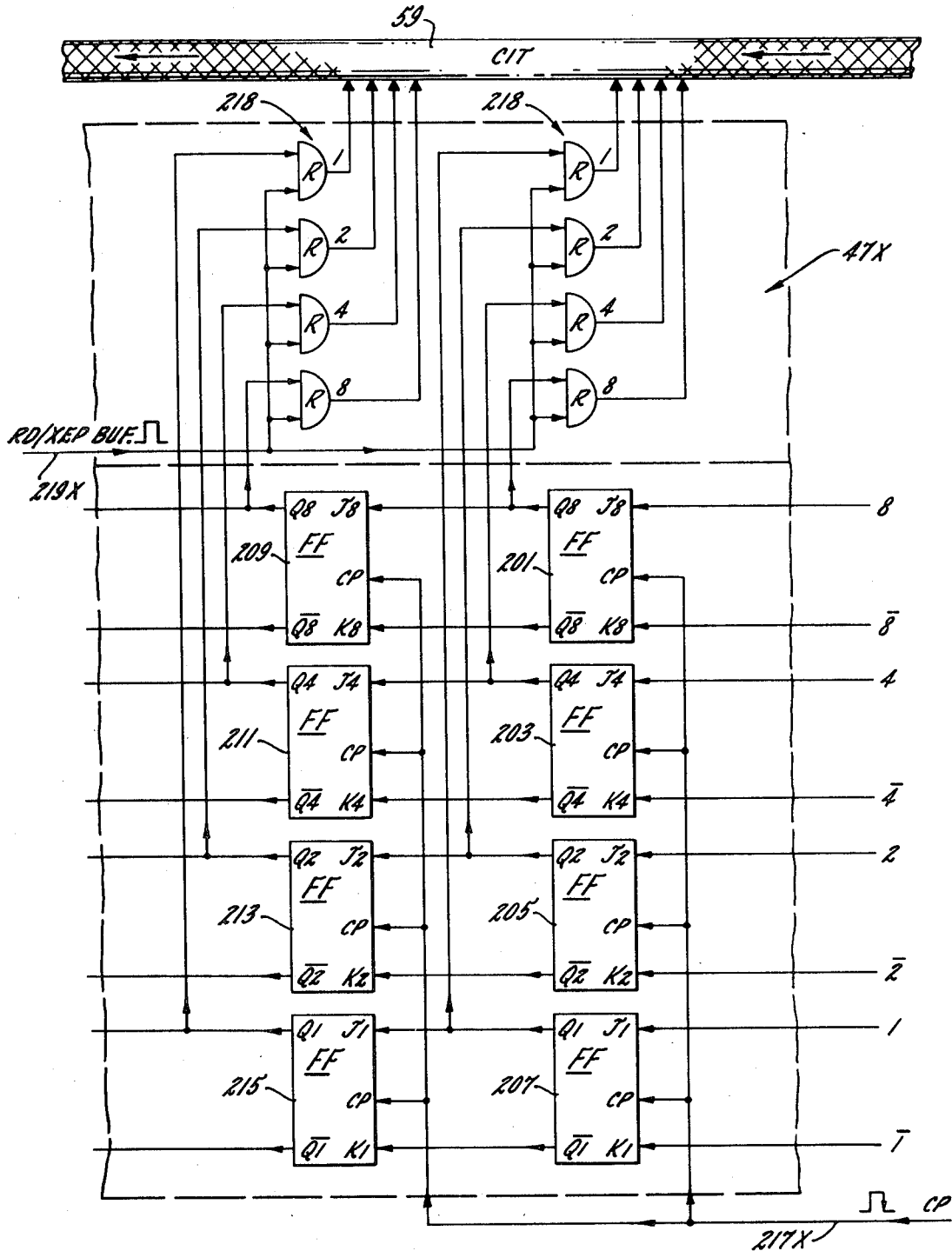

FIGS. 12, 12a and 12b illustrate the last two stages of a shift register suitable for use as one of the buffer registers in FIG. 9l.

Figure 13:
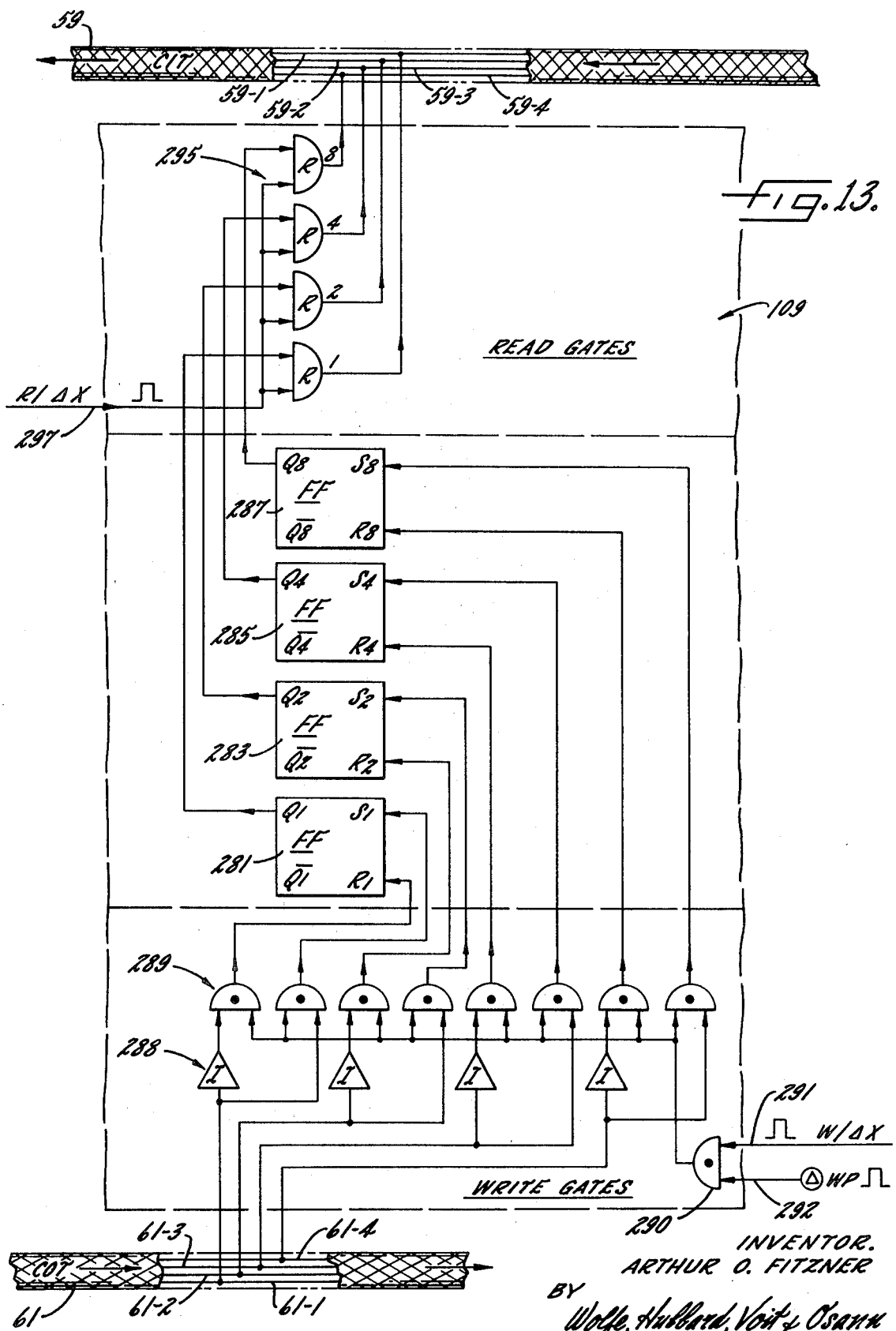

FIG. 13 illustrates one stage of a storage register suitable for use as one of the active registers 57 in FIG. 9.

Figure 14:
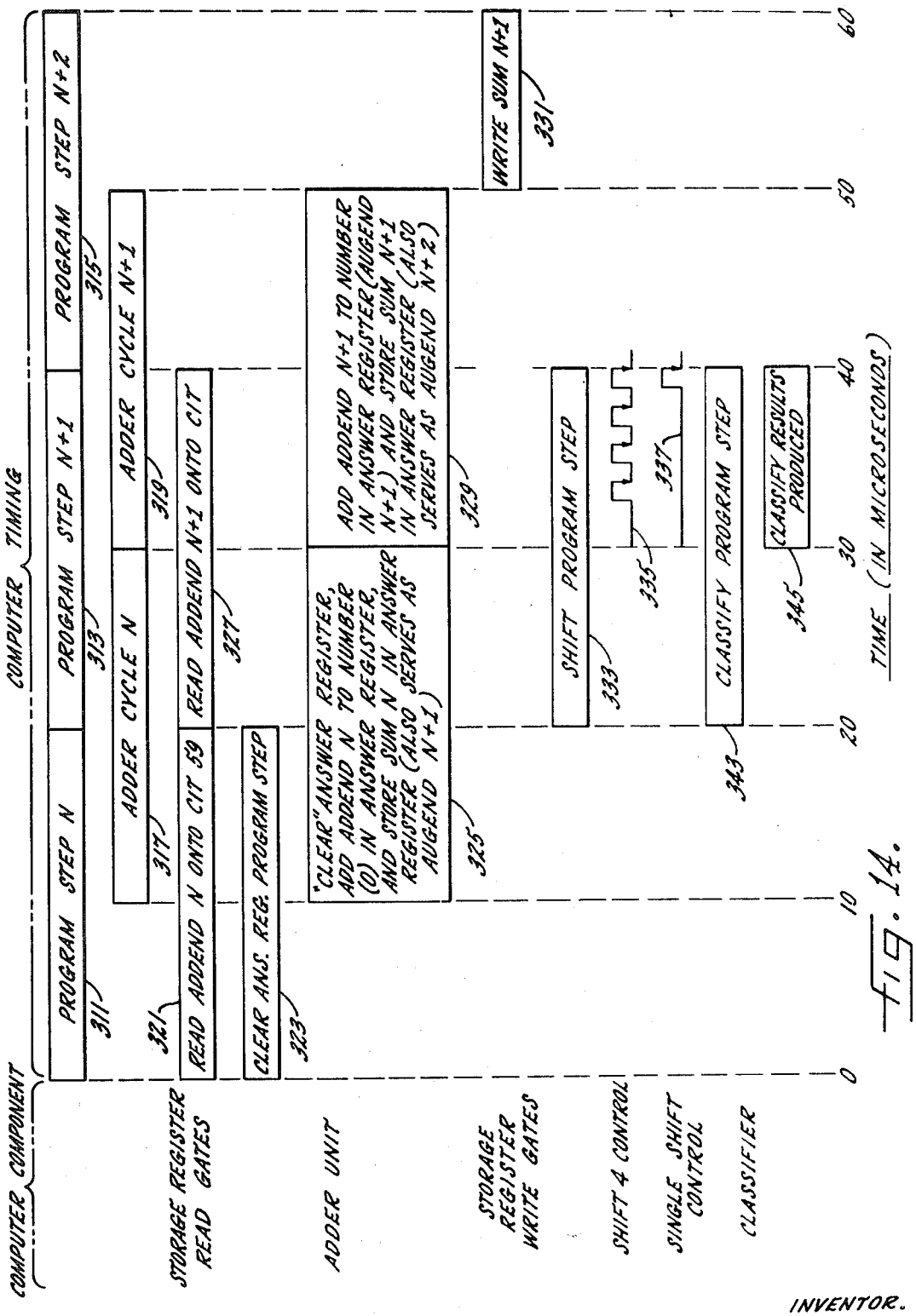

FIG. 14 is a timing diagram for the computer of FIG. 9f.

Figures 15, 16:
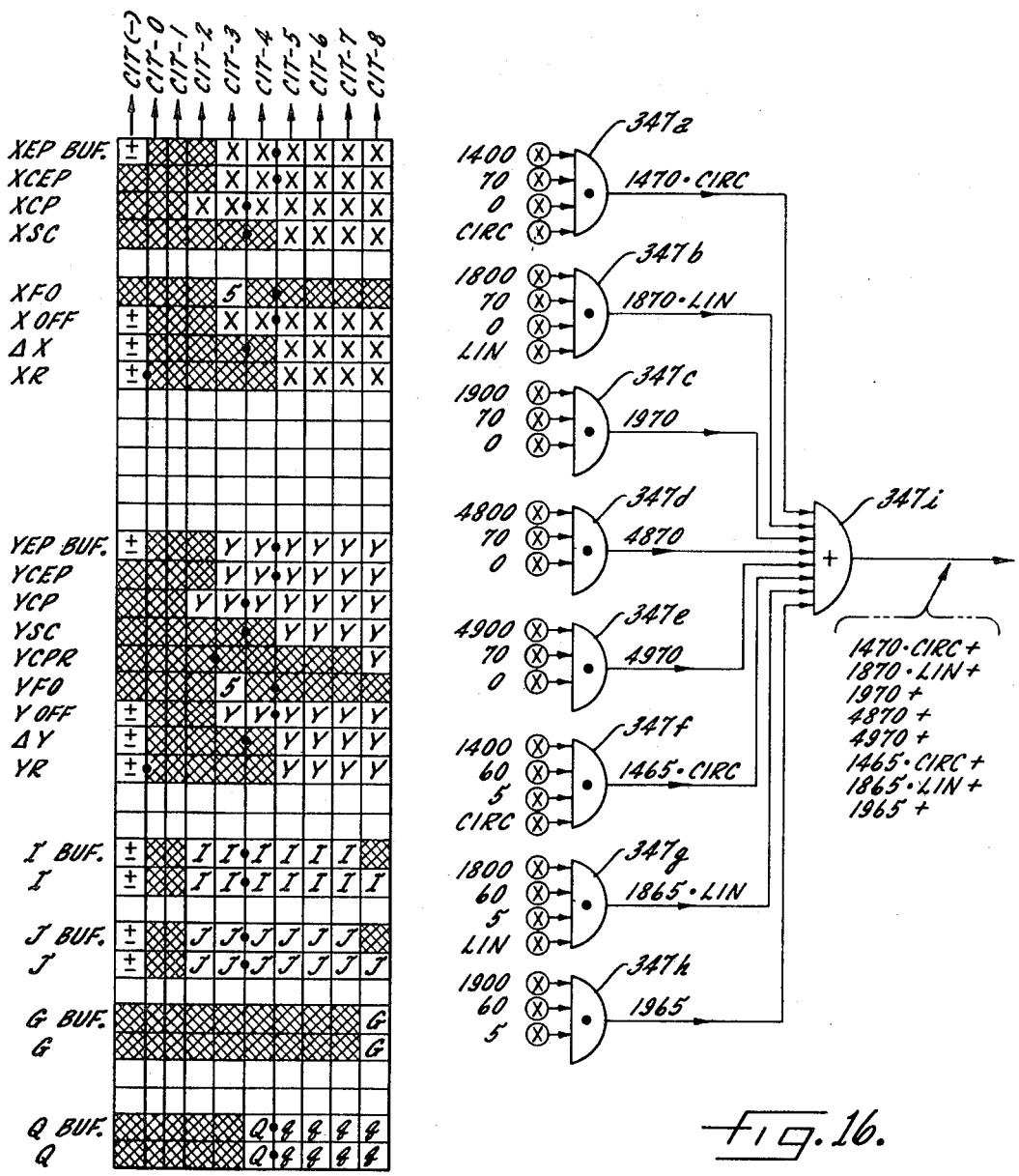

FIG. 15 is a representation of all the storage registers shown in FIG. 9 and of the location of the decimal points of the numbers stored in those registers.

FIG. 16 illustrates an exemplary gating arrangement for deriving a gating pulse at a desired time period from program step signals produced by the time base generating components of FIG. 9.

Figure 17:
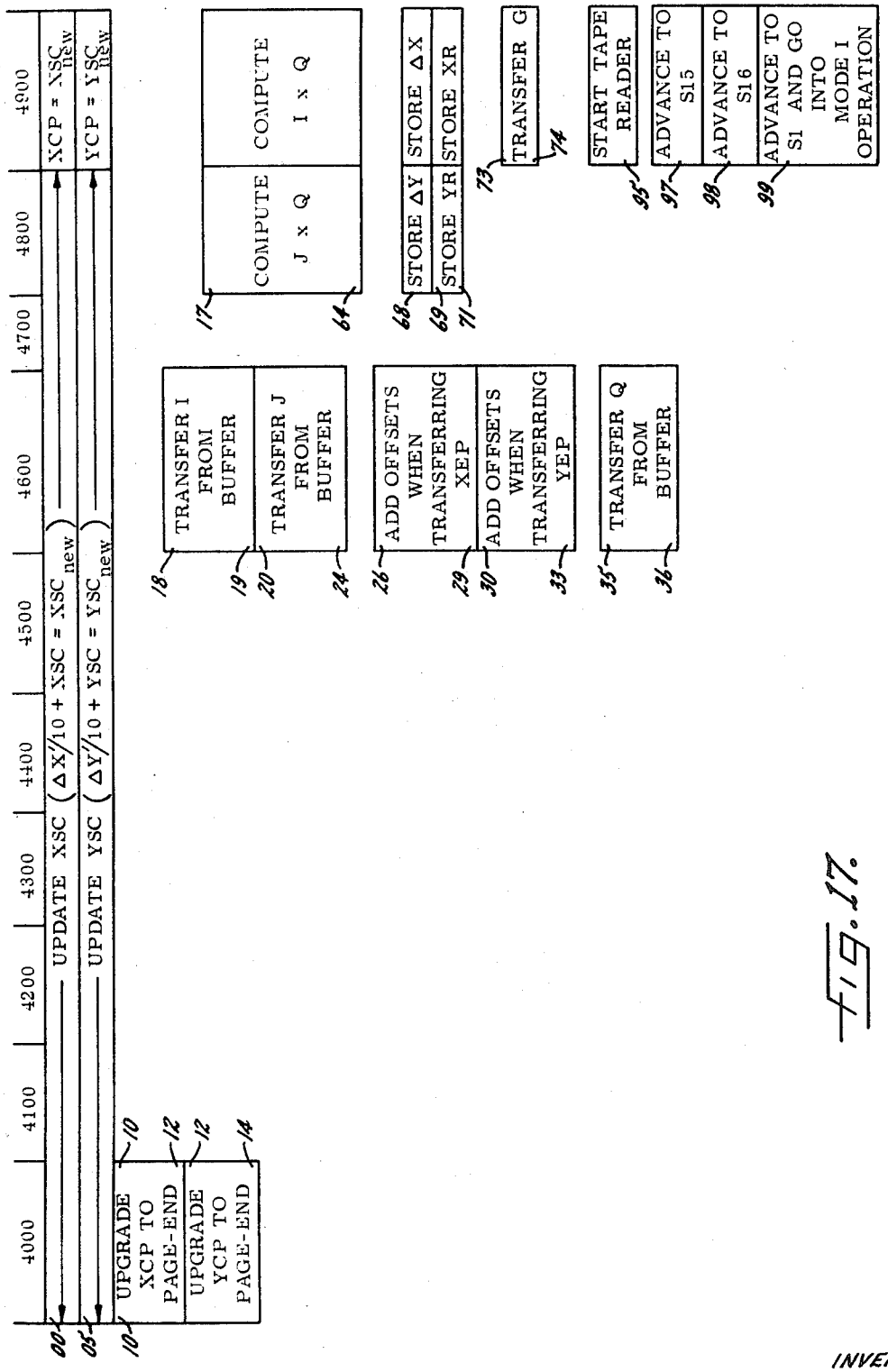

FIG. 17 is a flow chart showing operations performed during the last modified macromove of a linear path segment, including calculations for entering another linear path segment.

Figure 18:
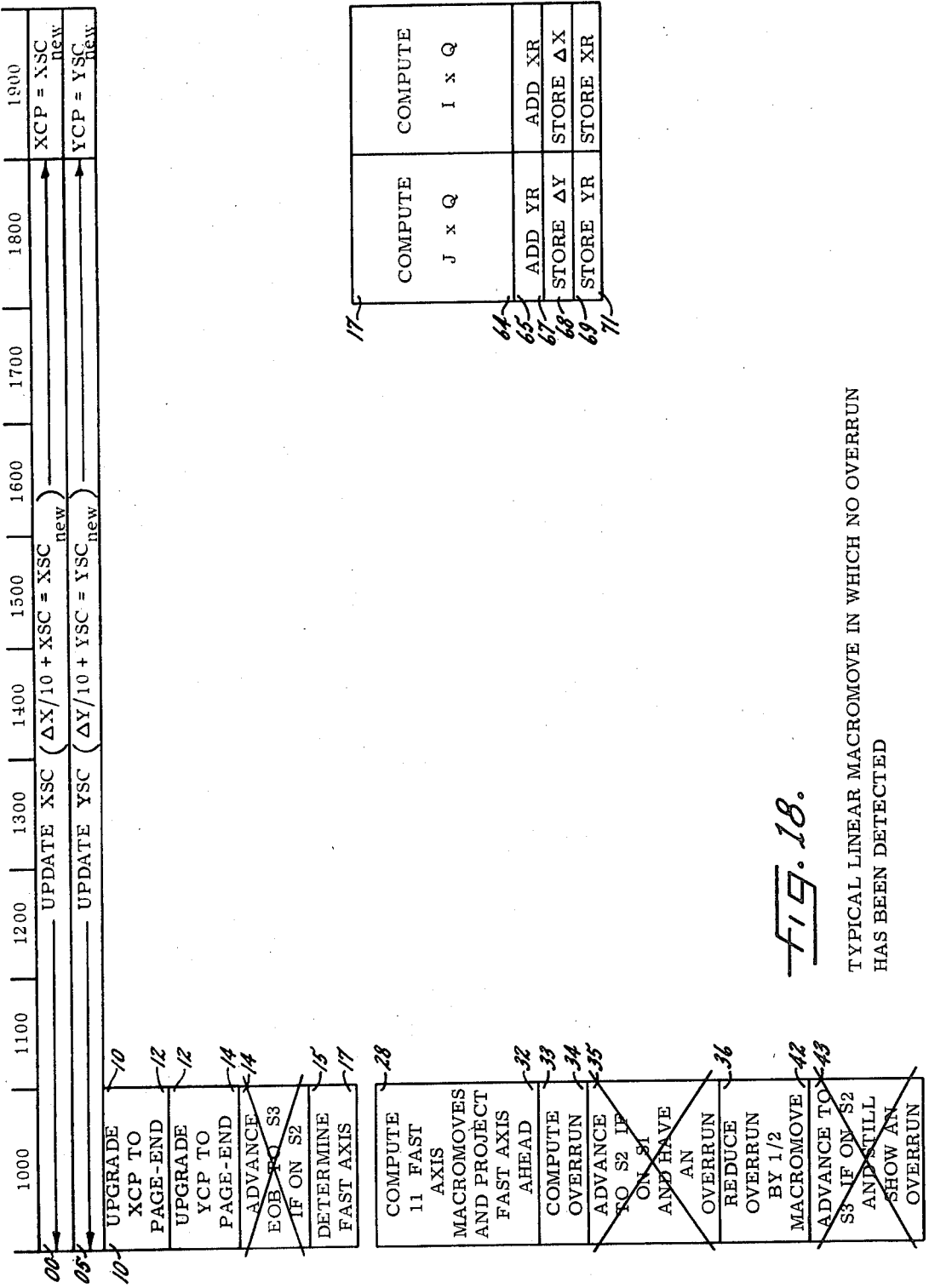

FIG. 18 is a flow chart of operations performed during a macromove along a linear path segment.

Figure 19:
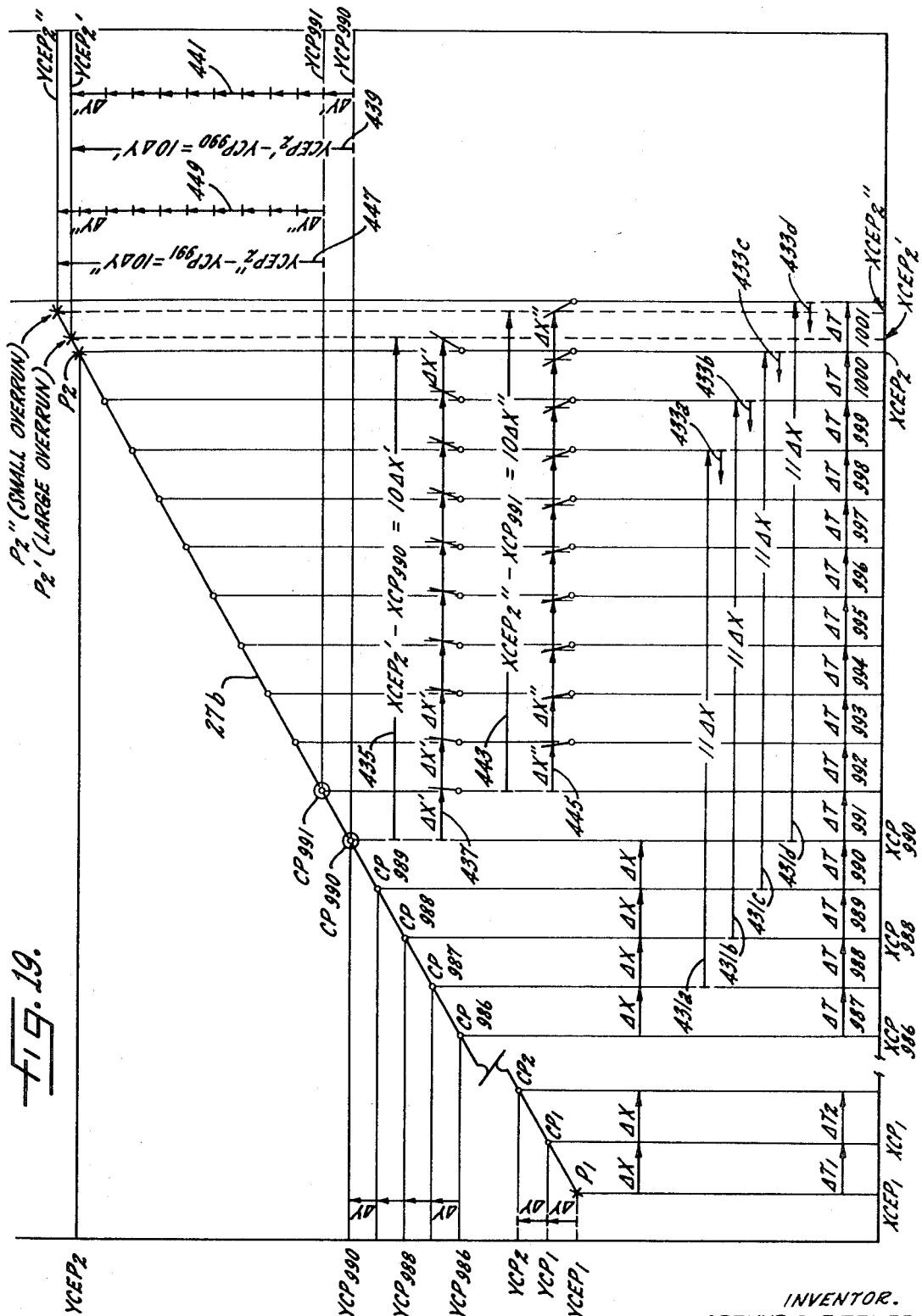

FIG. 19 is a vector diagram illustrating the manner in which the commanded X- and Y-axis macromoves are adjusted in order to terminate a commanded linear segment exactly at the end of a macromove.

Figure 20:
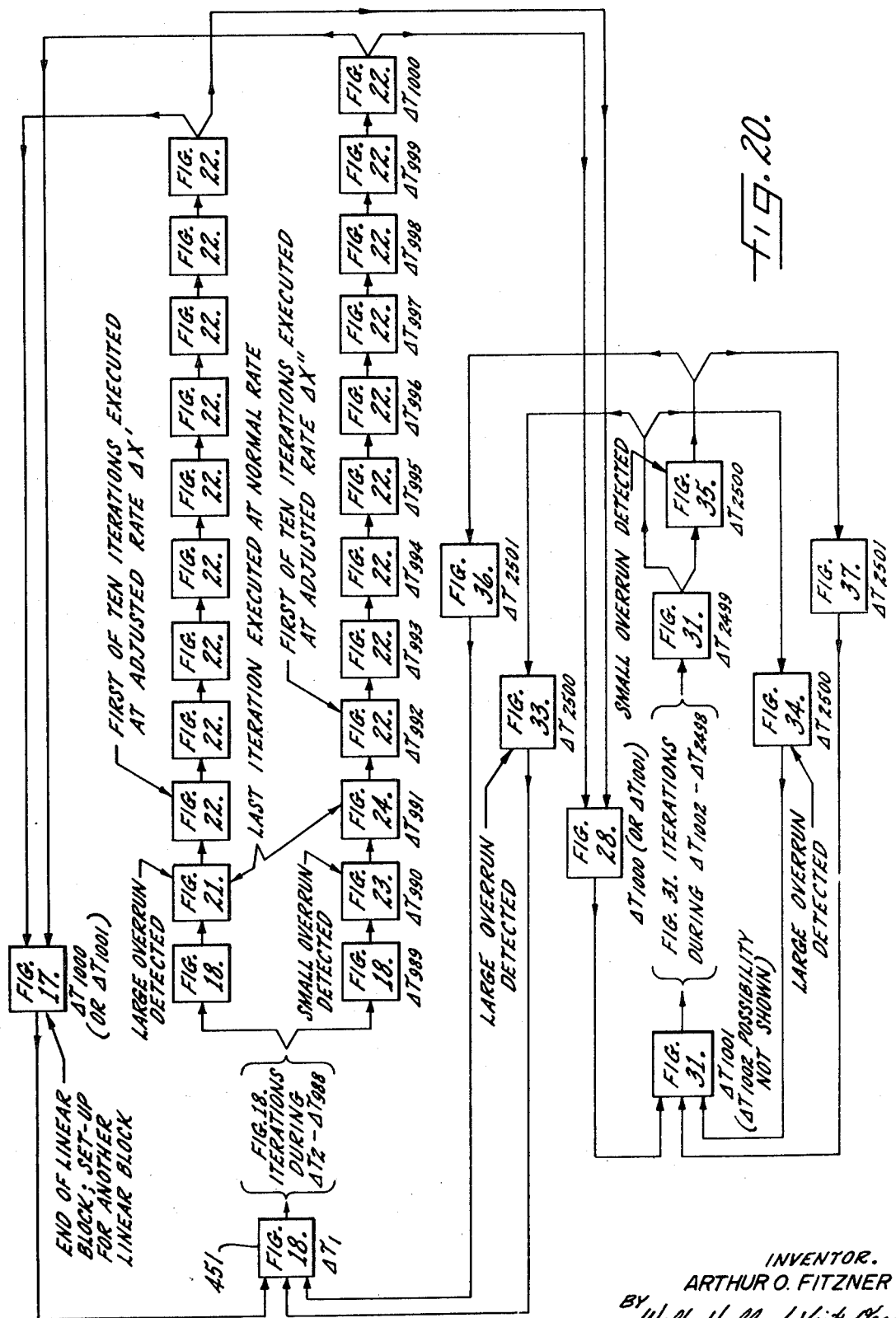

FIG. 20 is a flow chart showing the sequence in which different operating modes of the system illustrated in FIG. 9 follow on another in process of generating successive linear and circular path segments.

Figure 21:
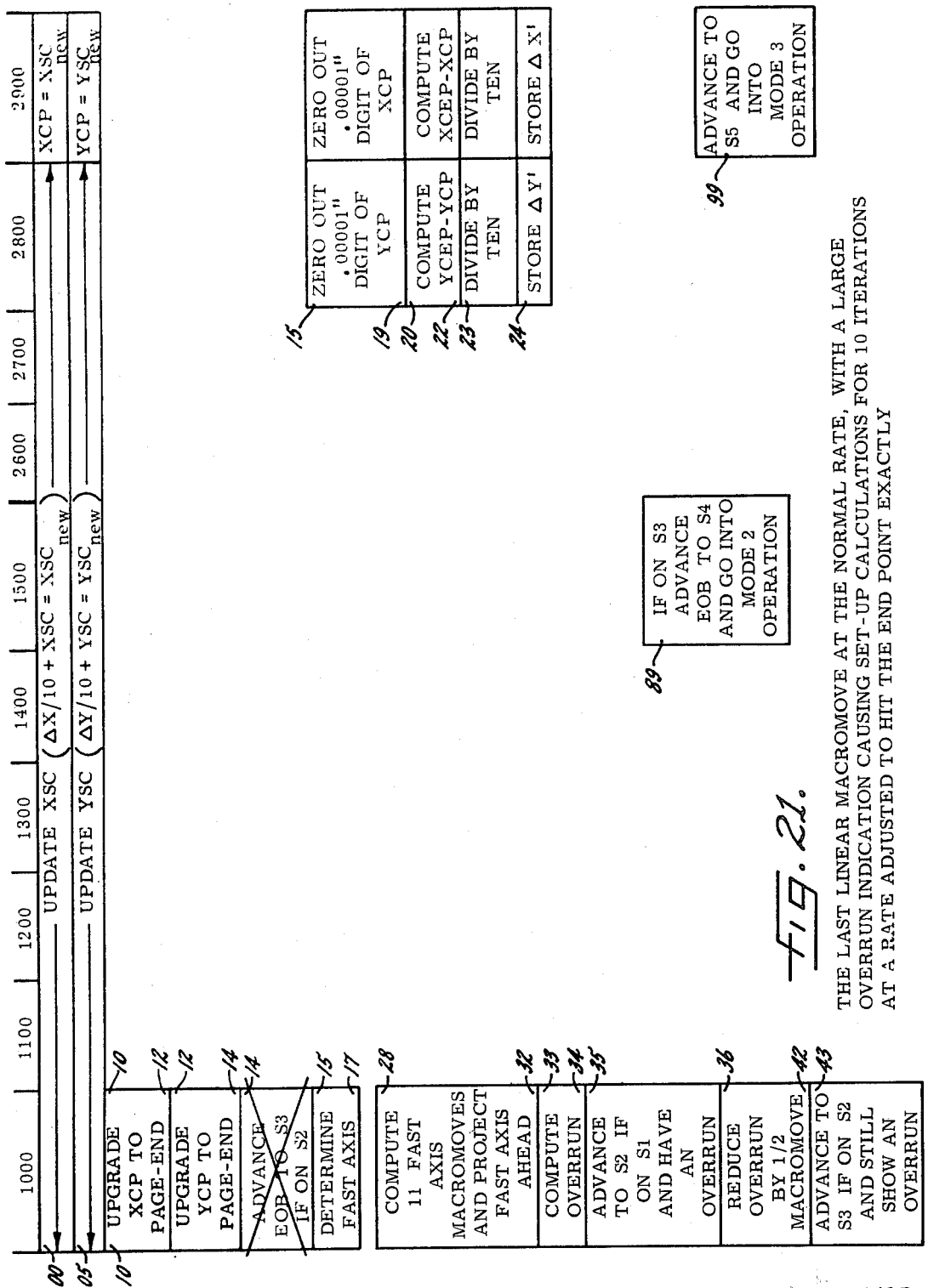

FIG. 21 is a flow chart of steps performed during the last macromove to be executed at a normal rate along the linear path, with a large overrun indication causing macromove calculations for 10 subsequent time periods at a rate adjusted to hit the end point exactly at the end of the 10th drive period.

Figure 22:
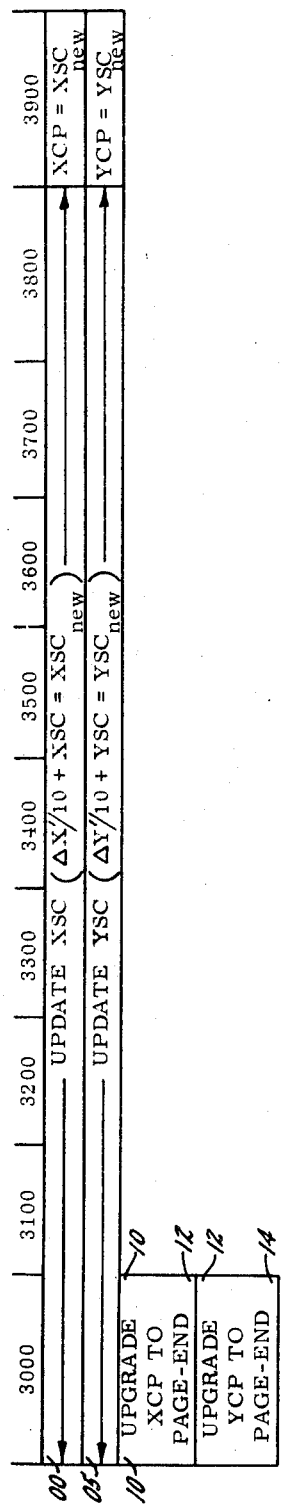

FIG. 22 is a flow chart of the operations performed during the first through the ninth of the 10 iterations for which the macromove has been modified to hit the end point exactly.

FIG. 23 is a flow chart of operations performed during a macromove along a linear path segment in which a small projected overrun is detected.

FIG. 24 is a flow chart showing the steps performed during the last macromove to be executed at a normal rate following a time period (FIG. 23) in which a small projected overrun was detected, causing macromove calculations for 10 time periods modified to hit the end point exactly.

FIGS. 25a–f are a series of vector diagrams showing the manner in which successive ones of the vector quantities necessary to generate a circular path are derived from initially given vector quantities.

Figure 26A:
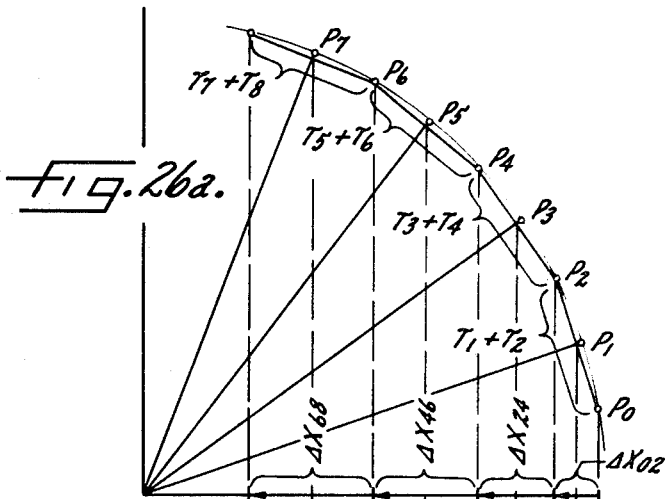
Figures 26B, 26C:
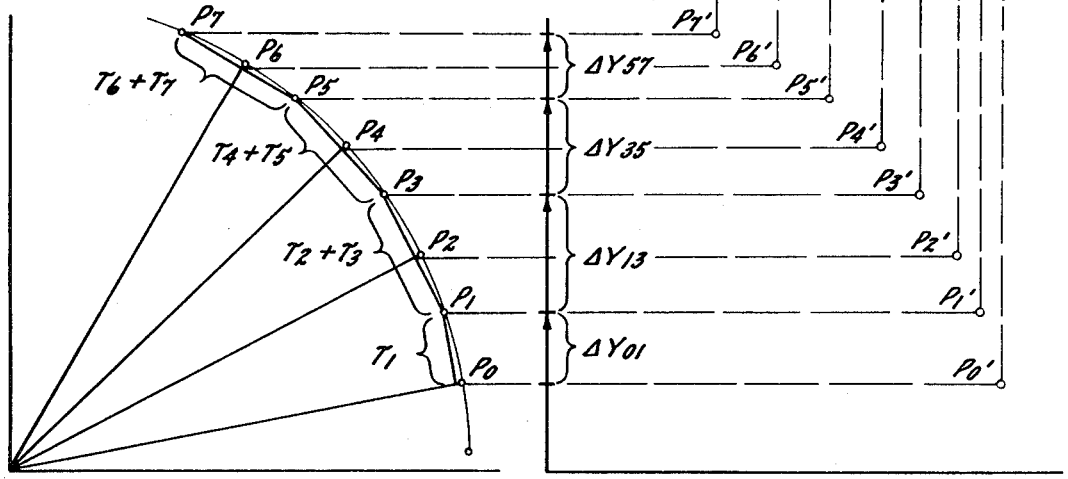

FIGS. 26a–c are composite vector diagrams showing a series of X- and Y-macromove vectors produced in the manner shown in FIGS. 25a–f and also showing a series of points along a circle defined by the X- and Y-macromove vectors so produced.

Figure 27:
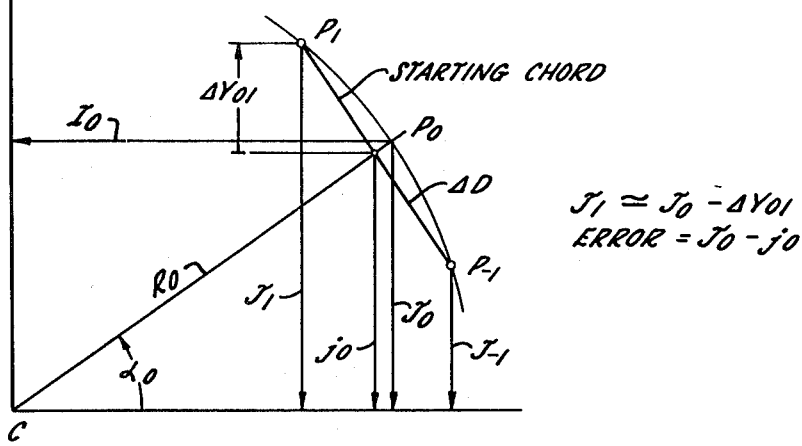

FIG. 27 shows the manner in which the Y-coordinate distance J1 between a point P1 on a circle and the center of the circle is derived from the Y-coordinate distance J0 between a preceding point P0 and the center of the circle.

Figure 28:
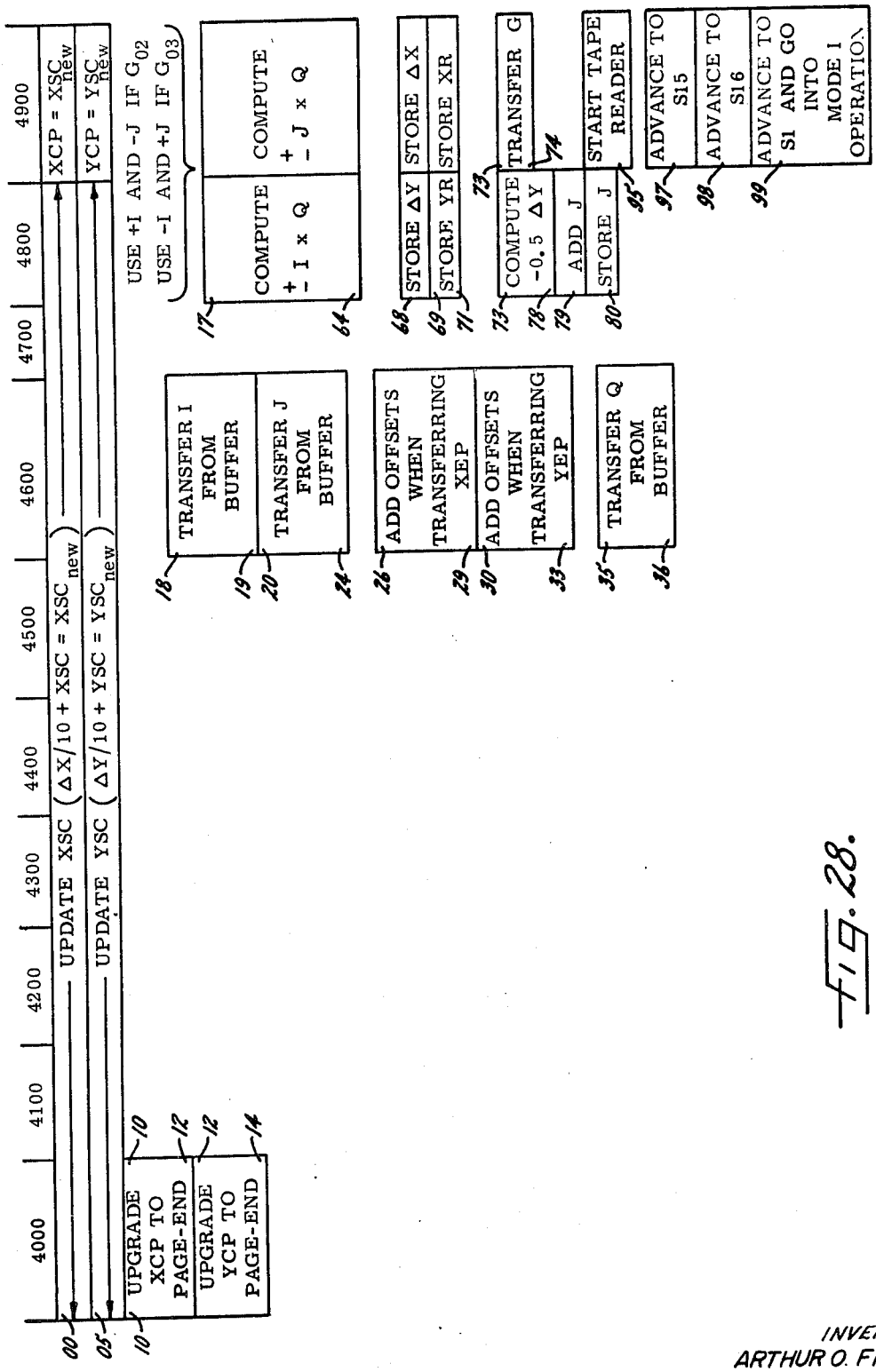

FIG. 28 is a flow chart showing operations performed during the last modified macromove of a linear path segment and setup calculations for entering a circular path segment.

Figure 29A:
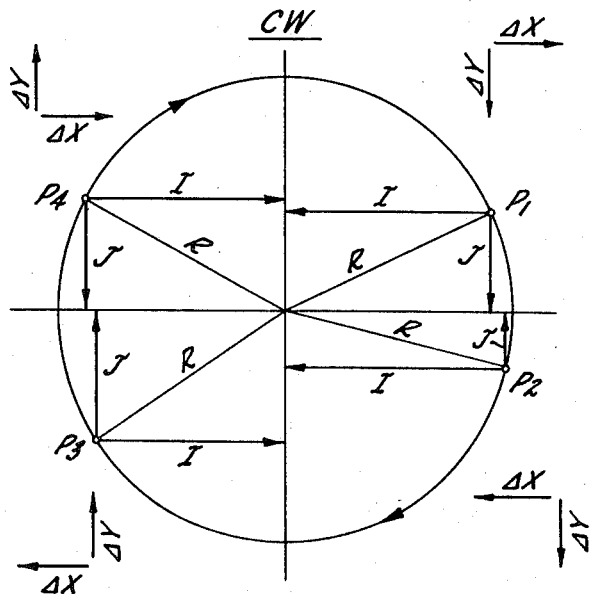
Figure 29B:
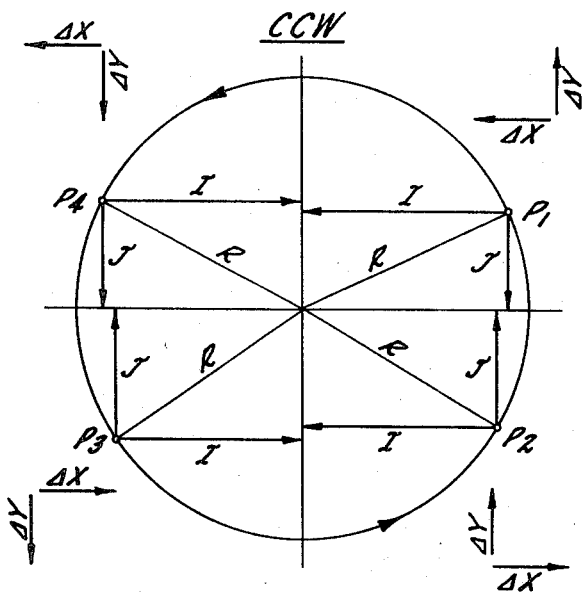

FIGS. 29a and 29b is a vector diagram showing the signs of I, J, ΔX and ΔY during clockwise and counterclockwise circular interpolation.

Figure 30A:
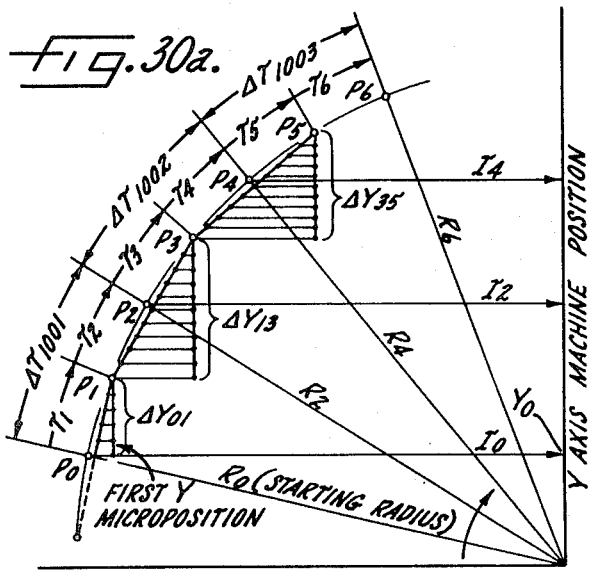
Figure 30B:
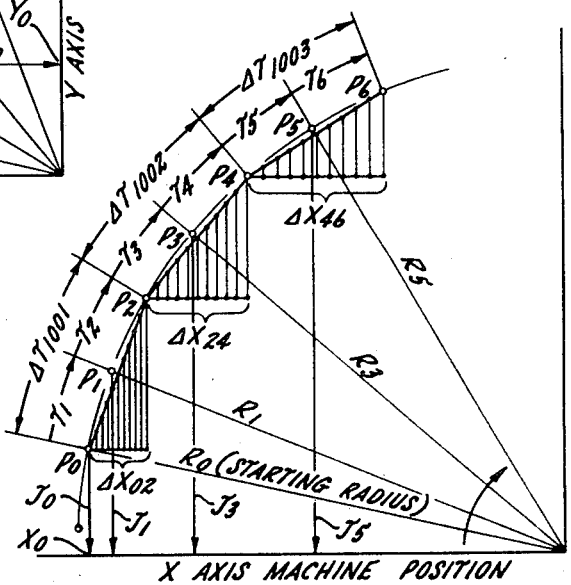

FIGS. 30a and 30b show the distribution of a series of micropositions along the X- and Y-axes produced as part of a process of generating a series of numerical commands for a circular path.

Figure 31:
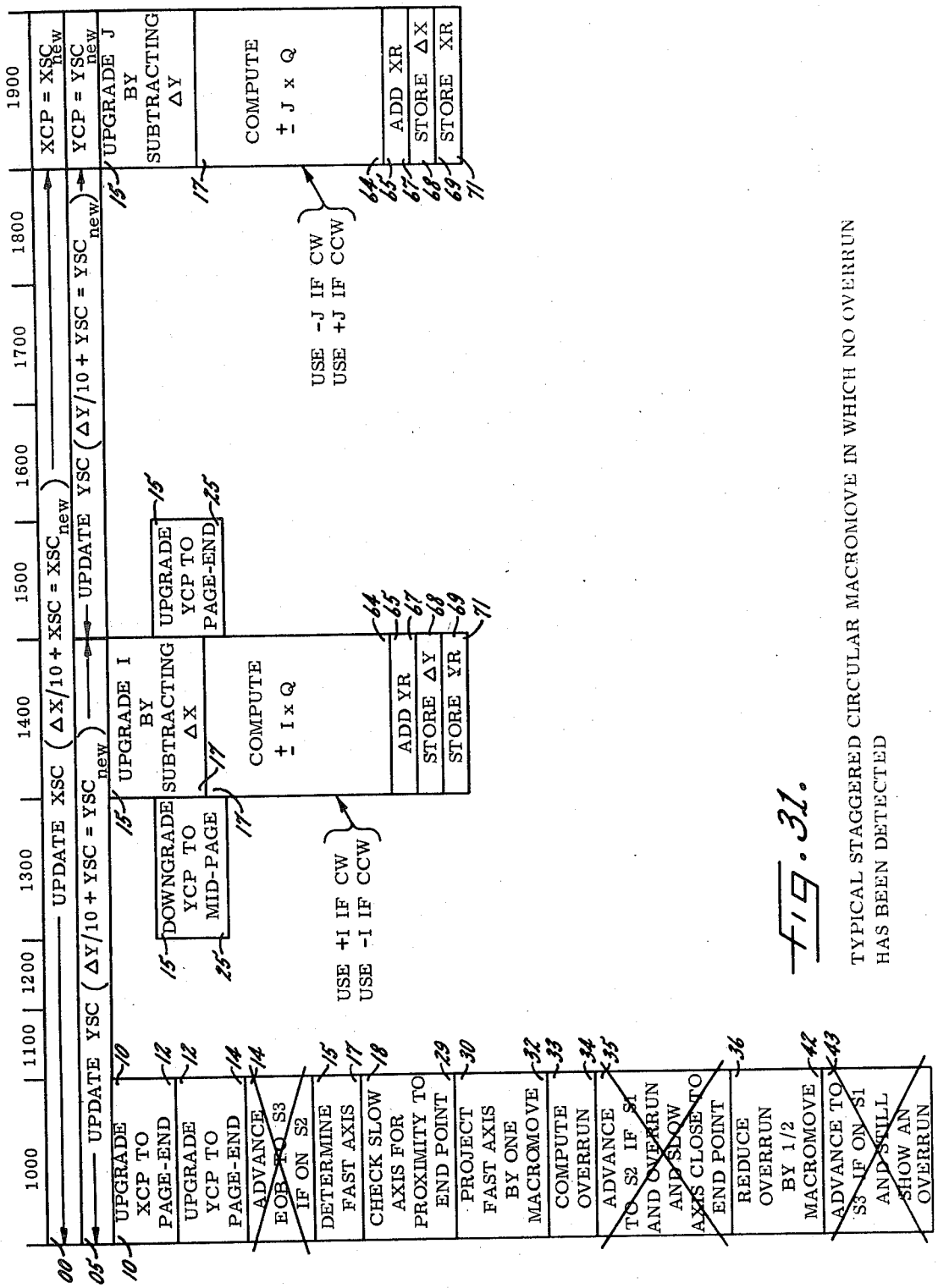

FIG. 31 is a flow chart showing operations during a typical iteration for describing a circular path segment.

Figure 32:
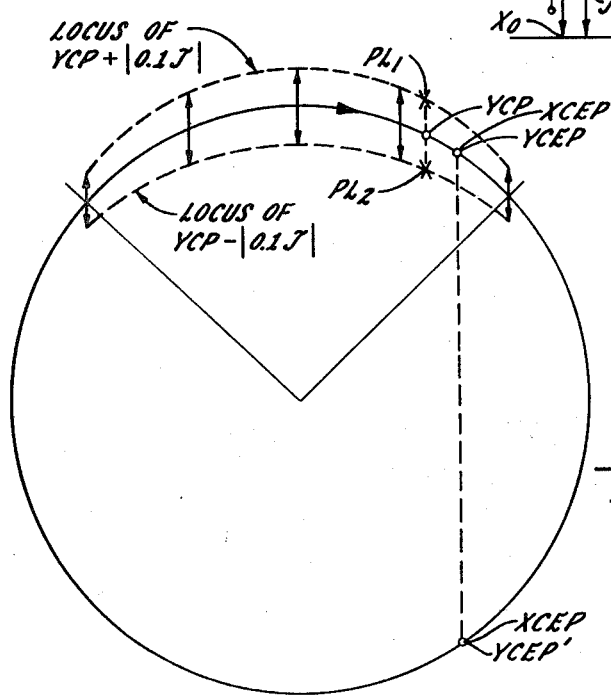

FIG. 32 illustrates a method of eliminating ambiguity from a test which is performed to detect when the commanded position along a circular path is within a predetermined distance from the desired end point of that path.

Figure 33:
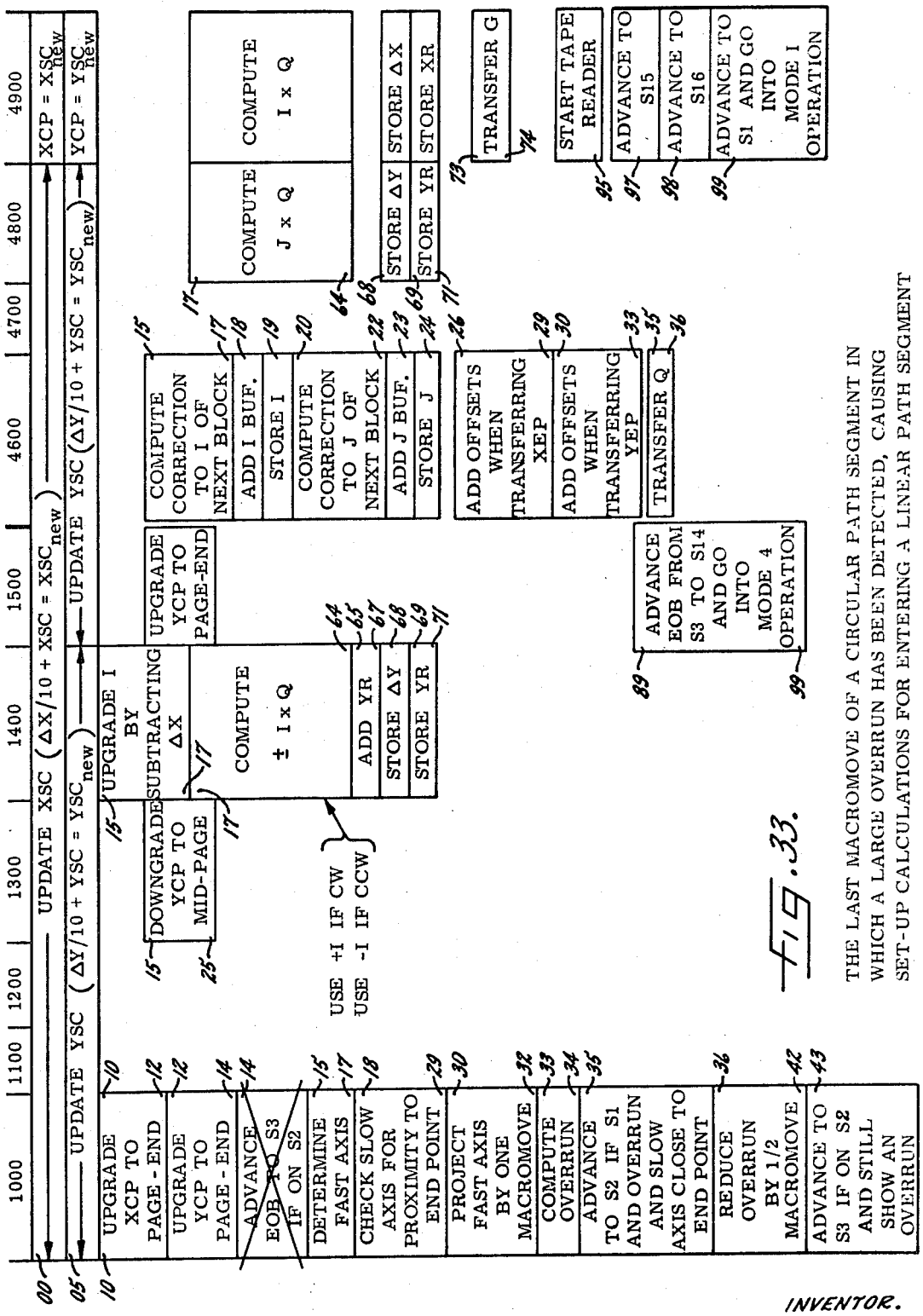

FIG. 33 is a flow chart showing the data processing operations performed during an iteration in which a large projected overrun is detected, and which is to be followed by a linear path segment.

Figure 34:
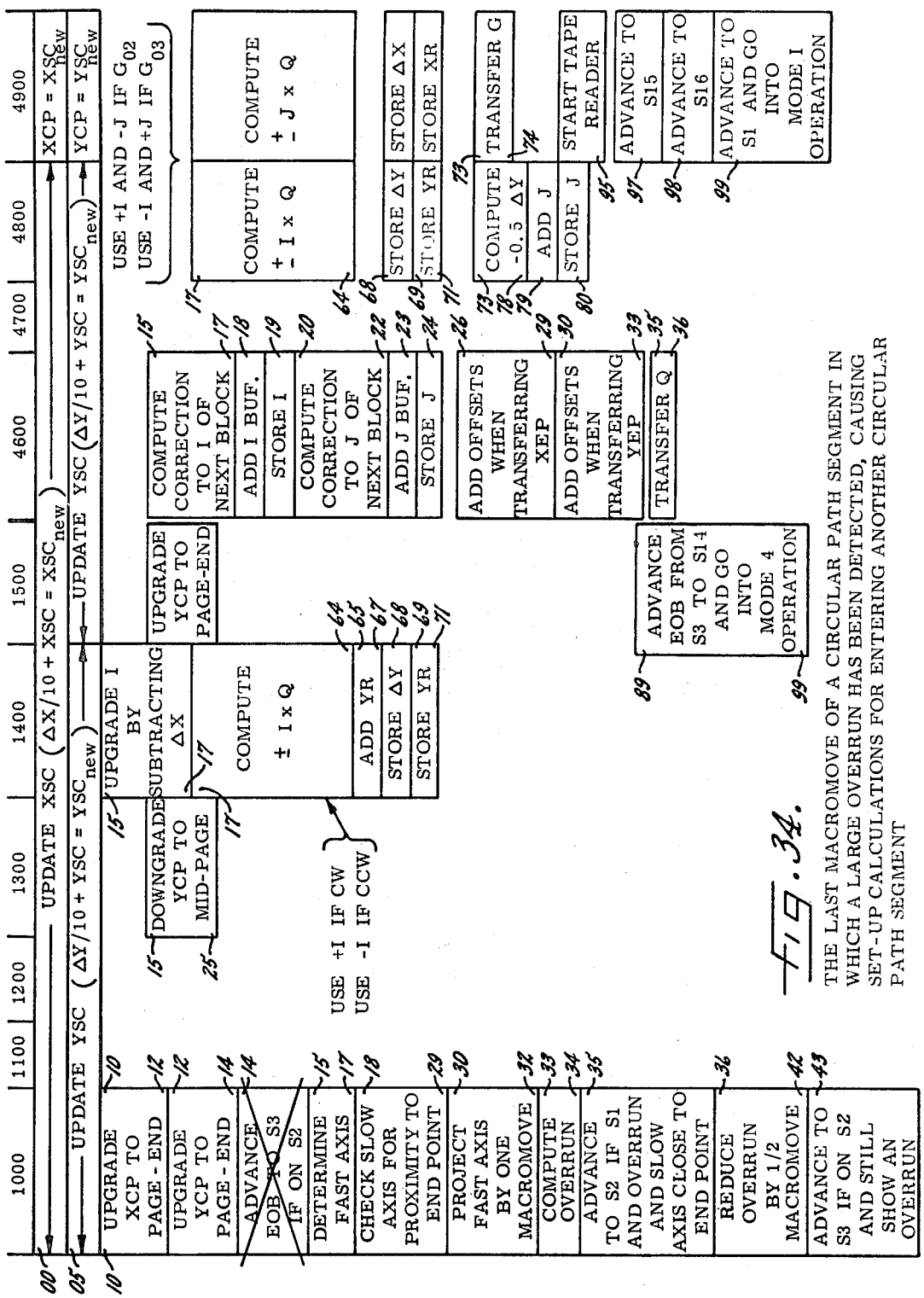

FIG. 34 is similar to FIG. 33 but shows instead the data processing operations during an iteration in which a large projected overrun has been detected, and which is to be followed by a circular path segment.

Figure 35:
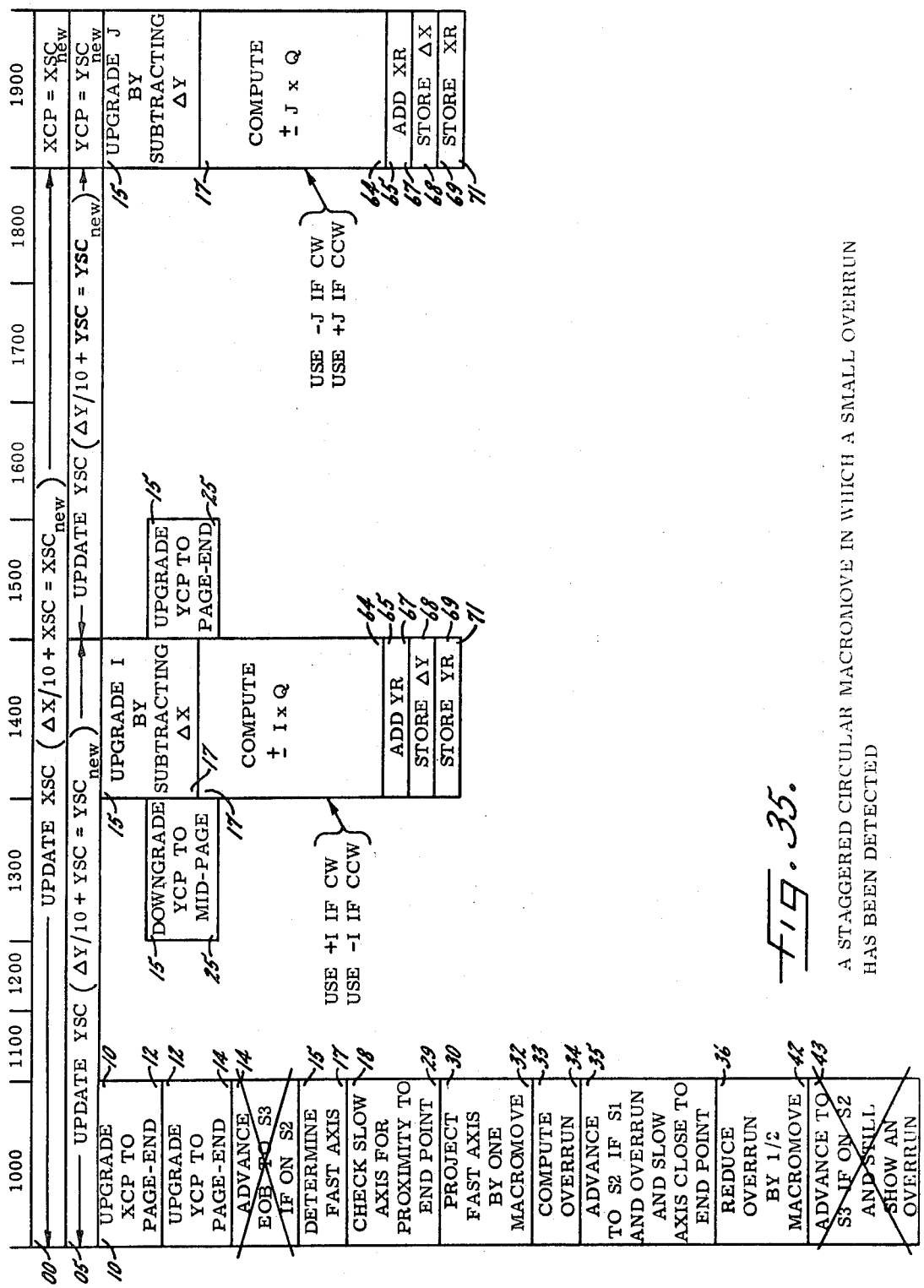

FIG. 35 is a flow chart showing operations during an iteration in which a small projected overrun has been detected.

Figure 36:
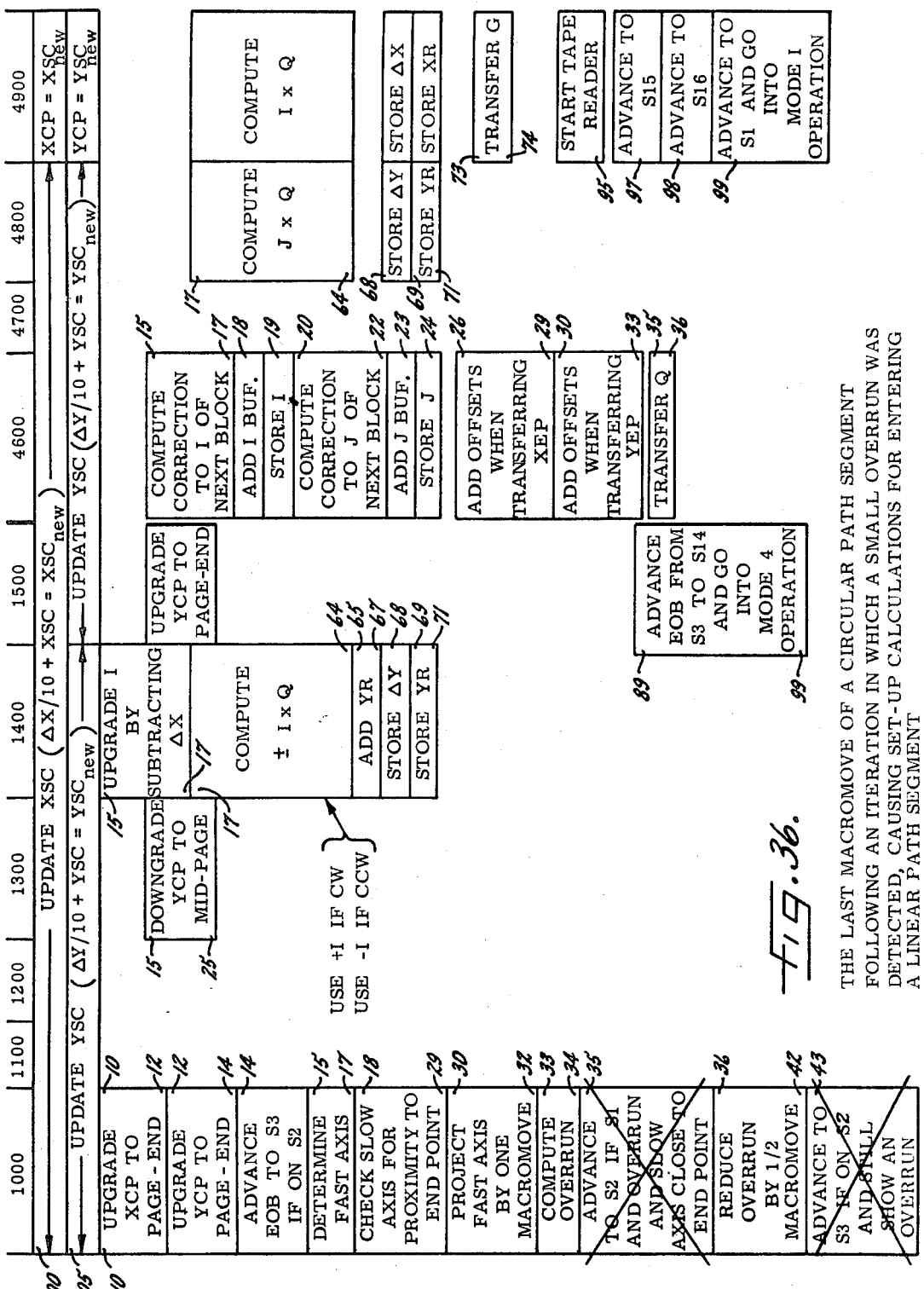

FIG. 36 is a flow chart showing the data processing operations performed during an iteration for a circular path segment following an iteration (FIG. 35) in which a small projected overrun was detected, and which is to be followed by a linear path segment.

Figure 37:
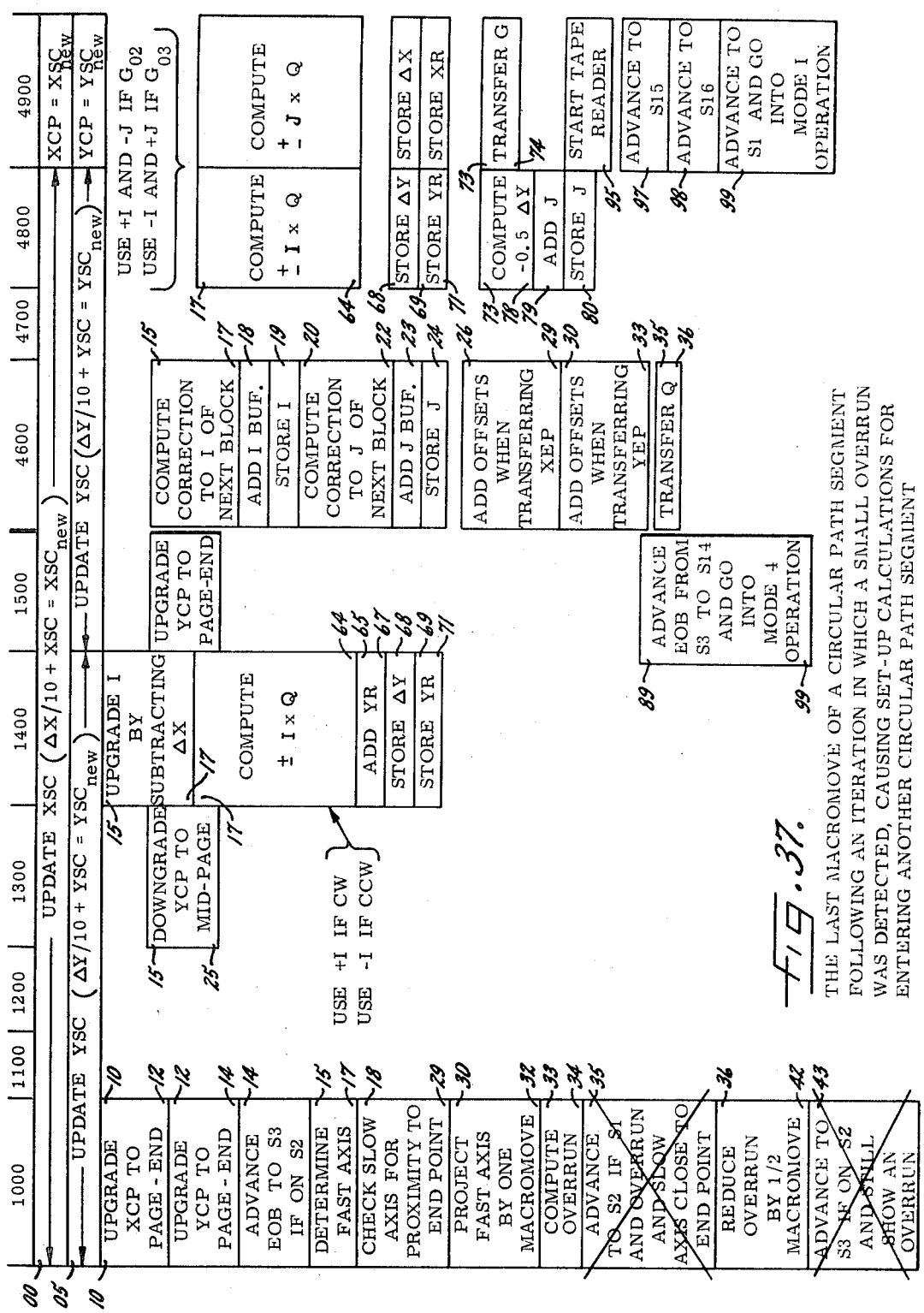

FIG. 37 is a flow chart similar to FIG. 36 except that the iteration is to be followed by a circular path segment.

FIGS. 38a, b, and c illustrate the time relationships of signals in the servosystem shown in FIG. 9a.

D. AN EXEMPLARY MACHINE TOOL

Figure 1:
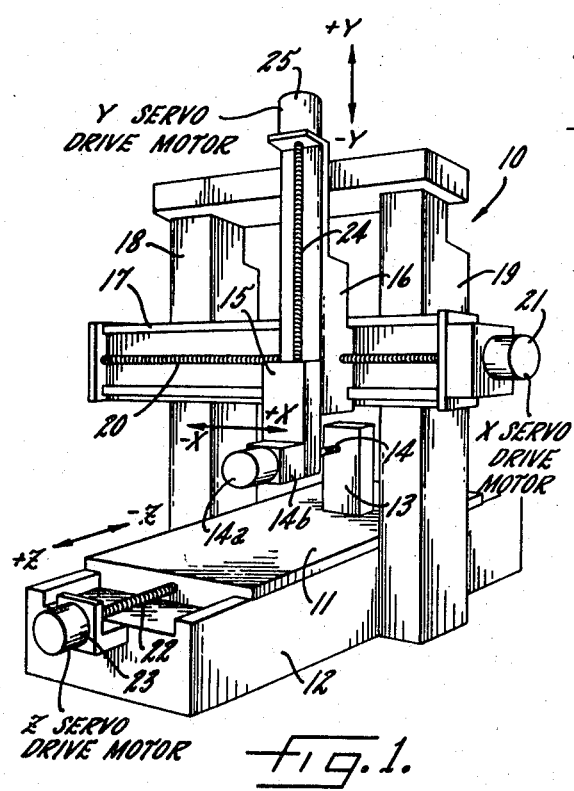
FIG. 1 is a perspective view of a milling machine shown to provide one example of a typical application of features of the invention.

In order to illustrate a particular environment in which the present invention will find especially advantageous use, it will be described here with reference to controlling paths described by an element of a numerically controlled milling machine along two mutually orthogonal axes. A milling machine 10 (shown in FIG. 1) is typical of the many different types of machine tools which may be numerically controlled and whose numerical control requires digital command signals for operation. The exemplary milling machine includes a worktable 11 movable horizontally along a bed 12 and adapted to carry a workpiece 13 which is to be machined. A milling tool 14, driven by a cutter drive motor 14a through a reduction gearbox 14b, is mounted on, and vertically movable with, a ram 15 which is slidable within vertical ways (not shown) formed on a saddle 16, the latter in turn being moveable horizontally along the ways of a rail 17 which is supported at its opposite ends by spaced columns 18 and 19. The milling tool 14 may thus be moved along horizontal and vertical X- and Y-axes relative to the workpiece 13 which in turn may be moved along a Z horizontal axis at right angles to the X horizontal axis.

By proper proportioning of the X-, Y- and Z-axis components of commanded movement and velocity, the milling tool 14 moves through the workpiece 13 along a path and at a depth to cut a desired contour thereon. To produce such controlled movement of the workpiece 13 and the milling tool 14, the saddle 16 includes a nut (not shown) engaged with a lead screw 20 driven through suitable gears (not shown) by a reversible servomotor 21. As the latter motor is caused to rotate in one direction or the other at different speeds, the saddle 16 will be moved horizontally in +X or −X directions and at velocities determined by the speed of the motor. Correspondingly, the ram 15 carries a nut (not shown) engaged with a vertically disposed lead screw 24 driven by a reversible servomotor 25 so that energization of that motor in one direction or the other moves the milling tool 14 in +Z or −Z directions. Finally, the table 11 also carries a nut (not shown) which is engaged with a second horizontally disposed lead screw 22 driven by a reversible servomotor 23 whereby the table 11 and the workpiece 13 thereon may be moved in +X or −X direction. To simplify the description which follows, only that part of the numerical control associated with the X- and Y-axis drive motors 21 and 25 will be illustrated. It will be understood by those skilled in the art, however, that such a control may be modified without departing from the scope of the invention to accommodate the third or Z-axis servomotor 23, and indeed to control simultaneous motions along as many axes as might be desired.

E. GENERAL DISCUSSION OF CONCEPTS AND METHODS

1. Positioning Controls v. Path Controls

The objective of a position control system is to locate a tool at a desired point in the shortest possible time. The nature of the path traveled by the tool between two successive points is of no importance. Thus a positioning control system will usually read a block of information from a record medium such as punched tape, the block including, as a minimum, the X- and Y-coordinates of the next desired point. In response to the block of data, the positioning control will generate electronic command signals which define the desired position of the next point for each of the X- and Y-coordinates. The command signals for the X-axis are sent to the X-axis servo drive and the corresponding signals for the Y-axis are sent to the Y-axis servo drive. Each servo drive includes its own feedback position transducer for signaling the actual position of the tools as well as a discriminating circuit for sensing the difference between the commanded position and the actual position of the tool along the respective axis. The discriminating circuit associated with each servo drive produces an error signal telling the servo drive how fast it should move and in which direction to reduce the position error for its axis to zero.

Figure 2:
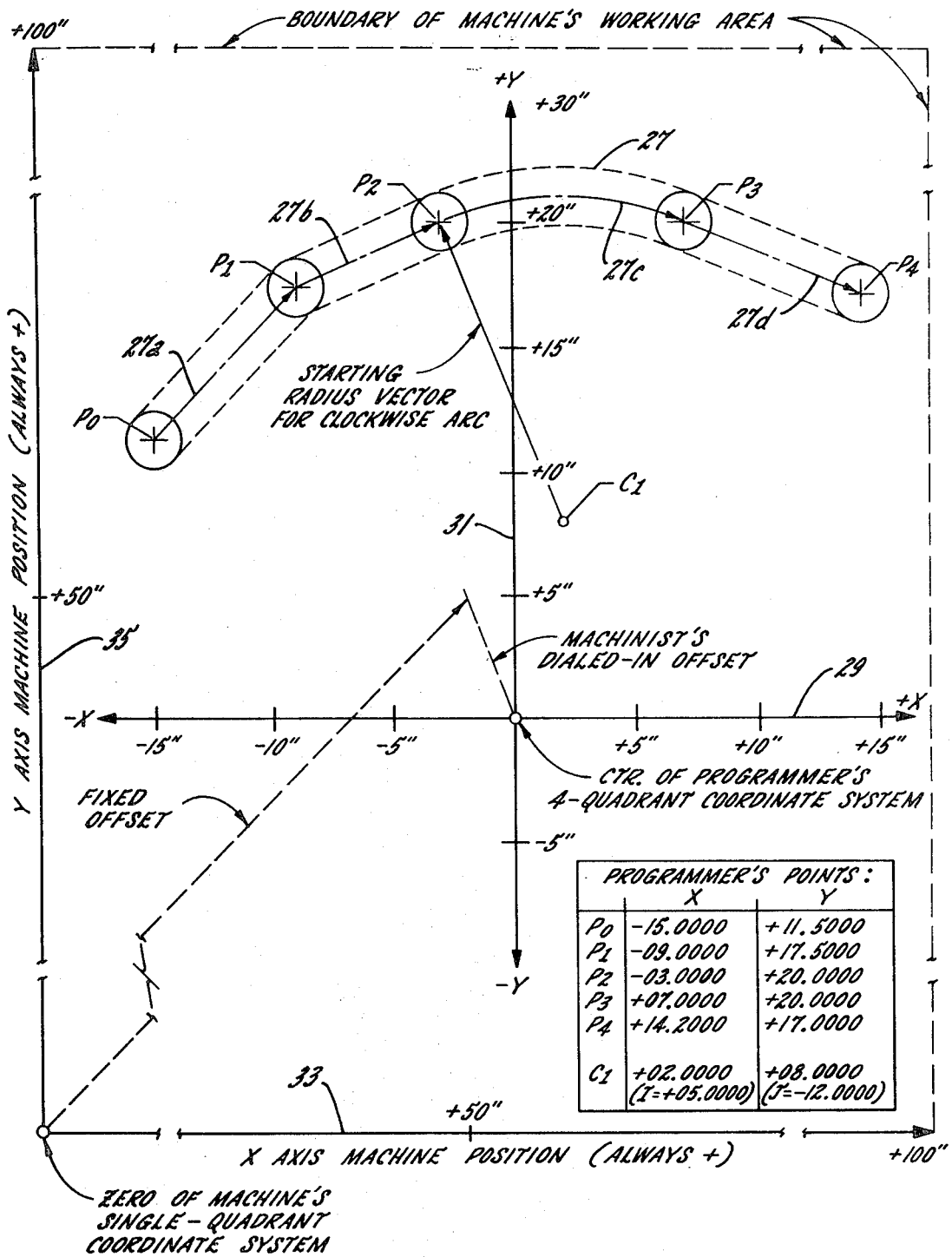
FIG. 2 illustrates the path cut into the workpiece by the exemplary milling machine under the control of command signals produced in accordance with a feature of the invention.

For an exemplary programmed path as illustrated in FIG. 2, if the X and Y servo drives had been directed to locate the tool at point P1 initially and were then directed to move it to point P2, they would both reach a very high speed initially due to the initial large error. Indeed, the initial speed of travel along the X- and Y-axes would be approximately equal, so that the composite direction of travel imposed upon the driven tool by the servo drives would be about 45° from the horizontal. The Y-axis servo drive would approach its target position before the X-axis servo drive because, in the illustrated example, it has a shorter distance to travel. It would rapidly decelerate and come to a stop at point P2. Meanwhile, the X-axis servo drive would continue on, without slowing down, until point P2 is approached, at which time it too would decelerate and come to a stop. Thus, it is seen that in a position control system of the type described, there is no control over the path followed by the controlled tool.

In contrast, in a contouring system the velocities of motion along the X- and Y-axes are controlled such that the resultant velocity vector, and the path of the tool relative to the workpiece 13, lie along a line from points P1 to P2. The signals applied to the servo drives thus control velocities, and they are reduced to zero when the tool reaches the point P2. Each axis velocity and the distance traveled along each axis in response to any given block of command data, are controlled, but in order to determine the net or resultant velocity, that is the feed rate which is of importance especially in metal-cutting operations, it is necessary to change the axis velocities from bock to block while keeping their ratio such that motion is at the desired angles. By making the successive straight line increments at different angles relatively short, and causing them to be executed in immediate succession, any arbitrary curve or contour may be produced with the desired degree of accuracy. For purely circular arcs, however, circular interpolation may be employed in which velocities along each axis are almost continuously readjusted to make the tool move from a first to a second point along the arc. Familiarity with the system and method disclosed in the above-identified McGee application is desirable before an understanding of the present invention is attempted. Accordingly, before describing the present invention, principally in Sections G. 2.h.(2), (3) and G.2.k,l, the McGee system will be described, first in general and then in detail.

2. Contouring with the McGee System

Turning again to FIG. 2, illustrated therein is an exemplary path 27 through the workpiece 13 which could be generated by the system. Two sets of coordinate X- and Y-axes are shown, the first set of axes 29 and 31 representing a four quadrant coordinate system in which a person programming the path 27 may work. The second set of axes 33 and 35 represents the single quadrant coordinate system of the controlled machine into which the information developed by the programmer is eventually translated. For the present preliminary discussion concentrating on the manner in which the date representing the path 27 is initially presented, attention need be paid only to the first set of coordinate axes 29 and 31.

The path 27 consists of a series of segments, both straight line and circular, extending between a series of points P0, P1, P2, P3 and P4. The data representing the desired motion along the path 27 is usually presented in the form of a series of blocks of information, each block representing the desired motion along a different one of the path segments 27a–27d. A record medium frequently used to carry these blocks of information is punched tape of the type illustrated in FIGS. 3 and 4. It will be recognized, of course, that punched tape is merely representative of the variety of record media which can be utilized to feed data to the apparatus which is to be described, but familiarity with the punched tape format and coding here illustrated will facilitate an understanding of the operation of the apparatus shown generally in FIG. 7 and in detail in FIG. 9.

Figure 3:
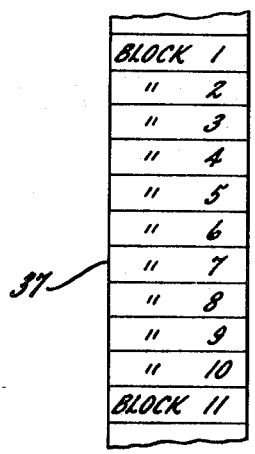
FIG. 3 illustrates the manner in which data representing successive segments of a desired tool path appear on punched tape.
Figure 4:
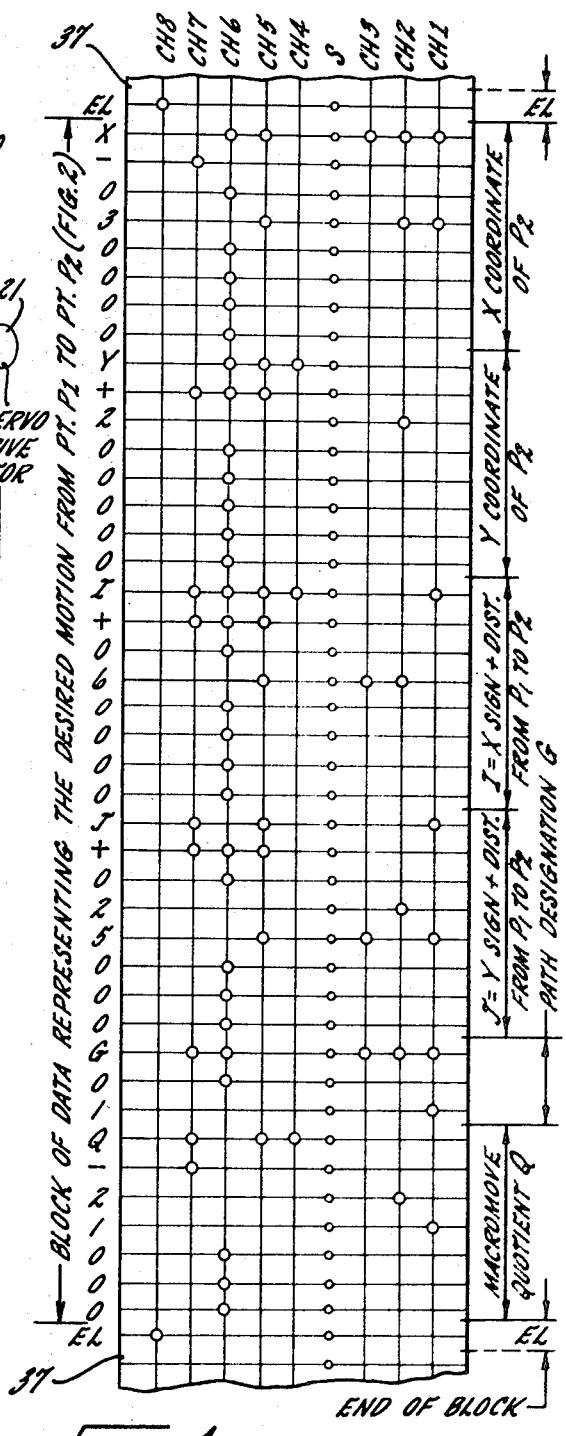
FIG. 4 shows the arrangement of one block of data on the tape.

The elongated punched tape 37 fragmentarily shown in FIGS. 3 and 4 is made of paper, plastic or the like and contains 8 longitudinal channels 1 through 8 and a lengthwise column of sprocket holes to facilitate transport of the tape through a tape reader. Each transverse row on the tape may thus receive holes punched in different combinations of the 8 channels to represent by any selective code notation different numbers, letters or symbols. In the present instance, the familiar E. I. A. STANDARD coding is employed and the combination of holes in each row of the tape shown in FIG. 3 represents the letter number or symbol labeled at the left side. It maybe observed that the 10 decimal digits 0 through 9 utilize weighted combinations of holes applied in channels 1, 2, 3 and 4, these being assigned the respective weights 1, 2, 4 and 8 so that each decimal digit is represented in 1, 2, 4, 8, binary coded decimal notation.

The command data representing respective ones of the successive desired motions 27a, 27b, 27c, 27d appears on the punched tape 37 in successive "blocks," with each block being constituted by a plurality of successive transverse rows. One of these blocks of data, representing the desired motion along the path segment 27b, is shown in FIG. 3. It is seen to consist of a first group of 8 rows representing the sign and magnitude of the X-coordinate of the point P2. Of the eight rows of holes, the first identifies the quantity represented by the following seven rows of holes and is later converted into an "address" signal to help guide the information to its designated storage. The second row represents the sign of the number, and the last six rows represent the six digits of which the number is comprised. This quantity is identified by the symbol X and in the illustrated example is equal to −03.0000 inch.

The next series of eight rows on the tape 37 represent the Y-coordinate of P2 which is shown in FIG. 2 as +20.0000 inches. Also included in the block are the X- and Y-coordinate distances I and J from the point P1 to the point P2, shown as +06.0000 and +02.5000 respectively. The following three rows of holes identify the shape of the path segment that is to be generated, i.e., whether it is to be linear or circular. The next 7 rows of holes signal a precomputed quantity Q which indicates the velocity at which movement is to occur along the path segment represented by the previous five groups of rows. The block ends with a standard EL symbol which indicates the end of the block.

In the exemplary system disclosed herein, the data stored on the punched tape 37 and representing a given path segment, such as the segment 27b of the path 27, is read from the tape and is converted into digital electrical signals. These signals are then continually processed to digitally represent at successive instants in time the X- and Y-coordinates of a point which progresses along the path 27b at the desired velocity. In the particular embodiment of the invention to be described herein, the point thus signalled is changed 500 times every second. Stated differently, a new target point or coordinate is generated for each of the X and Y servo drives every 2 milliseconds. The total length of the path segment 27b in the example illustrated in FIG. 2 is slightly over 6 inches. Let it be assumed for simplicity of illustration that the path segment 27b is exactly 6 inches long. Let it be assumed further that the desired speed along the path segment 27b is 1 inch per minute, so that the total time required for the controlled machine tool to travel from pint P1 to P2 along the path segment is 6 minutes. Significantly, during this time a total of 180,000 different digitally signaled command positions will be generated for each of the two servo drives. All of the large number of command positions generated during this 6 minute period are derived automatically from the relatively few numbers contained in the block of data stored on the punched tape 37.

3. Macromove and Micromove Calculations

Because of the large number of points signalled and because of the very short interval between the generation of successive points, it would be undesirable to compute each point through the same basic mathematical process. Instead, in the McGee system, a two-step process is used. The first step involves the generation of signals for each of the X- and Y-axes representing successive positions or points along those axes. Successive ones of these points are defined herein as macropositions and the moves whereby the controlled tool is traversed from one of these positions to the next are defined as composite macromoves. In the exemplary embodiment, which will be described herein, such macroposition signals are generated 50 times each second or every 20 milliseconds. The computations whereby the successive macropositions are derived from the basic data appearing in a block of information on the punched tape are relatively lengthy.

As part of the second, and considerably shorter part of the process, signals represented in a series of progressive micropositions which fall between each pair of successive macropositions are derived from the previously computed macroposition signals at 2 millisecond intervals. Summarizing, for each axis, a first series of target points, called macropositions, are generated through a detailed computational sequence, and a second and much larger series of intermediate points, called micropositions, which are approximately equally spaced and which lie between the macropositions, are derived from the signals representing the macropositions through a much shorter and simpler process.

a. Linear Path Generation

FIGS. 5a and 5b show in greater detail the quantities and relationships involved in generating the path segment 27b from point P1 to point P2 of FIG. 2. FIG. 5a shows the path segment 27b as the diagonal vector D, its X-component as the vector I, and its Y-component as the vector J. In accordance with a basic feature of the McGee system, a time period $\Delta T$ is chosen which in comparison to the total time required to advance the desired position of the controlled machine element from point P1 to point P2 is very short. Consequently, a large number of such time periods $\Delta T$ will elapse while the desired position advances from point P1 to point P2. The distance by which the desired position is to be advanced during a single time period $\Delta T$ is shown in FIG. 5b as the hypotenuse $\Delta D$ of a triangle. This is the distance which was previously referred to as a composite macromove. Its X-components forms the base of the triangle and is identified as the vector $\Delta X$, and its Y-component forms the vertical side of the triangle and is identified as the vector $\Delta Y$.

The size of the composite macromoves which are to be executed during the respective time periods $\Delta T$ are a function of the length of the time period $\Delta T$ and the desired velocity V as expressed by the equation $$\Delta D = V \cdot \Delta T \tag{1}$$

From an inspection of the triangles illustrated in FIGS. 5a and 5b it is seen that they are geometrically similar, since the hypotenuse of the smaller triangle of FIG. 5b is merely a short portion of the hypotenuse D of the larger triangle of FIG. 5a. Consequently, it follows from the law of similar triangles that $$\Delta X / I = \Delta D / D \tag{2}$$

Similarly, it follows from the law of similar triangles that $$\Delta Y / J = \Delta D / D \tag{3}$$

But $\Delta D = V \Delta T$ (4)
and $D = \sqrt{I^2 + J^2}$ (5)

Substituting (4) and (5) into (2) and multiplying both sides of the equation by I gives $$\Delta X = I \cdot \frac{V \Delta T}{\sqrt{I^2 + J^2}} \tag{6}$$

Substituting (4) and (5) into (3) and multiplying both sides of the equation by J gives $$\Delta Y = J \cdot \frac{V \cdot \Delta T}{\sqrt{I^2 + J^2}} \tag{7}$$

For the exemplary embodiment to be disclosed it is assumed that, for any given path segment represented by a block of data on the tape, the quantities V, I, and J each have a single value. Furthermore, the time period $\Delta T$ is a chosen constant which remains the same for all of the segments of the path. This permits the use of a composite constant Q, hereinafter referred to as the "macromove quotient," (so named because it happens to be equal to $\Delta D / D$ in place of the term $$\frac{V \cdot \Delta T}{\sqrt{I^2 + J^2}};$$

that is, $$Q = \frac{V \cdot \Delta T}{\sqrt{I^2 + J^2}} \tag{8}$$

Substituting (8) in equations (6) and (7) yields the much simpler expressions $$\Delta X = I \cdot Q \tag{9}$$
$$\Delta Y = J \cdot Q \tag{10}$$

From the foregoing series of equations it may be seen that the quantities $\Delta X$ and $\Delta Y$, respectively representing the desired movement of the commanded position during a time period $\Delta T$ along the X- and Y-axes, may be given in a partially precomputed form by using the term "Q" in place of the fraction $$\frac{V \cdot \Delta T}{\sqrt{I^2 + J^2}}$$

Thus, given the quantities I, J, and Q, the desired X and Y macromove components $\Delta X$ and $\Delta Y$ may be calculated relatively simply by the process of multiplication. However, even though multiplication is a relatively simple process, nevertheless it is a time-consuming one, especially where both the multiplier and the multiplicand are multidigit numbers. It is for this reason that a series of intermediate points or micropositions lying intermediate a pair of adjacent macropositions is developed by an even more direct process. As shown in FIG. 5b a composite macromove $\Delta D$ is divided into N equal portions $\Delta D/N$. These smaller portions are referred to herein as composite micromoves and their X- and Y-components are shown in the smaller triangle of FIG. 5b as the quantities $\Delta X/N$ and $\Delta Y/N$. In order to take fullest advantage of the two-step process described here, "N" is made equal to 10 and the quantities $\Delta X/N$ and $\Delta X/N$ are derived by dividing respective ones of the quantities $\Delta X$ and $\Delta Y$ by 10, which is very simply performed in a calculating machine or computed by shifting the signals representing those quantities by one decimal place.

After the quantities $\Delta X$, $\Delta Y$, $\Delta X/N$ and $\Delta Y/N$ have been calculated, a series of macropositions and micropositions are developed by a process of successive additions. In particular, for the X-axis the quantity $\Delta X$ is cumulatively added at intervals of $\Delta T$ to the X-coordinate of the starting point P1 so that, during each time period $\Delta T$, a new macroposition is generated for the X-axis. By a similar process of successive additions a series of Y-axis macropositions are developed at intervals of $\Delta T$ extending with the passage of time from near the Y-coordinate of the point P1 to the Y-coordinate of the point P2.

The micropositions are derived in a similar manner from the micromove components $\Delta X/N$ and $\Delta Y/N$. Thus, the first microposition for the $X$ axis is produced by adding the quantity $\Delta X/N$ to the X-coordinate of the initial point P1 and successive micropositions for the X-axis are produced at intervals of $\Delta T/N$ by further additions of the quantity $\Delta X/N$ to the previously derived sum. The same procedure is followed for deriving Y micropositions from the Y-coordinates of point P1 and micromove component $\Delta Y/N$.

The foregoing analysis has been principally in terms of geometrical relations. However, it should be remembered that in practice, the successive macropositions and micropositions do not simply exist in space. Rather, they are numerically represented by digital electrical signals as are the quantities, $I$, $J$, $V$, $\Delta T$, (or $I$, $J$, and $Q$) from which they are derived. These digital electrical signals representing successive target positions are then applied continuously to the X and Y servo drives in order to advance the position of the controlled machine tool shown in FIG. 1. In this manner, the cut may be generated along several consecutive straight line path segments, each of them being represented by a different block of data containing individual values for the quantities $I$, $J$, and $Q$ (or $V$ and $\Delta T$ if the quotient $Q$ is not used). In carrying out the process, the digital signals representing the X- and Y-components $I$ and $J$ of the composite distance $D$ are read by appropriate means from the tape on which they are initially stored, are converted into digital electrical signals and are processed by data processing apparatus to derive therefrom first and second sets of digital signals representing the $\Delta X$ and $\Delta Y$ numbers, in accordance with the equations (6) and (7) given above. Having derived signals representing the $\Delta X$ and $\Delta Y$ numbers successive periods of $\Delta T$ are measured off in actual time and during each such time periods, the first and second sets of signals representing the quantities $\Delta X$ and $\Delta Y$ are utilized to drive a controlled member through the distance $\Delta X$ along the $X$ axis and through the distance $\Delta Y$ along the $\Delta Y$ axis. In accordance with an additional, but optional, feature of the McGee system, signals are also produced to represent fractions $\Delta X/N$ and $\Delta Y/N$, and N times during each of the successive time periods $\Delta T$ these signals are utilized to drive the controlled member simultaneously along X- and Y-axes through intermediate distances $\Delta X/N$ and $\Delta Y/N$ b. Circular Path Generation The method of generating electrical signals representing successive target positions along a circular path is shown generally in FIG. 6a. It will be noted that the circular arc 39 there shown includes a quarter of a circle and thus does not correspond to the circular path shown in FIG. 2. Similarly, the points P0 through P5 appearing in FIG. 6a do not correspond to similarly labeled points appearing in FIG. 2. It should also be noted that the points P0 through P5 appearing in FIG. 6a are much farther apart then they would normally be in order to clarify the geometrical explanation of the process.

Distributed along the arc 39 in FIG. 6a is a first series of points P0, P2 and P4 and a second series of points P1, P3 and P5 symmetrically interspersed with the points P0, P2 and P4. The first series of points P0, P2 and P4 are connected by chords of equal length $\Delta D$ as are the second series of points P1, P3 and P5. Each of the points P1 through P5 is connected to the center C of the circle, of which the arc 39 forms a part, by a radius R. The X-components of the string of chords connecting the points P0, P2 and P4 are labeled $\Delta X$, and the Y-components of the second series of chords which connect the points P1, P3 and P5 are labeled $\Delta Y$. In accordance with the McGee method, as it pertains to generating a circular path, signals representing the X-coordinates of the points P2 and P4 are produced at intervals of time $\Delta T$ and signals representing the Y-coordinates of the points P1, P3 and P5 are produced at time intervals $\Delta T$ which are equal to but symmetrically staggered with respect to the time intervals $\Delta T$ associated with the points P2 and P4. Furthermore, in carrying out another feature of the McGee method, during each of the time periods $\Delta T$ which elapse between the generation of the points P0, P2 and P4 at intervals of $\Delta T/N$ signals are produced representing the X-coordinates of equally spaced intermediate points lying along the chords of the circle connecting the points P0, P2 and P4. In a similar manner signals are also produced representing the Y-coordinates of points intermediate the points P1, P3 and P5. This is best seen in FIG. 6b showing the $\Delta X$ vector components extending between P0, and P2, P2 and P4, and P4 and P6 and the vector components $\Delta Y$ extending from P1 to P3 and from P3 to P5. By comparing the paths illustrated in FIGS. 5b and 6b, it will be seen that, (a) the successive vector quantities $\Delta X$ and $\Delta Y$ represent successive macromoves along the X- and Y-axes, each of the macromoves along the respective axes being carried out over a period of time $\Delta T$ and $\Delta T'$ respectively, and (b) each of the macromoves $\Delta X$ is divided into N micromoves $\Delta X/N$ and similarly each of the macromoves $\Delta Y$ is divided into N micromoves $\Delta Y/N$.

In generating the circular path a two-step approach is used which is similar to the process explained with reference to linear path generation. As part of the first step, the quantities $\Delta X$ and $\Delta Y$ are calculated and the X-coordinates of the points P2 and P4 as well as the Y-coordinates of the points P3 and P5 are derived by a process of successive cumulative additions of the quantities $\Delta X$ to the X-coordinate of a starting point and of the quantities $\Delta Y$ to the Y-coordinate of a starting point. As part of the second step, each of the quantities $\Delta X$ and $\Delta Y$ is divided into N equal parts, preferably 10, and for each of the X- and Y-axes digital signals representing the X- and Y-coordinates of the intermediate target points, or micropositions are generated. The signals representing the X- and Y-coordinates of the intermediate points are then applied to respective ones of the X and Y servo drives so that the X-axis servo drive moves in close proximity with the X-coordinates of a string of chords connecting points P0, P2 and P4, while the Y-axis servo moves later in time by one-half $\Delta T$ in close proximity with the Y-coordinates of string of chords connecting the points P1, P3 and P5. The resultant of these two motions is a path very closely approximating the arc of the circle along which the two time-interleaved strings of chords extend.

FIGS. 6c and 6d illustrate some of the principles underlying the process of circular path generation carried out in accordance with the McGee method. Shown in FIG. 6c is the same arc appearing in FIG. 6a with the points P0 and P2 connected by a chord of length $\Delta D$. With the chord $\Delta D$ as the hypotenuse, a triangle is formed by the X- and Y-components of the chord. Lying halfway between the points P0 and P2 on the circle is a point P1 and connecting the center C of the circle to the point P1 is a radius vector R1 having an inverse X-component I1 and a inverse Y-component J1. Since the radius R1 extends through the midpoint of the chord $\Delta D$ from the center of the circle, the chord and the radius vector are at right angles, and from this it follows that the triangles formed by the chord $\Delta D$ and its X- and Y-components on the one hand, and by the radius vector R1 and its inverse X- and Y-components on the other hand are similar triangles.

Turning to FIG. 6d, there is shown therein one of the string of chords connecting the points P1, P3 and P5 in FIG. 6a. The particular chord shown in FIG. 6d connects the points P1 and P3 and forms the hypotenuse of a triangle whose other two sides are made up of the X- and Y-components of the chord. Lying midway between the points P1 and P3 on the arc in FIG. 6d is the point P2 connected to the center C of the circle by a radius vector R2. The radius vector R2 forms the hypotenuse of a second right triangle, in FIG. 6d, the other two sides of this triangle being made up of the inverse X- and Y-components I2 and J2 of the radius vector R2. Following the same reasoning advanced in connection with FIG. 6c, the chord of FIG. 6d and the radius vector R2 are at right angles and therefore the two right triangles of FIG. 6d are also similar triangles.

As part of the process of circular interpolation alternate ones of the radius vectors connecting the points P0 through P5 to the point C in FIG. 6a are represented by the X- and Y-coordinate distances from respective ones of them to the center of the circle C. The manner in which these X- and Y-coordinate distances are derived will not be described at this point. Let it be assumed instead that the radius vector R1 shown in FIG. 6c is represented by the Y-coordinate distance J1 from the point P1 to the point C and that the radius vector R2 is represented by the X-coordinate distance from the point P2 to the point C. Given this information as well as the desired velocity along the chords of the circle and the duration of the chosen time period $\Delta T$ associated with each chord, the X-component $\Delta X_{02}$ of the chord shown in FIG. 6c and the Y-component $\Delta Y_{13}$ of the chord shown in FIG. 6d may be derived.

Turning first to the generation of the chords shown in FIG. 6c, from the law similar triangles it follows that $$\Delta X_{02}/-J_1=\Delta D/R_1 \quad (11)$$

Similarly, with reference to the chord shown in FIG. 6d, it follows from the law of similar triangles that $\Delta Y_{13}/I_2=\Delta D/R_2$ (12)
But $$\Delta D = V \cdot \Delta T \quad (1)$$
$$R_1 = \sqrt{I_1^2 + J_1^2} \quad (13)$$

and $$R_2 = \sqrt{I_2^2 + J_2^2} \quad (14)$$

Therefore, substituting (1) and (13) into (11) and multiplying both sides of the equation by $J_1$ yields $$\Delta X_{02} = -J_1 \frac{V \cdot \Delta T}{\sqrt{I_1^2 + J_1^2}} \quad (15)$$

Similarly, substituting (1) and (14) into (12) and multiplying both sides of the equation by $I_2$ yields $$\Delta Y_{13} = I_2 \frac{V \cdot \Delta T}{\sqrt{I_2^2 + J_2^2}} \quad (16)$$

It is apparent from inspection that $$\frac{V \cdot \Delta T}{\sqrt{I_2^2 + J_2^2}} = \frac{V \cdot \Delta T}{\sqrt{I_1^2 + J_1^2}} = Q \quad (17)$$

Therefore, substituting (17) into (15) and (16)

$$\Delta X_{02} = -J_1 \cdot Q \quad (18)$$

and $$\Delta Y_{13} = I_2 \cdot Q \quad (19)$$

It is helpful to compare the equations (18) and (19), which relate to generating a circular path, with the equations (9) and (10) relating to the generation of a linear path. It is seen that they are the same, except that the positions of $I$ and $J$ are interchanged, and $-J$ is used. As written, equations (18) and (19) apply only for a clockwise (CW) progressing circular path. For CCW progression, the sign of the right side of each equation is simply reversed.

The information appearing in FIGS. 6c and 6d permits not only the calculation of the vector quantities $\Delta X_{02}$ $\Delta Y_{13}$ representing X- and Y-axis macromoves, but they also permit calculation of the Y coordinate distance from the point P3 to the center of the circle C and therefore the representation of the next radius vector R3 which, in turn, is used to calculate the X component of the next chord extending from the point P2 to the point P4 as seen in FIG. 6a. This is achieved by algebraically adding the quantities J1 and $-\Delta Y_{13}$, which respectively represent the Y-coordinate distance from the point P1 to the enter C of the circle, and from the point P3 to the point P1. This step of addition follows in the process the step of multiplication indicated by equation 16 (or alternatively equation 19) and once it is performed and the Y-coordinate distance from point P3 to the center of the circle C is derived, then the X-component of the next chord, extending between the points P2 and P4 and representing the next X-axis macromove is calculated by another process of multiplication similar to that expressed by the equation 15 (or alternatively by the equation 18). In this manner, successive points are generated along a circular arc, alternate ones of the points being represented by their X- and Y-coordinates. These points are the X and Y macropositions mentioned with reference to FIGS. 6a and 6b. Also, as part of the process, X- and Y-axis macromoves $\Delta X$ and $\Delta Y$ are alternatively calculated and may then be divided into equal segments as shown in FIG. 6b by a process of division, permitting the generation of a series of X- and Y-axis micropositions along the X- and Y-axes from the respective series of chords shown in FIG. 6a.

4. The Disclosed System

FIG. 7 is a general block diagram of a system designed to carry out the process of linear and circular interpolation as described briefly in the foregoing sections. The system will be described in greater detail with reference to a detailed block diagram shown in FIG. 9.

The system shown in FIGS. 7a-7d four major groups of components. The first group serves to read a block of data from the record medium upon which it is initially stored, and to store it temporarily while the rest of the system is processing the previously read block of data. This group of components includes a tape reader 41, a decoder 43, and a tape reader start control 45. Also part of the group are a plurality of buffer registers 47. There are six such buffer registers, one for each of the six numbers which comprise a block of data on the punched tape 37 shown in FIG. 3. Connected between the decoder 43 and the buffer registers 47 is a buffer register shift control 49. When it is desired to transfer a block of data from the punched tape 37 to the buffer registers 47, a transport mechanism within the tape reader 41 advances the tape past a reading mechanism which converts the indicia on the tape into electrical signals row by row. By means of the decoder 43 address signals are derived from the data rows representing the address symbols $I, J, X, Y, G$ and $Q$ and these signals in turn cause the buffer register shift control 49 successively to feed the signals following the respective $I, J, X, Y, G$, and $Q$ address indicia into respective ones of the buffer registers 47 over the trunkline 51.

The second principal group of components is made up of a time-shared digital computer 53, a plurality of computer function control arrays 55, and a series of "active" 57, so called because the data stored in them is continuously being processed by the computer 53. The output of each of the active registers 57 is connected through a common computer input trunkline 59 to the inputs of the digital computer 53, and each of the active registers 57 receives at its inputs the signals produced by the digital computer 53 through a common computer output trunkline 61. In addition to serving as a path for transferring signals stored in the active registers 57 to the computer 53, the computer input trunkline 59 also serves to carry the signals which are stored temporarily in the buffer registers 47 to be transferred to the active registers 57 by first entering them in the computer 53 over the computer input trunkline 59, and then transferring the signals from the computer 53 to the active registers 57 through the computer output trunkline 61.

It is the principal function of the computer 53 to process the digital data stored in the active registers 57 and to deposit the resulting data in appropriate ones of those registers. This operation is performed in a regularly recurring cyclical manner so that the information may be thought of as circulating counterclockwise, out of the active registers 57 through the input trunk line 59 into the computer 53, and out of the computer 53 through the output trunkline 61 back into the active registers 57. The selection and timing of the operations of the computer 53 necessary to perform this processing cycle is determined by the computer function control arrays 55. Specifically, each of the control arrays 55 applies to a respective control input of the computer 53 a control signal at the instant when the computer is to perform the operation associated with the particular control array involved. Just as the functioning of the digital computer must be timed, so must the flow of data from the active registers 57 onto the computer input trunkline 59. It is by selecting a particular one of the active registers 57 to feed data onto the input trunkline 59 that the data to be processed at a particular instant is selected. For this reason, each of the active registers 57 is provided with a set of READ gates which, when enabled, apply the signals then stored in the register to the computer input trunkline 53. Each of the READ gates is controlled by an array of program gates, the latter being labeled PGA in FIG. 7. When it is desired to transfer the data stored in a particular one of the active registers 57 into the digital computer 53 for processing, the program gate array associated with that register is caused to apply an enabling signal to the READ gates which are provided for that register. It is also desirable to have control over the particular one of the active registers 57 into which a particular group of signals produced by the computer 53 is to be deposited. Toward this end, each of the registers is provided with a set of WRITE gates which are operative, when enabled, to enter the signals, then on the computer output trunkline 61 into their associated register. Associated with each set of WRITE gates is an array of program gates (PGA) similar to those associated with the READ gates so that when it is desired to deposit the number produced by the computer 53 in a particular one of the registers 57, the program gate array associated with that register is caused to apply an enabling signal to the WRITE gates provided for the register.

To provide a time base for the operation of the entire system is the function of the third major group of components shown in FIG. 7. This group includes a Time Base and Digital Sweep 63, which, in the exemplary embodiment, is capable of producing at a plurality of outputs, a thousand different signal combinations, each representing a different one of a thousand cyclically repeating time periods. This basic set of timing signals is applied over a trunkline 65 to a Multimode Time Base Logic 67, which in effect, converts the single set of timing signals capable of producing a thousand different time periods into any selected one of four different groups of timing signals, each group representing the same series of a thousand time periods, but under different conditions. These conditions are determined in the third component 69 of the timing system, labeled the End-of-Block Responsive Time Base Mode Selector. The Time Base Mode Selector 69 responds to signals produced by the fourth component 71 of the timing system labeled the End-of-Block Anticipating System which in turn, receives the information upon which it acts from the digital computer 53 through the computer output trunkline 61. The End-of-Block Anticipating System 71 in combination with the Time Base Mode Selector 69 is operative to change the timing signals being produced at the outputs of the Multimode Time Base Logic 67 when the X- and Y-axis positions represented by the command signals which are being generated are near to the end of the path represented by the block of data then stored in the active registers 57. The purpose of this feature is to cause the computer 53 to operate in different modes as the end of the data block which is being processed is approached, and different operations become necessary.

The timing signals which appear at the outputs of the Multimode Time Base Logic 67 are distributed throughout the rest of the system by a trunkline network 73. Thus, these timing signals are applied to the computer function control arrays 55, to the program gate arrays associated with the active registers 57, and to the program gate arrays associated with the buffer registers 47. The timing signals are also distributed by the trunkline network 73 to the Tape Reader Start Control 45, so that the tape reader 41 may be started in proper time relationship with the termination of the processing of data in the active registers 57, and with the transfer of data into those registers from the buffer registers 47 through the computer 53.

Comprising the last major group of components forming the system of FIG. 7, are the X- and Y-axis servos 75 and 77. Over a pair of trunklines 79 and 81, the servos 75 and 77 continuously receive the microposition signals which are recomputed at frequent and regularly spaced intervals of time and which are periodically stored in two of the active registers 57 as the end result of the data processing operation carried out by the digital computer 53.

5. Operation of the System Disclosed Generally in FIG. 7

The first step in processing a block of data taken from the punched tape 37 is to transfer the data into the buffer registers 47 just after the previous data block has been transferred from the buffer registers to the active registers 57. The data block thus entered in the buffer registers 47 remains there for substantially the entire time during which the previous data block, just transferred to the active registers 57, is being processed through the computer 53 to generate the path represented by that previous block of data. Thus, at substantially all times two blocks of data are being stored in the system, one block in the active registers 57 and the other in the buffer registers 47.

Turning now to the particular ones of the buffer registers 47, two of the registers 47X and 47Y, are provided for receiving the X- and Y-coordinates of the end point that is to be reached in accordance with the block of data. They are labeled "X-axis Block Target Buffer Register (XEP BUF)" and "Y-axis Block Target Buffer Register (YEP BUF)." In terms of the data described with reference to the exemplary data block in FIG. 4, the information which will be stored in register 47X comprises the rows of indicia making up the X coordinate of the point P2, and the data to be stored in the register 47Y comprises the rows of indicia making up the Y-coordinate of the point P2 in FIG. 2.

The next pair of buffer registers 47I and 47J receive the data representing (in the case of a linear block) the sign and distance along the X- and Y-axes of the movement to be carried out in accordance with the block of data. The X and Y movement sign and distance data are referred to (in the case of a linear block) as the quantities $I$ and $J$ respectively, and the registers storing them are labeled "X-axis Component For Next Block (I BUF)," and "Y-axis Component for Next Block (J BUF)" respectively.

A fifth buffer register 47Q labeled "Macromove Quotient Buffer Register (Q BUF)" is provided to receive the signals derived from the tape indicia representing the macromove quotient Q. Finally a sixth buffer register 47G labeled "Path Mode Buffer Register (G BUF)" receives the signals corresponding to the tape indicia which represent the number G.

As noted previously, the entire block of data now residing in the buffer registers 47 was transferred there shortly after the previous block of data had been transferred from the buffer registers 47 into the active registers 57. The block of data residing in the buffer registers 47 remains there until the previous block of data has served its purpose in the active registers 57. This occurs very shortly before the move represented by the block of data in the active registers 57 has been carried out. It may be assumed that the previous path segment is the segment 27a between points P0 and P1 in FIG. 2, and that the block of data now to be transferred from the buffer registers 47 into the active registers 57 represent the following path segment 27b extending from point P1 to point P2 in FIG. 2.

Concentrating now on the active registers 57 which are about to receive the block of data residing in the buffer registers 47, they may be divided functionally into two groups, 57A and 57B. The first group 57A is comprised of six registers which correspond to the six buffer registers 47, and which are provided to receive the data when it is transferred from the buffer registers 47. Specifically, the data stored in the buffer registers 47X and 47Y is received and stored in a pair of active registers 95 and 97 respectively labeled "X-axis Block Target Register (XCEP)" and "Y-axis Block Target Register (YCEP)," the symbols XCEP and YCEP designating "X-command end point" and "Y-command end point."

A second pair of active registers is provided to receive the information transferred from the buffer registers 47I and 47J. They are the "X-axis Component For Present Block (I)" register 99 and the "Y-axis Component For Present Block (J)" register 101.

The last pair of the first group of active registers 57 serve to store the data read from the QBUF and GBUF registers 47Q and 47G, and are identified in FIG. 7 as the "Macromove Quotient Register (Q)" 103 and the "path mode register (G)" 105.

The data stored in the foregoing group 57A of six registers serves as the basic information from which additional signals representing intermediate macropositions and micropositions are derived by the digital computer 53 through the process of interpolation.

In general, the basic data stored in the six active registers 95–105 is utilized in the process of interpolation by the computer 53 by transferring the data over the computer input trunkline 59 to the computer, storing the data in appropriate storage devices (not shown) provided within the computer and operating on the data to derive desired further data therefrom.

To receive the signals produced by the computer 53 as a result of the computations which form part of the interpolation process is the function of the second group 57B of the active registers 57. Let us assume that the block of data representing the desired motion along the path segment 27b from point P1 to point P2 in FIG. 2 has been transferred from the buffer registers 47 to the six active registers 95–105. The computational process for performing interpolation is then ready to begin. The first step is to produce the X- and Y-axis macromove numbers $\Delta X$ and $\Delta Y$ corresponding to the macromove distances $\Delta X$ and $\Delta Y$ illustrated previously in FIG. 5. It will be noted that all numbers produced by the system under discussion are represented by digital signals.

It should be understood that when mention is made herein of reading, writing, adding, storing or otherwise processing a "number" the reference being made is to the signals which represent that number, rather than to the number per se.

It will be recalled from the discussion of FIG. 5b that, for a linear path segment, $$\Delta X = I \cdot Q \quad (9)$$

and $$\Delta Y = J \cdot Q \quad (10)$$

As a part of the McGee method, therefore, the numbers stored in the I register 99, the J register 101, and the Q register 103 are transferred into corresponding storage devices in the digital computer 53. The computer then produces a pair of axis macromove numbers $I \cdot Q$ and $J \cdot Q$. One of these numbers, the number $J \cdot Q$ is entered over the computer output trunkline 61 into a pair of storage registers 107 and 111, respectively identified in FIG. 7 as the "Y-axis Macromove Magnitude Register ($\Delta Y$)" and as the "Y-axis Macromove Remainder Register (YR)." The reason for using two registers to store a single number need not be understood at this point. Suffice it to say that in the exemplary embodiment to be described herein, the four most significant digits of the macromove number $J \cdot Q$ are stored in the $\Delta Y$ register 107, and that the remaining digits of the number are stored in the YR register 111. Subsequently, the computer produces an axis macromove number $I \cdot Q$ and it is stored in another pair of active registers 109 and 113, respectively labeled "X-axis Macromove Magnitude Register ($\Delta X$)" and "X-axis Macromove Remainder Register (XR)."

The four most significant digits of the product $J \cdot Q$ stored in the $\Delta Y$ register 107, are used to produce a number representing the Y coordinate of the point which is to be reached at the end of the axis macromove $\Delta Y$. The Y coordinate number, resulting from this operation is stored in a register 115, designated as "Y-axis Macroposition Register (YCP)." The operation is performed after each calculation of the number $\Delta Y$ by adding in the computer the numbers then stored in the registers 115 and 107, and storing the sum in the YCP register 115.

Similarly for the X-axis, a register labeled the "X-axis Macroposition Register (XCP)" 117 is provided for storing the X-command position number XCP. Thus, the number representing the last XCP macroposition is transferred from the register 117 to the computer 53 followed by the $\Delta X$ number from register 109. Their sum is then produced by the computer and replaces the previously stored XCP number in the register 117.

In addition to producing XCP and YCP macropositions, the system is also capable of producing micropositions designating the points along the X and Y axes to be reached at the ends of successive micromoves such as those shown in FIG. 5b. The numbers representing Y-axis micropositions are received in a register 119 labeled the "Y-axis Microposition Register (YSC)," and the numbers representing the successive X-axis micropositions are received in a similar register 121 labeled "X-axis Microposition Register (XSC)." The numbers stored in the registers 119 and 121 may be thought of as the end product of the computations carried out by the computer 53, since it is these numbers which are applied in the form of digital electrical signals over the trunklines 79 and 81 to the X- and Y-axis servos 75 and 77. It is these numbers therefore, which serve as the Y Servo Command and X Servo Command numbers. Hence the abbreviation YSC and XSC to designate the numbers stored in the registers 119 and 121.

The Y-axis microposition number YSC is derived in a manner similar to that for deriving the Y-axis macroposition number YCP. Thus, the number stored in the register 119, and representing the last microposition for the Y axis is taken from the register and is transferred to the computer 53. To this number is then added a number representing a micromove, or $\Delta Y/N$. The latter quantity is derived by taking the number from the $\Delta Y$ register 107, transferring it to the computer 53, and dividing it by N. The result, $\Delta Y/N$, is added to the number previously read from the YSC register 119, and the sum is transferred from the computer 53 back into the YSC register 119. The process of adding the number $\Delta Y/N$ to the number YSC taken from the YSC register 119, is repeated in the exemplary embodiment every 2 milliseconds, thus serving to make available to the Y-axis servo 77, signals representing a new microposition number 500 times every second. Successive microposition numbers are also derived for representing successive micropositions along the X axis. These numbers, as stated previously, are stored in the register 121, and they are derived from the $\Delta X$ number stored in the register 109 in a manner which is identical to that for deriving the YSC number in the register 119 from the number $\Delta Y$ in the register 107.

The computational process whereby data is periodically taken from the active registers 107–121, applied to the computer 53, processed by the computer to generate successive position numbers, and returned to the registers continues until the system detects that the process is about to be completed. This occurs when the axis macroposition number stored in one of the registers 115 and 117 approaches within a predetermined distance of the desired end point for the corresponding axis, as represented by the number stored in one of the block target registers 95 and 97. In the disclosed McGee system, a test is carried out for one of the axes after each macroposition has been computed for that axis. Furthermore, in the disclosed McGee system, in order to enhance the sensitivity of the test, the axis for which this test is performed is that axis along which the commanded movement is the faster. Thus, for example, in computing the macropositions for the path 27b in FIG. 2, the test would be performed for the X axis, since the desired movement and the required speed for executing such movement along the X-axis are greater than the corresponding quantities for the Y-axis. In performing the test to determine when the computational process for the data associated with the path 27b has been completed, each time a new macroposition number XCP is stored in the XCP register 117 that number is compared by the digital computer 53 with the number stored in the XCEP register 95. When it is detected that the macroposition number XCP is within a predetermined distance of the target point SCEP, the computer 53 produces a signal indicating this condition and this signal is applied over the computer output trunkline 61 to the End-of-Block Anticipating System 71. In response to an "End-of-Block" signal from the system 71, the Time Base Mode Selector 69 changes the timing signals which are produced by the Time Base Logic 67, and this change in timing signals in turn changes the sequence of operations performed by the computer 53. When the system is performing simultaneous linear interpolation, the new sequence of operations results in a modification of the position signals applied to the servo devices 75 and 77 so as to bring the last macroposition numbers stored in the registers 115 and 117 as close as possible to the corresponding target points SCEP and YCEP for the block. Another effect of the sequence of operations is to initiate the transfer into the active registers 57 of the data which up to that point was being held in the buffer registers 47 which is associated with the data block representing the next path segment 27c. The change in timing signals produced by the Multimode Time Base Logic 67 is also effective to cause the Tape Reader Start Control 45 to start the transport mechanism of the tape reader 41 to cause the tape reader to read the following block of data corresponding to the path segment 27d from the punched tape 37 to transfer that data into the buffer registers 47.

The purpose of the foregoing description has been to provide a general understanding of the manner in which a system capable of performing linear and circular interpolation might be organized. Sufficient details have not been given up to this point to understand exactly the operation or organization of the system. To provide such an exact understanding will be the purpose of the detailed description of the exemplary system which follows.

F. DETAILED DESCRIPTION OF SIMULTANEOUS LINEAR PATH GENERATION

1. The System in Greater Detail

The process by which macroposition numbers XCP and YCP are generated for each of a series of equally spaced points will be described in detail in connection with a system, shown in FIG. 9, which is capable of performing both simultaneous linear interpolation and staggered circular interpolation. Before considering the operation of the system whereby linear path generation is carried out, selected parts of the system will first be described.

a. The Central Timing System

Provision is made in the numerical control system of FIG. 9 for producing a digital sweep formed of signals which represent a reference number repeatedly and cyclically changing through a progressively increasing series of values during successive time intervals. Provision is also made for providing a sinusoidal reference signal for the X- and Y-axis servo drives 75 and 77, and for deriving from the digital sweep, signals which control the time periods during which various operations of the numerical control are performed. A particularly effective combination for performing all of these functions are the Time Base and Digital Sweep 63 and the Time Base Mode Selector 69 shown respectively in FIGS. 9b and 9e.

(1) Producing the Digital Sweep

Forming part of the Time Base and Digital Sweep 63 is a series of four cascaded binary coded decimal pulse counters 131, 133, 135, and 137. The digital sweep is derived from the outputs of the first three stages, 131, 133, and 135, respectively labeled the A, B, and C decade counters and collectively identified as the Digital Sweep Generator 139. The decade counters 131–137 are of similar construction and are well known to those skilled in the art. A typical unit of this type includes four cascaded flip-flops interconnected to that the decade repeatedly counts from 0 to 9 in response to successive input pulses, being reset to 0 by every 10th input pulse and signaling its contents on four output lines, or terminals, in 8, 4, 2, 1 binary code. Additionally, each time the unit is reset to 0, it produces a signal on a fifth or "carry" line.

The A decade counter 131 is stepped by output pulses produced at a repetition frequency of 500 kHz. by a Divide-by-4 circuit 141 which in turn is driven by pulses from a 2 MHz. clock 143. The output pulses produced by the clock 143 and the Divide-by-4 circuit 141 are shown in FIG. 11 as the waveforms 145 and 147 respectively. The units digit of the digital sweep is signaled on output terminals of the A decade counter 131, labeled A1, A2, A4 and A8 to signify the binary weight of the signals appearing on the respective terminals. Since the pulse repetition frequency of the pulses applied to the A decade counter 131 is 500 kHz. or a pulse every 2 microseconds, the A decade counter cycles through its 10 count states every 20 microseconds. Through line 149, the "-carry" output of the A decade counter 131 is applied to the input of the B decade counter 133 and consequently that counter cycles through its 10 count states every 200 microseconds and on its four output terminals, labeled B1, B2, B4 and B8 is signaled the 10 digit of the digital sweep. The "-carry" output of the B decade counter 133 is applied to the input of the C decade counter 135 through the line 151, causing that counter to cycle through its 10 count states every 2 milliseconds. It is on the output terminals C1, C2, C4 and C8 of this counter that the binary coded decimal signals representing the hundreds digit of the digital sweep are derived.

Collectively, the cycling decade counters 131, 133, and 135 produce a digital sweep formed of signals representing a reference number which repeatedly cycles during successive time intervals from a first predetermined value (here 000) to a second predetermined value (here 999) by uniform increments (here 1) and at uniformly time-spaced instants (here 2 microseconds). The signals produced by the Digital Sweep Generator 139 are applied to other components of the system and in order to maintain clarity in the drawings, their connections are not indicated by lines. Instead the output terminals of the Digital Sweep Generator 139 contain the symbol Δ and terminals of devices elsewhere in the system, such as the compare circuits in FIG. 9d, which are connected to terminals of the Digital Sweep Generator, contain similar symbols, with an additional indication of the particular Digital Sweep Generator terminal to which they are connected.

(2) Producing Gating Pulses to Assure Utilization of the Digital Sweep While its Count States Are Stable The progression of the reference number collectively signaled by the cycling decade counters of the Digital Sweep Generator 139 is shown in FIG. 11 as the staircase-shaped waveform. It will be seen that each new count state begins with the negative going edge of the waveform 147 and lasts until the next such negative going edge. The wavy line during the initial portion of each count state represents an instability period during which the counters are tumbling from their previous count states. It is the principal function of the Divide-by-4 circuit 141 to produce a gating pulse which occurs during the central portion of the stable period of each count state so that units in the system which utilize the output of the Digital Sweep Generator may be gated open to receive the outputs of the Digital Sweep Generator during its stable count states.

The Divide-by-4 circuit 141 includes two gated flip-flops 155 and 157. The flip-flop 155 has a pair of inputs J1 and K1 for receiving gating signals and a third input labeled CP for receiving clock pulses. The flip-flop also has a pair of outputs labeled T1 and T̄1 characterized by the fact that when a logic "1" level signal appears at one of the outputs, a logic "0" level signal is produced at the other. The flip-flop 157 has inputs and outputs corresponding to those of flip-flop 155 and are labeled J2, K2, CP, T2 and T̄2. Flip-flops of the type illustrated for use in the Divide-by-4 circuit are commonly referred to as J–K flip-flops and are well known to those skilled in the art. It will therefore suffice here to describe the manner in which they operate under four possible conditions.

Condition 1: if neither the J input nor the K input receives a logic 1 level signal, i.e., if neither J nor the K input is "qualified," while a block pulse is applied to the flip-flop, then the clock pulse does not change the state of the flip-flop. Condition 2: if the K input is qualified during application of a clock pulse, the negative-going edge of the clock pulse following qualification of the K input of the flip-flop will reset it to its "0" state, in which state its T output produces a logic 0 level and its T̄ output produces a logic 1 level. Condition 3: if the J input is qualified, application of a clock pulse will set the flip-flop to its "1" state, that is, to that state in which its T̄ output produces a logic 1 signal and its T̄ output produces a logic 0 signal. With respect to the last two conditions, it will be understood that, if the flip-flop is already in the 0 state when its K input is qualified, it will simply stay in that state after a clock pulse is applied to it. Similarly, if the flip-flop is already in the 1 state when its J input is qualified, it will simply stay in that state after receiving a clock pulse. Condition 4: if both the J and K inputs of the flip-flop are qualified at the time when a clock pulse is applied to the flip-flop, application of a clock pulse to the flip-flop will cause it to reverse its state from whichever state it had been in prior to the application of the clock pulse.

With this basic understanding of the J-K flip-flops which form the Divide-by-4 circuit 141, operation of the circuit can be simply described. It is the well-known switch tail or Johnson counter and is basically a two-stage serial shift register connected in a loop with the outputs cross-connected to the inputs. The T1 and $\overline{T1}$ outputs of flip-flop 155 are connected to the J2 and K2 inputs of flip-flop 157 respectively and the T2 and $\overline{T2}$ outputs of flip-flop 157 are connected to the K1 and J1 inputs respectively of the flip-flop 155. The clock pulse inputs of both flip-flops 155 and 157 receive pulses from the 2-MHz clock 143. Assuming that initially both flip-flops are in the reset condition, logic 1 signals are applied by the $\overline{T1}$ and $\overline{T2}$ outputs of the flip-flops to the K2 and J1 inputs of the two flip-flops. This is indicated by the waveform diagrams shown above the Divide-by-4 circuit 141. Consequently, upon receiving the negative going or switching edge of the first clock pulse, the first flip-flop 155 becomes set but the second flip-flop 157 remains in the reset condition.

With the flip-flop 155 set, when the negative-going edge of the second clock pulse occurs, the T1 output of the flip-flop 155 will be qualifying the J2 input of flip-flop 157 while the $\overline{T2}$ output of the flip-flop 157 will continue to qualify the J1 input of the flip-flop 155 so that the negative-going edge of the second clock pulse will leave the flip-flop 155 in the set state but will also cause the second flip-flop 157 to switch from the reset to the set state. Thus, when the third clock pulse arrives, the T1 and T2 outputs of flip-flops 155 and 157 will qualify the J2 and K1 inputs of flip-flops 155 and 157. Since the K1 input of flip-flop 155 and the J2 input of flip-flop 157 are qualified when the trailing edge of the third clock pulse occurs, that trailing edge will cause flip-flop 155 to be reset while leaving flip-flop 157 in the set condition. This last change causes the $\overline{T1}$ output of flip-flop 155 to qualify the K2 input of the flip-flop 157 and the T2 output of flip-flop 157 to qualify the K1 input of flip-flop 155. With this set of conditions existing, arrival of the trailing edge of the fourth clock pulse resets the flip-flop 157, while leaving the flip-flop 155 in the reset condition. This was the initial condition of the two flip-flops and from this point on, the cycle repeats.

The T2 pulse train, produced by the flip-flop 157, is the one used to drive the Digital Sweep Generator 139; which is advanced by one count with each negative-going edge of the T2 waveform. Thus, the time which elapsed during the four clock pulses represents one count state of the Digital Sweep Generator 139. Specifically, the A decade counter 131 changes its count state on the trailing edge of the T2 delayed by the propagation delay of the flip-flops. Decade counter 133 changes its count state, as signaled at its output terminals, on the trailing edge of the carry output of decade counter 131, delayed by the delays of the flip-flops in counter 133. Thus the delays in successive counters 131–137 cumulate. In the diagram above the Divide-by-4 circuit 141, the shaded area spanning the second, third, and fourth clock pulses begins at the instant when the C decade counter 135 has stabilized and ends when the A decade counter 131 begins to change. Thus the shaded area represents the approximate time period during which all of the counters 131–135 of the Digital Sweep Generator 139 are in a stable state. The unshaded area, coinciding approximately with the first clock pulse represents the brief time period during which some of the individual counters of the Digital Sweep Generator are tumbling to their new count states.

To produce a gating pulse which falls approximately during the midportion of the shaded area representing the stable state of the Digital Sweep Generator, the T1 output of flip-flop 155 and the T2 output of flip-flop 157 are applied to an AND-gate 159. From the waveforms related to the Divide-by-4 circuit 141, it is seen that the T1 and T2 outputs of flip-flops 155 and 157 are concurrently at a logic 1 level during the midportion of the shaded area so that during this time period a logic 1 or enabling voltage level appears at the output of AND-gate 159. This signal is represented by the logic symbol T1·T2.

(3) Generating a Basic Series of Program Steps

The Time Base and Digital Sweep 63 also includes means for producing timing signals during different predetermined states of the Digital Sweep Generator so as to time the operation of various elements in relation to particular count states of the Digital Sweep Generator 139. The particular arrangement used here comprises a Program Step Generator 161 formed of the B and C decade counters 133 and 135 of the Digital Sweep Generator 139, and the D decade counter 137, the latter being driven by the carry output of the C decade counter 135. Just as the ABC decade counters 131, 133, and 135, when taken together, comprise a Divide-by-1,000 counter which cycles through a thousand different count states 500 times per second, so the BCD decade counters 133, 135, and 137, when taken together, comprise a Divide-by-1,000 counter which cycles through a thousand different count states 50 times per second. Stated differently, the count signaled by the ABC decade counters 131, 133, and 135, which comprise the Digital Sweep Generator 139, changes 10 times for every change in the count signaled by the BCD decade counters 133, 135, and 137 which comprise the Program Step Generator 161.

The relationship just described is graphically illustrated in FIG. 11 wherein the waveform 163 illustrates the steps through which the Program Step Generator 161, formed of the BCD decade counters 133, 135, and 137, progresses. Each of these steps is a program step, and it is seen from the figure that, during the same period in which the program steps progress from 0 to 100, the Digital Sweep Generator 139 goes through a complete cycle from 000 to 999.

The relationship between digital sweep numbers and program steps is also illustrated in FIG. 10a. It shows a rectangular chart vertically divided into 10 columns, each column divided into 10 equal zones and each zone being further divided into 10 equal steps. Thus, the chart is divided into 1,000 equal steps, and each step represents one count state of the Program Step Generator 161. The top step in the first column is labeled 000 and represents the initial count state of the Program Step Generator 161. The bottom or last step of the first column is labeled 099 and represents the 100th count state of the Program Step Generator. Steps in the remaining nine columns have a similar significance; thus, the top step of the second column represents count state number 101, the bottom step of that column the 200th count state, and so on through the entire chart until the last step of the last column, representing the 1,000th count state of the Program Step Generator.

As pointed out earlier, for each step or count state of the Program Step Generator 161 the Digital Sweep Generator 139 goes through 10 steps or count states of its own. Thus, during each 100 steps represented by successive columns of the programming chart, the Digital Sweep Generator cycles through a thousand different count states from 000 to 999 and this is indicated in FIG. 10b by the leftward sloping line 165 which is an approximate representation of the count states of the Digital Sweep Generator 139.

Continuing with the consideration of the Program Step Generator 161, it is seen that it generates a series of 1,000 potential program steps from which any step may be selected by means which are responsive to the particular set of signals existing on the outputs of the Program Step Generator during that step. This selection might be performed by devoting a separate set of AND gates to each program step that is to be selected. Obviously this would require quite a large number of such AND gates since each program step is signaled on 12 output terminals, B1–B8, C1–C8, and D1–D8. Consequently, to reduce the complexity of the equipment required to select various program steps for performance of differently timed functions, a series of three binary coded decimal to decimal code converters 167, 169 and 171 are provided for reducing the number of signals by which different program steps are represented. Each of the three code converters has four input terminals for receiving a binary coded decimal digit from one of the three decade counters of the Program Step Generator 161 and 10 output terminals. The units converter 167 signals the units digit of the program step on one of 10 terminals labeled 0 through 9; the tens converter 169 signals the tens digit of the program step on one of 10 terminals labeled 00 through 90; and the hundreds converter 171 signals the hundreds digit of the program step on one of its 10 outputs labeled 000 through 900.

Through the use of the code converters, each of the 1,000 program steps shown in the programming chart in FIG. 10a is represented by signals on a different combination of three output terminals among the 30 output terminals of the code converters 167, 169, and 171. As an example, assume that the Program Step Generator is in its count state number 746, or with reference to the programming chart of FIG. 10a, in the 47th step of the eight column. This count state and program step will be represented at the output terminals of the Program Step Generator 161, by logic 1 signals appearing on terminals B2 and B4, C4, and D1, D2, and D4. In contrast, the same count state and program step is represented at the outputs of the binary coded decimal to decimal converters 167, 169, and 171 by logic 1 signals on three output terminals: the 700 terminal of the hundreds converter 171, the 40 terminal of the tens converter 169, and the 6 terminal of the units converter 167. Thus, if it were desired to initiate operation of some part of the system during count state 746, it could be accomplished by use of means such as an AND gate responsive to concurrent signals on the three code converter output terminals just listed. This is indeed the way in which many of the timing signals are produced in the system, and the AND gates used for this purpose will be referred to as "program" gates.

The Time Base and Digital Sweep 63 also includes a decoder 173 for producing a program clock pulse (PCP) and a WRITE pulse (WP). Each of the PCP and WP pulses occur once during each cycle of the A decade counter 131 and their relative times of occurrence during the 10 counts of each cycle of the A decade counter 131 are shown in the waveform diagrams directly above the counter in FIG. 9b. The program clock pulse PCP serves to initiate each program step and the function of the WRITE pulse WP is to signal the instant when data is to be stored in a storage register during a particular program step. The details of the decoder 173 will be obvious to one skilled in the art and will not be described. Suffice it to say that it uses the outputs A1, A2, A4 and A8 of the decade counter 131 and may also use T1, T2 of the Divide-by-4 circuit 141. The decoder 173 may include suitable inverters, AND gates, and flip-flops arranged in accordance with the logic required to produce the PCP and the WP pulses in such a manner as to avoid marginal timing problems. In particular, the PCP pulse should be over before the count state of the Program Step Generator changes.

(4) Generating Alternative Series of Program Steps

The Program Step Generator 161 as thus far described has a capacity to produce 1,000 different timing signals, each defining a different 20-microsecond time period during each cycle of the Program Step Generator. It has been stated that, if it were desired to initiate certain operation during a given count state of the Program Step Generator 161 such as count state 746, this could be accomplished by connecting three inputs of a program gate to the 700, 40, and 6 output of the converters 171, 169, and 167. Let it be assumed, however, that it is desired to initiate a certain operation during count state 746 only if a given condition exists, a different operation only if another condition exists, a third operation only if a third condition is met and yet another operation only if a fourth condition has been reached. Let it be assumed also, that a fifth operation is to be carried out during count state 746 regardless of whether or not any of the first, second, third and fourth conditions have been met. This is the function of the Multimode Time Base Logic 67 shown in detail in FIG. 9d. It includes four groups of AND-gates 175, 177, 179, and 181. Each group includes 10 AND gates of which only the first and last two are shown. Within each group, successive ones of the individual AND gates have one of their inputs connected to successive ones of the individual outputs 000 to 900 of the converter 171 in FIG. 9d.

The output terminals of the 10 AND-gates 175 are identified as 1000, 1100 ... 1900, and may be caused to transmit the signals present on the outputs 000, 100, ... 900 of the converter 171 by an enabling signal on the input line and M1. The remaining AND-gate groups 177, 179, and 181 have outputs identified at 2100–2900, 3100–3900, and 4100–4900 respectively. Signals corresponding to those on the outputs 000–900 may be placed on the outputs 2100–2900, 3100–3900, and 4100–4900 by enabling signals on respective ones of the input lines M2, M3, and M4. If the first of the four conditions is signaled by an enabling signal on the line M1, and the second, third and fourth conditions are signaled on the lines M2, M3 and M4 respectively, then to produce a timing signal during the count state 746 of the Program Step Generator 161 only when the first condition exits, two of the three inputs of the program gate will remain connected to the 40, and the 6 outputs of the converters 169 and 167 but the third input will have to be connected to the 1700 output of the AND-gates 175 instead. In this way, a timing signal will be produced at the output of the program gate during count state 746 only if the first condition is in fact signaled on the M1 line. By similar reasoning, to produce a timing signal during count state 746 only if the second, third, and fourth conditions have been fulfilled, the third input to the program gate will have to be connected to the 2700, 3700, and 4700 output terminals of the AND-gates 177, 179, and 181. If on the other hand, a timing signal is to be produced during count state 746 of the Program Step Generator 161 regardless of the existence of the four different conditions, then the inputs of the program gate should be connected directly to the 700, 40, and 6 outputs of the converters 171, 169, and 167.

Thus the generation of a timing signal during any one of the 1,000 different count states of the Program Step Generator 161 may be conditioned on the existence of one of four conditions, and for each one of the four conditions there exist 1,000 potential timing signals which may be derived with the aid of respective ones of the AND-gates 175, 177, and 179, and 181. The 1,000 potential time periods or program states that may be derived directly from the outputs of the converters 171, 169, and 167 were shown in FIG. 10a in the form of a programming chart. Similar programming charts exist for the four different groups of 1,000 timing signals which can be derived in response to signals on the lines M1, M2, M3, and M4. One such programming chart is shown in FIG. 10c. It is identical to the programming chart of FIG. 10a except that its 10 columns are numbered 1000–1900 in keeping with the numbers and the AND-gates 175 which must be enabled to produce the timing signals represented by the programming chart.

Summarizing, the programming chart shown in FIG. 10a represent 1,000 different time periods corresponding to the 1,000 successive count states of the Program Step Generator 161 during which a timing signal may be derived by means of a program gate connected to the outputs of the converters 171, 169, and 167. Each of the 1,000 different timing signals represented by the programming chart on FIG. 10a may be thought of as requiring a single program gate connected to an appropriate three of the 30 output terminals of the converters 171, 169, and 167. Thus, if it were desirable to produce a timing signal during each of the 1,000 program steps of the Program Step Generator 161, 1,000 program gates, each connected to a different combination of three output terminals of the converters might be used. In such a case, 1,000 different timing signals would be produced, one during each of the count states of the Program Step Generator 161, regardless of the presence of a signal on the lines M1–M4. If, in a similar manner 1,000 program gates were connected to the AND-gates 175, and to the outputs of the converters 169 and 167 so as to generate the 1,000 possible timing signals represented by the programming chart in FIG. 10c, these timing signals would be produced only if an enabling signal were received by the AND-gates 175 over the input line M1. Further, if the timing signals thus produce were used to initiate 1,000 different operations in the system in succession, these operations too would occur only when the M1 input line was energized. In actual practice, four groups of programming gates (or equivalent devices) are provided, each for producing a series of timing signals under a different one of the four conditions referred to. A different series of operations is initiated by each of the four series of timing signals, each series being repeated with each cycle of the Program Step Generator 161. In this manner, the system of FIG. 9 may be caused to carry out any one of four series of operations, or to operate in any one of four different "modes," by energizing an appropriate one of the four input lines M1–M4.

The four different modes in which the system of FIG. 9 is capable of operating are required to perform four different types of operation as a path consisting of linear and circular segments is generated. In its first mode of operation the system generates either a linear or a circular path segment. This mode of operation is typically repeated a large number of times in the course of generating a path, each repetition being called an iteration, extending over a period of time which is equal to the cycling time of the program step generator 161, and resulting in the generation of a new pair of macropositions for the $X$ and $Y$ axes.

Modes 2 and 3 relate exclusively to the generation of a linear path and relate in particular to a corrective operation performed during the last few iterations associate with the generation of the linear path which is designed to bring the last macroposition for each of the X- and Y-axes axes in coincidence with the desired end point for the linear path segment.

The last of the four modes of operation is put into effect during the last sequence of operations associated with generating either a linear or a circular path. In this mode of operation the system transfers data from the buffer registers 47 to the active registers 57 and processes the data so as to generate the macromove numbers for the following path segments to be executed.

It can be stated generally that in a typical operational sequence the system operates a large number of times and through a large number of the same, mode 1, iterations in generating a linear or circular path segment. It is toward the end of the path segment that a relatively rapid change occurs in the operating mode of the system. This rate of change may be so rapid as to cause the system to shift through different modes of operation within one iteration, or within less than 20 milliseconds. This indeed is the case where the system is completing a circular path. It will be seen that, when generating a circular path, the system shifts abruptly from its first to its fourth mode of operation toward the end of the path. In contrast, in performing simultaneous linear interpolation, and in carrying out a feature of the system which is yet to be discussed as the end of the linear path is approached the system shifts from its mode-1 operation to its second mode, then into its third mode and operates in that mode for nine iterations and only during the last iteration is it switched into its fourth operating mode in which the macromove numbers for the following path segment are derived. To permit the system to step through its successive operating modes at different rates, depending on whether a circular or a linear path segment is being generated, is the function of the Time Base Mode Selector 69.

(5) The Time Base Mode Selector

Generally, the Time Base Mode Selector 69 responds to certain preselected conditions occurring in the system to take a step toward changing the operating mode of the system in a prearranged manner. One condition to which the Time Base Mode Selector 69 responds is the nearing of the end of the path segment being generated by the system. This condition is sensed by the Fast Axis Projected Overrun Detector 71, and is indicated on its output line 82 by a signal which is one of the many signals that are applied to the Time Base Mode Selector 69 In all, in the exemplary system of FIG. 9 there are over 20 different conditions to which the Time Base Mode Selector 69 is designed to respond. Each of these conditions is detected by a different logic gate or gating array. The various conditions thus responded to are listed in a block 183 which thus symbolically represents the array of program gates which are used for this purpose. The various conditions represented in the block 183 will be explained subsequently in connection with the operation of the system. It need only be noted at this point that, in response to each condition an output signal is produced by the program gate array 183 and is applied over a line 184 to one input of an AND-gate 185 whose other input is energized by the PCP output of the Time Base and Digital Sweep 63. Therefore, every time an output signal is produced by the program gate array 183, a program clock pulse is gated through the AND-gate 185. These gates program clock pulses are applied to a four-stage binary counter 186 whose outputs in turn are decoded by a binary to single line decoder 187. Binary counters and decoders of the type suitable for use in the Time Base Mode Selector 69 are well known to those skilled in the computer arts and in fact the combination illustrated in the FIG. 9e is shown and explained in *Digital Computer principles* by the Burroughs Corporation, McGraw-Hill Book Company, Inc., 1962, at page 327. The decoder 187 is provided with a series of 16 outputs numbered S1 through S16. In combination the binary counter 186 and the decoder 187 operate in a manner analogous to a stepping switch in that, in response to each pulse received from the AND-gate 185 the binary counter is stepped to its next higher count state, signaled at its outputs in binary coded decimal form. These output signals in turn appear at successive ones of the 16 outputs S1–S16 of the decoder 187. The binary counter 186 has a count capacity of 16 and is cyclic in operation. Thus, the first program clock pulse gated through the AND-gate 185 causes an output signal to appear on the S1 output terminal of the decoder 187, and the 16th gated pulse results in a signal on the S16 decoder output terminal. The following pulse applied to the counter 186 again sets it in its first count state and again causes a signal to appear on the S1 output of the decoder 187.

The output terminals S1–S16 of the decoder 187 are operatively connected in four groups to the four control lines M1–M4 of the Multimode Time Base Logic 67. The first three output terminals S1–S3 are connected through an OR-gate 189 to the input line M1. The fourth output terminal S4 is connected directly to the second input control line M2. The fifth through the 13th output terminals S5–S13 are connected through a second OR-gate 190 to the third input line M3, and the last three outputs S14–S16 are connected through a third OR-gate 191 to the fourth input line M4.

When the system is performing linear path generation, the binary counter 186 is stepped generally once, or in some cases, twice during each of the last few iterations performed during the generation of the linear path. As a result, the system is caused successively to change its mode of operation through the first, second, third and fourth modes. On the other hand, when the system is generating a circular path, as the end of the path is approached, in one or two iterations the counter 186 is caused by the program gate array 183 rapidly to step through its second through 14th or S2 through S14 stages, thus causing the system to shift from its first mode of operation to its fourth in one or two iterations.

(6) Producing a Reference Signal for the Servo Drives

A third function performed by the Time Base and Digital Sweep 63, is to provide a sinusoidal reference signal for the servo drives 75 and 77. By means of a flip-flop 175, a square wave which is in phase with cycling periods of the digital sweep is generated. The flip-flop 175 may be of the same type as those described in connection with the Divide-by-4 circuit 141 and it is so shown. To drive the flip-flop 192 in phase with the digital sweep, its J input is connected to the C4 output of the C decade counter 135 and the "ANDed" C1 and C8 outputs of the same decade counter are applied by means of an AND-gate 177 to the K input of the flip-flop. Finally the clock pulse (CP) input of the flip-flop is connected to carry output line 151 of the B decade counter 133. Consequently, in accordance with the operation of the J-K flip-flop as explained previously, the flip-flop 175 is set every time the Digital Sweep Generator 139 changes from its 499th count state to its 500th count state and is reset every time the Digital Sweep Generator changes from its 999th count state to its 000 state. The desired square wave voltage appears at the Q output of the flip-flop 175 and is shown in FIG. 10b as the waveform A to the immediate right of the programming chart. The 500-c.p.s.-output of the flip-flop 175 is applied to a reference sine wave shaper 181 and is converted thereby into a 500-c.p.s.-sinusoidal reference voltage B which, as seen in FIG. 10b, is in phase with the square wave A. Suitable sine wave shapers are well known in the art and need not be described here.

*b. Tape Reader and Buffer Registers*

Having considered in detail the manner in which various timing signals are produced for the system of FIG. 9 attention will next be directed to the peripheral, input portion of the system whereby information is read from the punched tape 37 and stored temporarily in the buffer registers 47. The XEP BUF register 47 is exemplary of all the buffer registers with exceptions which will be noted in connection with particular ones of registers. It consists of two parts, a six-stage shift register for storing six binary coded decimal digits of a number, and a seventh stage for storing the sign of that number. Each digit stage of the shift register is made up of four J-K flip-flops which are identical to the flip-flops 155 and 157 described with reference to the Divide-By-4 circuit of FIG. 9b, with the sole difference that the letters Q and $\overline{Q}$ are used in place of the letters T and $\overline{T}$ to denote the outputs. Input signals are applied to the register 47X on a set eight input lines labeled 8, $\overline{8}$, 4, $\overline{4}$, 2, $\overline{2}$, 1 and $\overline{1}$. Successive pairs of the eight input lines are applied to the J and K inputs of successive ones of the four flip-flops comprising the lowest order digit position of the register. The two lowest order positions are shown in detail in FIG. 12.

Flip-flops 201, 203, 205 and 207 comprise the lowest order digit stage, and the second stage includes another four flip-flops 209, 211, 213 and 215, each of which receives at its J and K inputs the Q and $\overline{Q}$ outputs of the corresponding flip-flop of the preceding stage. The first two digit stages are exemplary of the other four stages which are not shown. They too contain four flip-flops per stage and the flip-flops comprising each stage are connected to the flip-flops comprising the preceding stage in the same manner in which the second stage flip-flops 209-215 are connected to the first-stage flip-flops 201-207.

To enter data into the shift register, groups of binary coded signals are periodically applied to its eight input lines and synchronously with these signals clock pulses are applied at regular intervals over an "X shift" input line 217X to the CP inputs of all the flip-flops of the shift register. With each shift clock pulse the binary signals on the eight input lines are stored in the lowest order stage of the shift register. With each succeeding clock pulse, the signals are shifted to the next higher order stage and a new group of signals is entered into the lowest order stage of the shift registers until after the sixth clock pulse and the sixth group of signals, the first group of signals has been transferred all the way to the last or highest order stage of the register and the last group of signals has been stored in the first, or lowest order, stage of the register.

In the operation of the system of FIG. 9, it is desirable to transfer simultaneously all of the signals which have been entered serially into the digit stages of the buffer register 47X. For this purpose, the register also includes a group of READ-gates. In particular four READ-gates, 218 are provided for each digit stage of the register and each of them receives one of the eight outputs of the stage. Thus, a total of 24 READ-gates 218 comprise the group of gates for simultaneously transferring or "reading" the contents of the six-digit stages of the register 47X onto the computer input trunkline 59.

Each READ gate is comprised of a standard two-input positive logic AND gate and an isolating diode as illustrated in FIG. 12a. As shown in FIG. 12a, a typical two-input READ gate includes a pair of diodes 208 and 210 whose cathodes receive the two logic input signals applied to the gate and whose anodes are connected together and through a resistor 212 to the positive terminal of a voltage source. The output of the AND gate is applied to one of the conductors 59-1 of the trunk 59 through an isolating diode 214. The other end of the trunkline conductor 59-1 is typically connected to the negative terminal of the voltage source through a path within the computer 53, the computer 53 represented in FIG. 12a by the resistor 216.

The READ-gate, comprised of the components 208-214 just described and connected to the trunkline conductor 59-1 may be assumed to be one of those shown as part of the buffer register 47X. Several other buffer registers have corresponding READ-gates whose outputs are also connected to the trunk conductor 59-1. One of these READ-gates is shown in FIG. 12a as being comprised of the resistor 212a, a pair of diodes 208a and 210a, the foregoing three components comprising the AND-gate portion of the READ-gate, and an isolating diode 214a. The isolating diodes 214 and 214a serve to prevent the interaction of the several READ-gates which are part of different registers but whose outputs are connected to the same trunk conductor.

To clarify the correspondence between the symbol used for a READ-gate and the actual circuit represented by that symbol, the two READ-gates which are drawn in FIG. 12a in detail are shown in FIG. 12b, with the READ-gate symbols being substituted for the individual components of the gates.

To time the simultaneous transfer of data from the buffer register 47X, a gating signal is applied over a line 219X labeled "RD/XEP BUF" to a second input of each of the READ-gates 218.

In addition to the six digit stages of the register 47X, it also includes a seventh stage (shown in FIG. 9k to the left of the highest order digit stage) for storing the sign of the number whose digits are stored in the other six register stages. This sign stage is not shown in the detailed representation of the register in FIG. 12. It comprises a single J-K flip-flop 220X with the J and K inputs of the flip-flops receiving signals respectively representing a negative and a positive sign. To time the entry of the sign signal into the sign flip-flop 220X, a sign store clock pulse is applied to its CP input. And to permit transfer of the sign information stored in the flip-flop 220X along with the digit data stored in the six-digit stages of the register 47X, its group of READ-gates 218 includes an AND-gate connected between an output of the sign store flip-flop and the trunk line 59 and gated concurrently with the other gates in the group from the line 219X.

The foregoing description of the XEP BUF buffer register 47X applies equally to the buffer registers 47Y, 47I, and 47J, each of which also includes a single stage for storing a sign signal and six-digit stages for storing a six-digit number. Due to the much smaller number to be stored therein, the G BUF register 47G has fewer stages than the other four registers 47X, Y, I and J. From the discussion related to FIG. 4 it will be recalled that the G number comprises three digits, the first designating the letter G and the second and third designating a two-digit number. Only the second digit of the number is actually used. Consequently the G BUF register 47G comprises a single digit stage of four flip-flops connected exactly as the flip-flops 201–207 in FIG. 12. The first digit to be entered in the register is simply destroyed when the second number is subsequently entered and this second number is then converted into a control signal by means of a G BUF decoder 221.

The decoder 221 has four control outputs respectively labeled G01, G02, G03, and G02+G03, and is operative to produce a logic 1 signal at those of its outputs which correspond to the number stored in the G BUF register 47G. If the number stored in the register is 1, a logic 1 signal is produced at the G01 output of the decoder and this represents to the rest of the system that the numbers stored in the registers 47X, Y, I and J represent a linear path segment. If the number stored in the register 47G is 2, a logic 1 signal appears on the G02 output of the decoder 221, indicating that the path segment to be generated is circular, progressing clockwise. A counterclockwise progressing circular path segment is indicated by a logic 1 signal on the G03 output of the decoder and this occurs when the number stored in the register 47G is 3. However, if either a 2 or a 3 is stored in the register 47G, the G02+G03 line of the decoder 221 is energized with a logic 1 signal, indicating that the path to be generated is circular but that it may be either clockwise or counterclockwise.

The Q BUF register 47Q differs from the XEP BUF register 47X, first in that it has only five-digit positions and secondly in that it does not have a sign-storing flip-flop. The reason for these differences arises out of the fact that the Q number which is stored in the register 47Q is represented on the tape in "floating point" terminology. Accordingly to this terminology a multidigit number is represented by a sign followed by a digit called the "characteristic," which is in turn followed by a series of digits which are collectively called the "mantissa." The characteristic digit serves to indicate where the decimal point should be placed. If the characteristic digit is zero, the decimal point should be placed immediately before the first digit of the mantissa. If the decimal point should be placed after the first digit of the mantissa, the value of the characteristic will be +1. If there should be a zero between the decimal point and the first digit of the mantissa, the characteristic digit will be a −1. Furthermore, if the decimal point should appear after the second, third, or fourth digit of the mantissa, this will be indicated by a characteristic digit of +2, +3, and +4 respectively. Similarly, if there should be two, three or four zeros between the decimal point and the first digit of the mantissa, respective ones of these conditions will be indicated by the characteristic which is −2, −3 and −4. Thus the particular number represented by the indicia on the block illustrated in FIG. 4 is 0.001, meaning that the ratio of the macromove $\Delta D$ to the total movement $D$ to be executed in response to the block of data is 0.001 and that, therefore, it will require 1,000 macromoves to complete the path segment involved. For practical purposes the value of the Q number will always be less than 0.1, and, therefore, the sign of the characteristic of the Q number will always be negative, and the Q BUF register 47GQ need not have a sign store flip-flop.

To provide individual control over the stepping of data in different ones of the buffer registers 47, each of the registers is provided with an individual shift control line for supplying clock pulses to associated shift registers. In addition to the X shift clock pulse line 217X associated with the register 47X, five other clock pulse lines 217Y, 217I, 217J, 217G, and 217Q are associated with respective ones of the registers 47Y, I, J, G and Q. Each of the six clock pulse lines 217 receives clock pulses through an individual one of six clock pulse control AND-gates 222X, Y, I, J, G, Q from a common shift clock pulse line 223 connected to a first input of each of the AND-gates. Means are provided individually to enable each of the AND-gates 222 thereby passing shift clock pulses only to a selected one of the registers 47. The clock pulses are derived directly from the sprocket holes on the punched tape 37, thus insuring that they will be in synchronism with the numbers being read from the tape. Specifically, the tape reader 41 includes a nine channel photoelectric hole detector, eight channels for the eight information channels on the tape 37 and a ninth channel for the sprocket holes of the tape. As each row of holes is transported past the detector, it produces data channel pulses on eight output lines, shown collectively in FIG. 91 as a trunkline 225, and a timing pulse on a ninth output line 227. Since the sprocket hole is smaller than the data holes, the timing pulse produced in response thereto is shorter in duration than the data channel pulses as indicated by the waveforms to the left of the tape reader 41. This assures that any shifting operation initiated by the clock pulses will occur between the leading and lagging edges of the data channel pulses.

The sprocket hole pulses are applied to the shift clock pulse line 223 through an AND-gate 229 which is part of a logic gating arrangement for permitting only those pulses that are derived from sprocket holes in digit data rows to reach the line 223.

The data channel pulses of the tape reader 41 are applied over the tape reader output trunkline 225 to the decoder 43 which is shown in block form only, since decoders are well known to persons skilled in the art of data processing. It need only be noted that the decoder 43 is provided with eight inputs connected to receive the signals on the trunk line 225 and with a first group of eight outputs labeled 8, $\bar{8}$, 4, $\bar{4}$, 2, $\bar{2}$, and 1, $\bar{1}$. As row after row of the indicia on the tape 37 are read by the tape reader 41, the decoder 43 is operative to produce at its first group of eight outputs electrical signals representing each row of indicia in binary coded decimal form. The aforesaid eight outputs comprise the decoder output trunkline 51 noted previously with reference to FIG. 7 and are connected to the similarly labeled eight inputs of each of the buffer registers 47.

A principal function of the decoder 43 is to generate over individual ones of a second group of output lines 231 signals in response to those rows of indicia on the tape 37 which represent the characters X, Y, I, J, G and Q. Thus by means of appropriate logic gating devices signals are produced on successive ones of six output lines 231X, 231Y, 231I, 231J, 231G, and 231Q of the decoder 43 as respective ones of the data rows representing the characters I, J, X, Y, Q, and G are sensed by the tape reader 41. At a seventh output 232, marked EL, the decoder also produces a signal when the last, or EL row of block has been read. The signals which are produced at the output lines 231 are called the address signals and are used to control the flow of clock pulses to that one of the buffer registers which is to receive the particular number being read from the tape. Toward this end six J–K flip-flops 233 are provided, one for each of the six buffer registers 47. Each of the six address output lines 231 of the decoder 43 is connected through a common OR-gate 235 to the K inputs of all of the flip-flops 233 so that all of the flip-flops are reset each time an address character is read from the tape. Furthermore, respective ones of the six address output lines 231 are individually connected directly to the J input of a different one of the six flip-flops 233 so that, as successive ones of the address characters X, Y, I, J, G, and Q are decoded, successive ones of the flip-flops 233X, Y, I, J, G and Q receive a signal at their J inputs. A second input of the AND-gate 237 is connected to the output of the OR-gate 235 so that each time an address character is read from the tape and an address signal is produced on one of the six lines 231, a sprocket hole pulse is gated through the AND-gate 237 to the CP inputs of all of the flip-flops 233.

As the tape 37 is transported through the tape reader 41, each time an address row of indicia is read and decoded, all six of the flip-flops 233 receive a pulse at their K inputs and also at their CP inputs. Furthermore, one of the flip-flops will also receive a pulse on its J input directly from one of the six address outputs 231 of the decoder 43. Only those five flip-flops which receive signals at their CP and K inputs will be reset, and the sixth flip-flop, receiving signals at all three of its inputs, will be caused to reverse its state from a reset to a set condition. Consequently, as each address row on the tape is read and decoded, a different one of the flip-flops 233 will be set. Thus in response to the X address row, containing holes in channels 1, 2, 3, 5 and 6, a signal will be produced by the decoder 43 on its output line 231X and this signal will be fed to the J input of the flip-flop 233X causing that flip-flop to be the only one whose state is reversed and leaving the flip-flop in its set state. As a result, a logic 1 signal appears at the Q output of the flip-flop. This output, labeled the "X ADR" (X address) is connected by a line 239X to the second input of the shift clock pulse control AND-gate 222X. The logic 1 signal thereon permits shift clock pulses to pass from the line 223 onto the X shift clock pulse line 217X.

The Q outputs of the other five flip-flops 233Y, I, J, G, and Q are similarly connected by lines 239Y, I, J, G, Q to supply enabling signals to the AND-gates 222Y, I, J, G, and Q through which sprocket hole pulses are fed to the other five buffer registers 47Y, I, J, G, and Q.

The next row of indicia after the X address row represents a minus sign and is presented by the decoder 43 on the second of a pair of special "+" and "−" output lines 241 and 243. The + and − lines 241 and 243 are connected to the J and K inputs of the sign flip-flops of the buffer registers 47X, Y, I, J. The lines 241 and 243 are also connected to the inputs of an OR-gate 245 whose output is connected to one input of an AND-gate 247. The other input of the AND-gate 247 receives sprocket hole pulses through the line 227 from the tape reader 41 and the output of the AND-gate is connected over a line 249 to one input of each of four AND-gates 251X, 251Y, 251I, and 251J. Respective ones of the AND-gates 251X, Y, I, J, have their outputs connected to the CP inputs of the sign store flip-flops 220X, Y, I, J and their second inputs connected to the Q outputs of respective ones of the flip-flops 233X, Y, I, J. By means of the gates 245 and 247, sprocket holes pulses are passed to the inputs of the AND-gate 251 only when a sign signal is present on one of the decoder output lines 241 and 243, and by means of the AND-gate 251, the sprocket hole pulses are applied to the sign store flip-flop 220 of that register which is about to receive the digits associated with the sign signal. Thus the sign signal on the lines 241 or 243 will be entered in the proper sign store flip-flop 220.

To prevent shift clock pulses from reaching the register 47X before the first X digit has been read from the tape, the AND-gate 229 which controls the supply of sprocket hole pulses to the clock pulse line 223 is disabled while the X sign is read from the tape and is enabled only when a digit is being read from the tape. For this purpose, the output of the OR-gate 235 is fed to an OR-gate 253 whose output, in turn, is applied through an inverter 255 to a second input of the AND-gate 229. As a result, whenever the OR-gate 235 receives a logic 1 signal from one of the address lines 231 of the decoder 243, that signal is applied through the OR-gate 253 to, and is inverted by, the inverter 255 to be applied as a logic 0 signal to the AND-gate 229. A sprocket hole pulse is thus prevented from being passed through the AND-gate 229 whenever the data being read from the tape is an address row.

Further, to prevent a sprocket hole pulse from passing through the AND-gate 229 when a sign signal or an EL row is being read, the output of the AND-gate 245 is connected to a second input of the OR-gate 253, and the EL output 232 of the decoder 43 is connected to an input of the OR-gate 235.

Following the reading, decoding and storing of the sign of the X-coordinate number, the next row of indicia, representing the first digit of the X-coordinate, a 0, is read and decoded. Since the row represents a digit, none of the input lines to the OR-gates 235 or 245 carries a logic 1 signal so that a logic 0 voltage level appears at the output of the OR-gate 253. This signal level is inverted by the inverter 255 and is applied as a logic 1 signal level to the AND-gate 229, enabling it. As a result, a sprocket hole pulse is passed through the AND-gate 229 onto the digit store clock pulse line 223. This sprocket hole pulse is gated through the AND-gate 222X by the address signal from the address flip-flop 233X, causing the data appearing on the digit output lines of the decoder 43 to be shifted into the lowest order digit stage of the register 47X. As successive digit rows are read, five more sprocket hole pulses are applied through the AND-gate 222X and over the line 217X as shift clock pulses to the register 47X, causing the other five digits of the X-coordinate to be shifted into the register. After the last shifting operation, the first read digit will be stored in the highest order stage of the register and the last read digit will be stored in the lowest order stage. In the same manner, the sign and digit rows of the Y, I, and J numbers are stored in the registers 47Y, 47I, and 47J.

The storage of the G and Q numbers in the registers 47G and 47Q differs from the foregoing process only in that neither of the G and G numbers needs a sign. Consequently, the step associated with the reading and storing of the sign of the number is omitted.

When the last digit of the G number has been stored in the G BUF register 47G, the tape reader 41 is stopped until the next block of data is to be transferred from the tape 37 to the buffer registers 47. The stopping and starting of the tape reader is synchronized with the remainder of the system of FIG. 9 by means of the tape reader start control 45, principally comprising a J–K flip-flop 257. The tape reader 41 is provided with a RUN input 259 connected to the Q output of the flip-flop 257 and is operative to begin transporting the tape 37 and reading the data thereon when a logic 1 voltage level is applied to the RUN input by the flip-flop. The clock pulse input (CP) of the flip-flop 257 is connected to the output of an OR-gate 261 and one of the inputs of the OR-gate is, in turn, connected to the output of an AND-gate 263. One input of the AND-gate 263 and the K input of the flip-flop 257 are both connected to the EL output of the decoder 43 through a line 265. The other input of the AND-gate 263 is connected to the sprocket hole pulse line 227. Consequently, assuming that the flip-flop 257 was set to start the tape reader 41 at the start of the block, when the last row of data in the block, representing the end of line symbol EL is read by the tape reader 41, a logic 1 signal is applied to the K input of the flip-flop and shortly thereafter a sprocket hole pulse is gated through the AND-gate 263 and the OR-gate 261 to the clock pulse input of the flip-flop. As soon as the EL symbol has been read, the flip-flop 257 is reset and applies a logic 0 voltage level to the RUN input 259 of the tape reader 41, causing the tape reader to stop just short of reading the first row of data in the following block.

The OR-gate 261 receives at a second input the output of an AND-gate 267. One input of the AND-gate 267 is connected to the PCP output of the decoder 173 in FIG. 9b and the other input of the AND-gate is connected to the output of a program gate 269 which produces a program pulse on program step 4,995. Program step 4,995 marks the time when the data in the active registers 57 has served its purpose in generating the path segment derived therefrom and occurs after the data from the buffer registers 47 has been transferred into the active registers 57 for generating the next path segment. The output of the program gate 269 is also connected directly to the J input of the start control flip-flop 257. Therefore, during program step 4,995, a logic 1 voltage level is applied to the J input of the flip-flop 257 and during this same program step a PCP pulse is applied to the CP input of the flip-flop so that it is set and applies a logic 1 voltage level to the RUN input 259 of the tape reader 41, causing the tape reader to start transporting the tape 37.

c. The Active Registers

In contrast to the serial transfer of data from the decoder 43 to the buffer registers 47, the flow of data between the buffer registers 47 and the digital computer 53 is characterized by parallel, or simultaneous transfer. Generally, as one of the first operations in the process performed by the system of FIG. 9, the data stored in respective ones of the six buffer registers 47 is read in parallel into the computer 53 on six different program steps by enabling the READ gates of the respective buffer registers. The data so placed on the computer input trunkline (CIT) 59 is temporarily stored in the computer 53 without removing it from the register from which it was read and is then put by the computer on the computer output trunkline (COT) 61 during the following program step to be stored in a designated one of the active registers 57. The trunks 59 and 61 each contain four conductors for each digit of the number to be sent over them and an additional line for the sign of the number. The exemplary system has a capacity for processing numbers with up to seven digits and therefore each of the trunks 59 and 61 includes a total of 29 conductors. FIG. 13 shows the trunks 59 and 61 in greater detail, illustrating the four conductors associated with the lowest order digit to be carried on the output trunk 61 as the conductors 61–1, 61–2, 61–3, and 61–4. Similarly, the four conductors associated with the lowest order digit to be carried from the active registers 57 to the computer 53 are shown as the conductors 59–1, 59–2, 59–3, and 59–4. Also shown in FIG. 13 is the lowest order digit stage of the $\Delta X$ register 109. The register stage illustrated in FIG. 13 is representative of all of the other six-digit stages of the register 109. The sign stage of the register is similar to one-quarter of the digit stage. Thus, the $\Delta X$ register has a total of 17 flip-flops, and is representative of all of the other active storage registers, except that some of them have more digit stages, others have fewer digit stages, and others yet do not have a sign stage.

Referring to FIG. 13, the lowest order digit stage of the $\Delta X$ register includes four R–S flip-flops 281, 283, 285, and 287. There is no provision for shifting the data stored in the flip-flops 281–287 to a higher stage. Rather, data is transmitted over the four trunkline conductors 61–1, –2, –3, and –4 to the flip-flops 281–287 and is subsequently sent from the flip-flops over the four trunkline conductors 59–1, –2, –3, and –4. To permit simultaneous transmission of signals over the trunkline 61 a group of 17 INVERTERS and 17 pairs of AND gates, which collectively comprise the WRITE gates associated with the register, are provided. Those of the INVERTERS and AND gates that are associated with the lowest order digit stage of the register are shown in FIG. 13 as INVERTERS 288 and the AND-gates 289 connected between the trunkline conductors 61–1, –2, –3, and –4 and the output of each of these four AND gates is connected to the S input of a different one of the four flip-flops 281–287. The second group of four AND-gates is connected to the outputs of the four INVERTERS 288, which in turn are connected to respective ones of the lines 61–1, 61–2, 61–3, 61–4. The second group of four AND-gates have their outputs connected to respective ones of the R inputs of the four flip-flops 281–287.

With the common input to the eight AND-gates 289 held at logic "0," the four R–S flip-flops 281–287 are held in their existing state.

When a number is to be written into the flip-flops of the $\Delta X$ register, the line 291 is brought to the logic "1" level by appropriate program gating. At the appropriate time within the program step thus selected, the formerly blocked WP pulse is allowed to pass through the AND-gate 290 to the common input of the eight AND-gates 289. When this occurs, the common inputs are enabled, and the R–S flip-flops 281 through 287 acquire the data from lines 61–1, 61–2, 61–3, and 61–4.

A logic "1" presented at the S input sets an R–S flip-flop; a logic "1" presented at the R input resets that R–S flip-flop. When a logic "0" is presented on both inputs the flip-flop does not change. The combination of logic "1" on both inputs is prevented from occurring by INVERTERS 288.

Some time after the number has been stored in the register 109, it will be required to transmit the stored number from the register to the computer 53 over the trunkline 59. For this purpose, a group of 17 READ gates, one for each of the 17 flip-flops comprising the register 109 is provided. Each READ gate is a coincidence responsive logic device, four of which are shown as the READ-gates 295, each having one input connected to the Q output of a respective one of the four flip-flops 281–287 and all of them having a second input connected to a common READ control line 297. The outputs of the four READ-gates 295 are individually connected to respective ones of the trunkline conductors 59–1, –2, –3, and –4 so that, when a READ control signal ($R/\Delta X$) is applied over the conductor 297 to the READ-gates 295 the information stored in the four flip-flops 281–287 is simultaneously applied via the READ gates to the aforesaid conductors.

d. An Exemplary Time-Shared Digital Computer

The destination as well as the source of almost all of the signals stored in the active registers 57 is the time-shared digital computer 53. Such computers are well known and the discussion of their details would overburden this description. Instead, there will be defined, in detail, the functions that are performed by the computer 53 and the times during which those functions are performed.

To satisfy the varied demands of the system of FIG. 9 in its different modes of operation, the computer 53 is capable of performing several arithmetic operations. The principal ones are algebraic addition, algebraic subtraction, and multiplication. The basic operating mode of the computer 53 is that of addition and all other operating modes are brought about by special control signals. The computer receives its inputs from the computer input trunkline 59 over eight branches of four conductors each, respective branches being labeled in FIG. 9f as CIT–1 through CIT–8 and representing successively lower order digits of a number. In addition to the 32 conductors in the eight branches, a 33rd input conductor CIT (–) is provided for carrying the sign of the number signaled on the other conductors. The output of the computer 53 is stored in an Answer Register 53a which includes stages 1 through 8 corresponding to the eight numerical digits received by the computer over the trunkline 59 and a sign stage corresponding to the sign signal received by the computer.

Each of the eight-digit stages includes means for storing four binary signals representing a decimal digit and these may be four J–K flip-flops such as those used in the buffer storage registers in the system. The sign stage includes means for storing a single binary signal representing the sign of the number stored in the other stages of the register and may comprise a single J–K flip-flop. The numbers stored in the Answer Register 53a appear on the conductors of the computer output trunk 61 which are connected to the Q outputs of the respective flip-flops comprising the register through eight output branches COT–1 through COT–8 and a ninth output line COT (–). The eight branches COT–1 through COT–8 each have four conductors, and are connected to respective ones of the stages 1 through 8 of the Answer Register 53a. The single COT (–) line is connected to the single flip-flop comprising the sign stage of the Answer Register.

A digit signaled on a particular one of the input line branches CIT–1 through CIT–8 is processed in the corresponding stage of the computer 53. Thus, a digit signaled on branch CIT–5 will be processed in stage five of the computer 53. In performing addition, the computer 53 adds to each digit stored in the Answer Register 53a that digit of the following number which is signaled on the corresponding branch of the trunkline 59. Each decade of the computer, except the last, also includes means for carrying any excess over 9 of the sum developed therein to the next higher order stage, which in the foregoing example would be stage six of the computer. Thus, for instance, if an augend of +346 is stored in stages six, seven and eight of the Answer Register 53a and subsequently an addend of +778 is applied over branches CIT–6, –7, and –8 to the computer, the result of +1,124 will appear in stages five, six, seven, and eight of the Answer Register.

An important attribute of the computer 53 is that it is time shared so as to perform many different operations upon data received by it from diverse sources in the system. Toward this end the computer is synchronized with the rest of the system. The relationship between the timing of the computer 53 and the rest of the system of FIG. 9 will be best understood by recalling the concept of program steps explained with reference to FIGS. 10 and 11. As explained there, certain operations of the system may be timed to occur during selected ones of a plurality of time periods, called program steps, each of which is 20 microseconds long. For example, a number stored in a particular active storage register may be caused to be transferred to the computer input trunkline 59 in response to a gating signal applied to the READ gates of that register during a particular one of the program steps. The point to observe is that, in the exemplary system the time during which such a gating signal is being applied to the READ gates of the program storage register coincides with the program step involved.

Each operation of the computer 53 is also performed in response to a control signal produced during a particular program step, but the operating cycle of the particular computer which is illustrated herein does not coincide with that program step. Instead, the operation begins during the middle of the program step in which that operation was initiated and ends at the middle of the following program step. The particular operation of the computer to which reference is being made is that of addition. Thus, the computer is so timed that, in response to a control signal during a given program step, it commences its operation for performing addition, called the Adder Cycle, halfway through that program step and terminates that adder cycle halfway through the following program step. Since the time periods during which numbers from various ones of the buffer and active storage registers 47 and 57 are gated onto the trunkline 59 coincide with the various program steps, the adder cycles are staggered relative to the time periods during which data is supplied to the computer 53. This staggered time relationship is illustrated in FIG. 14. Shown against a time scale extending from 0 to 60 microseconds are three program steps N, N+1, and N+2 represented by a continuous row of three blocks 311, 313, and 315. The adder cycles N and N+1 corresponding to the first two program steps are shown staggered therewith, as the second row of blocks 317 and 319.

An example will serve to illustrate how the exemplary computer 53 would add two numbers stored in different registers of the system. Let it be assumed that a number stored in the $\Delta X$ register 109 is to be added to the number stored in XCP register 117. During program step N the XCP number is read from the register 117 over the trunkline 59 into the digital computer 53 over its input branches CIT-2 through CIT-8. During the same program step the computer is instructed by means of a control signal over its CAR control input to clear its Answer Register 53a and its Overhanding Register 53b of any number that might have been stored in it. These events are indicated in FIG. 14 by the blocks 321 and 323. Addition begins during the adder cycle N and is represented in FIG. 14 by the block 325.

During this period the Answer Register 53a is effectively "cleared" by supplying zeros at the augend input terminals of the computer 53 in place of the numbers in the Answer Register which are normally used as the augend, while supplying the XCP number at the addend input terminals of the computer from the trunkline 59. Since the Answer Register 53a has thus been made to appear empty, the result of the first adder cycle N is that only the XCP number will be stored therein. The above operation for causing the Answer Register to appear empty will be referred to throughout this specification simply as "clearing the Answer Register." Furthermore, since the result of "clearing" the Answer Register is to prevent the number which had been stored in it from being, in effect, reentered in the same register as the augend of the next addition, clearing the Answer Register, in effect "removed" the number which had been stored in it, and for this reason throughout the specification the step of clearing the Answer Register 53a, or the larger Accumulator Register 53ab, will be referred to as "removing" a number from those registers.

During the next program step N+1 the sign and four digits of the $\Delta X$ number are read onto branches CIT (−), and CIT−5, −6, −7, and −8 of the trunkline 59 and through them to the computer 53. This operation is shown to occur during program step N+1 and is represented by the block 327.

To complete the addition, the computer 53 is signaled halfway through the program step N+1 to commence its next adder cycle N+1. In its normal, "add mode" operation within the system, the computer receives such a signal during each program step. In response to the signal indicating commencement of the adder cycle N+1, and with the computer operating in the ADD mode, the number signaled on the trunkline 59 is algebraically added by the computer to the previously stored XCP number and the resulting sum is substituted in place of the previously stored XCP number in the Answer Register 53a, as indicated by the block 329. In the actual operation of the system of FIG. 9, after the addition just described has been performed, the sum is substituted for the number previously stored in the XCP register 117. This occurs during the second half of the program step N+2, as indicated by the block 331.

In the foregoing example the seven digits of the XCP number were entered into the computer 53 over its input line branches CIT−2 through CIT−8 and the four digits of the $\Delta X$ number were then entered over the input line branches CIT−5 through CIT−8. Entry of the $\Delta X$ number into the computer caused it to be added immediately so as to produce the correct sum of the two numbers in the Answer Register 53a. The reason why the addition was performed so directly is that the digits stored in corresponding stages of the registers 117 and 109 from which the numbers XCP and $\Delta X$ were taken have the same significance. In the case of the XCP register 117, the significance of the digits residing in its various stages can be readily seen in FIG. 9g by observing that a decimal point has been placed between the second and third highest order digit positions. Thus, the digit stored in the highest order stage of the register 117 in the exemplary system represents tens of inches. The next lower order stage represents units inches and successively lower order stages to the right of the decimal point represent tenths, hundredths, thousandths, ten thousandths, and one hundred thousandths inches. Since the $\Delta X$ register 109 has only four digit stages in the exemplary system, its highest order stage represents hundredths of inches, so that the largest possible $\Delta X$ number that can be stored therein is 0.09999 or approximately 0.1 inches. This simply means that all macromove numbers are assumed to be less than 0.1 inches when the time period $\Delta T$ during which such a macromove is carried out is 20 milliseconds. This is a reasonable assumption since an excursion of 0.1 inches during 20 milliseconds would be the equivalent of 5 inches per second or 300 inches per minute.

Unlike the register 117 the $\Delta X$ register 109 does not carry an indication of the decimal point, because its highest order digit stage is one place removed therefrom. Instead, this information, as well as the placement of the decimal point and digital significance of numbers in all of the other registers, is shown in FIG. 15. The registers of the system are shown in FIG. 15 as stacked upon one another, with each register being represented as a row of squares and identified by appropriate symbols to its left. FIG. 15 readily shows that the decimal points of the numbers XCP and $\Delta X$ coincide and that they may be added to one another in the manner explained hereinabove. This is not always the case, however, since FIG. 15 shows that not all of the numbers have their decimal points in the same place. When two numbers with differently placed decimal points are to be added, the first number is usually shifted in the Accumulator Register 53a and 53b so as to bring its decimal point into alignment with that of the second number and only then is the addition performed.

So long as the computer continues to operate in the ADD mode, every time a number is read from one of the registers 47 onto the computer input trunkline 59 during a program step, that number will be automatically added during the following adder cycle to the sum previously stored in the Answer Register 53a. The addition operation is usually terminated by enabling the WRITE gates of a selected one of the active registers 57 during the particular program step in which the desired sum is available in the Answer Register 53a.

If it is desired that the computer 53 subtract a number signaled on the input trunkline 59 from a number stored in its Answer Register, a control signal is applied to its SX input concurrently with the reading onto the trunkline 59 of the number that is to be subtracted.

The computer is also capable of performing multiplication, this operation being initiated by a control signal on its X-control input. This operation may be assumed to involve a series of successive additions of the multiplicand by a number which is equal to the least significant digit of the mantissa of the multiplier (which is Q, represented in characteristic mantissa form, see section F1(b)), followed by a shift of the partial sum stored in the Answer Register 53a one position to the right, then another series of successive additions of the multiplicand a number of times equal to the second least significant digit of the mantissa of the multiplier, followed by another shift to the right of the partial sum in the Answer Register 53a, and so on until the multiplicand has been repeatedly added a number of times equal to the most significant digit of the mantissa of the multiplier. At this time the sum in the Answer Register 53a is shifted to the right a number of positions which is equal to the characteristic of the multiplier. It can be shown that the product will then be located correctly in the Answer Register 53a.

To store the digits which are shifted toward the right from stage eight of the Answer Register 53a an "overhanging" register 53b is provided. This register is shown as including four digit stages and forms a continuation of the Answer Register 53a. Indeed, the Answer Register 53a and the overhanging register 53b will be considered as a single 12-stage accumulator register 53ab. However, only the first eight stages of this 12-stage register receive sum data from the computer 53 and only those eight stages feed the sum data to the output trunk line 61. It is evident that the Accumulator Register 53ab has means for shifting its contents both toward the right and toward the left. The shifting operations performed during multiplication are internally initiated by the computer and these are not individually described herein. During certain other operations carried out by the computer, however, it is instructed to shift a number stored in its Accumulator Register 53ab to the right and also to the left and on occasion by four positions during a single adder cycle. These shifting operations are externally initiated by application of control signals during designated program steps to the SAR (shift accumulator right), SAL (shift accumulator left), SR4 (shift right 4), and SL 4 (shift left 4) control inputs of the computer. The timing of such control signals and shifting operations initiated thereby is shown by block 333 and waveforms 335 and 337.

Provision is also made in the computer 53 for selectively clearing either the Answer Register 53a or the Overhanging Register 53b. Such selective clearing operations are performed by the computer in response to control signals on the ZR1 (zero register portion 1) and the ZR2 (zero register portion 2) control inputs.

Another operation performed by the computer 53 is that of comparing two numbers and signaling on a pair of outputs 339 and 341 the relative magnitudes of the compared numbers. In carrying out this operation, the first of the two numbers to be compared is read onto the trunkline 59 during program step N and the second of the two numbers is read onto the trunkline during program step N+1, concurrently with a "classify" control signal (block 343) which is applied to the CX control input of the computer 53. The result of the comparison operation appears on one of the two outputs 339 and 341 in time to be used during the following program step (block 345). If the first of the two numbers is less than the second, a logic 1 signal appears on the output line 341. If the first number is equal to or greater than the second, this condition is indicated by a logic 1 signal on the output line 339.

The last mode of operation performed by the computer 53 is referred to as "force positive." In this mode of operation the computer treats the number which is entered into it as a positive number, regardless of what its sign is. To cause the computer to operate in this mode, a control signal is applied to the FP control input of the computer concurrently with the reading of the second number onto the trunkline 59.

e. Path-Type Indicator for the Current Path Segment

In describing the buffer registers 47 in FIG. 9k reference was made to the G register 47G and to the G decoder 221. It was stated that the decoder 221 is operative to produce at its outputs a signal indicative of the type of path represented by the signals stored in the other buffer registers 47. This information is useful in the present system because it can be used to control the type of operations to be performed on the data stored in the other buffer registers, in accordance with the shape of the path segment represented by them. Such a path indicative signal is also useful during the continuous processing of data in the active registers 57 which occurs while the path is being executed, that is, while the controlled machine element is being moved along that path. It is for this reason that the G number residing in the buffer register 47G is transferred along with the numbers in the other buffer registers 47 to the active registers 57 and in particular to the path mode, or G, register 105.

The G register 105 appears immediately to the right of the computer 53 in FIG. 9f, and is comprised of two R-S flip-flops, each for storing a binary signal. When the G number is transmitted from the G BUF register 47G to the computer 53, it is carried to the computer on the CIT-8 branch of the trunkline 59 and, in particular, on the one- and two-bit of that branch. When the number is subsequently sent from the computer to the G register 105, it is carried on the one- and two-bit lines of the COT-8 branch of the output trunkline 61 to the WRITE gates associated with the flip-flops of the register 105. In this manner, the digitally signaled G number, whether it be 1, 2, or 3, is transferred from the G BUF register 47G to the G active register 105. To convert the binary coded representation of the G number in the active register 105 into a single line representation, a decoder 106, which is similar to the G BUF decoder 221 is provided. The decoder 106 is shown in detail in FIG. 9f and includes an array of three AND-gates 106a, 106b, and 106c, connected to one another and through a trunkline 108 to the outputs of the G register 105 so that a logic 1 voltage level appears at the output of respective ones of the AND-gates 106a, 106c and 106b, in response to a logic 1, 2, and 3 stored in the register. The decoder also includes an OR-gate 106d connected to the outputs of the AND-gates 106b and 106c so that a logic 1 signal appears at its output when either of the AND-gates 106b and 106c is enabled. Since G numbers of 1, 2, and 3 signify paths which are linear, clockwise circular, and counterclockwise circular respectively, logic 1 signals on the outputs of the AND-gates 106a, 106c, and 106b are respectively designated as LIN, CW, and CCW. Finally, a logic 1 signal at the output of the OR-gate 106d is designated CIRC, meaning that a logic 1 signal at the output of the OR-gate 106d is used to initiate operations which are to be performed whenever a circular path is to be generated, be it clockwise or counterclockwise.

f. The Program Gate Array (PGA)

The type of operation to be performed by the computer 53 and the particular program step during which this is to occur depends on several factors. Among these is the type of path to be generated and the stage to which the generation of that path has progressed. Both of these factors are detected by means of a large number of program gates, each of which is connected to respond to the particular condition that is to initiate a particular computer operation. In most cases, a given type of computer operation will be required to be performed in response to a unique combination of several different conditions, each combination being detected by an individual program gate. All of the program gates associated with a given computer operation, such as shifting four places, are collected in a group, and are referred to as a Program Gate Array, or PGA for short. All of the PGA's associated with the computer 53 are shown in FIG. 9c and one of these, the PGA 347 for initiating the shift left four (SL4) operation, is also shown in detail in FIG. 16. For reasons which will become apparent during the description to follow, the computer will be instructed to shift the contents of its Accumulator Register 53ab four positions to the left during program steps 1465 and 1470 when generating a circular path, program steps 1865 and 1870 when generating a linear path, and during program steps 1965, 1970, 4870, and 4970 for both a linear path and a circular path. In response to each of the foregoing eight conditions, therefore, a control signal is produced at the output of the Program Gate Array 347. Each of the eight control signals produced under the eight different conditions is derived by means of a different one of eight program gates 347a, b, c, d, e, f, g, and h. Taking the first program gate 347a as an example, it is an AND-gate having four inputs, the first three being connected to the 1400 output of the Multimode Time Base Logic 67 and to the 70 and 0 outputs of the Time Base and Digital Sweep 63. The fourth input of the program gate 347a is connected to the CIRC output of the G decoder 106 so that, when the path being generated is circular, regardless of whether it is clockwise or counterclockwise, a pulse is produced during program step 1470 at the output of the program gate.

The second program gate 347b is similarly connected to produce a program pulse at its output during program step 1870 when a LIN signal is produced by the G decoder 106. The remaining six program gates 347c–h are connected in a similar manner to appropriate outputs of the Multimode Time Base Logic 67, the Times Base and Digital Sweep 63 and the Path Type indicator 106 to produce at their respective outputs program pulses during program steps 1970, 4870, 4970, 1465·CIRC, 1865·LIN, and 1965. By means of an OR-gate 347i the outputs of all of the five program gates 347a–h are collected and made to appear at the output of the OR gate. This single output constitutes the output of the entire Program Gate Array 347.

Program gate arrays are also used to time the reading of numbers into the computer trunkline 59 from, and the writing of numbers from the computer output trunkline 61 into the active registers 57. Each register is seen to have next to it two such PGA's, one connected to the WRITE gates and the other to the READ gates of the register. The different conditions under which a signal is produced by a particular PGA are listed therein in the same manner as done for the PGA's shown in FIG. 9c.

2. Operation of the System in Generating a Linear Path a. Steps Performed Prior to the Execution of the First Macromove Along a Linear Path to Generate $\Delta X$ and $\Delta Y$ Numbers In describing the process of linear path generation, and subsequently the process of circular path generation, reference will be made to the hypothetical path 27 shown in FIG. 2. Thus, the description will proceed on the assumption that the path 27 is being generated, and will begin with a point on the path just short of the end of the path segment 27a. The description will then follow the generation of the linear path segment 27b and subsequently the generation of the circular path segment 27c. Interlaced with the description of the linear and circular path generating process will be a description of the means provided for carrying out the processes, that is, the system of FIG. 9. By the nature of the processes to be described, each of them involves a very large number of steps, some of which are related to optional features which are not essential to the basic processes themselves. The steps performed by the apparatus in carrying out linear and circular path generation will be described, with a few exceptions, in chronological order, that is, in the order in which they occur in time. This will permit an orderly presentation of the operation of the exemplary system. However, in many cases, steps which are directed to carrying out a particular feature do not follow one another, and the relationship between these steps will not be apparent. Therefore, periodically as the description proceeds, the various features and subprocesses which have been carried out will be summarized.

Beginning with steps associated with generating the linear path segment 27b in FIG. 2, let it be assumed that the system is in the process of completing the previous path segment 27a, and that it is presently executing the last macromove associated with that path segment. Some of the events taking place during the time period are shown in FIG. 17 which is a flow chart of operations performed by the system of FIG. 9 during a complete iteration or system cycle when the system is operating in mode 4. The flow chart is, in effect, a programming chart such as those shown in FIGS. 10a and 10c. It has 10 columns numbered 4000 through 4900 and each column is understood to have a hundred 20-microsecond time periods, during each of which a different operation may be performed. However, rather than attempt to show each single step performed during the iteration represented by the flow chart in FIG. 17, these steps are identified only by the operation toward which they are directed.

Reviewing the programming chart concept briefly, it will be recalled that each iteration or machine cycle represented by a programming chart such as that shown in generalized form in FIG. 10a takes 20 milliseconds, this being the cycling time of the Program Step Generator 161. It will be understood of course, that this iteration time is entirely optional and has been chosen only for sake of a specific example.

The steps and operations carried out during the first six columns of the FIG. 17 chart relate entirely to the execution of the previous path segment 27a. They will become of interest when the termination of a linear path is considered and will be discussed at that time. The operations related to the generation of the next straight line path segment 27b begins during the seventh column, numbered 4600, of the chart.

(1) Transferring of Data Representing Next Path Segment From Buffer Registers to Active Registers The initial operations carried out during the 4600 column are directed to transferring the numbers associated with the next block segment 27b from the buffer registers 47, where they had been stored up to this time, to the active registers 57. First, the I and then the J number is transferred and then the XEP and the YEP numbers are transferred from the buffer registers 47X and 47Y to their designated active registers 57. Next the Q number is transferred from register 47Q to register 103, and finally the G number is transferred from buffer register 47G to its designated active register.

The foregoing series of operations, whereby numbers are transferred from "buffer to active," are shown in detail, step by step, in table I.

TABLE I.—STEPS PERFORMED IN MODE 4 (PART 1)

| | Finishing linear block | | Finishing Circular block | |
|---|---|---|---|---|
| 4600-LIN | | Comments | 4600-CIRC | Comments |
| 1-14 | | | See Table III | |
| 15 | CAR | | CAR, R/XCEP | Compute X and Y.[1] |
| 16 | | | SAL | Do.[1] |
| 17 | | | R/XCP,SX | Do.[1] |
| 18 | R/IBUF | Transfer I and J from buffer to active registers. | R/IBUF | Do.[1] |

TABLE I.—STEPS PERFORMED IN MODE 4 (PART 1) – Continued

| | Finishing linear block | | Finishing Circular block | |
|---|---|---|---|---|
| | 4600·LIN | Comments | 4600·CIRC | Comments |
| 19 | W/I | do | W/I | |
| 18 | R/IBUF | do | R/IBUF | Do.[1] |
| 19 | W/I | do | W/I | Do.[1] |
| 20 | CAR | do | {CAR<br>{R/YCEP | Do.[1] |
| 21 | | do | SAL | Do.[1] |
| 22 | | do | R/YCP, SX | Do.[1] |
| 23 | R/JBUF | do | R/JBUF | Do.[1] |
| 24 | W/J | do | W/J | Do.[1] |
| 25 | | | | |
| 26 | {CAR<br>{R/XEPBUF | Transfer programmed end point from buffer to active, translating it into machine coordinates. | {CAR<br>{R/XEPBUF | Transfer programmed.[2] |
| 27 | R/50.0000″ | do | R/50.0000″ | Do. |
| 28 | R/XOFF | do | R/XOFF | (2) |
| 29 | W/XCEP | do | W/XCEP | Do. |
| 30 | {CAR<br>{R/YEPBUF | do | {CAR<br>{R/YEPBUF | Do. |
| 31 | R/50.0000″ | do | R/50.0000″ | |
| 32 | R/YOFF | do | R/XOFF | Do. |
| 33 | W/YCEP | do | W/YCEP | Do. |
| 34 | | | | Do. |
| 35 | {CAR<br>{R/QBUF | | {CAR<br>{R/QBUF | |
| 36 | W/Q | | W/Q | |
| 37–99 | | | No further computations | |

[1] Overrun correction and modify I and J accordingly when transferring from buffer to active.
[2] End point from buffer to active, translating it into machine coordinates.

This table includes two columns, the first labeled 4600·LIN and related to finishing a linear path segment or block of data, and the other labeled 4600·CIRC, related to finishing a circular data block. They are shown side by side to permit comparison of the steps performed during corresponding time periods in carrying out linear and circular path generation. The first 14 steps during each column of the FIG. 17 programming chart are devoted to utilizing the results of data generated by the system and are separately shown in another table. The transferring of data from buffer to active begins on step 18 (time period 18) of column 4600. By means of a program gate 349 a READ-gating signal is applied to the I BUF register 47I during program step 4618, causing the I number stored therein to be placed upon branches CIT-2 through CIT-7 of the computer input trunkline 59, from which it is entered in the computer 53 during the adder cycle associated with the program step 4618.

During the following program step 4619 a WRITE-gating signal is applied to the I register 99 by its WRITE PGA 355 causing the I number appearing during this program step in the Answer Register 53a of the computer to be entered into the I register over trunkline branches COT-2 through COT-8. Since the I BUF number stored in the Answer Register 53a had only six digits the least significant of which was stored in digit stage 7 of the register, a zero is stored in the least significant digit stage of the I register 99. The reason for this additional digit will become apparent later in this description.

Having transferred the I number from buffer to active through the computer 53, its Answer Register 53a is cleared in the next step 20 by application of a control signal to its CAR input. This clearing operation is performed many times during the operation of the system and to produce the control signals required to initiate the clearing operation a program gate array 351, comprising many individual program gates is provided. A series of conditions under which the program gate array 351 is to produce a CAR signal are listed in the block representing the array. The particular program step 4620 is 14th on the list.

To transfer the J number from buffer to active, a READ pulse is applied to the J BUF register 47J by a program gate 353 during program step 4623. In response to this READ signal the J number is read into the trunkline 59 during program step 4623 and appears in the Answer Register 53a during the following program step. The J number is stored during the program step 4624 by a WRITE signal applied to the J register 101 by its associated WRITE PGA 357.

Having transmitted the J number from the Answer Register 53a to the J register 101, the Answer Register is cleared on program step 4626 by means of a CAR signal from the program gate array 351 (condition 15). Also during program step 4626 the XEP number is read from the XEP BUF register 47X by application of a gating pulse derived by means of a program gate 359. As a result, the programmed X-axis end point is transmitted to the Answer Register 53a over trunkline branches CIT-3 through CIT-8, causing the number to be stored in stages 3 through 8 of the register. Before this number is stored in the active registers 57, however, it is modified to translate it from the programmer's coordinate system into the machine's coordinate system. This is an entirely optional step and may be omitted if so desired. Indeed, in certain applications it is desirable not to translate the data from the programmer's coordinates (also known as "part coordinates") in order to permit display of the data in the form which is familiar to the programmer and to the operator of the machine with which the system is used. However, in the exemplary system the data is transformed and the nature of the changes made in making the transformation will be understood by referring to FIG. 2.

As seen in FIG. 2, the zero point of the machine's single quadrant coordinate system is offset by 50 inches along both the X- and the Y-axes with reference to the center of the programmer's four quadrant-coordinate system. The direction of the fixed X- and Y-axis offsets is such that the position of any point defined with reference to the programmer's coordinate system may be translated into the machine's coordinates of that point.

Another optional feature for which allowance is made in the detailed program shown in table I is the machinist's "dialed in offset" correction. By means of this optional feature the machinist operating the machine tool can enter an additional offset on either or both of the X- and Y-axes to compensate for dimensional inaccuracies of the cutting toll used. To implement the 50-inch fixed offset correction along both the X- and Y-axes, a pair of READ-gates 361 and 363, shown in FIG. 9f, are provided, their respective outputs connected to the one- and four-bit lines of trunkline branch CIT-3. Each of the READ-gates 361 and 363 has two inputs, the first of both being connected to a source of logic 1 voltage. The other inputs of the READ gates are parallel connected to a two-program gate array so as to be simultaneously enabled thereby. Consequently, when the READ-gates 361 and 363 are enabled they pass a logic 1 voltage level over the one- and four-bit lines of the trunkline branch CIT-3 to the one- and four-bit flip-flops of stage 3 of the computer 53, thereby entering digitally the number five therein. By defining the decimal point between stages 4 and 5 of the Answer Register for this offset number, it is made to represent 50.0000 inches, as seen in FIG. 15.

The machinist's X and Y offset numbers are produced by a pair of registers 365 and 367, respectively labeled in FIG. 9f as X OFF register and the Y OFF register. Each of the registers 365 and 367 has six digit stages and a sign stage. Each digit stage may be set by appropriate means digitally to signal any number from 0 to 9 and similarly the sign stage may also be caused to signal either + or −. Because the X OFF and Y OFF registers 365 and 367 are independently settable and do not receive their data from the buffer registers 47, they do not have WRITE gates as do the other active registers. They are provided, however, with READ gates which may be identical to those shown in FIG. 13 with reference to the $\Delta X$ register 109. The READ gates of the registers 365 and 367 are connected to apply the signals stored in the digit stages of the registers to trunk line branches CIT-3 through CIT-8 and through them to cause the numbers to be entered in stages 3 through 8 of the Computer 53.

With the X-axis end point number which had been read from the buffer register 47X still in the Answer Register 53a, a READ-gating signal is applied to the READ-gates 361 and 363 during program step 4627 in order to cause them to apply a digitally signalled number 5 to the computer as previously described. This pulse is produced by a program gate 369 whose output is applied through an OR-gate 371 to the inputs of the READ-gates 361 and 363. As a result, a +50.000-inch offset is added during the adder cycle associated with program step 4627 to the X-coordinate in the Answer Register 53a. The machinist's offset is added to or subtracted from, the sum in the Answer Register 53a during the following program step 4628 in response to a READ signal applied to the X OFF register 365 from a program gate 373. The final result, representing the X coordinate fully translated into machine coordinates, appears in the Answer Register 53a during program step 4629 and during this program step is transmitted over the output trunkline 61 to the XCEP register 95 in response to a WRITE-command signal from a program gate array 375 associated with the XCEP register 95. This completes the transfer and translation into machine coordinates of the X-axis end point number from the buffer register 47X to the active register 95.

The manner in which the Y-axis block end point is transferred during the next four program steps from the buffer register 47Y to the active register 97 is exactly the same as the foregoing, except that the steps occur at different times and are initiated by different program gates, and that different registers are involved. Thus, first the Answer Register 53a is "-cleared" during program step 4630 by a CAR pulse from the Program Gate Array 351 (condition 16). During the same program step the YEP BUF number is read from buffer register 47Y in response to a READ-gating signal from a program gate 377. During the following program step 4631 a 50.0000-inch offset is read into the computer through the READ-gates 361 and 363 in response to a READ-gating signal produced by a program gate 379, and fed through the OR-gate 371 to the READ gates. During the next program step 4632 the machinist's Y offset is read from the Y OFF register 367 in response to a READ-gating signal from a program 381 shown immediately to the left of the register. The result, representing the YEP BUF number translated into machine coordinates, is read from the Answer Register 53a into the YCEP register 97 by a WRITE-gating signal applied thereto from a program gate array 383 associated with that register.

Transfer of the Q number from the buffer register 47Q to the corresponding active register 103 is carried out during program steps 4635 and 4636. The Q number is read from the register 47Q during program step 4635 by a READ-gating signal applied to the register from a program gate 385 and during the same program step the Answer Register 53a of the computer 53 is cleared by a CAR signal from the PGA 351 (condition 17). Stored in stages 4 through 8 of the Answer Register 53a during the following program step 4636, the Q number is written into the Q active register 103 from the Answer Register 53a by a WRITE-gating signal from a program gate 387.

This completes the first sequence preparatory to generating the linear path segment 27b during which the I and J numbers and the X- and Y-coordinate numbers were transferred from buffer to active. No further operations are performed during the 4600 column. It will be noted that the G number has been left in the G BUF register 47G. The reason for this is that the G number associated with the path segment 27a which is currently being generated is still stored in register 105, and cannot as yet be discarded.

(2) Converting the Data Transferred to the Active Registers into Macromove and Micromove Numbers In a linear path segment the digital signals representing the X-component I of the composite distance to be covered in executing the path segment 27b are processed to derive a set of signals digitally representing a $\Delta X$ macromove number which is equal to $I \cdot \Delta T \cdot V / D$ (equation 20). Additionally, the digital signals representing the Y component J of the composite distance D are processed to derive therefrom a Y-axis macromove number $\Delta Y$, which in turn is equal to $J \cdot \Delta T \cdot V / D$ (equation 21). These equations will be recognized as being equivalent to those shown as equations (6) and (7) in FIG. 5b. In accordance with a more specific feature of the invention, several of the numbers comprising the equations (6) and (7) are precomputed and collectively represented as the number Q. The numbers which are so computed and their relation to the number Q is shown in equation (8) in FIG. 5b. Thus, the two computations referred to above as equations (20) and (21) are shortened to the form represented by the equation (9) and (10) of FIG. 5b. Reproduced here for convenient reference they are: $\Delta X = I \cdot Q$ (9); $\Delta Y = J \cdot Q$ (10).

In the exemplary embodiment of FIG. 9 the number Q is precomputed externally of the system and is supplied thereto as part of the data block representing a path segment. It will be understood, however, that this precomputation could also be performed internally. Thus, instead of the number Q the block of data representing a given path segment might include the number V. $\Delta I$ is a known constant. In such a case, the system would use a digital computer capable of squaring, square rooting, and dividing as well as adding and multiplying and the operations called for by the equations (6) and (7) would be carried out internally by the computer.

It should also be noted that the X- and Y-components I and J of the path segment D need not be given on the tape if the X- and Y-coordinates of the desired end point are supplied. Instead, the I and J numbers could be derived by the system simply by subtracting from the X and Y end-point coordinate numbers the corresponding numbers of the previous data block. The disclosed system merely represents the simplest of several possible alternatives.

(a) Multiplying J×Q and Splitting Off the Remainder

Referring now to FIG. 17, the basic computations represented by equations (9) and (10) are carried out during corresponding time periods of the adjacent programming sheet columns 4900 and 4800. The first quantity to be computed is J×Q and the quantity I×Q is computed subsequently.

The steps involved in carrying out these computations are shown in greater detail in table II.

The multiplication of J×Q is carried out in the exemplary computer during steps 19 through 64. This allows for 10 pro-

TABLE II.—STEPS PERFORMED IN MODE 4 (PART 2)

| | Entering linear block | | Entering circular block | |
|---|---|---|---|---|
| | 4800 · G 01 | 4900 · G 01 | 4800(G 02+G 03) | 4900(G 02+G 03) |
| 1–15 | | See Table III | | |
| 16 | | | | |
| 17 | R/Q | R/Q | R/Q | R/Q |
| 18 | R/J and multiply by Q | R/±I and multiply by Q | R/±I and multiply by Q | R/±J and multiply by Q. |
| 19–64 | Carry out J x Q multiplication. | Carry out I × Q multiplication. | Carry out ±I × Q multiplication. | Carry out ±J × Q multiplication. |
| 65–67 | | | No computations | |
| 68 | W/ΔY | W/ΔX | W/ΔY | W/ΔX |
| 69 | ZR1 | ZR1 | ZR1 | ZR1 |
| 70 | SL4 | SL4 | SL4 | SL4 |
| 71 | W/YR | W/XR | W/YR | W/XR |
| 72 | | | | |
| 73 | | {CAR / R/GBUF | CAR R/ΔY SX [1] | CAR R/GBUF |
| 74 | | W/G | R/ΔY SX [1] | W/G |
| 75 | | ([1]) | R/ΔY SX [1] | |
| 76 | | ([1]) | R/ΔY SX [1] | |
| 77 | | ([1]) | R/ΔY SX [1] | |
| 78 | | ([1]) | SAR [1] | |
| 79 | | ([1]) | R/J [1] | |
| 80 | | ([1]) | W/J [1] | |
| 81–94 | | | No computations | |
| 95 | | Start tape reader | | Start tape reader. |
| 96 | | | | |
| 97 | | Advance EOB to S15 | | Advance EOB to S15. |
| 98 | | Advance EOB to S16 | | Advance EOB to S16. |
| 99 | | Advance EOB to S1 | | Advance EOB to S1. |

[1] Advance J by ½Y axis macromove.

The first pair of columns in the table pertain to computations performed in preparation to entering a linear block and are of immediate interest. The third and fourth columns of the table pertain to computations in preparation for performing circular interpolation and will be discussed in a subsequent section. As in the case of table I, the corresponding steps pertaining to linear and circular path generation are shown side by side to facilitate comparison.

The operations performed during the first 15 time periods represented by the table II are not shown for the same reason mentioned in connection with table I. These time periods are assigned to certain repetitive operations which relate to the execution of the previous linear path segment 27a and will be discussed with reference to a separate table directed to those operations.

Since the steps to be performed in the first column of table II correspond to those listed generally in the 4800 column of the iteration shown on the programming sheet of FIG. 17 and since the next path segment for which the steps are to be performed is linear, each of the steps or operations performed during that first column in table II is initiated by a signal on the 4800 output of the Multimode Time Base Logic 67, and, for those steps which are to be performed only if the next path segment is linear, also on the G01 output of the G BUF decoder 221, as indicated at the heading of the column.

To begin the computation of J×Q the multiplier Q is read during step 4817·G01 from the Q active register 103 in response to a READ-gating pulse from the Program Gate Array 389 associated with the register. This step is also performed during program steps 4817·G02 and 4817·G03, and hence the PGA is conditioned to produce a gating signal simply in response to the signals representing program step 4817 (condition 3). The Q number thus read is stored in the auxiliary storage devices (not shown) provided for that purpose in the computer 53. For sake of example, it may be assumed that such a storage device is identical in structure to the Q active register 103.

Next, during program step 4818·G01, the number J is read from the J active register 101 in response to a program gating pulse from its associated PGA 391 (condition 9). The J number thus read is also stored in a storing device (not shown) in the computer 53 which may be identical to the J active register 101.

Concurrently with the reading of the J number from register 101 a multiply instruct signal is applied to the X (multiply) control input of the computer 53 by PGA 393 (FIG. 9c) in response to the fourth of its seven listed responsive conditions.

gram steps for each of the four mantissa digits of the Q number read from the active register 103 and additional steps for shifting the product in accordance with the characteristic of the Q number. The product appears in the Answer Register 53a during step 4864·G01, correctly positioned relative to the decimal point of the multiplicand I, which is between digit positions 3 and 4 in the register (See I in FIG. 15).

For practical values of path segment length and desired velocity along that path segment it may be assumed that the product stored in the Accumulator Register 53ab will have a zero in position 4 and that the first nonzero digit of the product will be in stage 5 or in an even lower digit stage of the register. In all, the nonzero digits of the product will be stored in some or all of stages 5 through 12 of the register, the last four of these being part of the Overhanging Register 53b and the digits stored in them having a digital significance of millionths, 0.1 millionths, 0.01 millionths, and 0.001 millionths (or billionths) inches. Because of their extremely small size these digits are not sufficiently significant to be utilized by the servo drives 75 and 77. Thus it would be desirable to discard them and to use only the four digits of the product J×Q that are stored in stages 5, 6, 7 and 8 of the Answer Register 53a. This would simplify the handling of the product J×Q. However, if the four least significant digits which are stored in stages 9 through 12 were simply discarded, an undesirable error would eventually accumulate. Accordingly, the first group of digits of J×Q, those in the Answer Register 53a, are stored in a first register and a second group of digits, those in the Overhanging Register 53b, are stored separately in a second register. Only those digits stored in the first register are processed to develop macropositions along the Y-axis, thereby reducing the storage capacity required for the computations involved in producing them.

The computation of J×Q is performed at regularly recurring instants, and as a part of each such computation the last four digits of the previous product J×Q, which had been formed in the second register as part of the previous computation of J×Q, are added to the result. The last four digits of the sum are then split off again and separately stored. In this manner each time the computation J×Q is performed, it is performed to an accuracy of 1 billionth of an inch. Even through the last four digits of the product are not used at this time, they are carried along after each computation as an unused part of the product, to be included in the next computation so as to insure that no significant accumulation of error occurs in the overall results.

Turning again to table II, the first step in the operation of "splitting off the remainder" occurs in the step 4868·G01 when the WRITE gates of the ΔY register 107 are opened by a gating signal from the Program Gate Array 395 (condition 4) provided for that register. As a result, the sign and digits of the product J×Q stored in stages ±, 5, 6, 7 and 8 of Answer Register 53a are transferred into the ΔY register 107 and are stored therein.

During the following program step 4869·G01 a control signal is applied to the ZR1 control input of the computer 53 from a Program Gate Array 397 (FIG. 9c) (condition 4). In response to this control signal, section R1 of the Accumulator Register 53ab is cleared so that stages 1 through 8 of the register all contain zeros. It now remains to transfer the contents of stages 9 through 12 of the Accumulator Register 53ab representing the "remainder" digits of J×Q, into the YR (for "Y-Remainder") register 111. Toward this end, during the following program step 4870·G01 the numbers stored in the Overhanging Register 53b are shifted four positions to the left by applying a control signal to the SL4 input of the computer 53. This signal is produced by the Program Gate Array 347 (condition 7) and in the manner explained with reference to FIG. 14 causes the contents of the register 53ab to be shifted four positions to the left during the same program step. By so doing the numbers previously stored in the Overhanging Register 53ab which does not have means for reading out its contents to the computer output trunkline 61 have been transferred to stages 5 through 8 of the Answer Register 53a which does have the appropriate connections, the trunkline branches COT-5 through COT-8. Through these branches, the sign and the four least significant digits of the product J×Q, now in stages ±, and 5 through 8, are transferred to the YR register 111 by a gating pulse applied to the WRITE gates of the register from a PGA 399 (condition 3) provided to control the entry of data into that register.

The computation of I×Q follows the same steps during column 4900·G01 as those performed in calculating the product J×Q except that, instead of the number J it is the number I which is fed to the computer and instead of the registers ΔY and YR 107 and 111, it is the ΔX and XR registers 109 and 113 in which the product is stored. Briefly, during step 4918·G01 the number I is read from the I register 99 (PGA 400, condition 8) and is transferred over the trunkline 59 to a storage device within the computer 53 (not shown). The Q number, serving as the multiplier, is again read into its storage device within the computer 53 during program step 4917·G01.

Also during step 4918·G01 a multiply command signal is applied to the computer from the PGA 393 (condition 3) in response to which the computer carries out the I×Q multiplication during program steps 4919·G01-·G01. The sign and the first four digits of the product, stored in stages ±, 5, 6, 7 and 8 of the Answer Register 53, are transmitted during program step 4968·G01 to the ΔX register 109 and are entered therein by a WRITE-gating signal from a PGA 401 (condition 2) associated with that register. The first four digits are then eliminated from the Answer Register 53a during program step 4969·G01 by a control signal from the "ZR1+ZR2" PGA 397 (condition 5). The last four digits of the product are then transferred into stages 5, 6, 7 and 8 of the Answer Register 53a from stages 9 through 12 of the Overhanging Register 53b by a "Shift Left 4" operation carried out during step 4970·G01 in response to a control signal produced by the PGA 347 (condition 8). During the next program step 4971·G01 the sign and the last four digits of the product are transferred from stages ±, and 5 through 8 of the Answer Register 53a to the XR register 113 and are read into that register in response to a gating signal from its associated PGA 403 (condition 2).

As a result of the foregoing two series of computations, the products J×Q and I×Q have now been stored in their designated active storage registers. It is now appropriate to transfer the G number from the G BUF buffer register 476 to the G active register 105. This may be done now because the execution of the path segment 27a is complete, so that the G number presently in the G active register is no longer needed.

To transfer the G number from buffer to active, the Answer Register 53a is cleared during step 4973·G01 by a control signal from CAR PGA 351 (condition 18) and during the same step the number stored in the G BUF register 47G is read therefrom by a gating signal from a program gate 405. The G number is transferred over trunkline 59 to the computer 53 and appears in its Answer Register 53a during the following program step 4974·G01 at which time it is entered into the G active register 105 in response to a gating signal applied thereto by a program gate 407. This completes the transfer from buffer to active of all of the basic data required to generate the following linear path segment 27b. Accordingly, during program step 4995·G01 a control signal is applied by the program gate 269 to the tape reader control flip-flop 257 (FIG. 9l). The data representing the next path segment 27c is then read from the tape 37 and is stored in the buffer registers 47.

(b) Going into Mode 1 Operation

Having transferred all the necessary information into the active registers 57 and having started the transfer of data from the tape to the buffer registers for the following path segment, it is now time to change the mode of operation of the system from that associated with the transfer and basic computation of data to that associated with the interpolation of the transferred and basically computed data for the generation of a linear path. Accordingly, means are provided in the form of one of the array of program gates 183 to advance the end of block counter from its 14th count state through its 15th and 16th count states into its first count state wherein its decoded output appearing on output S1 of the binary to single line decoder 187 enables the M1 input of the Time Base Mode Selector 69. This, it will be recalled, places the system in its mode 1 operation.

In order to step the End-of-Block Counter from its 14th count state to its first count state the Program Gate Array 183 includes three program gates for successively applying a stepping pulse to the End-of-Block Counter 186 in response to conditions 4997, 4998, and 4999 (conditions 19, 20, and 21). As a result, at the end of program step 4999·G01 the system is placed in its mode 1 operation. In this mode, 1,000 successive program steps, from 1000 to 1999 and corresponding to a programming chart such as that shown in FIG. 10c, are recurringly signaled at the outputs of the AND-gates 175 of the Multimode Time Base Logic 67 in conjunction with the tens and units converters 169 and 167 of the Time Base and Digital Sweep 63 in FIG. 9b.

b. Upgrading and Updating With Macromove and Micromove Numbers to Produce Macropositions and Micropositions It will be helpful to summarize the operations which have been performed up to this point and also the operations which are to be performed next in the generation of the linear path segment 27b. In preparation for generating the path segment 27b and while the system was executing the previous path segment 27a the macromove numbers ΔX and ΔY of a given computation were computed on the basis of information transferred from the buffer registers 47 plus the XR and YR unused remainders from the previous computation. Only the first four digits of the ΔX and ΔY macromove numbers will be used, those stored in the ΔX and ΔY registers 109 and 107, and the new remainder XR and YR carried over. These macromove numbers represent the movements which are to be executed along the X- and Y-axes during the next time period or iteration ΔT which, for the illustrated system, is 20 milliseconds long. (The phrase "time period ΔT," or "iteration" denotes a designated segment in time, which in the exemplary embodiment is 20 milliseconds long, as determined by the cycling period of the Program Step generator 161, and which repeats.) What remains to be done and what is performed by the system in mode 1 operation is to measure off successive periods ΔT in actual time and to utilize the ΔX and ΔY numbers stored in the registers 109 and 107 to generate for each successive time period $\Delta T$ corresponding X- and Y-axis macropositions which are to be reached at the end of the time period.

The means for measuring off successive periods $\Delta T$ in actual time has already been described. It is the program step generator 161 cycling at a repetition rate of once every 20 milliseconds. The macroposition numbers for the X- and Y-axes are also referred to as the X-command position (XCP) and Y-command position (YCP). Means are provided in the form of the XCP register 117 and the YCP register 115 to store signals initially representing the X- and Y-coordinates of the starting point P1 of the linear path segment 27b and means for supplying these particular coordinates to the registers 115 and 117 are also provided. In generating macropositions, the signals stored in the XCP and YCP registers 117 and 115 are "upgraded" during each time period $\Delta T$ so as to cause them to represent a new macroposition for each of the X- and Y-axes To do this, means are provided to cause the computer 53 to utilize the $\Delta X$ and $\Delta Y$ numbers stored in the registers 109 and 107 to perform the upgrading of the numbers stored in the XCP and YCP registers 117 and 115. A method, and means therefor, are also provided for generating signals which represent intermediate micropositions for each of the X- and Y-axes representing points which are to be reached at instants distributed in time along a given time period $\Delta T$. In carrying out this aspect of the invention, successive periods $\Delta T/N$ in actual time are measured off, N such time periods spanning each of the time periods $\Delta T$. Furthermore, there are derived from the signals stored in the $\Delta X$ and $\Delta Y$ registers 109 and 107 microposition signals which are changed at the end of each time period $\Delta T/N$ by incremental amounts of $\Delta X/N$ and $\Delta Y/N$.

For the above purpose there are provided a pair of storage means, the XSC and YSC registers 121 and 119, and means are also provided for initially storing in the registers 121 and 119 XSC (X servo command) and YSC (Y servo command) signals representing the required numerical portions of the coordinates of the starting point P1 of the linear path segment 27b. Moreover, means are provided for causing the digital computer 53 during each successive period $\Delta T/N$ to process the signals stored in the $\Delta X$ register 109 to derive therefrom the quantity $\Delta X/N$ and thereafter to operate upon the signals stored in the XSC register 121 so as to change the XSC coordinate value represented thereby by the quantity $\Delta X/N$. Similarly, means are provided for causing the computer 53 during each period $\Delta T/N$ to process the signals stored in the $\Delta Y$ register 107 so as to derive from them the quantity $\Delta Y/N$ and thereafter to operate upon the signals stored in the YSC register 119 so as to change the YSC coordinate value which they represent by the quantity of the $\Delta Y/N$.

FIG. 18 is a general programming chart of the operations performed by the system during each iteration in mode 1. Among these are the the generation of macropositions and micropositions. A new pair of micropositions is generated during the initial 10 steps of each 100-step column of the programming chart. A new pair of macropositions is produced only once during an iteration, and this occurs during steps 10–14 of the first column of the programming chart. These steps are shown in detail in table III and it will be noted that the steps there shown are common to all modes of operation of the system.

The 10 columns of the programming chart shown in table III are identified as X000, X100, X900, indicating that the first digit of the program step number, denoting the operating mode of the system, is immaterial, and that this chart applies to all operating modes. Consequently, all of the program gates provided to initiate the operations shown in table III are connected to receive their highest order input from the hundreds converter 171 of the Time Base and Digital Sweep 63 in FIG. 9b.

Turning now to a detailed consideration of producing micropositions, the first step is to clear the Answer Register 53a. This is timed to occur during program step X000 (table III) by a CAR signal from PGA 351 (condition 1). During the same step a READ-gating signal is applied to the $\Delta X$ register 109 by an associated program gate array 409 (condition 1), causing the $\Delta X$ number to be stored in the Answer Register 53a. The next step in the process, performed during step 001, is to derive from the macromove number $\Delta X$ a micromove number $\Delta X/N$. In the present example, N=10 in conformance with the number of smaller time periods into which the time period $\Delta T$ had been divided. Had $\Delta T$ been divided by 20, i.e., if the programming chart had 20 columns, then a micromove for such a time period would be one-twentieth of a macromove number.

To divide the macromove number $\Delta X$ by 10, it is simply shifted one position to the right during program step 001 in response to a Shift Right control signal applied to the SAR control input of the computer 53 by a Program Gate Array 411 (condition 1) provided for that purpose and shown in FIG. 9c. As a result of the shifting to the right of the $\Delta X$ number, the Answer Register 53a will contain during the following program step 002, the X-axis micromove number $\Delta X/10$ representing the movement to be executed along the X-axis substantially during the first one-tenth of the time period $\Delta T$.

To produce the first X microposition number for the time period $\Delta T$, the X micromove number stored in the Answer Register 53a is added to the X microposition number presently stored in the XSC register 121. This presently stored microposition number is the X-coordinate of the starting point of the linear path segment 27b and was stored therein at the end of the generation of the previous path segment 27a. To add the micromove $\Delta X/10$ to the last X microposition number XSC, the latter is transferred to the computer 53 from the XSC register 121 during program step 002, by application of a READ-gating signal to the XSC register 121 from a Program Gate Array 412 associated with that register (condition 1). As explained previously in section G1 (d), the reading into the computer of a number without a special control signal to one of the 10 control inputs to the computer causes the number automatically to be algebraically added to the number stored in the Answer Register 53a. Consequently, at the end of the adder cycle associated with program step 002, there is stored in the Answer Register 53a the sum of the previous X

TABLE III.—STEPS COMMON TO ALL MODES

| | X000 | X100 | X200 | X300 | X400 | X500 | X600 | X700 | X800 | X900 |
|---|---|---|---|---|---|---|---|---|---|---|
| 00 | CAR, R/$\Delta$X | CAR R/$\Delta$X | CAR R/$\Delta$X | CAR R/$\Delta$X | CAR R/$\Delta$X | CAR R/$\Delta$X | CAR R/$\Delta$X | CAR R/$\Delta$X | CAR R/$\Delta$X | CAR R/XCP |
| 01 | SAR | SAR | SAR | SAR | SAR | SAR | SAR | SAR | SAR | |
| 02 | R/XSC | R/XSC | R/XSC | R/XSC | R/XSC | R/XSC | R/XSC | R/XSC | R/XSC | |
| 03 | | | | | | | | | | |
| 04 | | | | | | | | | | |
| 05 | W/XSC, CAR, R/$\Delta$Y | W/XSC, CAR | W/XSC, CAR | W/XSC, CAR | W/XSC, CAR | W/XSC, CAR | W/XSC, CAR | W/XSC, CAR | W/XSC, CAR | R/YCP |
| 06 | SAR | SAR | SAR | SAR | SAR | SAR | SAR | SAR | SAR | |
| 07 | R/YSC | R/YSC | R/YSC | R/YSC | R/YSC | R/YSC | R/YSC | R/YSC | R/YSC | |
| 08 | | | | | | | | | | |
| 09 | | | | | | | | | | |
| 10 | W/YSC, CAR, R/XCP | W/YSC | W/YSC | W/YSC | W/YSC | W/YSC | W/YSC | W/YSC | W/YSC | W/YSC |
| 11 | R/$\Delta$X | | | | | | | | | |
| 12 | W/XCP, CAR, R/YCP | | | | | | | | | |
| 13 | R/$\Delta$Y | | | | | | | | | |
| 14 | W/YCP | | | | | | | | | |
| 15 | CAR | CAR | CAR | CAR | CAR | CAR | CAR | CAR | CAR | CAR | microposition number read from the XSC register 121 and the current micromove number $\Delta X/10$. The sum, representing the first X microposition for the time period $\Delta T$ under discussion is transferred from the Answer Register 53a to the XSC register 121 during program step 005 by the application of a WRITE-gating signal to the register from a program gate 413 shown to the right of the register in FIG. 9g.

The foregoing four steps, performed during program steps 000, 001, 002, and 005, represent the updating of the microposition number stored in the XSC register 121. A similar updating sequence is next performed for the Y-axis microposition stored in the YSC register 119. The process begins during program step 005 with the clearing of the Answer Register 53a so as to prevent the X-axis microposition number XSC from reaching the augend input of the computer. For this purpose the PGA 351 is operative to apply a CAR signal to the corresponding control input of the computer 53 during program step 005. This is indicated as condition 2 in the program gate array 351, shown as 05. The reason why the condition is not shown as 005 is that, for reasons which will be shown hereinafter, a CAR signal is also produced during program steps 105, 205 . . . 905 and therefore these 10 conditions are adequately defined by the program step number 05. Other such multiple steps are produced by 00, etc.

Also during program steps 005, the Y-axis macromove number $\Delta Y$ is transferred from the $\Delta Y$ register 107 to the Answer Register 53a by applying a READ-gating signal to the register from a Program Gate Array 415 (condition 1). During the next program step 006 the macromove number stored in the register 53a is shifted to the right by one position, thereby dividing it by 10 and producing therein the Y-axis micromove number $\Delta Y/10$. The shifting to the right by one position is initiated by a control signal applied to the SAR input of the computer 53 by the Program Gate Array 411 (condition 2).

The Y micromove number $\Delta Y/10$ stored in the Answer Register 53a is added to the previous Y microposition number YSC by transferring that number from the YSC register 119 to the computer 53 the latter operating in the ADD mode. This is done during program step 007, and is initiated by a READ-gating signal applied to the YSC register 119 by a program gate array 417 (condition 1). The sum, representing the next Y microposition number YSC, is transferred from the Answer Register 53a over the trunkline 61 to the YSC register 119 during program step 010 by means of a WRITE-gating signal applied to the register 119 by a program gate 419.

Summarizing the foregoing sequence of operations carried out during steps 000-010, the XSC and YSC registers 121 and 119 have both been updated so as to store in them the first of the 10 microposition numbers for the time period $\Delta T$.

The first step in upgrading the XCP and YCP registers for producing new macroposition numbers is that of clearing the Answer Register 53a and is carried out during program step 010. During this program step a CAR signal is applied to the appropriate control input of the computer 53 by the CAR PGA 351 (condition 3). Next, during the same program step, the X macroposition number presently stored in the XCP register 117 is read therefrom by applying to the register a READ-gating signal from its associated Program Gate Array 421 (condition 1) and is stored in the Answer Register 53a. During program step 011, the X macromove number $\Delta X$ is read into the computer 53 from the $\Delta X$ register 109 by a READ-gating signal supplied to the register from its associated Program Gate Array 409 (condition 10) and is automatically added to the stored macroposition number XCP. The sum, representing the upgraded X macroposition number XCP appears in the Answer Register 53a during the following program step 012 and is written into the XCP register 117 during the same program step by a WRITE-gating signal applied to that register from its Program Gate Array 423 (condition 1).

A similar process is next performed to upgrade the YCP register 115 and commences with the clearing of the Answer Register 53a during program step 012 to remove the upgraded XCP number therefrom (CAR PGA 351, condition 4). During the same program step the current Y-axis macroposition number is added into the cleared Answer Register 53a from the YCP register 115 by the application of a READ-gating signal to the register from its Program Gate Array 425 (condition 1). During the next program step 013 the Y-axis macromove number $\Delta Y$ is added to the current YCP number stored in the Answer Register 53a by reading the $\Delta Y$ number from the register 107 onto the computer input trunk 59. For this purpose, a READ-gating signal is applied to the register by its Program Gate Array 415 (condition 10). The sum, appearing in the register 53a during program step 014, is entered in the YCP register 115 by a WRITE-gating signal applied thereto by its Program Gate Array 427 (condition 1). This completes the upgrading of the XCP and YCP registers 117 and 115. They now contain macroposition numbers representing the X- and Y-axis coordinates to be reached at the end of the time period $\Delta T$ represented by the programming chart of FIG. 18. In order to prepare the computer for other operations that are to follow, its Answer Register 53a is cleared during the next program step 015 (CAR PGA 351, condition 5).

The updating operations performed during the first one-tenth of the iteration represented by column X000 in table III are repeated during the corresponding time periods in each of the following eight-tenths of the iteration represented by columns X100 through X800 of table III. This is indicated in the table by horizontal arrows originating from particular operations performed during the column X000 and running through the corresponding steps of the columns to its right. Thus, for example the horizontal arrow originating from $R/\Delta X$ (read $\Delta X$) in step 00 of column X000 in table III signifies that the same operation of reading the number from the $\Delta X$ register 109 is also performed during step 00 of each of the columns X100 through X800, i.e., during program steps X100, X200, . . . X800. The gating signals for initiating these reading operations are indicated in the PGA 409 in FIG. 9h as the conditions 2 through 9 inclusive. It may be confirmed by reference to other portions of FIG. 9 that other gating signals for initiating all of the other operations indicated for columns X200 through X800 of table III are similarly shown in their respective program gate arrays. By these means a new updated microposition is written into the XSC register 121 during the sixth program step of each of nine successive but time-separated series of 10 program steps. Similarly, a new microposition for the Y-axis is written during the 11th program step of each series into the YSC register 107. Each updated XSC value differs by $\Delta X/10$ from the previous XSC value and similarly each YSC value varies by $\Delta Y/10$ from the previous YSC value.

The updating process tends to cause very small errors to accumulate because, when the $\Delta X$ and $\Delta Y$ numbers are divided by 10 through shifting them to the right by one digit position in the Answer Register 53a, the last digit is discarded and only those three digits which had been initially stored in stages 5, 6 and 7 of the Answer Register are used. To compensate for the discarded digit, the last updating operation during column X900 in table III is carried out by using the macroposition numbers XCP and YCP. These numbers, stored in the registers 117 and 115, are free of the small errors inherent in the microposition numbers XSC and YSC since they were produced by adding the entire $\Delta X$ and $\Delta Y$ numbers to the previous XCP and YCP numbers. Therefore they represent the correct values of the X- and Y-axis micropositions XSC and YSC for the 10th column X900 of the table III. Accordingly, during the first step 00 of the column X900, the Answer Register 53a is cleared by a CAR signal from the CAR PGA 351 (condition 1) and during the same program step the X macroposition number is read from the XCP register 117 and added into the cleared Accumulator Register 53a in response to a gating signal applied to the XCP register from its associated PGA 421 (condition 2). The XCP macroposition number is then written into the XSC register 121 during program step X905 by a gating signal applied to the register from the program gate 413. During the same program step, as in all of the previous columns of table iII, the Answer Register 53a is cleared by a pulse from CAR PGA 351 (condition 2) and the Y-axis macroposition number is added into it from the YCP register 115 by a gating signal from its PGA 425 (condition 2). The number so stored is then transmitted from the Answer Register 53a to the YSC register 119 as the new YSC microposition number during step X910 by a WRITE signal applied to the register by the program gate 419.

Referring again to FIG. 18, the updating operations of the XSC and YSC registers 121 and 119 are represented by the two horizontal strips extending along the top of the programming chart of FIG. 18 and the upgrading operations of the XCP and YCP registers 117 and 115 comprise the first two operations indicated in block form following the updating operations performed during the first column of the programming chart. These operations are common to all of the programming charts used in performing linear interpolation and are performed during each iteration, or once every 20 milliseconds.

The generation of macropositions and micropositions shown on the programming chart of FIG. 18 is continuously repeated, causing the generated positions to progress and to be executed along the desired path segment until the macroposition associated with one of the X- and Y-axes reaches within a predetermined distance of the programmed end point P2 of the path segment 27b for that axis. In the exemplary system incorporating the present invention provision is made for predicting M time periods $\Delta T$ in advance, the specific time period $\Delta T$ during which an overshoot of the end point P2 will occur, i.e., during which the macroposition numbers XCP and YCP will be changed to represent X- and Y-coordinates which are past the desired end point P2 of the path segment 27b as represented by the end point coordinates XCEP2 and YCEP2. Toward this end the computer 53 is caused during each of the time periods $\Delta T$ to process the signals representing a chosen one of the end point coordinates XCEP and YCEP, the corresponding one of the macropositions XCP and YCP, and the corresponding one of the $\Delta X$ and $\Delta Y$ numbers to produce a signal representing the comparative magnitudes of:
1. the chosen end point coordinate, and
2. the sum of the corresponding macroposition number and M times the corresponding macromove number.

In response to the signal produced by the computer, representing the comparative magnitudes of (1) and (2), a warning signal is generated during the first time period $\Delta T$ in which the initially lesser of the compared quantities (1) and (2) becomes the greater. It will be seen in the following more detailed explanation that this reversal of relative magnitudes is indicative of a predicted overshoot of the desired end point coordinate. This feature of predicting a future overshoot condition will be referred to as "look-ahead."

c. Geometrical Analysis of Look-Ahead with Macromoves Adjusted to Hit the End Point 1. General Discussion The purpose of the look-ahead feature is to enable the system to reach the programmed end point for a linear path segment such as 27b exactly at the end of an iteration. In order to understand the usefulness of this feature, it will be helpful to understand why this is unlikely to occur without some adjustment in the magnitudes of at least some of the calculated macromoves $\Delta X$ and $\Delta Y$. The basic reason for computing and executing $\Delta X$ and $\Delta Y$ macromoves at regularly recurring time periods $\Delta T$ is to cause movement along a designated path segment at a predetermined velocity. Thus, the primary significance of the macromove numbers $\Delta X$ and $\Delta Y$ is velocity and not distance. Consequently, the calculations by which the macromove numbers $\Delta X$ and $\Delta Y$ are determined to produce movement along a predetermined path segment toward a designated target point at a predetermined velocity. It is not the objective of these computations to reach the end point at the end of any particular macromove. To do so would require unduly high computational accuracy. However, this objective can be attained without increasing the computational accuracy otherwise required, by adjusting for certain of the time periods $\Delta T$ the magnitudes of the $\Delta X$ and $\Delta Y$ macromove numbers which are to be executed during those time periods. Stated very simply, the movements to be carried out during these time periods $\Delta T$ are either "stretched" or "compressed" by amounts which will result in the target point being reached exactly at the end of a time period $\Delta T$.

In previous sections there have been described with reference to a path segment 27b extending toward an end point P2, certain means causing the computer 53 to operate over a first period of time at intervals of $\Delta T$ on the signals stored in the XCP register 117 and the YCP register 115 so as to "upgrade," or change, the coordinate values represented thereby by the quantities $\Delta X$ and $\Delta Y$, respectively. In accordance with another feature of the exemplary system disclosed herein means are also provided for causing the computer 53 to operate, over another given period of time and at similar intervals $\Delta T$, on the signals in the XCP and YCP registers so as to upgrade them by the quantities $\Delta X'$ and $\Delta Y'$ whose values are such that after 10 of the similar time intervals $\Delta T$, the upgraded XCP and YCP values agree closely with the X- and Y-coordinates of the end point P2.

Referring to FIG. 19, a preferred method for attaining the above objective is illustrated with reference to the path segment 27b previously shown in FIG. 2. Shown in FIG. 19 are the $\Delta X$ and $\Delta Y$ movements executed along the X- and Y-axes during a series of time periods $\Delta T1-\Delta T1000$ and the composite movement representing the path 27b is also shown. The X-axis excursion $I$ for the path segment 27b was previously given as 6 inches and the macromove quotient $Q$ was stated to 0.001. Accordingly, the X-axis macromove $\Delta X$ is 0.006 inches. In view of this assumption the end point P2 would be reached after exactly 1,000 iterations of 0.006 inches each, exactly at the end of iteration $\Delta T1000$. Of these only the first two and the last 14 are fully shown in FIG. 19.

In addition to the end point P2 two alternative end points P2' and P2'' are also shown. Let it be assumed first that, instead of the end point P2, the end point P2' had been programmed on the tape 37. It can be shown that the magnitudes computed for the $\Delta X$ and $\Delta Y$ macromoves would not have been affected by this very small change and that the point P2, which is short of the point P2' would still have been reached at the end of the 1,000th $\Delta T$ iteration as before. If movement were stopped at this point, the desired end point P2' would not be reached. On the other hand, if one more iteration were carried out, the movement executed during that iteration would carry past the desired end point P2'.

2. The Two Tests for Detecting the Presence and Sign of a Projected Overrun

In accordance with a specific aspect of the feature related to reaching the end point exactly at the end of an iteration, a distinction is made, based upon the amount by which this last macromove would carry past the actual end point. If the amount of "overrun" would exceed half of a macromove, that is, if the end point would be passed during the first half of the time period $\Delta T$, it is classified as a large overrun. It not, it is classified as a "small" overrun. Thus it is seen that, since the point P2' lies less than half a macromove past the point P2, the execution of another full macromove past the point P2 would result in a large overrun.

A small overrun is illustrated by the second alternative end point P2'' lying more than half a macromove past the point P2.

More specifically, two tests are performed during each time period $\Delta T$ while movement along the path segment 27b progresses toward the end point, taken to be the point P2' initially to illustrate a large overrun. The first test detects proximity to the end point far enough in advance to permit subsequent macromoves so to be adjusted as to cause the end point to be reached at the end of one of them. The second test is used to determine whether the detected overrun condition is large or small. If large, one type of corrective operation is carried out and if small, the corrective operation is of a second type. The number of iterations for which the macromove numbers $\Delta X$ and $\Delta Y$ are modified are made sufficiently large to prevent the resulting change in speed from being excessive.

A convenient number for computation is 10. In the exemplary system illustrated herein, a modified pair of macromove numbers $\Delta X$ and $\Delta Y$ is computed for the last 10 iterations.

3. The First Test

To allow sufficient time to modify the macromove numbers $\Delta X$ and $\Delta Y$ for the last 10 iterations for the path segment 27b, the overrun prediction is made 11 time periods $\Delta T$ in advance. It is made by producing during each time period $\Delta T$, as part of the iteration performed during that time period, a point projected 11 macromoves forward along a selected one of the coordinates X and Y measured from the point that would be reached at the end of the current iteration. Several of these projections, produced during iterations $\Delta T987$–$\Delta T990$, are shown in FIG. 19 as the horizontally extending vectors 431a–d. In the exemplary system the look-ahead test projection is always done for the axis along which desired movement is faster in order to enhance the sensitivity of the test. In the illustrated example, this is the X-axis.

Each of the projected points along the selected coordinate is compared with the corresponding coordinate of the end point to detect the first iteration $\Delta T$ during which an overrun would occur if movement continued along the path at the existing rate, i.e., with the existing macromoves. The first three of the look-ahead projections 431a–c fall short of the X-coordinate $XCEP_{2'}$ of the end point P2' and as a result, the following iteration is carried out with the "standard" macromove numbers $\Delta X$ and $\Delta Y$. However, the fourth projection 431d, produced during iteration $\Delta T990$ extends past the coordinate $XCEP_{2'}$ and this condition is detected and is used to initiate appropriate corrective action. The corrective action undertaken in response to detecting this projected overrun condition depends, however, on the result of the second test, which is related to the size of the overrun. If the second test indicates a large overrun, greater than half a macromove, the system is permitted to complete the iteration during which the overrun was detected but is forced to perform the following 10 iterations with increased macromoves $\Delta X'$ and $\Delta Y'$. On the other hand, if a small overrun is detected, the system is permitted to complete the iteration during which the detection occurred and also the following iteration at the normal rates. The subsequent 10 iterations are then carried out with slightly shortened macromoves $\Delta X''$ and $\Delta Y''$.

4. The Second Test

The second test is represented in FIG. 19 as a short vector extending leftward from the end of one of the longer vectors 431a–d. Each of the short vectors 433a–d is half a macromove, i.e., one-half $\Delta X$ in length and represents an operation whereby the amount of overrun indicated by the first test is compared with one-half $\Delta X$ in order to determine whether it would be "small" or "large." In the case of the vector 431d the second test represented by its corresponding short vector 433d indicates that the projected overrun revealed by the first test represented by the vector 431d would be a large one because the short vector 433d extending backward from the end of the first vector 431d does not quite extend to the X-coordinate $XCEP_{2'}$ of the assumed end point P2'. In other words, even if the projection were shortened by half a macromove it would still extend past the X-coordinate $XCEP_{2'}$.

5. Calculating Adjusted Macromoves $\Delta X'$, $\Delta Y'$ for a Large Projected Overrun Continuing with the assumption that P2' is the end point and that a large projected overrun had been predicted to occur during iteration $\Delta T1001$, the iteration $\Delta T990$ during which the projected overrun was detected is carried out at the normal $\Delta X$ and $\Delta Y$ macromoves. However, during the same iteration, while movement along the path 27b is advancing from command point (or macroposition) CP989 to command point CP990, calculations are being made to produce adjusted X- and Y-axis macromoves to be executed during the following 10 iterations so that at the end of the last one of them the end point P2' will be reached along both the X- and the Y-axes. These adjusted macromoves for reaching the point P2' are identified in FIG. 19 by the symbols $\Delta X'$ and $\Delta Y'$.

To compute the adjusted X-axis macromoves $\Delta X'$ the difference between the X-coordinates of the end point P2' and of the macroposition CP991 is determined. This difference is the quantity $10\Delta X'$. It is divided by 10, resulting in the adjusted X-axis macromove $\Delta X'$ which is then repeatedly executed once during each of the following 10 iterations, thereby insuring that at the end of the last of them, movement along the X-axis will have reached the X-coordinate $XCEP_{2'}$ of the end point P2' exactly. The results of these computations are identified in FIG. 19 as the vector 435, representing the quantity $10\Delta X'$ and by a series of 10 shorter vectors 437, together equal in length to the vector 435 and individually representing the adjusted X-axis macromoves $\Delta X'$. Since the vector $10\Delta X'$ is slightly longer than $10\Delta X$, each of the adjusted X-axis macromoves $\Delta X'$ is longer than a normal macromove $\Delta X$ and the end point $XCEP_{2'}$ along the X-axis is reached exactly at the end of iteration $\Delta T1000$.

The adjusted macromoves $\Delta Y'$ for the Y-axis are calculated in a similar manner. During iteration $\Delta T990$ the distance remaining between the Y-axis coordinate of the macroposition CP990 to be reached at the end of the iteration and the Y-coordinate $YCEP_{2'}$ of the point P2' is determined. This distance is identified in FIG. 19 as the vector 439 and it represents the quantity $10\Delta Y'$. During this same iteration the quantity $10\Delta Y'$ is divided by 10, producing the adjusted Y-axis macromoves $\Delta Y'$ shown in FIG. 19 as the string of vectors 441. During the following 10 iterations $\Delta T991$–$\Delta T1000$ the 10 adjusted macromoves $\Delta Y'$ are executed concurrently with the adjusted X-axis macromoves $\Delta X'$.

6. Calculating Adjusted Macromoves $\Delta X''$, $\Delta Y''$ for a Small Projected Overrun Let it be assumed next that the actual programmed end point is P2''. This assumed end point has X- and Y-axis coordinates $XCEP_{2'}$ and $YCEP_{2'}$ and is less than half a macromove short of the point scheduled to be reached at the end of iteration $\Delta T1001$. It, too, is detected during iteration $\Delta T990$ by use of the forward projected point represented by the vector 431d. Thus, it becomes known during the iteration $\Delta T990$ that an overrun would occur during iteration $\Delta T1001$. By means of the second test carried out during iteration $\Delta T990$, represented by the shorter vector 433d, it is further determined that the projected overrun along the X-axis would be less than one-half $\Delta X$. As a result, instead of increasing the X- and Y-axis macromoves in order to reach the end point P2'' at the end of iteration $\Delta T1000$, as was done in the case of a large overrun, a number of the remaining iterations are modified by shortening the X- and Y-axis macromoves so as to reach the end point P2'' only at the end of iteration $\Delta T1001$. To simplify calculations, such modified macromoves are calculated for the last 10 iterations $\Delta T992$–$\Delta T1001$ by determining the difference between the X-coordinate of the macroposition CP991 that will be reached at the end of iteration $\Delta T991$ and the X-coordinate $XCEP_{2'}$ of the end point P2''. The result is divided by 10, yielding the adjusted macromove quantity $\Delta X''$ for the X-axis, 10 of which are then successively executed during the time periods $\Delta T992$–$\Delta T1001$. The quantities $10\Delta X''$ and $\Delta X''$ calculated in this manner are shown in FIG. 19 as the vectors 443 and 445, respectively. Also, during iteration $\Delta T991$ the quantities $10\Delta Y''$ and $\Delta Y''$ are calculated, these being represented in FIG. 19 by the vectors 447 and 449, respectively.

7. Summary and Restatement in Data Processing Terms

Summarizing the foregoing, if the overrun predicted for a given iteration, such as iteration $\Delta T1001$ in FIG. 19 is more than half a macromove, then the macromoves $\Delta X$ and $\Delta Y$ are increased for the 10 iterations immediately preceding the given iteration and the programmed end point for the path segment is reached at the end of the iteration $\Delta T1000$. On the other hand, if the overrun during a given iteration such as iteration $\Delta T1001$ is predicted to be less than half a macromove, then the macromoves $\Delta X$ and $\Delta Y$ are reduced for the nine iterations immediately preceding the given iteration and additionally for the given iteration itself and the programmed end point for the path segment is caused to be reached at the end of the iteration $\Delta T1001$.

The time periods $\Delta T$ during which the first series of adjusted macromoves $\Delta X'$ and the second series of adjusted macromoves $\Delta X''$ are executed are shown by diagonal lines extending from the ends of the respective adjusted macromoves to the vertical lines designating the time periods $\Delta T991-\Delta T1001$. The corresponding adjusted macromoves $\Delta Y'$ and $\Delta Y''$ are executed concurrently with the adjusted X-axis macromoves $\Delta X'$ and $\Delta X''$.

A principal advantage of providing two possible corrections of the macromoves $\Delta X$ and $\Delta Y$, depending upon the magnitude of the projected overrun, is that, in the instance of adjusting the last 10 macromoves, the greatest amount of change in the magnitude of the macromoves and therefore in the rate at which motion is executed along the path 27b if 5 percent. Assume, for example, that an attempt had been made to reach the programmed end point at the end of iteration $\Delta T1000$ in the case of a small overrun such as illustrated by the assumed end point P2''. Specifically, assume that the programmed end point P2'' is only 0.1 macromove short of the point which would be reached at the normal rate at the end of iteration $\Delta T1001$. If it were desired to reach this point at the end of iteration $\Delta T1000$ instead, each macromove along both the X- and Y-axes would have to be increased by 0.09 macromoves or by 9 percent. But the end point P2'' can instead be reached exactly at the end of iteration $\Delta T1001$ with only a 1 percent change in speed by reducing each of the macromoves by 0.01 macromove.

It will be understood that the numbers used in the above example have been chosen because they lend themselves most readily to rapid calculation. However, it would be equally within the scope of the invention to use a longer look-ahead projection and to approach the end point so as to hit it exactly at the end of a given iteration with 20 instead of 10 adjusted macromoves.

To better illustrate the full scope of this feature of the invention it will be restated using symbols and data processing terms in place of specific numbers, but with the corresponding numbers in the previous example being shown in parentheses. Thus, during each time period $\Delta T$, first and second sets of signals are produced representing the amount, if any by which motion would be directed past the programmed end point along a selected axis at the end of the following M (11) and M-1/2 (10.5) time periods. If it is predicted that motion would be directed past the programmed end point along the selected axis within M-1/2 (10.5) time periods, the macromove numbers along the X- and Y-axes are increased by equal amounts for each of the M-1 (10) time periods $\Delta T$ which precede the time period $\Delta T$ for which an overrun was predicted so as to cause the programmed end point to be reached substantially at the end of the last one of the M-10(10) time periods $\Delta T$. On the other hand, if it is determined that motion would be directed to extend past the programmed end point along the selected axis within M (11) time periods $\Delta T$ but not within M-1/2 (10.5) time periods $\Delta T$, the macromove numbers for the specific time period $\Delta T$ during which an overrun was predicted to occur ($\Delta T1001$) as well as the macromoves for the M-2 (9) time periods $\Delta T$ immediately prior thereto are reduced by equal amounts so that motion will end exactly at the programmed end point at the end of the specific time period ($\Delta T1001$).

d. Data Processing Steps Carried Out by the Exemplary System in Performing Look-Ahead and Macromove Adjustment 1. Sequence of Iterations During Generation of Linear Path Segment To explain the sequence of iterations performed by the system of FIG. 9 corresponding to the time periods $\Delta T1-\Delta T1001$ illustrated in FIG. 19, reference will first be made to FIG. 20. Illustrated therein are a series of blocks, each block representing a programming chart such as those shown in FIGS. 17 and 18. The first iteration, performed during time period $\Delta T1$ is represented by the block 451 and is seen to be the type of iteration illustrated in FIG. 18 and discussed previously. The iterations of FIG. 18 are repeated during time periods $\Delta T2-\Delta T988$. During each of these, a standard macromove is executed along the X- and the Y-axes, causing a resultant motion to progress along the linear path segment 27b toward the programmed end point of that path segment. Following this series of iterations two possible options, corresponding to the two possible corrective actions discussed with reference to FIG. 19, are shown. The first option, undertaken when a large overrun is detected, is shown as the top row of blocks extending from iteration $\Delta T988$. The second option, chosen when a small overrun is detected, is represented by the second row of blocks, also extending from iteration $\Delta T988$.

Taking the top row of blocks first, agreeably with the example in FIG. 19, one more FIG. 18 iteration is performed during time period $\Delta T989$ with the standard macromove along the X- and Y-axes. During the following time period $\Delta T990$, a large overrun is detected by means of the look-ahead feature. As a result, the operations performed during the following time period $\Delta T990$ include calculations whereby modified macromoves are computed. The operations performed during this type of an iteration are illustrated in FIG. 21 and will be discussed in greater detail hereinafter.

During each of the following nine time periods $\Delta T991-\Delta T1000$ yet another type of iteration is carried out, these being shown in FIG. 22. Iterations of this type are performed with the system in mode 3 operation and are characterized by the fact that during each of them adjusted macromoves are executed. After the last of the nine FIG. 22 iterations, one more iteration is performed with the adjusted macromoves during time period $\Delta T1000$ in accordance with the operations shown in FIG. 17. These were discussed in detail previously in Section G·2.a and will be recalled to have included the computation of the standard macromoves for performing or generating the initial portion of the next linear path segment.

Referring now to the second row of blocks shown in FIG. 20 for time periods $\Delta T989-\Delta T1000$ in FIG. 20, the first of the iterations, during $\Delta T989$, is again of the FIG. 18 type and precedes the iteration in which a small overrun is detected. The latter occurs during time period $\Delta T990$ and causes the operations performed during this time period to assume a sequence which is shown in FIG. 23. Because the detected overrun is small, however, adjusted macromoves are not computed until the following time period $\Delta T991$ and these are shown in FIG. 24. The adjusted macromoves are executed during the next 10 iterations $\Delta T991-\Delta T1001$, the first nine of which are of the type shown in FIG. 22 and the last of which is in accordance with FIG. 17.

2. Data Processing Steps Associated with Detecting a Projected Overrun (a) Determining the Fast Axis Turning again to FIG. 18 for a closer analysis of the look-ahead feature, the first step is to determine for which of the X- and Y-axes are the computed macromoves $\Delta X$ and $\Delta Y$ larger, i.e., which of the axes is the "fast" axis. The identification of the fast axis is carried out during program steps 1015–1017 of

TABLE IV.—STEPS PERFORMED IN MODE 1 LINEAR

| | 1000-LIN | 1500-LIN | 1800-LIN | 1900-LIN |
|---|---|---|---|---|
| 0–13 | | See Table III | | |
| 14 | Advance E.O.B. ? S2 | | | |
| 15 | R/I | Identify fast axis | | |
| 16 | R/J, CX | do | | |
| 17 | {P/FAX ? ≥ <br> {C/FAX ? < | } do | | |
| 18 | | | R/Q | R/Q |
| 19–27 | | | R/J and Multiply by Q. Carry out multiplication of J × Q. | R/I and Multiply by Q. Carry out multiplication of I × Q. |
| 28 | {CAR, R/ΔX?FAX <br> {R/ΔY? $\overline{FAX}$ | } Generate 11ΔX or ΔY | do | Do. |
| 29 | SAL | do | do | Do. |
| 30 | {R/ΔX ? FAX <br> {R/ΔY ? $\overline{FAX}$ | } do | do | Do. |
| 31 | W/ACNX from ACN | Project 11 macromoves ahead. | do | Do. |
| 32 | {R/XCP ? FAX <br> {R/YCP X $\overline{FAX}$ | } do | do | Do. |
| 33 | SAR | Compute projected overrun | do | Do. |
| 34 | {SX, R/XCEP ? FAX <br> {R/YCEP ? $\overline{FAX}$ | } do | do | Do. |
| 35 | See Note 1 | | do | Do. |
| 36 | SAL | | do | Do. |
| 37 | SAL | | do | Do. |

Note.—1: On step 1035 advance E.O.B. counter to
S2 ? S1·(ACN·ACNX+$\overline{ACN}$·$\overline{ACNX}$)·LIN.

the programming chart shown in FIG. 18 and are shown in detail in table IV.

During program step 1015 the programmed coordinate excursion $I$ is read from the I active register 99 by a gating pulse from its PGA 400 (condition 1). The I number so read is transferred to the computer 53 and is stored therein. During the following step 1016 the programmed Y-coordinate excursion $J$ is read from the J active register 101 in response to a gating signal from its PGA 391 (condition 5). This information, too, is stored in the computer 53. Concurrently with reading of the J number a "compare" control signal is applied to the CX input of the computer 53 by a Program Gate Array 453 shown in FIG. 9c and labeled "FP+CX" (condition 3). In response to the control signal, the computer 53 carries out a compare operation whose results appear at one of its outputs 339 and 341 during program step 1017. If $I$ is equal to or greater than $J$, a logic 1 signal appears on the output 339. If $I$ is less than $J$, a similar signal if produced on the output line 341. To preserve this indication, a J-K flip-flop labeled FAX FF 455 (fast axis $X$) is provided. Through a pair of AND-gates 457 and 459 the flip-flop 455 is so connected to the compare outputs 339 and 341 that if $I$ is greater than $J$ during program step 1017 the flip-flop is set, and if $I$ is less than $J$ the flip-flop is reset. Accordingly, if the $X$ axis is the fast axis, a logic 1 signal appears at the $Q$ output of the flip-flop 455 at the end of program step 1017 and this output is labeled FAX. Conversely, if the $Y$ axis is the fast axis, a logic 1 signal appears at the $\overline{Q}$ output of the flip-flop and this output is labeled $\overline{FAX}$.

(b) Producing the Look-Ahead Point and Performing the First Test

Following the identification of the fast axis, a look-ahead point is subsequently generated along that axis beginning with program step 1028. It will be understood, of course, that the particular program steps during which the operations which are being described here are performed, are of no significance except where indicated and thus if it were desired, the computations which will be described next could have been initiated during any of the program steps 1018–1027. The first operation, performed during program step 1028, is to clear the Answer Register 53ab and to read the number stored in the ΔX-register 109 if the X axis was identified as the fast axis or the number in the ΔY register 107 if the Y axis was so identified. Toward this end the PGA 409 associated with the ΔX register 109 is conditioned to apply a READ-gating signal to the ΔX register 109 during program step 1028 if an FAX signal is produced by the flip-flop 455 (condition 11). Conversely, the PGA 415 is conditioned to apply a READ-gating signal to the ΔY register 107 during program step 1028 if an $\overline{FAX}$ signal is produced by the flip-flop 455 (condition 11). Since the present description relates to the path segment 27b whose X-component $I$ is greater than its Y-component $J$, the ΔX number will be read into the computer during program step 1028.

The ΔX number read into the computer 53 during program step 1028 appears in its Answer Register of 53a during program step 1029 and is effectively multiplied by 10 by shifting the contents of the Answer Register one position to the left. The appropriate control signal is applied to the SAL control input of the computer 53 by Program Gate Array 463 in FIG. 9c (condition 1). This multiplication is the first step in "building up" an 11-macromove look-ahead number. As a result of the operation, a number which is equal to 10ΔX is stored in the Answer Register 53a. To increase this number to 11ΔX, the number ΔX is again read from the register 109 into the computer 53 during program step 1030 in response to a READ signal from PGA 409 (condition 12). The result appears in the Answer Register 53a during program step 1031, but its numerical digits are not immediately utilized. Instead, during program step 1031 the sign of the number 11ΔX is stored in a sign store flip-flop 465, labeled "ACNX" and shown in FIG. 9e as part of the Fast Axis Projected Overrun Detector 71.

In addition to the flip-flop 465, the detector 71 also includes a pair of AND-gates 467 and 469. In the computer 53, the sign stage was previously described as a single JK flip-flop. In the exemplary system of FIG. 9, a (−) sign is represented by a logic 1 signal on the $Q$ output of the sign flip-flop, and this is the output supplied to the COT(−) line of the computer output trunk 61. The output line COT(−) is directly connected to the J input of the ACNX flip-flop 465 in the detector 71 and is referred to as ACN (Accumulator Negative).

The inverse of the ACN signal, $\overline{ACN}$ is applied to the K input of the flip-flop 465 by means of an inverter 471 whose input is connected to the COT(−) line. Consequently, if the sign of the number 11ΔX is negative, the ACNX flip-flop 465 is set and a logic 1 signal, referred to as ACNX, appears at its $Q$ output. On the other hand, if the number 11ΔX is positive, the ACNX flip-flop 465 is reset and a a logic 1 signal labeled $\overline{ACNX}$ appears at its $\overline{Q}$ output.

Continuing with the look-ahead process, the sign is read into the ACNX flip-flop 465 during program step 1031 by means of a program gate 473 which is connected to the CP input of the flip-flop through an additional AND-gate 475 enabled by a WP pulse from the decoder 173 of the Time Base and Digital Sweep 63 (FIG. 9b). Having stored the sign of the look-ahead number 11Δ$X$ and with that number still in the Answer Register 53a during the following program step 1032, the upgraded macroposition number XCP, representing the position to be reached at the end of the current time period Δ$T$, is additively read into the computer 53 from the XCP register 117 by a READ-gating signal from the Program Gate Array 421 (condition 3). The resulting sum (XCP+11Δ$X$) appears in the Answer Register 53a during the following program step 1033 and represents the desired look-ahead point projected forward 11Δ$X$ macromoves from the macroposition which is programmed to be reached at the end of time period Δ$T1$. (See FIGS. 19 and 20).

Having produced the look-ahead point, it now remains to compute the projected overrun, if any. This is achieved in the exemplary system by subtracting the programmed $X$-coordinate end point XCEP from the look-ahead point and using the sign of the difference to detect an overrun condition. The minuend of this operation is in the Answer Register 53a; however, the subtrahend, which is the XCEP number, cannot be read subtractively into the computer because its decimal point is located one position to the right of the decimal point of the subtrahend. (Compare XCEP and XCP in FIG. 15). Accordingly, during program step 1033 the number (XCP+11Δ$X$) is shifted one position to the right in the Answer Register 53a in response to a control signal applied to the SAR control input by the program gate array 411 (condition 23).

With the number representing the look-ahead point in proper decimal point position, the XCEP number is subtractively read into the computer 53a during program step 1034 from the XCEP register 95 in response to a READ-gating signal from its program gate array 359 (condition 1). The computer 53 is put in the subtractive mode by a control signal applied to its SX input from the program gate array 479 (condition 1).

In accordance with a specific aspect of the exemplary system, related to detecting an overrun, a comparison is made during program step 1035 between the sign of the remainder produced during the program step 1034 and the sign of the quantity 11 Δ$X$, previously stored in the ACNX flip-flop 465 in FIG. 9e during step 1031. It may be readily shown that, so long as the two signs are opposite, an overrun condition has not occurred. Thus, for the test performed during iteration Δ$T1$ the look-ahead quantity 11Δ$X$ is positive, since motion is to be toward the right in FIG. 19. When the end point coordinate $XCEP_2$ is subtracted from the look-ahead point projected forward 11Δ$X$ past the upgraded macroposition $XCP_1$, the remainder will be negative, since $XCEP_2$ is greater than $XCP_1$+11Δ$X$. Thus, the sign of the quantity 11Δ$X$ is opposite that of the quantity $XCP_1$+11Δ$X$–$SCEP_2$. However, during the first iteration that the look-ahead point $XCEP_n$+11Δ$X$ extends past the end coordinate $XCEP_2$, so that the quantity which had been the lesser becomes the greater, the sign of the remainder of $XCP_1$+11Δ$X$–$XCEP_2$ will become the same as the sign of the quantity 11Δ$X$.

The foregoing condition is detected by applying the ACN signal from the Answer Register 53a directly to a second input of the AND-gate 467 which also receives the stored ACNX signal from the Q output of the flip-flop 465. Similarly, in addition to receiving the output $\overline{ACNX}$ from the $\overline{Q}$ output of the flip-flop 465, the AND-gate 469 is also connected to receive the signal $\overline{ACN}$ directly from the output of the inverter 471. As a result, during the program step 1035 a logic 1 output is passed through the AND-gate 467 and appears at its output only if both the quantity 11Δ$X$ and the remainder of $XCEP_n$+11Δ$X$–$XCEP_2$ are negative. On the other hand, the second AND-gate 469 produces an output only if both of the aforesaid quantities are positive. The outputs of the two AND-gates 467 and 469 are fed to an OR-gate 481.

During each of the time periods Δ$T1$–Δ$T989$ in which the path segment 27b is generated, the look-ahead point $XCP_n$+11Δ$X$ will be less than the programmed end point $XCEP_2$, the signs applied to the detector 71 during program steps 1031 and 1035 will differ, and no signal will appear at the output of the OR-gate 481 during step 1035. During the first iteration, however, in which the initially lesser look-ahead point $XCP_n$+11Δ$X$(Δ$T990$ in the example of FIGS. 19 and 20) becomes the greater, the sign of $XCP_n$+11Δ$X$–$XCEP_2$ is reversed and a logic 1 signal is applied to the OR-gate 481 by the AND-gate 469 during step 1035. The resulting signal which appears at the output of the OR-gate 481 is in effect an end-of-block warning signal utilized by the system to change its mode of operation a predetermined number of iterations before the specific time period Δ$T$ in which a projected overrun is predicted to occur.

As indicated in the discussion of FIG. 19 for the exemplary path segment 27b, a projected overrun condition will not be indicated or predicted, for many iterations. Means are provided, however, to initiate in response to a signal from OR-gate 481 of the detector 71 a change in the mode of operation of the system such that during selected ones of the following iterations adjusted macromoves are computed for the $X$ and $Y$ axes. Toward this end the output of the OR-gate 481 is connected to the Program Gate Array 183, to serve as an input of the Time Base Mode Selector 69 in FIG. 9e. The output from the detector 71 is identified by the symbols SST. ("Same sign twice.") One of the program gates of the array 183 represented by the first condition listed therein (1035·LIN·S1·SST) is connected to produce a signal in response to an SST signal from the overrun detector 71 during program step 1035 if the system is generating a linear path and if the end of block counter 186 is in its first count state as indicated by a logic 1 level on the $S_1$ output of the decoder 187. Therefore, in response to an SST overrun indication, whether it be caused by a small projected overrun or a large one, the PGA 183 allows a PCP pulse to be applied to the End-of-Block Counter

TABLE IV A

| | 1000·LIN | 1500·LIN | 1800·LIN | 1900·LIN |
|---|---|---|---|---|
| 38 | | | | |
| 39 | SX, R/Δ$X$ ? FAX | | | |
| 40 | | | | |
| 41 | R/Δ$Y$ ? $\overline{FAX}$ | | | |
| 42 | | | | |
| 43 | See Note 1 | | Carry out multiplication of JQ. | Carry out multiplication of IQ. |
| 44–64 | | | do | Do. |
| 65 | | | SI 4 | SL4 |
| 66 | | | R/YR | R/XR |
| 67 | | | SR4 | SR4 |
| 68 | | | W/Δ$Y$ | W/Δ$X$ |
| 69 | | | ZR1 | ZR1 |
| 70 | | | SL4 | SL4 |
| 71 | | | W/YR | W/XR |
| 72–87 | | | No computations | |
| 88 | | | | |
| 89 | | Advance E.O.B. 1 count ? S3 | | |
| 90–98 | | | No computations | |
| 99 | | | | |

Note 1.—On step 1043 advance E.O.B. to S3 ? S2
·(ACN·ACNX+$\overline{ACN}$·$\overline{ACNX}$).

186, advancing it at the end of program step 1035 from its first to its second count state, indicated by a signal on the S2 output of the decoder 187.

The operation of advancing the end of block counter 186 to state S2, which can only occur when a projected overrun has been detected, appears in column 1000 of FIGS. 23 and 21.

(c) "Retracting" the Look-Ahead Point by One-half Macromove and Performing the Second Test A second test, directed to determining the magnitude of an overrun, if any, is carried out during steps 1036–1042 of the iteration shown in FIG. 18 and table IV.

First, the projected overrun which is still stored in the Answer Register 53a during program step 1036 is shifted two positions to the left in the register during program steps 1036 and 1037 in response to Shift Left control pulses from the PGA 463 (conditions 2 and 3). The rest of the iteration is shown in table IV A.

During steps 1038–1042 the macromove number stored in the $\Delta X$ register 109 is subtractively read into the computer 53 five times. Due to the shifting of the minuend in the register 53a two positions to the left, each subtractive reading of the $\Delta X$ number in the computer has the effect of reducing the number remaining in the Answer Register by $0.1\Delta X$ so that, after the last of the five program steps 1038–1042, $\frac{1}{2}\Delta X$ will have been subtracted from the projected overrun. The necessary gating and control signals for carrying out the foregoing operations are listed in PGA 409 of the $\Delta X$ register 109 as condition 14. It will be noted that condition 14 depends on the presence of an FAX signal at the output of the FAX flip-flop 455. Had this not been present; that is, had the Y-axis been the fast axis, the number in the $\Delta Y$-register 107 would have been read instead in response to gating signals indicated as condition 13 in its associated PGA 415.

During step 1043 a test is performed on the remainder in the Answer Register 53a to determine whether or not the projected overrun exceeded a one-half macromove. The test is identical to that performed previously during step 1035; that is, the sign of the remainder present in the register 53a during step 1043 is compared with the sign of the look-ahead quantity $11\Delta X$. If they are the same, it is an indication that even with the projected overrun reduced by a one-half macromove an overrun would occur; or, in other words, that the projected overrun is equal to or greater than a one-half macromove.

Referring to FIG. 9e, if movement is in a positive direction, a logic 1 signal will be applied to the OR-gate 481 by the AND-gate 469 on step 1043 during the first iteration in which the sign of the remainder in the register during step 1043 is the same as the stored sign of the look-ahead quantity $11\Delta X$. Similarly, a logic 1 signal is applied by the AND-gate 467 to the OR-gate 481 during the first time period $\Delta T$ during which a similarity of signals occurs if movement is in a negative direction. By means of a program gate represented in the PGA 183 by condition 3, if a projected overrun condition was detected during a given time period $\Delta T$ as a result of the first test, causing the S2 output of the decoder 187 to be energized, then a second SST signal at the output of the detector 71 caused by a positive result from the second test will cause the End-of-Block Counter 186 to be advanced to its third count state and the decoder 187 to produce a signal on its S3 output.

(3) Changing System Operation into Mode 2 in Response to Detection of a Large Projected Overrun Since the projected overrun detected during program step $\Delta T990$ is assumed to be large, a changeover needs to be made from the FIG. 18 iteration to an iteration which includes computational steps for deriving the adjusted macromove numbers which will be required during the following 10 iterations. FIG. 21 illustrates this iteration.

Referring to FIG. 21 it will be observed that the periodic updating of the XSC and the YSC registers 121 and 119 are the only operations performed during the second, third and fourth columns 1100–1400 of the programming chart. Up to this point the only difference between the FIG. 21 type iteration and that shown in FIG. 18 is that, during the first column on the programming chart in FIG. 21 both of the tests performed have resulted in projected overrun indications. For this reason the two blocks in FIG. 21, column 1000, calling for advancement of the EOB Counter to S2 and then to S3 are not crossed out. The changeover to operations characteristic of the iteration shown in FIG. 21 is initiated during program step 1589. During this program step the End-of-Block Counter 186 is advanced to its fourth count state, provided that it is already in its third count state. This further advancement of the binary counter 186 has the effect of producing a signal on the S4 output of the decoder 187, which, in turn, enables the AND-gates 177 of the Time Base Logic 67 thereby placing the system in its mode 2 operation. The significance of this change is that, in its mode 2 operation the system carries out the computations required to produce the adjusted macromoves necessary to hit the end point exactly.

To advance the binary counter 186 from its third to its fourth count state, the Program Gate Array 183 includes a gate, represented as condition 5, which is connected to produce the required stepping signal during program step 1589, provided a signal is present on the S3 output of the decoder 187. This does not occur for the example illustrated in FIG. 19 until time period $\Delta T990$ and then only if the assumed end point is P2'. During that time period, however, with P2' being the assumed end point, in response to the condition created by advancement of the End-of-Block Counter 186 from state S1 to state S4 during the same time period $\Delta T$, after program step 1589, or slightly after the first half of time period $\Delta T990$, the system is switched over into its mode 2 operation as indicated by the headings 2600–2900 on the last four columns of the programming chart of FIG. 21. During each of the previous 989 time periods $\Delta T1-\Delta T989$ the system operates in its mode 1 and the operations which it performs are those shown in FIG. 18.

(4) Data Processing Steps Associated with Calculating Adjusted Macromoves

In addition to the frequently repeated updating operations performed during each column, two series of computations are performed during columns 1800 and 1900 of FIG. 18. The first of these is almost identical to the operations performed in column 4800 of FIG. 17 and, similarly, the second series of operations performed in column 1900 of FIG. 18 is almost exactly the same as those carried out in column 4900 of FIG. 17.

Turning first to the computations performed during column 1800 in FIG. 18 during steps 1817–1864 the product $J \cdot Q$ is derived from the numbers stored in the registers 101 and 103. Thus, during program step 1817 (table IV) the number $Q$ is read from the register 103 in response to a gating signal applied thereto by its PGA 389 (condition 1). During the following program step 1818 the number $J$ is read from the Register 101 by a gating signal from its PGA 391 (condition 6). During the same program step, a multiply command signal is applied to the computer 53 from its PGA 393 (condition 5). In response to the multiply command signal, the operation $J \cdot Q$ is performed by the computer during program steps 1819–1864. This is followed by adding the "remainder" digits which were split off the product formed during the previous iteration. Toward this end, the product $J \cdot Q$ is shifted four positions to the left in the Answer Register 53a during program step 1865 by a Shift Left 4 control signal from the PGA 347 (condition 2). The four remainder digits are then read from the YR register 111 during program step 1866·LIN by a gating signal from its Program Gate Array 399 (condition 1). With the product of $J \cdot Q$ correctly aligned in the Answer Register 53a with the incoming digits from the YR register 111 the latter is directly added to the product and the sum appears in the Answer Register 53a during program step 1867·LIN. It is then shifted to the right four positions by Shift Right 4 control signal from the PGA 487 in FIG. 9c (condition 2). The digits remaining in the Answer Register 53a after the shifting operation represent the macromove number ΔY and are transferred into the ΔY 107 Register by a WRITE signal from its Program Gate Array 395 (condition 1).

During the following three steps the remainder digits of the product J·Q just completed are transferred to the YR register 111. First, during program step 1869 the digits in the Answer Register 53a are zeroed by the ZR1 control signal from the PGA 397 (condition 2). Next, during program step 1870, the four digits stored in the overhanging register 53b are transferred to the left by four positions by a Shift Left 4 control signal from the PGA 347 (condition 5). Finally, during the program step 1871 the four digits now residing in stages 5, 6, 7 and 8 of the Answer Register 53a are transferred to the YR Register 111 by a WRITE signal from its Program Gate Array 399 (condition 2).

During the corresponding steps of column 1900 the same operations are performed as those carried out during 1800, but with the number "I" being used instead of the number "J" and with the ΔX and XR registers being used instead of the ΔY and YR registers to receive the result. These operations will not be described in detail. They are shown in tables IV and IV A, and the appropriate program and control gates required to perform them are identified in FIG. 9.

It should be noted that the multiplication of J·Q and I·Q need not be performed during each FIG. 18 iteration because these products remain the same for those iterations during which one linear path segment is generated. Thus, having computer J·Q and I·Q in the first FIG. 18 iteration during time period ΔT1, these products could have been stored in two large registers added specifically for this purpose. The reason why these quantities have been shown as being newly computed during each iteration is that this is the manner in which a circular path is generated. The system of FIG. 9 is designed to perform both linear and circular path generation. This being the case, it is simpler to have, wherever possible, the same type of computations performed for linear path generation as those which are performed during the corresponding steps for circular path generation.

Returning now to time period ΔT990 and continuing with the assumption that a large overrun has been detected, the first series of operations carried out by the system in Mode 2 during column 2800 of FIG. 21 is directed to generating an adjusted macromove number ΔY'. Generally, this is achieved by subtracting the macroposition YCP from the end point coordinate YCEP, dividing the result by 10 and storing the resulting quotient. Preceding this sequence, however, the last digit of the macroposition number YCP is eliminated. The reason for this is that the YCP macromove number has one more digit than the YCEP end point coordinate from which it is to be subtracted. Were this extra digit not eliminated, it would prevent the subsequent division from producing adjusted macromove numbers that would fit in the ΔY register 107. The Y servo command register YSC also carries a digit corresponding to the extra digit of YCP (see FIG. 15), but this digit is not transmitted to the Y servo 77 over the lines 81. The detailed steps performed by the system in Mode 2 are shown in table V.

To eliminate the last digit of the YCP number, it is read into the computer 53 from the YCP Register 115 during program step 2815 by a gating signal from the PGA 425 (condition 7). Lodged in the Answer Register 53a during the following program step 2816, the YCP number is shifted one position to the right by a shift signal applied to the computer by the PGA 411 (condition 26). The last digit of the YCP number is now in stage 9 of the Overhanging Register 53b and is eliminated by a ZR2 signal applied to the corresponding control input of the computer by the PGA 397 (condition 6). With its lowest order digit eliminated, the YCP number is shifted back toward the left by one digit position during program step 2818 in response to an appropriate control signal from the SAL PGA 463 (condition 6). The YCP number is now in a proper position in the Answer Register 53a to be transmitted over the output trunkline 61 and it is stored during program step 2819 in the YCP register 115 by a WRITE-gating signal from its PGA 427 (condition 2). This completes the elimination of the lowest order digit of the macroposition number YCP.

To subtract the modified YCP number from the YCEP number residing in the YCEP Register 97, the YCEP number is transferred to the computer 53 during program step 2820 by a READ-gating signal applied by its associated PGA 487 (condition 2). During the same program step, just prior to the reading of the YCEP number, the Answer Register 53a is cleared by a CAR signal from PGA 351 (condition 12). Next, the YCEP number, the minuend just stored in the Answer Register, is shifted one position to the left to bring its decimal point into alignment with that of the subtrahend YCP (see FIG. 15). Accordingly, a Shift Left control signal is applied to the computer 53 during program step 2821 from PGA 463 (condition 7).

With the minuend YCEP properly positioned in the register 53, the subtrahend YCP is subtractively read into computer 53 during program step 2822. Toward this end a subtract control signal is applied to computer 53 from the PGA 479 (condition 3) and a READ-gating signal is applied to the YCP register 115 by its PGA 425 (condition 8). The remainder, stored in the Answer Register 53a during program step 2823, is 10 ΔY', representing the sum of 10 adjusted Y-axis macromoves, at the end of which the end point YCEP will be reached exactly.

To derive from the 10 ΔY' number the adjusted Y-axis macromove number ΔY', the 10 ΔY' number in the Answer Register 53a is shifted one position to the right during program step 2823 by means of a control signal applied to the SAR input of the computer 53 from its PGA 411 (condition 27). The result is transmitted from the Answer Register 53a to the Y-axis macromove register 107 during program step 2824 by the application to the register of a WRITE-gating signal from its PGA 395 (condition 3). Thus, during the ninth column of the programming chart of FIG. 21, the adjusted macromove ΔY' has been calculated and stored in the ΔY register 107. A similar series of calculations are performed during the tenth portion of the iteration represented by the column 2900 of the programming chart to derive from the macroposition number XCP and the end point coordinate

TABLE V.—STEPS PERFORMED IN MODES 2+3 LINEAR

| | 2800-LIN | 2900-LIN | 3900-LIN |
|---|---|---|---|
| 1-13 | | See Table III | |
| 14 | | | |
| 15 | R/YCP | R/XCP | |
| 16 | SAR | SAR | |
| 17 | ZR2 | ZR2 | Zero out the .00001 digit of XCP and YCP. |
| 18 | SAL | SAL | |
| 19 | W/YCP | W/XCP | |
| 20 | CAR,R/YCEP | CAR,R/XCEP | |
| 21 | SAL | SAL | Compute YCEP-YCP and XCEP-XCP. |
| 22 | R/YCP, SX | R/XCP, XS | |
| 23 | SAR | SAR | |
| 24 | W/ΔY | W/ΔX | Divide the result by 10 Store ΔX' and ΔY'. |
| 25 | | | |
| 26 | | | |
| 27-28 | | No computations | |
| 99 | | Advance E.O.B. to S5 | Advance E.O.B. by one count. |

XCEP the adjusted macromove number $\Delta X'$. These steps and the necessary gating means are indicated in table V, and in FIG. 9 and will not be described in detail. Suffice it to say that, at the end of the series of operations, during program step 2924·LIN, the adjusted macromove number $\Delta X'$ becomes stored in the $\Delta X$ register 109.

5. Changing System Operation into Mode 3 in Order to Execute Adjusted Macromoves During Subsequent Iterations With the adjusted macromoves $\Delta X'$ and $\Delta Y'$ computed and stored, the only operation remaining during the FIG. 21 iteration is to cause the system to change to its mode 3 operation. In this mode the system executes during each iteration one of the macromoves $\Delta X'$ and $\Delta Y'$ along the X and Y axes, as indicated in FIG. 22. Changeover of the system from its mode 2 operation to its mode 3 operation is initiated during program step 2999 by advancing the End-of-Block Counter 186 to its fifth count state signaled by a logic 1 voltage level on the S5 output of the decoder 187. Since the End-of-Block Counter is already in its count state 4, a single signal is sufficient and this signal is applied to the counter 183 by the PGA 183 during program step 2999 as indicated by condition 17 in the PGA. In response to the signal on the S5 output of the decoder 187, the third group of AND-gates 179 of the MultiMode Time Base Logic is enabled, causing timing signals 3000–3999 to be recurringly generated, as indicated by the heading of the 10 columns in FIG. 22.

6. Operation of the System in Mode 3

The first of the FIG. 22 iterations is performed during time period $\Delta T991$ and is repeated eight more times, once during each of the following time periods $\Delta T992$–$\Delta T999$. Each of these iterations comprises principally only two types of operations. First, the XSC and YSC registers are updated during each of the ten time periods $\Delta T/10$ represented by the 10 columns 3000–3900 of the FIG. 22 iteration. Second, the XCP and YCP registers 117 and 115 are upgraded during the 3000 column of the iteration. A comparison of the Programming Chart of FIG. 22 with the basic Programming Chart shown in FIG. 18 will reveal that the updating and upgrading operations are performed during the same time periods. The only difference between the operations is that different numerical values are used. Consequently, table III and the description given in reference to it in Section G.2.b. is equally applicable to the steps performed during the FIG. 22 iterations carried out during the time periods $\Delta T991$–$\Delta T999$.

7. Changing the System to Mode 4 Operation Following Execution of the Ninth Pair of Adjusted Macromoves An additional step performed once during each of the FIG. 22 iterations, but not during the FIG. 18 iteration, is directed to registering the number of times that the FIG. 22 iterations have been performed. Toward this end, means are provided for advancing the End-of-block Counter 186 one count state for each FIG. 22 iteration. This is achieved by applying a stepping pulse to the End-of-Block Counter 186 during program step 3999 of each FIG. 22 iteration. The stepping pulses originate from the PGA 183 and the particular Program Gate for generating them is indicated as condition 18. The FIG. 22 iteration is permitted to repeat nine times. After the last such iteration, the system is directed to leave its mode 3 operation and to enter its fourth mode. In this mode, previously discussed with reference to FIG. 17, computations are performed to derive a macromove for the next path segment after the end point of the current path segment has been reached. To bring about the desired changeover from mode 3 to mode 4 operation, the S14 output of the decoder is connected through the OR-gate 191 to the fourth set of AND-gates 181 in the Time Base Logic 67. These AND-gates, as explained previously, cause the system to operate in its fourth mode when they are enabled. The S14 output of the decoder 187 becomes enabled at the end of the ninth FIG. 22 iteration, shown in FIG. 20 as appearing at the end of time period $\Delta T999$. By the end of this time period, nine iterations have been performed with the adjusted macromoves, leaving only one iteration to be performed with those adjusted macromoves in order to reach the programmed end point P2 exactly. This is the iteration shown in FIG. 17. Thus, during time period $\Delta T1000$ the updating and upgrading operations associated therewith are carried out with the adjusted macromove quantities $\Delta X'$ and $\Delta Y'$.

The FIG. 17 iteration also includes computational steps associated with producing another linear path segment. A slightly different type of iteration is also available for commencing a circular path segment, and this will be disclosed in a subsequent portion of this specification. The computational steps performed during the columns 4600–4900 of FIG. 17 have been discussed previously, in section G.2.a, in connection with initiating the generation of the path segment 27b. Thus, the completion of the updating and upgrading steps of the FIG. 17 iteration during time period $\Delta T1000$ completes the operations associated with generating the linear path segment 27b.

8. Changing System Operation from Mode 1 to Mode 2 in Response to the Detection of a Small Projected Overrun The foregoing detailed description with reference to FIG. 20 of the iterations shown in FIGS. 18, 21, 22 and 17 was based on the assumption that a large overrun was detected during time period $\Delta T990$. It was seen that, in keeping with the analysis offered with reference to FIG. 19, it was necessary for the system to switch over to its next mode of operation during the same time period in which a projected large overrun was detected—this, in order to calculate the adjusted macromove before the following time period $\Delta T$ begins. The iteration during which such a prompt switchover occurs is that shown in FIG. 21.

Let it be assumed, however, that instead of a large overrun, a small overrun was detected during time period $\Delta T990$. In this event it is desirable to defer the switchover of the system for one time period so that it occurs during the time period $\Delta T991$ following the time period $\Delta T990$ (during which the small projected overrun was detected). In this way, the first FIG. 22 iteration during which adjusted macromoves are executed is also deferred, and does not occur until time period $\Delta T992$ (see FIG. 20).

It is in order to prevent a switchover from mode 1 to mode 2 in the time period $\Delta T$ during which a small overrun is detected that advancement of the End-of-Block Counter 186 through its second and third count states is made necessary before the further change of the counter to its fourth count state, and with it, switchover of the system to mode 2 can occur. This series of events cannot occur, however, if the detected overrun is a small one because advancement of the End-of-Block Counter 186 into its third count state will not occur during the same time period $\Delta T$ in which such an overrun was detected. It will, however, occur during the following time period $\Delta T$.

Specifically, means are provided, in the form of a Program Gate represented by condition 4 of the PGA 183, for advancing the End-of-Block Counter 186 from its second to its third count state during a given time period $\Delta T$ if during the previous time period $\Delta T$ the counter was advanced only to its second count state.

The steps carried out during the time period in which a small overrun is detected and during the following time period are shown as the iterations appearing in FIGS. 23 and 24. A comparison of the FIG. 23 iteration with the FIG. 21 iteration shows that the principal difference between the two is that the event represented in FIG. 21 by the last block in its 1000 column is crossed out in the corresponding block in FIG. 23. The legend in the block in question states that the End-of-Block Counter 186 shall be advanced from its second to its third count state if the second test associated with overrun indicates that the overrun was greater than one-half macromove. If, as assumed, the overrun is small and this test yields a negative result, the counter 186 is not advanced to its third count state, but instead, the iteration is completed with the counter still in its second count state as shown by the last block in column 1900 of FIG. 23.

As a result of the failure of the End-of-Block Counter 186 to advance from its second to its third state during the column 1000 of the FIG. 23 iteration, the further advancement of the counter into its fourth count state, shown to occur during the FIG. 21 iteration toward the end of its fifth column 1500, also fails to occur so that the iteration is completed with the system in its mode 1.

As a second result of the End-of-Block Counter 186 not advancing to its third state S3 during program step 1043 of time period ΔT990, the following iteration, shown in FIG. 24 begins with the system still in mode 1. However, during the FIG. 24 iteration, that is, during time period ΔT991, the End-of-Block Counter 186 is advanced to S3 and finally about halfway thru ΔT991, the operation of the system is changed from mode 1 to mode 2 in the same manner as was previously seen to occur during the FIG. 21 iteration performed during time period ΔT990. Thus, the End-of-Block Counter 186, having been previously advanced to its third count state S3 on step 1014 of the FIG. 24 iteration, is advanced to its fourth count state S4 during program step 1589 of the FIG. 24 iteration. With the counter 186 thus advanced, all events thereafter are the same as if a large overrun had been detected during the time period ΔT991 during which the iteration of FIG. 24 is performed. Consequently, during the next nine time periods ΔT992–ΔT1000, the iterations of FIG. 22 are carried out, following which, provided the next path segment is to be linear, the system is caused to switch during time period ΔT1001 into operating mode 4 and the iteration shown in FIG. 17. The End Point is reached at the end of time period ΔT1001.

G. DETAILED DESCRIPTION OF STAGGERED CIRCULAR PATH GENERATION

1. The Concept a. Assuming Components of Two Radius Vectors are Given

Circular path generation as performed by the exemplary system disclosed herein was explained in a previous section with reference to FIGS. 6a–6d and will be explained in greater detail presently with reference to FIGS. 25a–25f. The latter figures show successive steps in generating a circular path progressing counterclockwise. Referring in particular to FIG. 25a, it is assumed that movement is to be accomplished along a circular arc generated by a radius vector of length R which passes from an initial point $P_0$ on the arc through a series of points P1, P2, P3, P4, P5 on the arc at the end of respective ones of a consecutive series of equal time periods T1, T2, T3, T4 and T5. It is also assumed that the data initially furnished includes the $X$ component $I_0$ of the inverse of the radius vector $R_0$ which extends from the center C of the circle to the initial point $P_0$ on the arc, and that the information also includes the $Y$ component $J_1$ of the inverse of the radius vector $R_1$ extending from the center C of the circle to the point $P_1$. The inverse of the radius vector $R_0$ is simply that radius vector turned head for tail, as a straight line extending from the point $P_0$ to the circle center C. The reason why the $X$ and $Y$ components of the inverse of the radius vectors are given is that this convention has been adopted by the numerical control industry to define circular paths. Had the radius vector and its $X$ and $Y$ components been so adopted, the following description would be little changed. The same fundamental principles would still apply. In conformance with the present convention, in the following paragraphs the quantities $I$ and $J$ will be referred to by the short names "inverse $X$ component" and "inverse $Y$ component" of a radius vector.

In generating the circular path, prior to the respective time periods $T_1$, $T_3$ and $T_5$, signals are produced respectively representing numerically the $X$ coordinate distances $\Delta X_{02}$ and $\Delta X_{24}$ between the points $P_0$, $P_2$ and $P_4$. These quantities are shown vectorially in FIGS. 25b and 25f. In a similar manner, prior to the respective time periods $T_2$ and $T_4$, signals are also produced respectively representing numerically the $Y$ coordinate distances $Y_{13}$ and $Y_{35}$ between the points $P_1$, $P_3$ and $P_5$. The first of these quantities is shown vectorially in FIG. 25d.

The $\Delta X$ signals are utilized during respective pairs of the time periods such as $T_1$–$T_2$ and $T_3$–$T_4$, during which a controlled member is driven under the control of the $\Delta X$ signals through the distances $\Delta X_{02}$ and $\Delta X_{24}$ along the axis. Correspondingly, the $\Delta Y$ signals are utilized during respective pairs of time periods $T_2$–$T_3$ and $T_4$–$T_5$ by driving the controlled member along the Y-axis through the distances $\Delta Y_{13}$ and $\Delta Y_{35}$. In accordance with a more detailed aspect of the invention, motion along both axes is kept substantially uniform during each of the pairs of time periods.

The manner in which the $\Delta X$ and $\Delta Y$ quantities are developed will be explained next. The $\Delta X_{02}$ number, representing motion to be executed along the $X$ axis during time periods $T_1$ and $T_2$ is derived from the inverse $Y$ axis component $J_1$ of the radius vector $R_1$ in accordance with equation (22) in FIG. 25b. The derivation of the equation was given previously with reference to equation (15) in FIG. 6. The differences between equation (15) and (22) are due to the fact that the direction of motion shown in FIG. 25b is counterclockwise, whereas FIG. 6c, to which equation (15) applies, shows motion in a clockwise direction. Secondly, the term $V \cdot \Delta T$ in equation (15) is replaced in equation (22) by $\Delta D$, representing the chord which extends from point $P_0$ to point $P_2$. Finally, the term $\sqrt{I_1^2 + J_1^2}$ in equation (15) is replaced by (R), the radius vector.

Having produced the macromove number $\Delta X_{02}$ prior to the time period $T_1$, the macromove is executed by moving the controlled element along the X-axis by a distance $\Delta X_{02}$ during the time periods $T_1$ and $T_2$ at substantially uniform speed. The next quantity to be derived is the Y-axis macromove number $\Delta Y_{13}$. As shown in FIG. 25d, in order to calculate $\Delta Y_{13}$, the $X$ coordinate distance from the point $P_2$ to the center C of the circle, that is, the inverse X-component $I_2$ of the radius vector $R_2$, must be known. $I_2$ is determined by advancing the inverse X-component of $R_0$ by means of the X-component $\Delta X_{02}$ of the chord $CH_{02}$ which was derived in the previous step. This is achieved during time period $T_1$ by processing the previously stored signals representing $I_0$ and $\Delta X_{02}$ so as to derive therefrom further signals numerically representing the quantity $I_0 - \Delta X_{02}$ in accordance with equation (23) in FIG. 25c. Having thus derived signals representing the inverse X-component, $I_2$ of the radius vector $R_2$, the Y-component $\Delta Y_{13}$ of the next chord $CH_{13}$, extending from $P_1$ to $P_3$ in FIG. 25d, is produced by processing the signals representing $I_2$ in accordance with equation (24) in FIG. 25d to derive therefrom signals numerically representing the quantity $(-I_2 \cdot \Delta D/R$ and storing the resulting signals. With the $\Delta Y_{13}$ signals stored, the macromove $\Delta Y_{13}$ along the Y-axis is executed at substantially uniform speed during time periods $T_2$ and $T_3$, as indicated in FIG. 25d.

The stored $\Delta Y_{13}$ macromove number is also used to produce the Y-axis inverse component $J_3$ of the radius vector $R_3$ required to derive the next X-axis macromove number $\Delta X_{24}$. As shown in FIG. 25e, the component $J_3$ is derived by advancing the inverse Y-component $J_1$ of the radius vector $R_1$ by means of the Y-component $\Delta Y_{13}$ of the chord $CH_{13}$. In data processing terms, during time period $T_2$ the stored signals representing $J_1$ and $\Delta Y_{13}$ are processed to derive from them signals which numerically represent the quantity $J_3 = J_1 - \Delta Y_{13}$ (equation 25). Shortly thereafter and still during the time period $T_2$, the derived signals are further processed in accordance with equation (26) in FIG. 25f to derive therefrom signals numerically representing the quantity $(J_3 \cdot \Delta D)/R$. This quantity is the X-component of chord $CH_{24}$ extending from point $P_2$ to point $P_4$ in FIG. 25f. The signals representing the macromove number $\Delta X_{24}$ are stored and are used to control movement along the X-axis during time periods $T_3$ and $T_4$ by an amount corresponding to the number $\Delta X_{24}$.

In equations (22) and (26) of FIGS. 25b and 25f, the right-hand side of the equation is positive, whereas in FIG. 25d a negative sign appears. It will be understood that the particular signs shown in FIGS. 25b, 25d, 25f are characteristic of a circular path which is progressing counterclockwise. As will be explained subsequently with reference to FIG. 29a, the signs of equations 22, 24, 26 will be different when the movement is clockwise.

Recapitulating the foregoing analysis of staggered circular interpolation given with reference to FIG. 25, movement is along two series of staggered chords. The first series of chords is represented by $CH_{02}$ and $CH_{24}$ in FIGS. 25b and 25f. The second series of chords is represented by $CH_{13}$ in FIG. 25d. It is not exactly accurate to say that movement is along either one of the two series of chords. Rather, movement along the X-axis is represented by the X-coordinate of the first series of chords $CH_{02}$ and $CH_{24}$ and movement along the Y-axis is represented by the Y-components of the second series of chords. Furthermore, movements along the two series of chords are time-staggered relative to one another so that it is rather difficult to visualize the actual path covered by a controlled member whose movements along the X- and Y-axes are represented by the X- and Y-components of the first and second series of chords referred to.

To clarify the actual path in space defined by the X- and Y-components of the two series of chords, FIG. 26a shows a first series of macromove chords extending from point $P_0$ to $P_7$ whose X-components $\Delta X_{02}$, $\Delta X_{24}$, $\Delta X_{46}$ and $\Delta X_{68}$ are the macromoves executed along the X-axis during time periods $T_1-T_2$, $T_3-T_4$, $T_5-T_6$ and $T_7-T_8$, respectively. FIG. 26b, on the other hand, shows a second series of macromove chords, including a half-chord extending from point $P_0$ to $P_1$ and three full chords extending from $P_1$ to $P_3$, $P_3$ to $P_5$ and $P_5$ to $P_7$. The Y-components $\Delta Y_{01}$, $\Delta Y_{13}$, $\Delta Y_{35}$ and $\Delta Y_{57}$ of the respective macromove chords in the second series are executed during time periods $T_1$, $T_2-T_3$, $T_4-T_5$ and $T_6-T_7$, respectively.

The composite of the motions represented by FIGS. 26a and 26b is shown in FIG. 26c which is a plot of the points $P_0$ through $P_7$ having the X- and Y-coordinates shown in FIGS. 26a and 26b. Because of the greatly exaggerated scale, the plotted points $P_0$ through $P_7$ in FIG. 26c visibly deviate from a true circle. Thus, the chords drawn in FIGS. 26a and 26b appear significantly spaced from the arcs upon which they lie. Under normal cutting conditions, however, adjacent ones of the points $P_0$ through $P_7$ would be on the order of less than 0.01 inches apart and the points $P_0$ through $P_7$ in FIG. 26c would be extremely close to a true circle.

b. Assuming that Components of Only a Single Radius Vector are Given

The foregoing explanation of staggered circular interpolation given with reference to FIG. 25 was based on the assumption that the initially available data would include the inverse X-component $I_0$ of the radius $R_0$ and the inverse Y-component $J_1$ of the radius vector $R_1$. This assumption was made in order to simplify the initial detailed explanation of staggered circular interpolation. Normally, however, the components $I_0$ and $J_1$ would not be available. Instead, it may be expected that the starting data will comprise both inverse components $I_0$ and $J_0$ of a single radius vector $R_0$. In accordance with yet another specific aspect of the present invention, a process is provided for deriving from the inverse X- and Y-components $I_0$ and $J_0$ the inverse Y-component $J_1$, thus yielding the quantities which were assumed to have been given in the previous analysis.

Referring to FIG. 27, prior to time period $T_1$ first and second sets of signals respectively representing the inverse X- and Y-components $I_0$ and $J_0$ of the starting radius vector $R_0$ are produced. The signals representing $I_0$ are processed to derive therefrom signals numerically representing the quantity $(I_0 \cdot \Delta D)/R$. From FIG. 27 it may be seen that $(I_0 \cdot \Delta D)/R$ represents twice the Y-component $\Delta H_{01}$ of the chord shown in FIG. 27 to extend over a distance $\Delta D$, from the point $P_{-1}$ to the point $P_1$ on the circle.

As the next step in deriving $J_1$, the signals representing $2\Delta Y_{01}$ and $J_0$ are processed so as to derive from them signals numerically representing the Quantity $J_0 - \Delta Y_{01}$. The resulting signals represent to a very close approximation the desired Y-component $J_1$. A slight error is involved in this process due to the fact that $\Delta Y_{01}$ would have to be subtracted from $j_0$, which is the Y-coordinate distance from the center of the chord in FIG. 27 to the center C of the circle, in order that the result be exactly $J_1$. By subtracting $\Delta Y_{01}$ from $J_0$ instead, an error which is equal to $J_0 - j_0$ is introduced. This error, however, is negligible and is visible in FIG. 27 only because of its greatly exaggerated scale.

2. Staggered Circular Interpolation as Carried Out by the System of FIG. 9 a. In General

The numerical control system of FIG. 9 is operative in the mode to be described hereinafter to cause relative motion between two machine members along a circular path. The elements of the system which are of particular significance in carrying out this function include first and second storage means, shown as the $\Delta X$ register 109 and the $\Delta Y$ register 107. By means which include the digital computer 53, a first series of numbers are stored in the first storage means at regularly spaced intervals $\Delta T$. Respective ones of these numbers represent the X-coordinate distances between a first series of equidistant points $P_0$, $P_2$ and $P_4$ on a circle as shown in FIGS. 25a–f. Additional means also including the computer 53, are provided for storing in the $\Delta Y$ register 107 a second series of numbers at regularly spaced intervals $\Delta T'$ which are staggered symmetrically with, but are of the same duration as the time intervals $\Delta T$. Respective ones of the latter numbers represent the Y coordinate distances between a second series of equidistant points $P_1$, $P_3$ and $P_5$ on the circle. As seen in FIGS. 25a–f, the points $P_1$ $P_3$ and $P_5$ are staggered symmetrically with, but spaced the same distance apart as the points $P$, $P_2$ and $P_4$.

The object of generating the two series of numbers is, of course, to provide successive macropositions which are to be reached along the X- and Y-axes during the respective time intervals $\Delta T$ and $\Delta T'$. Toward this end, means are provided which are responsive to the numbers stored in the $\Delta X$ register 109 for causing relative motion between the machine members during successive ones of the time intervals $\Delta T$ corresponding to respective ones of the X-coordinate distances represented by the successive numbers stored in the $\Delta X$ register. Correspondingly, means are also provided which, in response to the numbers stored in the $\Delta Y$ register 107, causes relative motion between the machine members during successive ones of the time intervals $\Delta T'$ corresponding to respective ones of the Y-coordinate distances represented by the successive numbers stored in the $\Delta Y$ register.

b. The Form of Starting Data for a Circular Path Segment

Before going into further detail as to the system, consideration will be given first to the form of the data which will be assumed to have been provided by means of the punched holes on the tape 37. Referring to FIG. 3, the tape will include in the form of punched holes a pair of numbers representing the X- and Y-coordinates of the desired end point of the circular arc that is to be executed by the system. These coordinates are referred to as XEP and YEP when they are initially stored in the buffer registers 47X and 47Y and are referred to as XCEP and YCEP when subsequently stored in the active registers 95 and 97. Thus, the first two numbers in a data block given for a circular path segment have the same significance and are identified by the same symbols as the corresponding numbers in a data block for a linear path segment.

The next two numbers in a data block for a circular path segment are the $I$ and $J$ numbers. Although they are analogous to the corresponding numbers for a linear block in that they represent X- and Y-coordinate distances, the $I$ and $J$ numbers for a circular block are different in an important respect. Thus, the $I$ and $J$ numbers in a circular data block represent the X- and Y-coordinate distances from a given point on the circle to which they relate to the center of that circle. In actual practice successive path segments follow one another as shown in FIG. 2. Consequently, the starting point of a given segment will be the same as the end point of the previous segment. From this it follows that the $I$ and $J$ values of the starting radius vector of a circular path segment, that is, the X- and Y-coordinate distances from the initial point on the path segment to the center of the circle may be given in the form of the X- and Y-coordinates of the center of the circle. In this event, the system would be required to perform the additional step of deriving from the end point coordinate of the previous path segment and from the coordinates of the center of the circular path segment, the $I$ and $J$ values of the starting radius vector for that path segment. However, in order to simplify this description, it will be assumed, as in the case of a linear block, that the $I$ and $J$ values of the starting radius vector are given.

Concluding the data block for a circular path segment, the fifth and sixth numbers are the path designation "G" and the macromove quotient "Q" as in the case of a linear data block. As explained in a previous section, the G number will be 02 for a clockwise circular path, 03 for a counterclockwise circular path.

The significance of the macromove quotient $Q$ was explained in detail with reference to FIG. 6 and is expressed by the equation 8a there shown. In physical terms, the macromove quotient $Q$ is equal to the ratio of a macromove chord $\Delta D$ of a circular arc (see FIGS. 6a–6d) to the length of its radius vector. Stated as a very simple equation, $$Q=(\Delta D)/R \qquad (27)$$

c. Generating Successive $I, J, \Delta X$ and $\Delta Y$ Numbers

Assuming that a circular path segment is to be executed next by the system, the numbers included in the data block representing that segment will have been transferred from the tape 37 to the buffer registers 47 well before the need for that data arose. Toward the end of the execution of the path segment immediately preceding the circular path segment, the data related to the circular path segment is transferred from the buffer registers 47 to the active registers 57. In the exemplary system shown in FIG. 9, the I register 99 serves as a means for initially storing the number $I_0$ representing the X-coordinate distance from the starting point $P_0$ on the circle to the center of the circle. Similarly, the J register 101 serves as the means for storing the corresponding $J_0$ number.

As stated previously, the $\Delta X$ and $\Delta Y$ registers 109 and 107 serve to receive and store the $\Delta X$ and $\Delta Y$ numbers representing desired excursions along the X- and Y-axes. To derive the $J_1$ component in the manner explained with reference to FIG. 27, first control means are provided for causing the computer 53 to multiply the initially stored number $I_0$ by $\pm Q(+IF\ G02, -IF\ G03)$. The resulting product represents twice the desired initial extention of the circle along the Y-axis and is stored in the $\Delta$ register 107 as the first $\Delta Y$ number.

Second control means are provided for causing the computer 53 to replace the initially stored $J_0$ number with a new number $J_1$ which is equal to the remainder of $J_0$ less one-half of the stored $2\Delta Y_{01}$ number. The second control means also serves to cause the computer to multiply the resulting sum by $$\pm Q\left(\frac{-IF\ G02}{+IF\ G03}\right),$$

and to store the product, representing $\Delta X_{02}$, the first desired extension of the circle along the X-axis, in the $\Delta X$ register 109.

With the numbers $I_0$ and $J_1$ in the I and J registers 99 and 101, the starting conditions assumed in FIG. 25a have been attained. Ignoring initially the execution of the distances represented by the numbers $2\Delta Y_{01}$ and $\Delta X_{02}$, third control means are additionally provided for causing the computer 53 to replace the initially stored number $I_0$ with a new number $I_2$, which is equal to the remainder of $I_0$ less the stored first number $\Delta X$. This third control means is also operative to cause the computer to multiply the resulting sum by $\pm Q$ (+IF CW, −IF CCW) and to store newly (that is, as the new $\Delta Y$ number) the resulting product (after having picked up the previous remainder YR), representing the next desired extension of the circle along the Y-axis, in place of the stored first number $\Delta Y$. The operations initiated by the third control means are represented by the vector diagrams and equations appearing in FIGS. 25c and 25d.

To replace the stored number $J_1$ in the J register 101 with the remainder of that number less the newly stored number $\Delta Y$, to multiply this remainder by $Q$, and to store newly the resulting product (allowing for remainders), representing the next desired extension of the circle along the X-axis, in place of the stored first number $\Delta X$ in the $\Delta X$ register 109, fourth control means are provided, which are effective to cause the computer 53 to carry out each of the necessary operations. Furthermore, each of the third and fourth control means is operative to repeat its assigned series of functions a predetermined time after the other has carried out its assigned series of functions, so that $\Delta X$ and $\Delta Y$ numbers are newly stored alternatively and repeatedly.

The succession of $\Delta X$ and $\Delta Y$ numbers are utilized in the generation of the circle by means operative to extend the circle along the Y-axis by amounts corresponding to one-half the first $\Delta Y$ number and successive ones of the newly stored $\Delta Y$ numbers and along the X-axis by amounts corresponding to the first $\Delta X$ number and successive ones of the newly stored $\Delta X$ numbers. The extension of the circle is physical but may be either in the form of electrical position command signals or in the form of mechanical movement either of a single machine component along two axes relative to a stationary machine component or in the form of relative movement between two components moved at right angles to one another. In the exemplary system, extension of the circle is executed both electrically, in the form of macroposition signals developed by the computer 53 and stored in the XCP register 117 and YCP register 115 and mechanically, by movement of the machine element 14 by means of the servo drives 75 and 77.

The foregoing description of some of the concepts underlying staggered circular interpolation and of the manner in which these concepts are carried out by the system of FIG. 9 was based on the diagrams of FIGS. 25a–f which show a circular path which is generated in a counterclockwise direction. The following detailed description will be patterned on the assumption that it is the path segment 27c shown in FIG. 2 which is being generated. In effect, the ensuing description will be a continuation of the previous detailed description relating to the generation and execution of the linear path segment 27b. That description had progressed, in section F.2.d.(8), to the end of the linear block which was reached either at the end of time period $\Delta T1000$ or $\Delta T1001$. Let it be assumed that the end point was reached at the end of time period $\Delta T1000$. It it were also assumed that the path segment following path segment 27b is also to be linear, then the iteration shown in FIG.

17 would be performed during ΔT1000. That is, during the time period ΔT1000 the system would operate in mode 4 and would execute, in 10 substantially equal micromoves, the last of the 10 adjusted macromoves which were computed during time period ΔT990. In the present case, however, where the path segment 27c is to be circular, the iteration carried out after the last of the FIG. 22 type of iterations is different from that shown in FIG. 17 and appears in FIG. 28.

The iterations carried out in accordance with FIGS. 17 and 28 are very similar. Both of them are directed to executing the last adjusted macromoves along the X- and Y-axes for the preceding linear path segment. They also resemble one another in that during both iterations data is transferred from buffer registers 47 to the active registers 57 in order to permit their use in computing the macromoves ΔX and ΔY for the following path segment; linear in the case of FIG. 17, and circular in the case of FIG. 28.

The FIG. 28 type iteration differs from the FIG. 17 type iteration in that, the computations shown in the last two columns of FIG. 28 are directed to deriving the initial macromoves for a circular path in contrast to the corresponding operations shown in the last two columns of FIG. 17, which represent operations for deriving the initial macromoves for a linear path.

As shown in FIG. 20, a FIG. 28 type of iteration may follow either a series of upwardly adjusted macromoves, which has been assumed to be the case, or a series of downwardly adjusted macromoves which are represented by the lower series of FIG. 22 iterations, the last of which occurs during time period ΔT1000.

The steps involving transfer of data from buffer to active, shown to occur during column 4600 of FIG. 28, is the same as explained previously with reference to table I and need not be repeated here. The first series of operations which are characteristic of FIG. 28 are those which occur during column 4800. These are shown in detail in table II of section F.2.a.(2)(a) to which reference shall again be made.

d. Data Processing Steps Performed Prior to the Generation of Signals Representing a Circular Path The first series of steps 4817 ($G_{02}+G_{03}$) through 4864 ($G_{02}+G$) is directed to deriving the number 2 $\Delta Y_{01}$ (see FIG. 27). This is obtained by multiplying $I$ by $\pm Q$ (where $Q\Delta\Delta D/R$) and storing the product in the $\Delta Y$ register 107 and in the $Y$ remainder register 111. Ignoring the sign of the product $I \cdot Q$ initially, it may be confirmed by comparison of the first and third columns of table II that the steps performed during steps 17 through 64 of column 4800 ($G_{02}+G_{03}$) are essentially the same as the corresponding steps performed during column 4800·$G_{01}$ The steps 4817–4864 ($G_{02}+G_{03}$) associated with circular interpolation differ from the steps 4817·LIN–4864·LIN principally in that the multiplicand is read from the I register 99 rather than from the J register 101. This difference is reflected by condition 9 in the PGA 400 associated with the I register 99, showing that a READ-gating signal will be applied to that register during step 4818, provided that either a $G_{02}$ or a $G_{03}$ signal appears at the outputs of the G buffer decoder 221 in FIG. 9k. The corresponding condition 9 for PGA 391 of the J register 101 is not realized because it requires the presence of a $G_{01}$ signal at the output of the decoder 221, which occurs only when the following path segment is to be linear.

The product of the multiplication performed during steps 17 through 64 in column 4800 ($G_{02}+G_{03}$) is written into the $\Delta Y$ register 107 and the YR register 111 during steps 68 through 71 in exactly the same manner as described previously with reference to column 4800·$G_{01}$. Briefly, the product of $I \cdot Q$ is split into two parts, with the four lowest order digits being stored in the YR register 111 and the other four digits being stored in the $\Delta Y$ register 107. Again, the same gating and control signals are utilized to carry out these steps as were used for performing the corresponding steps for a linear path segment and need not be referred to again. The following operation, however, does not find its counterpart in the computations performed for a linear path. It relates to computing $-0.5\Delta Y$ in order to derive the required starting component $J_1$ in the manner explained previously with reference to FIG. 27. From FIG. 27 it will be recalled that the initially computed $\Delta Y$ macromove number is referred to as $2\Delta Y_{01}$, so that, in effect, the operation amounts to advancing the initially provided $J_0$ component by $0.5(2\Delta Y_{01})$.

The first step in the process is to clear the Answer Register 53a during step 4873 ($G_{02}+G_{03}$) and this is in response to an appropriate control signal from the PGA 351 (condition 19). During the same program step and during the following four program steps 4874–4877 ($G_{02}+G_{03}$) the $2\Delta Y_{01}$ number stored in the $\Delta Y$ register 107 is subtractively read into the computer 53 five times by means of five READ-gating signals applied to the register by its associated PGA 415 (condition 16) and by means of five subtract control signals applied to the computer 53 by the SX PGA 479 (condition 10).

During the following step 4878 ($G_{02}+G_{03}$) the contents of the Answer Register 53a, representing $-5(2\Delta Y_{01})$ are shifted one position to the right in response to a control signal from the PGA 411 (condition 30). This effectively causes the number in the Answer Register to appear as $-0.5(2\Delta Y_{01})$. The $J_0$ number stored in the J register 101 is read into the computer 53 during the next time period 4879 ($G_{02}+G_{03}$) in response to a READ-gating signal from PGA 391 (condition 3) and is automatically added by the computer to the $-0.5(2\Delta Y_{01})$ stored therein. The result, $J_0-0.5(2\Delta Y_{01})=J_0-\Delta Y_{01}$, appears in the register 53a during program step 4880($G_{02}+G_{03}$) and is written into the J register as the number $J_1$ by a WRITE-gating signal from its PGA 357 (condition 3).

Summarizing the operations performed thus far, following the entering of a circular block into the active registers 57, the first $\Delta Y$ number, representing twice the desired initial extension along the Y axis, was derived from $I_0$ and $Q$ and using the $\Delta Y$ number and the initially provided number $J_0$, the number $J_1$ was calculated and stored in the J register 101. As explained previously with reference to FIG. 25b, the number $J_1$ is required to derive the first X-axis macromove number $\Delta X_{02}$ nd the steps for achieving this are shown in column 4900 ($G_{02}+G$) of table II.

The initial step, carried out during steps 4918–4971 ($G_{02}+G_{03}$) correspond almost exactly to the steps performed during the corresponding steps 4918–4971·$G_{01}$ in preparation for computing the $\Delta X$ macromove number for the linear path segment 27b. The principal difference is that, instead of $I$ the multiplicand is $J$ so that, to transfer the multiplicand to the computer 53 a gating signal is applied to the J register 101 during step 4918 ($G_{02}zG_{03}$) from the PGA 391 (condition 10). The number thus transferred is $J_1$ and is multiplied by $Q$, with the product appearing in the Answer Register 53a after the program step 4964 ($G_{02}+G_{03}$). The product is then split into two parts and stored in the $\Delta X$ register 109 and the XR register 113. There are now stored in the $\Delta X$ register 109 and the $\Delta Y$ register 107, appropriate macromove numbers for initiating generation of the first pair of macroposition numbers corresponding to the X- and Y-coordinates of the point $P_2$.

Reference will now be made to one further provision which differentiates the steps connected with circular interpolation from those related to linear path generation. This feature is directed to selecting the proper sign for the multiplicand $I$ or $J$ depending upon whether the desired path is to progress clockwise or counterclockwise. The rule governing the selection of sign may be easily derived by referring to FIGS. 29a and 29b. They are vector diagrams showing the signs of $I$, $J$, $\Delta X$ and $\Delta Y$ in all four quadrants during the generation of a circle either clockwise (FIG. 29a) or counterclockwise (FIG. 29b).

As shown in FIG. 29a, when the circular path is generated in a clockwise direction the sign of $J$ is always opposite the sign of $\Delta X$. On the other hand, the sign of $I$ is seen to be always the same as the sign of $\Delta Y$. Consequently, in view of equations (18) and (19), whenever the circular path which is to be generated is to progress clockwise $-J$ and $+I$ should be used in order that $\Delta X$ and $\Delta Y$ have the proper sign.

The relative signs of $I$ and $\Delta Y$ are the exact opposite, and the relative signs of $J$ and $\Delta X$ are the same, when the circular path to be generated is to progress counterclockwise, and this is shown in FIG. 29b. Thus, during all four quadrants, $I$ and $\Delta Y$ are of opposite sign while $J$ and $\Delta X$ are of the same sign. Therefore, when performing equations (18) and (19), the number $J$ is used without a modification, but the number $I$ is provided with a minus (−) sign. However, the $I$ and $J$ numbers still carry their own signs as part of the numbers.

In other portions of this specification and in certain of the claims the process of giving the $I$ or $J$ number a negative significance before multiplying it by $Q$ is expressed in terms of multiplying the $I$ or $J$ number by $-Q$ for the sake of brevity. These of course are fully equivalent expressions, since giving a number a negative significance is equivalent to multiplying it by $-1$.

The foregoing rules for selecting the sign of the multiplicand $I$ or $J$ are also indicated in FIG. 28 and require no further comment. The appropriate control signals for implementing these rules are indicated by conditions 13 and 14 in the Program Gate Array 479 as shown in FIG. 9c. Thus, when the $I$ multiplicand number is read into the computer during step 4818, a control signal directing the computer 53 to attach a negative significance to that number will be applied to the computer if a $G_{03}$ signal is produced by the GBUF decoder 221 in FIG. 9k; in other words, if the path to be interpolated is counterclockwise. Similarly, when the $J$ multiplicand is read into the computer 53 during step 4918, a control signal is applied to the computer 53 directing it to attach a negative significance to that number if a $G_{02}$ signal is produced by the decoder 221; that is, if the path to be interpolated is clockwise.

With the numbers $\Delta X_{02}$, $2\Delta Y_{01}$, $I_0$ and $J_1$ stored in the registers 109, 107, 99 and 101 and with the G number transferred to the G active register 105 during steps 4973–4974 the tape reader may be started during program step 4995 in order to transfer to the buffer registers 47 the data relating to the next path segment 27d in FIG. 2. Following this, the End-of-Block Counter 186 is advanced from its count state S14 which it had reached during the last of the FIG. 22 iterations through count states S15, S16 into count state S1 in the manner explained previously with reference to the corresponding program steps 4997–4999 in table II. The last change in the count state of the End-of-Block Counter 186 causes the system to switch over from its mode 4 operation into mode 1 in which the AND-gates 175 of the MultiMode Time Base Logic 67 in FIG. 9d are enabled. The operations comprising the iteration of the system in mode 1 when performing circular interpolation are shown in FIG. 31. Before turning to FIG. 31, however, reference will first be made to FIG. 30 to illustrate the physical significance of the steps performed thus far.

e. A Physical Representation of Macromoves and Micromoves Generated During the Initial Portion of a Clockwise Circular Path Segment FIGS. 30a and 30b show in detail the macromoves and micromoves executed during the initial iterations of the circular path segment 27c. Thus, it will be understood that the initial point $P_0$ in FIGS. 30a-b corresponds to the point $P_2$ of the circular path segment 27c in FIG. 2. Furthermore, each of the time periods $\Delta T$ associated with a complete iteration such as that which appears in FIG. 31 is shown as two time periods, such as $T_1$ and $T_2$ in FIGS. 30a and 30b. Thus, the first iteration $\Delta T1001$ associated with the execution of the path segment 27c is shown in FIGS. 30a and 30b as the time periods $T_1$ and $T_2$.

From the starting data, comprising the $I_0$ and $J_0$ components of the starting radius $R_0$, there was computed the macromove quantity $2\Delta Y_{01}$ which was subsequently used to derive the $J_1$ component of the radius vector $R_1$. The $J_1$ component was then used to compute during the steps shown in column 4900 of FIG. 28 the first macromove number $\Delta X_{02}$ which appears in FIG. 30b. Thus, at the end of the iteration shown in FIG. 28, which corresponds to time period $\Delta T1000$ in FIG. 20 which is where it had been assumed the Path Point $P_2$ had been reached, and just prior to the time period $T_1$ shown in FIGS. 30a–b, there are stored in the $\Delta X$ and $\Delta Y$ registers the numbers representing the required excursion along the Y-axis to reach the Y-coordinate of the point $P_1$ and the required excursion along the X-axis to reach the X-coordinate of the point $P_2$. Stored in the J register 101 is the $J_1$ number and stored in the I register 99 is the number $I_0$.

This, then, represents the state of the data at the start of time period $\Delta T1001$. Physically, the preceding linear path segment 27b has just reached the point $P_0$ in FIG. 30a-b and the next type of iteration, illustrated generally in FIG. 31 performed first during time period $\Delta T1001$ and repeated many times during the following time periods, is ready to begin.

f. Data Processing Steps and Operations Performed by the System in Mode 1 While Executing a Circular Path Segment 1. Y-axis Data Used for Updating YSC Register Changes Midway Through an Iteration Due to Staggering A comparison between FIG. 31, representing a typical iteration during staggered circular interpolation, with FIG. 18 representing the corresponding iteration during simultaneous linear interpolation reveals certain organizational similarities. First, as in FIG. 18, two strips extend horizontally across the top of FIG. 31, representing the updating of the XSC and YSC registers 121 and 119. These operations are identical with those performed during linear interpolation.

Although the updating operations during circular interpolation are the same as those performed during linear interpolation, there is a difference, due to the staggered nature of circular interpolation, in the data which is being processed. From the detailed explanation of linear interpolation with reference to FIG. 18, it will be recalled that the updating of the XSC register 121 was done on the basis of the $\Delta X$ macromove number which was generated before the start of the iteration and which was valid for the entire iteration shown in FIG. 18. This is also the case with staggered circular interpolation. Thus, the $\Delta X_{02}$ number which was computed during the 4900 column of FIG. 28 is truly the macromove to be executed during the time periods $T_1$ and $T_2$ shown in FIG. 30b to which the time period $\Delta T1001$ of the first of many FIG. 31 iterations corresponds.

It was seen then, that the macromove data used to update the XSC register 121 remains the same for an entire circular iteration, just as in the case of linear interpolation. The same is not true, however, for the data used for updating the YSC register 119. This is so because the initially computed macromove number $2\Delta Y_{01}$ is only valid for the Y-axis up to the Y-coordinate of point $P_1$ which is to be reached during the first half of the iteration shown in FIG. 31. Indeed, only half of this number, $\Delta Y_{01}$ is utilized, this half representing the desired Y-coordinate distance from the point $P_0$ to the point $P_1$. Therefore, a new $\Delta Y$ macromove number must be computed for the updating of the YSC register 121 during the column 1500 of FIG. 31 and for the following nine updatings of that register. This "new" $\Delta Y$ macromove number is then used as the basis for updating the YSC register 121 during the second half of the FIG. 31 iteration in which it is computed and for the first half of the following FIG. 31 iteration. This staggered arrangement is reflected in FIG. 31 by using two update strips side-by-side, each extending across five columns of the FIG. 31 chart under the single strip representing the updating of the XSC register 119 and extending across all 10 columns of the FIG. 31 chart.

The generation of the first pair of micropositions for the X- and Y-axes, as well as the subsequent micropositions during the FIG. 31 iteration, may be explained with reference to table III. Each of the steps performed in accordance with that table, to which detailed reference was made in section F.2.b. are also performed during staggered circular interpolation. Thus, during the first five steps of column 1000 of the FIG. 31 iteration, the XSC register 121 is updated by dividing the number $\Delta X_{02}$ by 10 and adding the resulting quotient, $0.1\Delta X_{02}$, to the microposition number then in the XSC register ($X_0$). To update the YSC register 119, the number $2\Delta Y_{01}$ in the $\Delta Y$ register 107 is divided by 10 during the following five program steps, and the result, $$\frac{1}{5}\Delta Y_{01},$$

is added to the number ($Y_0$) in the YSC register. Since the number ($Y_0$) represents the Y-coordinate of the point $P_0$, the updated microposition number, $$Y_0 + \frac{1}{5}\Delta Y_{01}$$

represents the Y-coordinate of the first microposition to be reached during the FIG. 31 iteration, and is so identified in FIG. 30a. during each of the subsequent columns 1100–1800 of the FIG. 31 iteration, the XSC microposition number is updated by $0.1\Delta X_{02}$ and during the last column 1900 it is conformed to the upgraded XCP number which is $X_0+\Delta X_{02}$. Similarly, during each of the four columns 1100–1400 the YSC microposition number is updated by $0.2\Delta Y_{01}$, the last such update yielding a YSC microposition number which is $Y_0+\Delta Y_{01}$.

2. Upgraded YCP Number Modified During Iteration Using New $\Delta Y$ Macromove Number Another significant difference between the iterations shown in FIGS. 31 and 18 lies in the manner in which the upgrading of the XCP and YCP registers 117 and 115 is carried out. In the case of linear interpolation, it will be recalled from FIG. 18 that the XCP and YCP registers are upgraded substantially concurrently, near the beginning of the iteration, with numbers which represent the macroposition which is to be reached at the end of the iteration. In the case of linear interpolation, such upgrading operations were seen to have a dual purpose. First, the upgraded XCP and YCP numbers are used as a preliminary step in the look-ahead process, whereby a prediction is made of the point expected to be reached at the end of the 11th macromove following the iteration during which the test is made. A second purpose of the upgrading operation was seen to be to provide numbers accurately representing the macroposition to be reached at the end of the iteration, numbers which can be used in the last updating of the XSC and YSC registers.

The upgrading of the XCP and YCP registers 117 and 115 in carrying out circular interpolation have a similar twofold purpose. The XCP and YCP upgrading in the FIG. 31 iteration starts out in exactly the same manner as that carried out in a FIG. 18 operation for a linear interpolation. That is, the XCP register 117 is upgraded during steps 10–12 of the 1000 column and the YCP register 115 is upgraded during the steps 12–14. These steps are shown in detail in table III. The number $XCP_0+\Delta X_{02}$ which is stored in the XCP register after the upgrading accurately represents the X-coordinate $X_2$ of the macroposition $P_2$ which will be reached at the end of the iteration. The same is not true, however, of the number which will be stored in the YCP register after it has been upgraded. The reason for this is that, to upgrade the number in the YCP register, the macromove number $2\Delta Y_{01}$ stored in the $\Delta Y$ register 107 is used; that is, the macromove number $2\Delta Y_{01}$ is added to the previous macroposition number $Y_0$ stored in the YCP register. However, the $\Delta Y$ macromove number so used applies only up to the 5th microposition that is generated during the FIG. 31 iteration, that one which is produced during column 1400. For the following five micropositions of that iteration and for the first five micropositions of the following iteration, a new $\Delta Y$ number representing the Y-axis macromove $\Delta Y_{13}$ must be computed which, it will be seen, is done during column 1400 of the iteration after the updating of the XSC and YSC registers.

The upgraded number $Y_0+2\Delta Y_{01}$ which is in the YCP register 115 during column 1000 of the first FIG. 31 iteration is sufficiently accurate for purposes of the look-ahead process performed subsequently during that column. It is not sufficiently accurate, however, for deriving the macroposition number during column 1900 of the iteration. Consequently, means are provided for correcting the upgraded macroposition number in the YCP register 115 as soon as the new $\Delta Y$ macromove number $\Delta Y_{13}$ becomes available during the FIG. 31 iteration under consideration.

The manner in which this is carried out will be understood more readily if the upgrading of the number $Y_0$ in the YCP register during the column 1000 is thought of as projecting the number $Y_0$ presently in the YCP register ahead by the full macromove $2\Delta Y_{01}$. Then, recognizing that only the first half of the projection $2\Delta Y_{01}$ is correct and that the second half is in error, it may be seen that a correction can be effected by retracting the point which had been projected forward by the full macromove $2\Delta Y_{01}$ by one-half of that macromove; that is, $\Delta Y_{01}$, and by then projecting forward again by one-half of the newly computed macromove $\Delta Y_{13}$ which is truly applicable to the second half of the FIG. 31 iteration.

To retract the point which had been projected forward by a full macromove $2\Delta Y_{01}$ during column 1000, the number in the upgraded YCP register is "downgraded" by one-half $(2\Delta Y_{01})$ during column 1300; that is, one-half of the "old" $\Delta Y$ number $2\Delta Y_{01}$ is subtracted therefrom. Then, after the "new" number $\Delta Y_{13}$ has been computed during column 1400 of the FIG. 31 iteration, one-half of that number is added to the "downgraded" YCP number, thereby again upgrading it by ½ $\Delta Y$ to represent the Y-coordinate $(Y_0+\Delta Y_{01}+\frac{1}{2}\Delta Y_{13})$ of the macroposition $P_2$ to be reached at the end of the iteration (see FIG. 30a).

Reference will now be made to tables VI and VIA which show in detail all of the steps characteristic of the FIG. 31 iteration with the exception of the operations performed during the first 13 steps in each of the 10 columns comprising the iteration, these being shown in table III.

The first operation, which will be described with reference to table VI will be the "downgrading" and subsequent upgrading of the YCP register during columns 1300 and 1500 of a FIG. 31 iteration. For a reason similar to that which caused a YR register 111 to be provided to store the four least significant digits of the $\Delta Y$ macromove number a YCPR register 116 is provided to store the least significant digit of the upgraded YCP macroposition number, with the other five digits of the number being stored in the YCP register 115.

Continuing to assume that the FIG. 31 iteration under discussion is that which corresponds to the time periods $T_1$, $T_2$ in FIGS. 30a–b, the number in the YCP register 115 after its upgrading during column 1000 will represent the Y-coordinate of the point $P_0$ projected forward; that is, upward by the macromove $2\Delta Y_{01}$. Algebraically, it is $YCP_0+2\Delta Y_{01}$. The first step, then, to correct this number during column 1300 is to subtract one-half of the macromove number, $\Delta Y_{01}$, therefrom. Toward this end, during step 1315, the five highest order digits of the YCP number, which is $XCP_0+2\Delta Y_{01}$ are transmitted from the YCP register 115 to the computer 53 in response to a READ-gating signal from its associated PGA 425 (condition 5). These digits become stored in digit stages 2–8 of the Answer Register 53a during the following program step 1316·CIRC and are shifted one position to the left by a control signal from PGA 463 (condition 4). This frees stage 8 of the Answer Register 53a to receive the lowest order digit of the YCP number from the YCPR register 116 during program step 1317·CIRC. The appropriate READ-gating signal is applied to the YCPR register 116 by a program gate 489 through an OR-gate 491. It will be noted that the highest order digit of

TABLE VI.—STEPS PERFORMED IN MODE 1 CIRCULAR

| | 1000-CIRC | 1300-CIRC | 1400-CIRC | 1500-CIRC | 1900-CIRC |
|---|---|---|---|---|---|
| 0–13 | | | See Table III | | |
| 14 | Advance E.O.B. ? S2 | | | | |
| 15 | R/J | R/YCP | R/I | R/YCP | R/J |
| 16 | {R/I, CX} | SAL | R/ΔX, SX | SAL | R/ΔY, SX |
| 17 | {P/FAX ? ≥, C/FAX ? <, CAR, FP} | R/YCPR | {W/I, CAR, R/Q} | R/YCPR | {W/J, CAR, R/Q} |
| 18 | {R/J ? FAX, R/I ? $\overline{FAX}$} | R/YΔ, SX | R/±I and multiply by Q | R/ΔY | R/±J and multiply by Q. |
| 19 | {SAR, C/UBFF, C/LBFF} | R/YΔ, SX | Carry out ±I × Q multiplication. | R/ΔY | Carry out ±J × Q multiplication. |
| 20 | {R/YCP ? FAX, R/XCP ? $\overline{FAX}$} | R/YΔ, SX | do | R/ΔY | Do. |
| 21 | SAR | R/YΔ, SX | do | R/ΔY | Do. |
| 22 | {CX, R/YCEP ? FAX, R/XCEP ? $\overline{FAX}$} | R/YΔ, SX | do | R/ΔY | Do. |
| 23 | P/UBFF ? ≥ | W/YCPR | do | W/YCPR | Do. |
| 24 | {CAR, FP, SX, R/J ? FAX, R/I ? $\overline{FAX}$} | SAR | do | SAR | Do. |
| 25 | SAR | W/YCP | do | W/YCP | Do. |
| 26 | {R/YCP ? FAX, R/XCP ? $\overline{FAX}$} | | do | | Do. |
| 27 | SAR | | do | | Do. |
| 28 | {CX, R/YCEP ? FAX, R/XCEP ? $\overline{FAX}$} | | do | | Do. |
| 29 | P/LBFF ? | | do | | Do. |
| 30 | {CAR, R/ΔX ? FAX, R/ΔY ? $\overline{FAX}$} | | do | | Do. |
| 31 | W/ACNX | | do | | Do. |
| 32 | {R/XCP ? FAX, R/YCP ? $\overline{FAX}$} | | do | | Do. |
| 33 | SAR | | do | | Do. |
| 34 | {SX, R/XCEP ? FAX, R/YCEP ? $\overline{FAX}$} | | do | | Do. |

TABLE VI A

| | 1000-CIRC | 1300-CIRC | 1400-CIRC | 1500-CIRC | 1900-CIRC |
|---|---|---|---|---|---|
| 35 | See Note 1 | | Carry out I×Q multiplication. | | Carry out J×Q multiplication. |
| 36 | SAL | | do | | Do. |
| 37 | SAL | | do | | Do. |
| 38 | {SX R/ΔY ? FAX, R/ΔX ? FAX} | | do | | Do. |
| 39 | {SX R/ΔY ? FAX, R/ΔX ? FAX} | | do | | Do. |
| 40 | {SX R/ΔY ? FAX, R/ΔX ? FAX} | | do | | Do. |
| 41 | {SX R/ΔY ? FAX, R/ΔX ? FAX} | | do | | Do. |
| 42 | {SX R/ΔY ? FAX, R/ΔX ? FAX} | | do | | Do. |
| 43 | See Note 2 | | do | | Do. |
| 44–64 | | | do | | Do. |
| 65 | | | SL4 | | SL4 |
| 66 | | | R/YR | | R/XR |
| 67 | | | SR4 | | SR4 |
| 68 | | | W/ΔY | | W/ΔX |
| 69 | | | ZR1 | | ZR1 |
| 70 | | | SL4 | | SL4 |
| 71 | | | W/YR | | W/XR |
| 72–88 | | | No computations | | |
| 89 | | | | | Advance E.O.B. ? S3. |
| 90 | | | | | Advance E.O.B. ? S4. |
| 91 | | | | | Advance E.O.B. ? M3. |
| 92 | | | | | do |
| 93 | | | | | do |
| 94 | | | | | do |
| 95 | | | | | do |
| 96 | | | | | do |
| 97 | | | | | do |
| 98 | | | | | do |
| 99 | | | | | do |

Note 1.—On step 1035 advance E.O.B. counter to S2 ? S1·SST·CIRC·UB·LB.
Note 2.—On step 1043 advance E.O.B. counter to S3 ? S2·SST.

In order to subtract half of the ΔY number $2\Delta Y_{01}$ from the inaccurately upgraded macroposition number $YCP_0 + 2\Delta Y_{01}$, the YCP number, which normally resides in digit stage 2 of the Answer Register 53a, is now in digit stage 1 of the Answer Register so that, in effect, the number presently in the Answer Register 53a is $10(YCP_0 + 2\Delta Y_{01})$.

the entire number $2\Delta Y_{01}$ is subtracted five times from the number $10(YCP_0 + 2\Delta Y_{01})$ in the Answer Register 53a, giving the result $10(YCP_0 + \Delta Y_{01})$. This result is then simply divided by 10, giving the "downgraded" macromove number $YCP_0 + \Delta Y_{01}$. Accordingly, the macromove number $2\Delta Y_{01}$ is subtractively read from the ΔY register 107 into the computer 53 five times, once during each of the program steps 1318·CIRC–1322·CIRC. The READ-gating signals required are represented by condition 14 by program gate 415 associated with the $\Delta Y$ register 107 and by condition 5 of the SX PGA 479 in FIG. 9c. The result, $10(YCP_0+\Delta Y_{01})$ appears in the Answer Register 53a during program step 1323·CIRC.

The lowest order digit of the result is transmitted from digit stage 8 of the Answer Register 53a to the YCPR register 116 during program step 1323·CIRC by a WRITE-gating signal applied to the register 116 by a program gate 493 through an OR-gate 495. The remaining five digits of the result are shifted toward the right from stages 1–7 to stages 2–8 during program step 1324·CIRC in response to an appropriate control signal from the PGA 411 (condition 24). Thus, the lowest order digit of the number $10(YCP_0+\Delta Y_{01})$ has been stored in the YCPR register 116 and the remaining digits have been effectively divided by 10 so that what is stored in the Answer Register 53a during program step 1325·CIRC are the first seven digits of the number $YCP_0+\Delta Y_{01}$. These digits are transferred during the same program step to the YCP register 115 by a WRITE-gating signal applied to the register from PGA 427 (condition 3). Thus, the number in the YCP register 115 has been "downgraded" to the middle of the FIG. 31 iteration and accurately represents the Y-coordinate $YCP_0+\Delta Y_{01}$ of the macroposition $P_1$ which is to be reached at the end of the first half of the FIG. 31 iteration; that is, at the end of the time period $T_1$ in FIG. 30.

During the following column 1400 of the FIG. 31 iteration, the new macromove number for the Y-axis, $\Delta Y_{13}$, is derived and becomes available toward the end of column 1400. It is used during column 1500 to upgrade the "downgraded" macromove number in the YCP register to the value representing the Y-coordinate of the point $P_2$ that is to be reached at the end of the FIG. 31 iteration. This is carried out by adding to the "downgraded" number $YCP_0+\Delta Y_{01}$ in the YCP register 115 half of the new macromove number $\Delta Y_{13}$, producing the correct result, $YCP_0+\Delta Y_{01}+0.5\Delta Y_{13}$. That this result is correct may be confirmed from FIG. 30a.

Turning to table VI, the first step is to transmit the first five digits of the number $YCP_0+\Delta Y_{01}$ from the YCP register 115 to the computer 53. This occurs during program step 1515·CIRC and is done by applying a READ-gating signal to the YCP register 115 from the PGA 425 (condition 6). The seven digits are transferred from digit stages 2–8 to digit stages 1–7 of the Answer Register 53a during the following program step 1516·CIRC by a control signal from the PGA 463 (condition 5). The 6th and least significant digit of the number $YCP_0+\Delta Y_{01}$ is transmitted from the YCPR register 116 to the computer 53 and, in particular, to its digit state 8 during program step 1517 by a READ-gating signal applied to the YCPR register from a program gate 497 through the OR-gate 491. The number now stored in the Answer Register 53a is $10(YCP_0+\Delta Y_{01})$. During the following five program steps 1518·CIRC–1522·CIRC the new macromove number $\Delta Y_{13}$ is added five times to the number in the Answer Register 53a by a succession of five READ-gating signals represented by condition 15 of the PGA 415 associated with the $\Delta Y$ register 107. The result, $10(YCP_0+\Delta Y_{01}+0.5\Delta Y_{13})$, appears in the Answer Register 53a during program step 1523·CIRC. Its lowest order digit is transferred from digit stage 8 of the Answer Register 53a to the YCPR register 116 during the same program step by application of a WRITE-gating signal to the register from its associated program gate 499 through the OR-gate 495. The remaining seven digits are shifted one position to the right from digit stages 1–7 of the Answer Register 53a during the following program step 1524·CIRC by a shift control signal from PGA 411 (condition 25). Consequently, during program step 1525·CIRC the digits appearing in stages 2–8 of the Answer Register 53a represent the highest order digits of the number $YCP_0+\Delta Y_{01}+0.5\Delta Y_{13}$. These digits are transmitted during the program step 1525·CIRC to the YCP register 115 by application of a WRITE-gating signal to that register from its associated PGA 427 (condition 4). This completes the second upgrading of the YCP number in the YCP register 115 so that it now represents correctly the Y-coordinate of the point $P_2$ to be reached at the end of the FIG. 31 iteration (See also FIG. 30a).

3. Computing the New $\Delta Y$ Macromove Number

Attention will now be directed to the specific steps carried out to compute the new Y-axis macromove number $\Delta Y_{13}$. Referring first to FIG. 31, and in particular to column 1400 thereof which is taken to occur just before the time period $T_2$ in FIG. 30, the first task is to derive from the $\Delta X_{02}$ number in the $\Delta X$ register 109 and from the $I_0$ number stored in the I register 99 the $I_2$ component of the radius vector $R_2$ shown in FIG. 30a. As may be seen from FIG. 30a and recalling the previous discussion with reference to FIGS. 25c and 25d, the value $I_2$ will be required to compute the quantity $\Delta Y_{13}$. This operation is referred to in FIG. 31 as "upgrading $I$ by subtracting $\Delta X$". Thus, it may be confirmed by reference to FIG. 29a that, when a circular path is to be generated clockwise, the macromove component $\Delta X$ must be subtracted from the I component in order that the change in the latter be in the right sense. Taking as an example the fourth quadrant, both $I$ and $\Delta X$ are positive. Whatever the angular position of the radius vector with which a given I component is associated, as that radius vector is advanced clockwise, its I component must diminish. Clearly, then, subtraction of $\Delta X$ will yield the correct result. The same is true for a circular path which is to be generated counterclockwise, as may be seen from FIG. 29b. Taking the first quadrant as an example, the $\Delta X$ and $I$ vectors are both negative. Again, regardless of the angular position of the radius vector, as it is rotated counterclockwise, its I component must shrink; that is, it must be a smaller negative number. Consequently, the subtraction of the negative $\Delta X$ number from the negative $I$ number will result in a smaller negative number for the I component.

To subtract $\Delta X_{02}$ from $I_0$, $I_0$ is transmitted from the I register 99 to the computer 53 during program step 1415·CIRC by a READ-gating signal from PGA 400 (condition 6). During the following program step 1416·CIRC, the $\Delta X_{02}$ number is subtractively read into the computer 53 from the $\Delta X$ register 109. To this end, a READ-gating signal is applied to the $\Delta X$ register 109 during program step 1416·CIRC from its associated PGA 409 (condition 13) and a subtract control signal is applied to the computer 53 from its associated PGA 479 (condition 6). The result, $I_0-\Delta X_{02}$, appears in the Answer Register 53a during program step 1417·CIRC and is transmitted to the I register 99 as the upgraded or new $I$ component number $I_2$ by the application of a WRITE-gating signal to the I register 99 from its PGA 355 (condition 1).

With the desired I component number $I_2$ in the I register 99, the next operation is to derive the quantity $Y_{13}=I_2\cdot D/R$. It will be recalled that $D/R=Q$, which is stored in the Q register 103. Consequently, the computation is simplified to $I_2\cdot Q$ and is seen in FIG. 31 to occur during program steps 1417·CIRC–1464·CIRC. Specifically, with reference to table VI, the $Q$ number is read into the computer 53 from the Q register 103 during program step 1417·CIRC by a gating signal from its PGA 389 (condition 2) after clearing of the Answer Register 53a by a control signal from the PGA 351 (condition 10). The upgraded $I_2$ number is transmitted to the appropriate storage register in the computer 53 from the I register 99 by READ-gating signal applied to the register from its PGA 400 (condition 7) during the following program step 1418·CIRC. During the same program step, a "multiply" control signal is applied to the computer 53 from its PGA 393 (condition 1). It should be noted that, since the path being generated is clockwise, the $I_2$ number used for the subsequent multiplication process is to be positive, in keeping with the rules developed with reference to FIG. 29. Had the illustrated path been progressing in a counterclockwise direction, the $I$ number would have been read into the computer 53 subtractively, as indicated by condition 11 in PGA 479 of FIG. 9c.

The operation $I_2\cdot Q$ is completed by the computer 53 during program step 1464 shown in table VI–A and the result appears in the Answer Register 53a during program step 1465·CIRC.

The following operations which are carried out during steps 1465·CIRC–·CIRC are the same as those shown to occur during steps 1865·LIN–1871·LIN, as discussed previously with reference to FIG. 18 and table IV–A. By means of these operations any number in the YR register 111 is added to the product $I_2 \cdot Q$, the first four digits of the sum are stored as the number $\Delta Y_{13}$ in the $\Delta Y$ register 107 and the four least significant digits in the YR register 111. The necessary control and gating signals are indicated by condition 1 of the SL4 PGA 347, condition 2 of the R/YR PGA 399, condition 1 of an SR4 PGA 501 in FIG. 9c, condition 2 of the W/$\Delta Y$ PGA 395, condition 1 of the "ZR1+ZR2" PGA 397, condition 4 of the SL4 PGA 347 and condition 1 of the W/YR PGA 398.

Having computed the macromove number $\Delta Y_{13}$ during the 1400 column of the FIG. 31 iteration, that number is used for three purposes, some of which have already been explained. First, the macromove number $\Delta Y_{13}$ is used during the next column 1500 and during each of the following four columns of the present FIG. 31 iteration and during each of the following four columns of the present FIG. 31 iteration and during the first four columns of the following FIG. 31 iteration to generate successive Y-axis microposition numbers by repeated updatings of the YSC register 119. This is performed during steps 05, 06 and 10 of each of the columns 1500–1800 and 1000–1400 of the next iteration in the manner shown in table III, that is, by dividing the macromove number $\Delta Y_{13}$ by 10 and successively adding the quotient to the number stored in the YSC register.

The second purpose for which the number $\Delta Y_{13}$ is used is to upgrade the number in the YCP register 115 to the value which it is to have at the end of the FIG. 31 iteration. This was explained in the immediately preceding sections. The third purpose for which the number $\Delta Y_{13}$ is used is to upgrade the component number $J_1$ which is presently in the J register 101 by subtracting from that number the macromove number $\Delta Y_{13}$. By inspection of FIGS. 30a and 30b, it may be seen that the result will be $J_3$; that is, the Y-component of the point $P_3$. It is this component which is necessary to compute $\Delta X_{24} = -J_3 \cdot D/R = -J_3 \cdot Q$.

The upgrading of the component number $J_1$ and the subsequent computation of the new macromove number $\Delta X_{24}$ required for the following FIG. 31 iteration is performed during the 1900 column of the current FIG. 31 iteration; that is, toward the end of time period $\Delta T1001$. The first step in the sequence, performed during program step 1915·CIRC is to transmit the number $J_1$ from the J register 101 to computer 53 by means of a READ-gating signal from its associated PGA 391 (condition 1). The new macromove number $\Delta Y_{13}$ is then read subtractively into the computer 53 from the $\Delta Y$ register 107. The necessary gating and subtract signals are indicated by condition 17 of the R/$\Delta Y$ PGA 415 and condition 7 of the SX PGA 479. The result, $J_3 = J_1 - \Delta Y_{13}$ appears in the Answer Register 53a during the following program step 1917·CIRC and is transmitted to and stored in the J register 101 during that program step by application to the register of a WRITE-gating signal from its associated PGA 357 (condition 1).

This completes the upgrading of the J vector component so that, in effect, there is now stored in the J register 101 the inverse Y-component of the radius vector $R_3$ which has been "advanced" from $P_1$ to $P_3$. Next, the Answer Register 53a is cleared during program step 1917·CIRC by a control signal from the CAR PGA 351 (condition 11), and the multiplier $Q$ is entered by a control signal from R/Q PGA (condition 4). The multiplicand $J_3$ is entered into the computer again during program step 1918·CIRC from the J register 101 by gating signal from its PGA 391 (condition 2). The circle being generated is clockwise; therefore, a $-J_3$ must be used and consequently the $J_3$ number is read into the computer 53 subtractively, as indicated by condition 12 of the SX PGA 479. With the multiplicand $-J_3$ just written into the appropriate storage device in the computer 53 and with the multiplier $Q$ stored in its associated storage device in the computer, the multiplication process $-J_3 \cdot Q$ is initiated during program step 1918·CIRC by a "multiply" control signal represented by condition 2 of the X PGA 393. The multiplication process $-J_3 \cdot Q$ is carried out during the ensuing program steps 1918·CIRC–1964·CIRC indicated in tables VI and VI–A. The product, $-J_3 \cdot Q$, appears in the Answer Register 53a during the next program step 1965·CIRC. During program steps 1965·CIRC–1971·CIRC, any digits stored in the XR register 113 are added to the product. The resulting eight-digit number in the Answer Register 53a is split into two parts. These parts are stored in the $\Delta X$ register 109 as the macromove number $\Delta X_{24}$, and in the XR register 113 as the "remainder" of $\Delta X_{24}$ in the same manner as described previously with reference to steps 1965–1971 of table IV–A.

In executing the clockwise circular path segment 27c, the system repeats the FIG. 31 iteration many times. Thus, during the following time period $\Delta T$ 1002 the $I_2$ component number is upgraded to $I_4 = T_2 - \Delta X_{24}$ and, using the new $I_4$ component number, the next Y-axis macromove number $\Delta Y_{35} = I_4 \cdot Q$ is computed during column 1400, or, with reference to FIG. 30, just before the end of time period $T_3$. The new macromove number $\Delta Y_{35}$ is then executed at substantially uniform speed and in ten substantially uniform increments during time periods $T_4$, $T_5$. Subsequently, during column 1900 of the second FIG. 31 iteration, the component $J_3$ is upgraded to $J_5 = J_3 - \Delta Y_{35}$, this occurring just before the end of the time period $T_4$ in FIG. 30. The new component number $J_5$ is then used to compute the next macromove number $\Delta X_{46} = -J_5 Q$ which is executed during time periods 5 and 6 shown in FIG. 30, again in 10 equal increments due to the periodic updating of the XSC register.

g. The Particular Advantages of a Two-Level Interpolation Process in Generating a Circular Path Segment It should be noted in connection with linear interpolation that the $\Delta X$ and $\Delta Y$ macromove numbers need not be computed newly for each successive iteration as the linear path segment is being generated provided there were the means for extremely fine resolution, i.e., the remainder is insignificant. Therefore, it would have been theoretically possible in the case of linear interpolation to use a single level interpolation in which the $\Delta X/10$ and the $\Delta Y/10$ micromove numbers would have been computed during the initial FIG. 17 iteration simply by carrying out the computations $J \cdot Q/10$ and $I \cdot Q/10$. In other words, linear interpolation could be carried out by computing micromoves and micropositions only and without the intermediate computation of macromoves and macropositions. In the case of circular interpolation the situation is significantly different. As the circular path is being generated, the macromove numbers $\Delta X$ and $\Delta Y$ continually change. Thus, it is impossible to initially compute a pair of macromove numbers $\Delta X$ and $\Delta Y$ or a pair of micromove numbers $\Delta X/10$ and $\Delta Y/10$ which can then be used for the entire process. To the contrary, it is apparent from FIGS. 30a and 30b that the distance to be covered during a given time period $\Delta T$ continually changes along both axes. But to compute each successive micromove and microposition by multiplying a radius vector component $I$ or $J$ by the number $Q$, would put very heavy demands upon a computer. On the other hand, to compute only macromoves $\Delta X$ and $\Delta Y$ and macropositions XCP and YCP would result in the generation of relatively widely spaced-apart points and a surface which would not be sufficiently smooth for all purposes. It is here then, that the two-level interpolation process is used to the best advantage. The relatively lengthy process of $J \cdot Q$ and $I \cdot Q$ is carried out only for deriving the macromove numbers $\Delta X$ and $\Delta Y$ and the much simpler process of dividing each new macromove number $\Delta X$ and $\Delta Y$ by 10 and adding the result to the microposition numbers stored in the XSC and YSC registers 121 and 119 is used for deriving the intermediate micropositions.

h. Terminating the Circular Path Segment

1. Macromoves are not Adjusted and the Path Segment is not Necessarily Reached at the End of an Iteration In several respects the manner in which a circular path segment is terminated in the McGee system is similar to that discussed previously in connection with terminating a linear path segment. During each time period $\Delta T$ look-ahead signals are produced representing the projected fast axis coordinate of the point which is expected to be reached along the circular path segment during a following time period. These look-ahead signals are compared with signals representing the corresponding coordinate of the designated End of Point of the path segment and a warning signal is produced during the first time period in which the comparison indicates that the fast axis coordinate represented by the look-ahead signals had passed the corresponding coordinate of the designated end point. Furthermore, as with a linear path segment, a determination is also made during each time period $\Delta T$ of the extent of the projected overrun. If the fast axis coordinate represented by the look-ahead signals is more than one-half macromove past the corresponding coordinate of the End Point of the path segment an auxiliary signal is produced. Movement along the circular path segment is terminated at the end of the time period $\Delta T$ preceding the particular time period for which an overrun has been predicted to occur if both a warning signal and an auxiliary signal were produced; that is, if the projected overrun was predicted to exceed one-half macromove. Movement is terminated at the end of the particular time period for which an overrun is predicted to occur if only the warning signal was produced; that is, if the projected overrun was predicted not to exceed one-half macromove.

When the path terminating process described briefly in the preceding paragraph is performed for a linear path in combination with the adjustment of macromoves in order to hit the End Point exactly, it becomes necessary to predict an overrun condition several time periods $\Delta T$ in advance in order to leave a sufficient number of such time periods in which to compute and execute the adjusted macromoves. In the termination process shown to be carried out by the exemplary system for a circular path segment, adjustment of macromoves is not used. Instead, the macromoves continue to be computed on the basis of the originally supplied data and an overrun or an underrun is permitted to occur; that is, if the path segment is terminated at the end of the time period for which an overrun was predicted to occur, that overrun will actually occur. Similarly, if the path segment is terminated during the immediately preceding time period, the path will have been terminated short of its designated End Point, thus causing an underrun. This may cause a small error to be introduced into the interpolation process performed for the following path segment which may in certain circumstances be tolerable. In this event, the following path segment is permitted to commence on the basis of the original data provided therefor. The resulting error will be in the nature of an offset.

In other circumstances, the offset which would result from terminating the circular path segment at the end of a time period $\Delta T$ without a correction may be intolerable. For use of the system in such situations an entirely different mode of correction is provided to compensate for failure of the preceding path segment to terminate on its prescribed End Point exactly. This correction, by which some of the data representing the following path segment is modified, is an important feature of the present invention and will be described in detail in sections G.2.k. and G.2.1.

2. Proximity to the End Point Must be Tested for Both Axes

The operations connected with predicting a projected overrun and determining its magnitude are generally shown in FIG. 31 in column 1000. They correspond to a similar series of operations performed during a typical macromove in the course of simultaneous linear interpolation and shown in column 1000 of FIG. 18. The first operation is to upgrade the numbers in the XCP and YCP registers 117 and 115 to the macroposition values which are to be reached at the end of the iteration represented by FIG. 31. This represents a prediction of the positions along the X- and Y-axes which will be reached by the path segment, or by an element which is moved along that path segment, by the end of the time period $\Delta T$. Following this, a determination is made as to which of the X- and Y-axes is the fast axis so that the forward projection toward the End Point might be made along that axis. The test based upon comparison of a forward projected point along the fast axis with the corresponding coordinate of the designated End Point for the path segment is not sufficient, however, by itself, to give an unambiguous indication of a projected overrun of the designated End Point. The reason for this may be seen in FIG. 32. It shows movement along a path segment clockwise in the second and first quadrants toward a designated End Point whose X- and Y-coordinates are XCEP and YCEP. The End Point in FIG. 32 is in the top half of the first quadrant so that the X-axis is the fast axis; that is, motion along that axis is at a higher rate than along the Y-axis.

Consequently, the look-ahead signals are produced for the X-axis and it is on the basis of a comparison of those signals with the signals representing the coordinate XCEP that a projected overrun is detected. In the case assumed in FIG. 32 the results of such a test would be correct because with motion along the path segment progressing clockwise and with the Y-coordinate YCEP of the designated End Point being in the first quadrant, an overrun would, in fact, occur. Let it be assumed instead, however, that the designated End Point has the coordinates XCEP, YCEP'; so that it falls in the fourth quadrant, as shown in FIG. 32. In such a case the comparison of the look-ahead signals along the fast axis with the corresponding coordinate XCEP of the designated End Point would by itself give a misleading result because it would indicate (correctly) that the end point XCEP/YCEP' was about to be reached along the X-axis, and this would be interpreted by the system (incorrectly) as an indication that the end point is about to be reached along the Y-axis as well. To eliminate a false indication of proximity to the End Point, in accordance with a feature of the present invention a preliminary test is performed by the exemplary system to determine whether or not the path segment has progressed along the slow axis to within the vicinity of the designated path End Point.

3. Testing for Proximity of the Path Segment to its Designated End Point Along the "Slow" Axis In accordance with the present invention, to confirm that a projected circular path segment such as that shown in FIG. 32 has extended past its designated End Point rather than the mirror image of that point, a special test is performed. Specifically, along with each forward projection of a fast axis macroposition coordinate, a pair of slow axis coordinates are produced which "bracket" an adjacent slow axis macroposition coordinate. More particularly, in the first exemplary embodiment disclosed by McGee in the above referenced patent application, during each iteration a one-macromove look-ahead projection is made from the fast axis macroposition coordinate XCP toward the fast axis End Point coordinate XCEP. Additionally, in accordance with the present invention, and with particular reference to FIG. 32, a pair of points PL1 and PL2 are produced which are a small distance above and below the Y-axis macroposition coordinate YCP for the iteration. The points PL1 and PL2 may be rapidly derived by respectively adding and subtracting the absolute value of 0.0J to and from the coordinate value YCP, yielding $YCP+|0.1J|$ for the point PL1, and $YCP-|0.1J|$ for the point PL2. In other words, the "size of the bracket" along the slow axis is chosen to be 0.2J. If YCEP, the slow axis End Point coordinate is within the bracketed range; that is, if it is less than $YCP+|0.1J|$ and greater than $YCP-|0.1J|$, the slow axis test is satisfied, indicating that the specified End Point is, in fact, being approached. Consequently, if the fast axis look-ahead test indicates an overrun, it will be interpreted by the system as an actual projected overrun of the designated End Point. It may be said, therefore, that, in addition to looking ahead along the fast axis, a probe is also cast to either side in order to determine whether an End Point is about to be reached.

4. Testing for a Projected Overrun Path Segment of its Designated End Point Along the "Fast" Axis Following the proximity test for the slow axis, the previously predicted macroposition for the end of the current time period $\Delta T$ is projected forward by one macromove so that, in effect, the resulting signals represent the point which will be reached along the fast axis at the end of the following iteration. This point is then compared with the corresponding coordinate of the prescribed end point for the path segment by a "compute overrun" operation. If a projected overrun is in fact detected and if the prior check of the slow axis revealed that the path segment is in the vicinity of the slow axis coordinate of the prescribed End Point, the End-of-Block Counter 186 is advanced to its second, S2 state, as in the case of the linear path segment. The forward projection of the macroposition along the fast axis is then "retracted" by one-half macromove, again as in the case of linear path segment, and a second comparison is made with the corresponding coordinate of the prescribed End Point to determine whether or not a projected overrun condition still exists. If it does, it means that, were another FIG. 31 iteration to be performed during the following time period, the resulting overrun along the fast axis would exceed one-half macromove along that axis. In that event, the End-of-Block Counter 186 is advanced another step to its third count state.

5. Typical Iterations for Terminating a Circular Path Segment

FIG. 31 represents a typical iteration performed during the generation and execution of signals representing points along a circular path segment before an overrun has been detected. Consequently, the blocks in column 1000 relating to the advancing of the End-of-Block Counter are crossed out, since the events which bring this about do not occur during a typical iteration. An iteration during which a large projected overrun is detected, causing the End-of-Block Counter 186 to be advanced from its first count state S1 through its second count state S2 to its third count state S3, is represented by FIG. 33 wherein the blocks in column 1000 showing these events appear without crosses therein.

In the situation shown by the FIG. 33 iteration; that is, where a large overrun has been detected, the path segment is to be terminated during the time period immediately preceding the time period for which such an overrun was predicted. Since the overrun predicted during the FIG. 33 iteration is for the following time period, the path segment must be terminated at the end of the FIG. 33 iteration and thus during this same iteration the basic computations required to convert the I, J and Q data for the next block into macromove numbers must be carried out. Consequently, during the FIG. 33 iteration the system must be changed from mode 1 to mode 4 operation and this is indicated by the designation of the last four columns of the FIG. 33 iteration as 4600, 4700, 4800 and 4900.

As will be described in greater detail, the set of calculations performed during the last four columns 4600–4900 of the FIG. 33 iteration are those required if the following path segment is to be linear. FIG. 34 shows an iteration identical to that shown in FIG. 33, except that the computations performed during its last four columns 4600–4900 are those that are required when the following path segment is circular.

FIG. 35 illustrates what happens during an iteration in which a small overrun is detected; that is, during which the End-of-Block Counter 186 is only advanced to its second count state as indicated by the fact that the last block in the 1000 column of the FIG. 35 iteration is crossed out. The only detail in which the FIG. 35 iteration (during which a small overrun is detected) varies from the FIG. 31 iteration (during which no overrun is detected) is in that, during the FIG. 35 iteration, the End-of-Block Counter is advanced from count state 1 to count state 2. All of the other computations which are performed during the FIG. 35 iteration are exactly the same as those carried out during the FIG. 31 iteration. In the flow chart of FIG. 20 each of the alternative iterations illustrated in FIGS. 33, 34, and 35 is shown to occur during time period ΔT 2500. This is simply an arbitrary time selected for sake of example and agrees generally with the length of the circular path segment 27c relative to the length of the preceding linear path segment 27b in FIG. 2.

The events which occur during the iteration which follows one in which a small overrun was detected, that is, a FIG. 35 iteration, are shown in FIG. 36. This iteration, shown in FIG. 20 to occur during time period ΔT 2051, is characterized by advancement of the End-of-Block Counter 186 during the 1000 column to its third count state S3 as a direct result of the advancement of the counter 186 to its second count state S2 during the preceding FIG. 35 iteration.

The consequence of stepping the counter 186 to its third count state S3 during the initial portion of the FIG. 36 iteration is seen to be the same as its advancement to that count state during a FIG. 33 iteration. Thus, the system is caused to switch over to its mode 4 operation at the end of the 1500 column of the iteration, as indicated by the designations 4600, 4700, 4800 and 4900 of the last four columns. During these four columns, setup calculations are carried out which are identical to those performed during the corresponding columns of the FIG. 33 iteration, those required where the following path segment is to be a linear one. If, on the other hand, the next path segment is to be circular, the computations which are performed during columns 4600–4900 are those shown in FIG. 37, which is also shown in FIG. 20 to occur during time period ΔT 2501.

Summarizing the foregoing general discussion of typical iterations for terminating a circular path segment with reference to FIGS. 33 through 37, FIGS. 33 and 34 shown what takes place during a time period in which a large overrun is detected. The setup calculations performed during the last two columns, 4800 and 4900, of these iterations, are those required to begin execution of a linear and a circular path segment respectively. Thus, the computations shown to be carried out during the last two columns on the FIG. 33 iteration are exactly the same as those previously discussed with reference to the corresponding columns of FIG. 17. Similarly, the computations which are carried out during the last two columns of the FIG. 34 iteration are exactly the same as those explained previously with reference to FIG. 28.

FIG. 35 illustrates what happens during an iteration in which a small overrun is detected and, except for advancement of the End-of-Block Counter 186 from its count state S1 to its count state S2, all of the steps performed during this iteration are the same as those carried out during the FIG. 31 iteration. Finally, FIGS. 36 and 37 show the events which take place during the time period immediately following that in which a small overrun was detected. The two FIGS. differ from FIGS. 33 and 34 only in the manner in which the End-of-Block Counter 186 is advanced to its third count state in column 1000·CIRC. Otherwise, all of the computations carried out during the FIG. 36 iteration are exactly those performed during the FIG. 33 iteration and the same identity prevails between a FIG. 37 and a FIG. 34 iteration.

i. Data Processing Steps Directed to Detecting a Projected Overrun by Testing for Proximity to the End Point Along Both Axes In the following discussion, reference will again be made to tables VI and VI–A, which were referred to previously in Section G.2.f.(2).

The first columns of tables VI and VI–A, taken one after the other and labeled 1000·CIRC, represent in detail the operations performed during column 1000 of each of FIGS. 31 through 37, with the small variations which exist between the corresponding columns of the several Figures being indicated in the tables. It will be assumed initially that the steps are performed as part of a FIG. 31 iteration; that is, that an overrun has not been detected.

1. Determining the Fast Axis

During the first 15 steps of the 1000·CIRC column of table VI, the XSC and YSC registers 121 and 119 and the XCP and YCP registers 117, 115 are updated and upgraded in accordance with the steps shown previously in table III. The possible advancement of the End-of-Block Counter 186 during step 14 does not occur because the counter was not previously advanced to its second, S2, count state. During the following two program steps 1015·CIRC and 1016·CIRC, the J and I component numbers are transmitted to the computer 53 from the J and I registers 101 and 99 in order to determine which of them is larger; i.e., along which axis movement is to be at a higher rate. The READ-gating signals causing the J and I numbers to be so transmitted are indicated by condition 4 of R/J PGA 391 and condition 3 of R/I PGA 400. Concurrently with transmission of the number I to the computer 53, a compare-instruct signal is applied to the computer from the "FP and CX" PGA 453 (condition 3). If the first of the two numbers transmitted to the computer 53 is greater than or equal to the second, that is, if J is greater than or equal to I, the FAX flip-flop 455 is preset, indicating by a logic 1 voltage level on its FAX output that motion along the X-axis is to be equal to or faster than along the Y-axis. If the contrary is true and J is less than I, the flip-flop is reset and a logic 1 voltage level on its $\overline{FAX}$ output indicates that the motion along the Y-axis is greater than the rate of motion along the X-axis.

It will be observed that the order in which I and J are transmitted to the computer 53 is the reverse of that in which they were transmitted during a linear macromove. The reason for this is that in the case of circular interpolation the size of a macromove along the X-axis is proportional to J and not to I as in the case of linear interpolation. Similarly, the Y-axis macromove $\Delta Y$ in the case of circular interpolation is proportional to I instead of J. Consequently, whereas in generating linear path segments movement on the X-axis is faster than along the Y-axis if I is greater than J, the reverse applies when the path segment being generated is circular.

2. Proximity Test for the Slow Axis

With the identity of the fast axis and, therefore, of the slow axis determined, the next operation is aimed at checking the slow axis for proximity to the End Point in accordance with the present invention as described previously with reference to FIG. 32. In implementing this feature there are generated for a selected one of the X- and Y-axes first and second digital signals representing first and second spaced-apart coordinates which are respectively farther from and nearer to the origin of the axes than the corresponding coordinate of the path segment; in the present instance, the upgraded XCP or YCP number. A determination is then made as to whether or not the corresponding coordinate of the designated End Point for the selected one of the axes, XCEP or YCEP, lies between the first and second spaced apart coordinates.

More specifically, the signals representing the first of the spaced apart coordinates along the selected one of the two axes are compared with the signals representing the corresponding End Point coordinate, and an upper bracket signal is produced and stored if the comparison indicates that the End Point coordinate lies between the origin and the first coordinate. Furthermore, the digital signals representing the second of the pair of spaced apart points along the selected one of the two axes are also compared with the signals representing the corresponding coordinate of the End Point and a lower bracket signal is produced and stored if it is found that the second coordinate lies between the origin and the corresponding End Point coordinate. The proximity test along the slow axis is satisfied if both the upper and lower bracket signals have been stored.

To store the upper bracket and lower bracket signals, an upper bracket flip-flop UBFF 503 and a lower bracket flip-flop LBFF 505 are provided. They comprise the principal components of the Storages for Slow Axis End Point Proximity Test unit 71" in FIG. 9e.

The first step in checking the slow axis for proximity to the End Point is to clear the Answer Register 53a by means of a control signal from the CAR PGA 351 (condition 7). During the same time period the J number is transmitted to the computer 53 from the register 101 if the X-axis is the fast axis and the I number is so transmitted if the X-axis is not the fast axis. In other words, the inverse radius vector component along the slow axis is read into the computer. This is the first step in forming the absolute number $|0.1J|$ or $|0.1I|$. The means for applying the necessary READ-gating signal to the appropriate one of the I and J registers 99 and 101 are indicated by condition 4 of the R/I PGA 400 and by condition 7 of the R/J PGA 391. In order to insure that the number read from one of the registers 99 and 101 is treated as an absolute value, i.e., so that its sign is disregarded, a Force Positive control signal is concurrently applied to the computer 53 from the "FP and CX" PGA 453 (condition 1).

As a result of the operations performed during step 1018·CIRC, at the end of the adder cycle associated with that step there is stored in the Answer Register 53a the quantity $|J|$ if the X-axis is the fast axis and the quantity $|I|$ if the Y-axis is the fast axis. In order to divide by 10 the absolute value stored in the Answer Register 53a, it is shifted one position to the right during the following step 1019 by a control signal applied to the computer from the SAR PGA 411 (condition 19). The number now stored in the Answer Register 53ab is therefore $|0.1J|$ or $|0.1I|$, depending upon the identity of the slow axis. In preparation for receiving the results of the slow axis proximity test the UBFF and LBFF flip-flops 503 and 505 are reset during the same program step 1019·CIRC by means of a common program gate 507.

To produce the signals representing the upper bracket coordinate, which is farther from the origin than the corresponding coordinate of the path segment, the absolute value $|0.1J|$ or $|0.1I|$ is added to the corresponding coordinate of the path segment, YCP or XCP, yielding as the end result YCP+ $|0.1J|$ if the Y-axis is the slow axis. Accordingly, during program step 1020·CIRC the macroposition number YCP is read into the computer 53 from the YCP register 115 if the X-axis is the fast axis and the corresponding number from the XCP register 117 is so read if the Y-axis is the fast axis. The necessary READ-gating signals for these alternative operations appear in Program Gate Arrays 425 and 421 as the condition 4. The resulting coordinate number YCP+ $|0.1J|$ or XCP+ $|0.1I|$ is shifted one position to the right during program step 1021·CIRC by a control signal, represented in SAR PGA 411 as condition 20, in order to bring it into alignment with the corresponding coordinate of the designated End Point YCEP or XCEP with which the upper bracket coordinate number is to be compared.

The computer is placed in the compare mode during program step 1022·CIRC by a control signal from the "FP and CX" PGA 453 (condition 4) and during the same program step the End Point coordinate corresponding to that built up in the Answer Register 53a during the preceding steps is transmitted to the computer 53 for comparison therewith from one of the registers XCEP and YCEP 95 and 97, as indicated by condition 4 in each of the Program Gate Arrays 359 and 487.

Let it be assumed that the path segment and its designated End Point are as shown in FIG. 32, and that therefore movement along the Y-axis is the slower. Accordingly, during program step 1022·CIRC the end point coordinate number YCEP is compared with the upper bracket coordinate YCP+ $|0.1J|$, shown in FIG. 32 as the point PL1. Means are provided to produce an upper bracket signal if the End Point coordinate YCEP lies between the upper bracket coordinate YCP+ $|0.1J|$ and the origin. Serving as a means for carrying out this function is the comparison circuitry of the computer 53 which is operative to produce a "greater than, or equal to" signal at its output 339 if the first of the compared quantities, YCP+ $|0.1J|$, is greater than or equal to the second of the compared quantities, YCEP. To store this "greater than" signal the output line 339 of the computer 53 is connected to the J input of the UBFF flip-flop 503 through a program gate 509 whose other inputs are conditioned to transmit the "greater than" signal appearing on the line 339 during program step 1023·CIRC. Accordingly, if the first test for proximity along the slow axis is satisfied, the upper bracket signal causes the flip-flop 503 to be set and is thus stored therein.

Continuing with the assumption that the Y-axis is the slow axis, during step 1024·CIRC the Answer Register 53a is cleared by a signal from the CAR PGA 351 (condition 8) in preparation for the following part of the slow axis proximity test. During the same program step the inverse component number from the J register 101 is transmitted to the computer 53 by a READ-gating signal from the R/J PGA 391 (condition 8). During the steps which follow, the J number thus read into the computer 53 is divided by 10 and then subtracted from the macroposition number YCP in order to produce the lower bracket signal representing the lower bracket coordinate shown in FIG. 32 as the point PL2. Consequently, a "force positive" signal is applied to the computer 53 from the "FP and CX" PGA 453 (condition 2) in order to cause the computer to ignore the sign of the J number. Additionally, a "Subtract" control signal is also applied to the computer from the SX PGA (condition 15) in order to cause the computer 53 to treat the J number as a negative number. Accordingly, when subsequently the J number is divided by 10 and added to the macroposition coordinate number YCP the result will be YCP− $|0.1J|$.

At the end of program step 1024·CIRC the number which is stored in the Answer Register 53a is $-|J|$ and during the following program step 1025·CIRC this number is shifted one position to the right and thereby divided by 10 by means of a "Shift Accumulator Right" control signal from the SAR PGA 411 (condition 21). The result is $-|0.1J|$. The YCP macroposition number is additively read into the computer 53 during the following step 1026·CIRC from the YCP register 115 by means of a READ-gating signal from the R/YCP PGA 425 (condition 10). The result of this operation is YCP− $|0.1J|$ ; i.e., the lower bracket coordinate point PL2 in FIG. 32.

A test is next performed to determine whether or not the coordinate point YCP− $|0.1J|$ lies between the origin and the corresponding coordinate YCEP of the designated End Point of the path segment. Stated differently, a comparison is made between the lower bracket coordinate number YCP− $|0.1J|$ and the corresponding End Point coordinate YCEP, and if the first of the compared quantities is the lesser, the test is satisfied. This test is shown in table VI to occur during program step 1028·CIRC. Preparatory to this comparison operation the lower bracket coordinate number YCP− $|0.1J|$ in the Answer Register 53ab is shifted one position to the right in order to bring its decimal point into alignment with the other of the compared quantities YCEP. This shift to the right occurs during program step 1027·CIRC in response to a control signal from the SAR PGA (condition 22).

During the next program step 1028·CIRC the computer 53 is placed in the compare mode by a control signal from the "FP and CX" PGA 453 (condition 5) and the YCEP End Point coordinate number is transmitted to the computer from the YCEP register 97 by a READ-gating signal applied thereto by its associated R/YCEP PGA 487 (condition 5). If the "lower bracket" test represented by this comparison is satisfied, an output will appear at the "less than" output line 341 of computer 53 indicating that the lower bracket coordinate YCP− $|0.1J|$ is closer to the origin than the designated End Point coordinate YCEP. This signal is applied to the lower bracket flip-flop 505 through a program gate 511 whose other inputs are conditioned to transmit the "less than" signal to the J input of flip-flop during program step 1029·CIRC. The flip-flop thus becomes set at the end of program step 1029·CIRC, storing the lower bracket signal, if the lower bracket test is satisfied.

Summarizing, if both of the tests carried out for proximity of the path segment to the designated End Point along the slow axis are satisfied, both of the flip-flops 503 and 505 become set and maintain UB and LB signals at their Q outputs indicative of their set condition. The system is now ready to perform the proximity test for the fast axis which has been assumed to be the X-axis.

Before continuing with the description of the proximity test for the fast axis a further observation should be made concerning the test which is described with reference to FIG. 32. As described with reference to FIG. 32, digital signals are produced to represent for a selected one of the axes a pair of coordinates which "bracket" the corresponding coordinate of the path being generated. A determination is then made as to whether or not the corresponding digitally signaled coordinate of the designated end point of the path lies between the first and second spaced-apart coordinates. It will be understood that an alternative but equivalent way of achieving the same result would be to produce for the selected axis digital signals representing a pair of coordinates which bracket, not the corresponding coordinate of the path, but the corresponding coordinate of the designated end point of the path. In this a determination would be made as to whether or not the corresponding coordinate of the path lies between the first and second spaced-apart coordinates which bracket the designated end point along the selected axis. More specifically, the digital signals representing the first bracketing coordinate would be processed together with the digital signals representing the corresponding coordinate of the path, an upper bracket signal would be produced if the corresponding coordinate of the path fell between the origin of the axes and the first bracketing coordinate, and the upper bracket signal would be stored. Similarly, a second set of digital signals representing the lower bracketing coordinate would be processed together with digital signals representing the corresponding coordinate of the path, a lower bracket signal would be produced if the second bracketing coordinate fell between the origin and the corresponding coordinate of the path, and the resulting lower bracket signal would also be stored.

(3) Proximity Test for the Fast Axis

The test which is performed during steps 1030·CIRC–1043·CIRC during each of the iterations shown in FIGS. 31–37 for detecting proximity to the designated End Point of a circular path segment along the fast axis is quite similar to the corresponding test performed during steps 1028·LIN 1043·LIN during each of the iterations shown in FIGS. 18, 21, 23 and 24 for a linear path segment. In essence the only significant difference between the two tests is in the number of macromoves by which the position along the path segment is projected forward. For a linear path segment this forward projection was shown to be 11 macromoves. For a circular path segment the look-ahead is reduced to a single macromove. In view of these similarities reference should be made to the previously given detailed description of the two-step proximity test for the fast axis given in section F.2.d(2) under the heading "Data Processing Steps Associated with Detecting a Projected Overrun." Briefly, and with particular reference to table VI, and to FIG. 32, during step 1030·CIRC, the Answer Register 53a is initially cleared by a signal from the CAR PGA 351 (condition 9) and an X-axis macromove number ΔX is entered into the computer 53 from the ΔX register 109 by a READ-gating signal from the R/ΔX PGA 409 (condition 12). From condition 12 of PGA 409 it is seen that the READ-gating signal will issue only if the X-axis is the fast axis. In the event that motion along the Y-axis is faster, the ΔY number is read, as indicated by condition 12 of the R/ΔY PGA 415.

During step 1031·CIRC a WRITE-gating signal is applied to the CP input of the ACNX flip-flop 465 of the Fast Axis Projected Overrun Detector 71 in FIG. 9e. This conditions the flip-flop 465 to be set if the sign of the ΔX macromove number just entered into the computer 53 is negative and to be reset if the ΔX number is positive. Since it is being assumed that the circular path in FIG. 32 is being generated and that the path is approaching the End Point XCEP, YCEP in the first quadrant, ΔX is positive and the ACNX flip-flop 465 is reset.

To produce the "look-ahead" number for the X-axis, the upgraded macroposition number XCP is read into the computer 53 during program step 1032·CIRC from the XCP register 117 by a READ-gating signal from the R/XCP PGA 421 (condition 3). Again it will be noted that condition 3 of PGA 421 includes the condition FAX so that the XCP number will only be read into the computer during step 1032·CIRC if the X axis is the fast axis. If this is not the case the number in the YCP register 115 is read instead, as indicated by condition 3 of the R/YCP PGA 425. The number stored at the end of the adder cycle associated with program step 1032·CIRC is XCP+ΔX. Since XCP is the upgraded macroposition number which is to be reached at the end of the present iteration, the look-ahead number XCP+ΔX is the position that is to be reached along the fast axis at the end of the following iteration. This number is shifted one position to the right in the Answer Register 53a by a control signal from the SAR PGA 411 (condition 23) in order to align the decimal point of the look-ahead number with the decimal point of XCEP, the X-coordinate of the End Point of the circular path. During step 1034·CIRC the End Point coordinate XCEP is subtractively read into the computer 53 by a READ-gating signal applied to the XCEP register 95 from its associated R/XCEP PGA 353 (condition 1).

The sign of the remainder of the subtraction operation performed during step 1034·CIRC is applied to the AND-gates 467 and 469 of the fast axis projected overrun detector 71. As indicated by the legends on the inputs of the AND-gate and as explained previously in section F.2.d.(2)(b), if the sign of the remainder is the same as the sign of the macromove number which was read into the computer 53 during step 1030·CIRC, the forward projected look-ahead point has passed the corresponding coordinate of the path End Point and this condition is indicated by an SST ("Same Sign Twice") signal appearing at the output 182 of the detector 71. The SST signal has the effect of advancing the End-of-Block Counter 186 by one count state during program step 1035·CIRC, but only if (a) the prior proximity tests for the slow axis End Point yielded a positive result, as indicated by the UB and LB outputs from the UBFF and LBFF flip-flops 503 and 505, and (b) the End-of-Block Counter was in state 1.

The means for producing a signal for advancing the End-of-Block Counter 186 under the aforesaid conditions is represented by condition 2 of the Program Gate Array 183. As indicated by the individual terms of the condition, such means would comprise coincidence gating means having eight inputs connected respectively to the 1000 output of the AND-gate group 175 of the Multimode Time Base Logic 67 in FIG. 9d, the 30 output of the converter 169 and the 5 output of the converter 167 in the Time Base and Digital Sweep, the CIRC output of the Path-Type Indicator 106, the UB and LB outputs of the flip-flops 503 and 505, the S1 output of the decoder 187 in the Time Base Mode Selector 69 and the SST output appearing on the output line 182 of the Fast Axis Projected Overrun Detector 71. It will be understood that each listed condition in PGA 183 represents such a coincidence gating means, also referred to herein as a "program gate," connected to receive the signals represented in that listed condition and that the outputs of all of the coincidence gating means are connected to the respective inputs of a single OR-gate in the manner shown in FIG. 16.

The next series of steps are directed to "retracting" the look-ahead point by one-half macromove in the same manner as explained previously in section F.2.d.(2)(c) with reference to a linear path. As described in that section, the number in the Answer Register 53a representing the look-ahead point is shifted to the left by two digit positions so as to give that number a "weight" of 10 (XCP+ΔX) relative to the macromove number in the ΔX register 109. This is caused to occur during program steps 1036·CIRC and 1037·CIRC by successive applications of Shift Left control signals from the SAL PGA 463 (conditions 2 and 3). During the following five program steps 1038-1042 the ΔX macromove number is read subtractively into the computer 53 from the ΔX register 109 by gating signals represented in the R/ΔX PGA 409 by condition 14. The remainder produced in the Answer Register 53a during the adder cycle associated with program step 1042·CIRC is 10(XCP+0.5ΔX−XCEP), or 10 times the difference between the upgraded XCP macroposition projected forward by one-half macromove less the designated End Point coordinate XCEP for the path. In the context of the example shown in FIG. 32, if an overrun has occurred and it exceeded one-half macromove, the sign of the remainder in the Answer Register 53a will be positive. The sign of this remainder is applied to the AND-gates 467 and 469 and if the sign is the same as that of the ΔX macromove, indicating a projected overrun even with only a one-half macromove forward projection, an SST signal indicative of this condition will appear on the output line 182 of the detector 71 during program step 1042·CIRC. By means of a program gate represented by condition 3 in the Program Gate Array 183 a signal is produced on the output line 184 of the array 183 in response to the SST signal during program step 1043·CIRC if the End-of-Block Counter 186 was previously advanced to its S2 (second) count state, as indicated by a signal on the S2 output of the decoder 187.

During a typical iteration for generating a circular path segment as shown in FIG. 31, no overrun is detected and the End-of-Block Counter 186 remains in its first count state so that a signal appears only on the S1 output of the decoder 187. Consequently, the blocks in column 1000 of FIG. 31 which represent advancement of the End-of-Block Counter 186 are crossed out. If a sufficient number of FIG. 31 type iterations have been carried out so that the path segment closely approaches its End Point XCEP, YCEP and if the first test for proximity to the fast axis End Point indicates an overrun but the second test does not, the counter 186 is stepped to its second count state S2 but not its third, as shown in FIG. 35. In this case, the counter will be automatically advanced to its third count state, S3, during the following iteration during program step 1014·S2 by means of a stepping signal represented by condition 4 of the PGA 183. This situation is represented by FIGS. 36 and 37 which represent the last iteration for a circular path segment following an iteration in which a small overrun was detected.

If, on the other hand, both tests for the fast axis indicate an overrun condition, i.e., if the projected overrun is more than one-half macromove along the fast axis, the End-of-Block Counter 186 is stepped to its S3 (third) count state during the same iteration, as shown in FIGS. 33 and 34. In such event, setup calculations for the following path segment are promptly carried out so that the current path segment may be terminated at the end of the iteration.

j. Data Processing Steps Directed to Changing Operation of the System From Mode 1 to Mode 4

To perform the setup calculation required to begin generation of the following path segment, the system must be placed in its fourth operating mode. It will be recalled that the exemplary embodiment of the system is placed in its fourth operating mode when the counter 186 reaches its count state S14. In the case of linear interpolation it was desirable to advance the End-of-Block Counter 186 by only one count state during each FIG. 22 iteration in order to carry out nine such iterations with adjusted macromoves. These intermediate iterations are not utilized with circular interpolation and, instead, it becomes desirable to switch the system over directly from mode 1 into its mode 4 operation during the iteration in which a large overrun is detected or during the iteration following that in which a small overrun has been detected. Consequently, means are provided for rapidly stepping the counter 186 from its S1 to its S14 count state during an iteration in which a large overrun has been detected, as shown in FIGS. 33 and 34 and to step it from its S2 to its S14 count state during the iteration following that in which a small overrun is detected, as shown in FIGS. 36 and 37. Means for rapidly advancing the End-of-Block Counter 186 to its fourteenth count state are indicated in the Program Gate Array 183 by conditions 5, 6 and 7–16.

To understand the manner in which the End-of-Block Counter 186 is rapidly stepped through several of its count states during a single iteration, let it be assumed that a large projected overrun has been detected during time period ΔT2500 so that the iteration is of the type shown in FIG. 33 or 34. The End-of-Block Counter 186 will have advanced to its S3 count state during step 1043·CIRC. By means of a program gate represented by condition 5 of the Program Gate Array 183 a further stepping signal will be applied to the End-of-Block Counter 186 during program step 1589·CIRC causing it to be advanced to its S4 count state which now puts the system in Mode 2. By means of another program gate, (PGA 183, condition 6) during the following program step, now 2590·CIRC, yet another stepping signal is applied to the counter 186 as a result of it having reached its S4 count state during the preceding program step, so that, at the end of program step 2590·CIRC the End-of-Block Counter 186 is stepped to its S5 count state. This results in a signal on the S5 output of the decoder 187 so that an M3 output signal is produced at the output of the OR-gate 190, putting the system in Mode 3. This M3 output signal is used as an input to each of nine further program gates represented by conditions 8–16 of the PGA 183. Each of these nine program gates are also conditioned by the CIRC output of the Path-Type Indicator 106, by the 3500 output of the group of AND-gates 179 in the MultiMode Time Base Logic 67, and the 90 output of the converter 169 in the Time Base and Digital Sweep 63. Finally, respective ones of the nine program gates represented by the conditions 8–16 receive outputs 1 through 9 of the Units Decoder 167 of the Time Base and Digital Sweep 63 so that respective ones of them produce an output signal during successive ones of the program steps 3591·CIRC–3599·CIRC, provided the OR-gate 190 of the MultiMode Time Base Logic 69 continues to produce an M3 signal.

The last of the stepping signals produced by the program gates represented by conditions 8–16 places the End-of-Block Counter 186 at count state S14. The S14 signal from the decoder 187 is passed through and appears at the output of the OR-gate 191 of the Time Base Mode Selector 69 as an M4 signal, which is applied to the AND-gates 181 of the MultiMode Time Base Logic 67, placing the system in its mode 4 operation.

If it were assumed instead, that only a small projected overrun of the End Point had been detected during a given iteration, the End-of-Block Counter 186 would be advanced during that iteration to its S2 count state only, as shown in FIG. 35. However, during the following iteration, which might be either of the type illustrated in FIG. 36 or of the type shown in FIG. 37, the End-of-Block Counter would be stepped to its S14 count state.

k. The reason for and Manner of Modifying the Data Representing the Next Path Segment The invention to be described in this and the following section is closely related to the generation of path segments as taught by John K. McGee and as described in several of the preceding sections. In order to place the present invention in proper context, the most pertinent of the preceding sections will be summarized briefly. What has been described, in short, is a method and the system for performing that method for moving a machine element or member at a controlled velocity along a series of path segments, any one of which may be either linear or circular. The starting point of each path segment is the same as the end point of the preceding path segment, i.e., the path segments are contiguous.

Each path segment is represented by a block of data from which there are initially derived the X- and Y-components I and J of the path segment if it is linear and the X- and Y-coordinate distances I and J from the starting point of the path segment to its prescribed center if it is circular. Each block of data also includes the composite velocity at which movement along its associated path segment is to occur, expressed as the "macromove quotient" V·ΔT/D or V·ΔT/R. From each block of data there are derived, during respective ones of a series of equal time periods ΔT, by a process called "interpolation," digital signals representing the X-coordinates XCP of a series of points lying on the path segment and the Y-coordinates YCP of a series of points lying on the path segment. During each of the time periods ΔT the machine element or member is moved along the X- and Y-axes to a new XCP, and a new YCP coordinate. The distance ΔX from a given XCP coordinate to the next XCP coordinate is so proportioned relative to the distance ΔY from the corresponding YCP coordinate to the next YCP coordinate that the composite motion of the element resulting from the respective motion through successive XCP and YCP coordinates will always be in the required direction to execute motion along the path segment. But there is no assurance that either coordinate of the end point of the path segment will coincide with the corresponding coordinate reached at the end of any one of the time periods ΔT. Indeed, without some special provision, it is almost certain that, were the element to continue to move, eventually, during one of the time periods ΔT one or both of the XCP and YCP coordinates to which the element is moved would lie past the corresponding coordinate of the end point of the path segment. Accordingly, movement of the element along the path segment is terminated at the end of that time period ΔT for which a selected one of the XCP and YCP coordinates falls closest to the corresponding coordinate of the end point. This may cause the end of the actually executed path segment to fall short of, or extend past, the starting point of the following path segment.

Therefore, were the next path segment to be derived from its associated data block as originally provided, its originally prescribed direction would remain unchanged, but its starting point would be different due to the underrun or overrun of the preceding path segment. In short, the new path segment, if it is linear, or its center, if it is circular, would be offset by the amount of underrun or overrun of the preceding path segment.

In accordance with the present invention, the I and J values in the data block representing the following path segment are altered so as to change their composite vector until it extends between the actual end point of the preceding path segment and the prescribed end point or center of the following path segment, depending upon whether it is linear or circular. In the preferred method in accordance with the present invention, this is accomplished by modifying each of the I and J components of the next path segment by an amount which is equal to the underrun or overrun of the end point of the preceding path segment along the corresponding coordinate axis. For example, if the preceding path segment stops short of its prescribed end point by an amount ΔX along the X-axis and by an amount ΔY along the Y-axis, than the I and J values for the following path segment, whether it be linear or circular, are modified to I+ΔX and J+ΔY. If there is an overrun of ΔX and ΔY instead, the I and J values are modified to I−ΔX and J−ΔY.

Taking a specific example, let it be assumed that a large projected overrun was detected during time period ΔT2500 and that the next path segment to be generated is linear. The iteration, therefore, is that shown in FIG. 33. Having detected during column 1000 of the iteration that the fast axis coordinate of the end point would be greatly overrun by the end of the following iteration; i.e., during time period ΔT2501, the system performs steps to terminate the current path segment at the end of the present iteration; that is, at the end of time period ΔT2500, and to begin the following path segment at the start of time period ΔT2501. The setup computations utilizing I and J to compute ΔY and ΔX for the following path segment are performed during column 4800 and 4900 of the FIG. 33 iteration, but since the current path segment has been stopped short of its designated End Point a correction is made to the I and J values and these corrections are made during column 4600 of the iteration.

1. Data Processing Steps Directed to Modifying the Data Representing the Next Path Segment The first of the numbers to be corrected is I and, therefore, the first step in the correction process is to compute the correction to be made to I. This correction is XCEP−XCP, or the difference between the X coordinate of the path segment end point and the X coordinate of the path segment at the end of the last iteration for the path segment. The steps for carrying out this computation appear in column 4600·CIRC of table I in section F.2a. (1). The XCEP number is read into the computer 53 during program step 4615·CIRC from the XCEP register 95 by a READ-gating signal applied to the register from the R/XCEP PGA 359 (condition 3). The number appears in the Answer Register 53a during the following program step 4616·CIRC and is shifted one position to the left by a control signal from the SAL PGA 463 (condition 10) in order to bring it into alignment with the XCP number which is to be subtracted therefrom during the next program step 4617·CIRC. During that program step the number XCP is transmitted to the computer 53 from the XCP register 117 by a gating signal from the R/XCP PGA 421 (condition 5) and in response to a subtract control signal from the SX PGA 479 (condition 8). The remainder, XCEP−XCP appears in the Answer Register 53a during the next program step 4618·CIRC and represents the correction number which is to be added to the I number representing the next path segment and currently in the buffer register 471.

The I number is additively read into the computer 53 from the I buffer register 471 during program step 4618·CIRC by a READ-gating signal from program gate 349. The result, I+(XCEP−XCP), is the corrected I number for the following path segment and is entered into the I active register 99 during program step 4619·CIRC by a WRITE-gating signal from the W/I PGA 355 (condition 2). Next, the J number in the J buffer register 47J is modified and in preparation the Answer Register 53a is cleared by a control signal from the CAR PGA 351 (condition 14). During the same program step, following the clearing of the Answer Register 53a, the YCEP number is entered into the computer 53 from the YCEP register 97 by a READ-gating signal from the R/YCEP PGA 487 (condition 3). The number thus entered into the computer and lodged in its Answer Register 53a is shifted one position to the left during program step 4621·CIRC by a Shift Left Control signal from the SAL PGA 463 (condition 11). Next, the YCP number is subtractively entered into the computer 53 from the YCP register 115 by a READ-gating signal from the R/YCP PGA 425 (condition 9) and by a signal from the SX PGA 479 (condition 9). The result, appearing in the Answer Register 53a during the following program step 4623·CIRC, is YCEP−YCP, or the correction number for the J number in the buffer register 47J. That number is additively entered into the computer 53 during program step 4623·CIRC by a READ-gating signal applied to the register from its associated program gate 353 and the J number is automatically added to the previously computed correction number resulting in the storage during program step 4624·CIRC in the Answer Register 53a of the corrected J number J+(YCEP−YCP). This corrected J number is entered from the Answer Register 53a into the J active register 101 during program step 4624·CIRC by a WRITE-gating signal from its W/J PGA 357 (condition 2).

The remaining operations carried out during column 4600·CIRC need not be described at this point since they are identical to the corresponding operations described with reference to the iteration shown in FIG. 17. They relate to the transfer from buffer to active of the X and Y components XCEP and YCEP of the next path segment, adding to them the necessary offset corrections stored in the XOFF and YOFF registers 365 and 367 and to the transfer of the Q number from the buffer to active.

Similarly, the computational steps carried out during column 4800 for computing the ΔY number, and during column 4900 for computing the ΔX number are identical to those described in detail previously with reference to FIG. 17 and need not be considered again at this point.

The method of modifying the data representing the next path segment which has been described in this and the preceding section is particularly designed for the system disclosed herein. Thus the method lends itself best to an exemplary system in which the I and J values are precalculated externally. However, as has been pointed out in Section F.2a. (2), the X- and Y-components I and J of the successive path segments need not be precalculated externally and need not be applied in that form to the system. Instead, the X- and Y-coordinates of the desired end point of the successive path segments might be given on the tape for each block and the I and J numbers for each given path segment could be calculated by the system by subtracting from the X and Y end point coordinate numbers of that path segment the corresponding coordinate numbers of the previous path segment given in the previous data block. If the exemplary system were modified to operate in this manner, the feature of the present invention would be equally applicable without departing from the scope of the invention.

Let it be assumed, for example, that a path composed of a series of linear path segments is to be generated and that the linear path segments are joined at designated path segment end points P with the X- and Y-coordinates of the end points of each path segments being made part of the block of data fed to the system for the system of the path segment. The first step in the process carried out by the exemplary system in such a case would be to represent by digital signals the X- and Y-components I and J of the first of the path segment, the digital signals being derived by the system from the X- and Y-components of the starting point of the first path segment and the X- and Y-components of the end point of that path segment, all of which would be fed to the system. Successive target positions would then be derived for the first path segment by the system from the digital signals representing its I and J components through a process of interpolation substantially as described previously and the path would be extended along the X and Y axes toward the designated end point P of the first path segment in accordance with the target positions. Finally the segment would be terminated close to, but not necessarily at, its designated end point for the reasons that have been explained in this and the preceding section.

In accordance with the present invention, instead of first computing a pair of coordinate distances I and J for the following path segment, which would then have to be corrected because of the failure of the previous path segment to end exactly at its designated end point, the I and J values for that following path segment would be initially calculated in such a manner as to obviate the need for a correction. Specifically, digital signals representing the X and Y coordinate distances I and J from the actual point of termination of the first path segment to the designated end point of the next path segment would be produced and these signals would then be used to produce through the previously disclosed process of interpolation the digital signals representing successive target positions along the X- and Y-axes for the next path segment. Since the distances I and J thus represented by digital signals would extend from the actual point of termination of the first path segment rather than from the originally programmed end point for that path segment, a compensation will have been made for the failure of the first path segment to terminate exactly at its designated end point.

For each of the following path segments the digital signals representing the X and Y coordinate distances I and J would be calculated by the system in the same manner, so that they would extend from the actual point of termination of each path segment to the designated end point of the next path segment.

m. Return of the System to Mode 1 Operation for Executing the Next Path Segment After the $\Delta Y$ and $\Delta X$ macromove numbers have been computed during columns 4800 and 4900 of the FIG. 33 iteration, the last number G in the data block, representing the following path segment 27d of FIG. 2, which is linear, is transferred from buffer to active during steps 4973 ($G_{01}$)–4974 ($G_{01}$) shown in column 4900·$G_{01}$ of table II, section F.2a. (2)(a). Referring further to table II, the tape reader 41 is started during step 4995 ($G_{01}$) in response to a signal applied to the J input of the flip-flop 257 in FIG. 9–1. This initiates reading from the tape into buffer of the data block representing the path segment which follows the path segment whose data block was just transferred from buffer to active. The only steps remaining to be performed during the FIG. 33 iteration prior to commencement of the execution of the following path segment is to switch the system into its mode 1 operation by advancing the End-of-Block Counter 186 through its S15 and S16 count states into its S1 count state by means of three successive signals produced by the Program Gate Array 183 during program steps 4997·$G_{01}$, 4998·$G_{01}$ and 4999·$G_{01}$. The program gates required are represented in the Program Gate Array 183 by conditions 19, 20 and 21. With the End-of-Block Counter 186 in its S1 count state the signal appearing at the S1 output of the decoder 187 is applied to and produced on the output of the OR-gate 189 of the Time Base Mode Selector 69 as the signal M1 enabling the AND-gates 175 and placing the system in its mode 1 operation.

H. Detailed Description of a Servomechanism for Executing a Path Segment in Accordance with Interpolated Microposition Numbers In the preceding sections a detailed description has been given of the generation of electrical position command signals. There will now be described in detail a pair of servomechanisms referred to previously with reference to FIG. 7A as elements 75 and 77 which are suitable for moving the machine element 14 in accordance with the X- and Y-axis macroposition command signals XCP and YCP and, more specifically, in accordance with the X- and Y-axis microposition command signals XSC and YSC.

Referring to FIG. 9, the numerical control system there shown includes a pair of servomechanisms 75 and 77 for translating the movable element 14 along X and Y axes according to the numerically defined command signals generated in accordance with the present invention. Since the servomechanisms may be identical, only one need be described. The movable element 14 is translated through distances and at velocities along the X-axis corresponding to the numerically defined X-axis commands which appear in the XSC register 121 by appropriate energization of the reversible servomotor 21 connected to turn the lead screw 20. Engaged with the lead screw through a nut (not shown) and fixed to the element 14 is the ram 16 (these elements having been described previously with reference to FIG. 1). The element 14 is moved with the ram in a −X or +X direction (toward the left or toward the right in FIG. 9a) and at speeds corresponding to the magnitude and polarity of a DC voltage applied to the servomotor 21 by a servoamplifier 521. The manner in which the signal for driving the servoamplifier 521 is generated will be described hereinafter.

Stated briefly, a comparison is made between the instantaneous position of the movable element 14 and the command signal. Based on this comparison an error signal is produced whose sense and magnitude correspond to the sign and extent of the error which exists between the instantaneous directed and actual positions of the element. In this manner, the velocity of the element is made to correspond to the rate of change in the commanded instantaneous position.

Provision is made to generate a feedback signal whose phase relative to a reference signal is indicative of the actual instantaneous position of the movable machine element 14. In the exemplary arrangement shown in FIG. 9a the 500 c.p.s. output B of the sine wave shaper 181 (FIG. 9b) is used.

To provide an indication of the actual instantaneous position of the movable element 14, a resolver 523 is provided for producing a recurring feedback signal which is indicative by the sense and magnitude of its phase angle, relative to the reference signal B, of the sign and extent of the displacement of the movable element from a datum position. It comprises a stator with stator windings 525 and 527 associated with a rotor carrying a rotor winding 529. The resolver rotor is mechanically coupled through suitable gearing (not shown) to the lead screw 20, so that as the latter is turned by the servomotor 21, the resolver rotor turns with it. As a specific example, the resolver rotor may be geared to the lead screw 20 so that it makes one revolution for each 0.1 inch of travel by the movable element 14.

The resolver 523 is excited by the sinusoidal reference signal B fed to its rotor winding 529. The resulting pulsating magnetic field induces a pair of sinusoidal signals in the stator windings 525 and 527 with the amplitude of the output signals varying as sine and cosine functions of the angular position of the movable rotor winding 529 with respect to the stator windings.

By means of a phase shifter 531 the variable amplitude sinusoidal signals appearing across the resolver stator windings 525 and 527 are converted into a single sinusoidal signal C which is of constant amplitude but whose phase relative to that of the sinusoidal reference signal B shifts 360° with each complete rotation of the resolver rotor. In the illustrated example, for each 0.1-inch movement of the machine element 14, the resolver rotor winding 529 is rotated 360° so that with each such movement of the element the feedback signal C is shifted by 360° relative to the reference signal B. As the machine element 14 continues to move, the feedback signal C is brought into phase with the reference signal B at successive "datum" positions spaced 0.1 inches apart. When the element 14 is moved to the left or to the right of such a datum position, the sense and magnitude of the phase angle $\phi 2$ between the midcycle points of the feedback signal C and the reference signal B reflects the sign and extent of the displacement of the element from that datum position.

The phase relationships just described are illustrated in FIGS. 38a–c. In FIG. 38a the feedback signal C lags the reference wave B by a small angle $\phi_{2a}$ indicating that the movable element 14 is on one side, say to the right, of one of the datum points. In FIG. 38b the feedback signal C lags the reference wave B by a larger angle $\phi_{2b}$, indicating that the element 14 is further away from the datum position compared to the case illustrated by FIG. 38a. FIG. 38c illustrates the relative phases of the feedback signal C and the reference wave B when the movable element 14 is on the opposite side of a datum position from that illustrated in FIGS. 38a and 38b. In such a case the feedback signal C leads the reference wave B by an angle $\phi_{2c}$.

As explained previously in section F.1.a. (1) with reference to FIGS. 9b and 10, provision is made in the system to produce signals digitally representing a reference number which during successive time intervals repeatedly and cyclically changes in small uniform increments from a first to a second predetermined value. The signaled reference number itself thus undergoes successive cycles of variation, relative to which a repeating signal may vary in phase.

More particularly, digital sweep generating means, shown in FIG. 9b as the cycling binary counters 131, 133, 135, are provided to produce binary coded decimal signals which change to signal a reference number that increases linearly in uniform steps at uniform time intervals during each cycle of the reference wave B. The reference number thus cyclically increases from a minimum value (e.g., 000) to a maximum value (e.g., 999) and then repeats, in synchronism with the reference wave B. In effect, therefore, each increment of the reference number corresponds to one time portion of a cycle of the reference wave, the latter being divided up into many small time intervals equal in number to the number of counts or increments in the reference number variation.

The phase relations here assumed between the reference square wave A, the reference wave B, and the number signaled by the cycling counters 131, 133 and 135 (as indicated by the positively sloped line D) is shown in FIG. 38a. The vertical scale to the left of the line D indicates that, during a complete cycle of the reference square wave A, the reference number D signaled by the cycling counters 131–135 increases from 000 to 999 at a uniform rate, and that the midpoint of the square wave A occurs at the instant when the cycling counters are just turning 500, the middle of their total range. The same relationships apply to the reference wave B, since it is assumed to be in phase with wave A.

Provision is made to produce a repeating signal F (called "compare signals") at each instant when the cyclically changing and digitally signaled reference number is equal to the periodically changing digitally signaled command number. In this way, the phase angle or phase modulation of the repeating signal F varies in sign and magnitude (relative to the cycling intervals of the reference number signaled by the digital sweep counters 131–135) according to the sense and extent of the changes in the microposition command number. More specifically, the repeating signal F is produced by comparing the cyclically changing reference number D, or digital sweep, against the dynamically changeable command number E, so that the phase angle of that repeating signal changes in sense and extent (relative to the recurring reference wave B, which is fixed in phase relative to the cycling intervals of the reference number) according to the sense and extent of the difference between (a) the midpoint value (e.g., 500 as here described) of the cyclically changing reference number D and (b) the instantaneous value of the updated command number E. Thus, the digital intelligence of the dynamically changing command number E is converted into a corresponding phase analog variation, since the phase angle between the repeating signal F and the reference wave B changes by amounts, in a sense, and at an average rate which correspond respectively to the amount, sense and average rate of change of the command number.

As shown in FIG. 9d, this comparison of two digitally represented but changing numbers is effected by connecting the twelve output lines of the cycling counters 131–135 and the 12 output lines of the updated XSC register to the respective inputs of a fast-acting multidigit comparing device 533. The comparing device operates to produce a compare signal F in the form of a short pulse on its output line 533a only when the reference number digitally represented in binary code on the output lines of the counters 131–135 is equal to the updated command number digitally represented in binary code on the output lines of the XSC register 121.

At some value of the reference number, during each cycle thereof (from 000 to 999) it will become equal to the digitally signaled XSC microposition command number because the latter, being a three-digit decimal number, will always fall within the range spanned by the cyclically changing reference number. Thus, a compare signal F will be produced at some instant during each cycle of the digital sweep counters 131–135 and the train of pulses F recurring at a nominal rate of 500 per second will by their variation in phase, relative to the reference wave B, represent the corresponding changes in the XSC command number.

The manner in which the compare signals F, i.e., the phase variable command signal, change in phase relative to the reference signal B is illustrated in FIGS. 38a, b, c. In these figures, the number held in the XSC register 121 is represented by the horizontal lines E, and the instant of equal comparison is indicated by their intersections with the lines D representing the cyclically changing reference number.

Since the reference number D increases from its minimum to its maximum value once during each cycle of the reference signal B, the instant, or phase, during the cycle of the reference signal B when the compare signal F occurs is unambiguously determined by the amount to which the reference number D has increased when it becomes equal to the command number E. Hence, the phase of the compare pulse F with reference to the phase of the reference wave B is determined by the magnitude of the command number E, so that the compare signal F is itself a time phase command signal.

To cause the movable element to advance at uniform velocity in small "micromove" increments in conformance with the larger generated "macromove" increments generated by the system, the information in the XSC storage register 121 is periodically updated in the manner explained in detail previously in section F.2.b.

FIGS. 38b and 38c show two examples of updating, both at the same instant $t_u$ during the cycle of the reference signal B. In the example of FIG. 38b, the command number E is reduced by updating, while in the example of FIG. 38c the change is in the opposite direction. It is important to note that the instant of occurrence of the compare signal F is determined by the magnitude of the updated command number E.

The time phased command signal F and the variable phase feedback signal C are caused to operate a single bistate device whose outputs are then used to produce a polarized error signal which is indicative of the magnitude and the sense of the error phase angle between the phase command and feedback signals. The bistate device, shown as a flip-flop 535, has two stable states which will be referred to as "0" and "1" states. The flip-flop 535 is set into its 1 state by the compare signal F, fed to its "set" input terminal S from the output of the comparing device 533 at the instant when the reference number D becomes equal to the command number E.

Means are also provided for resetting the flip-flop 535 into its 0 state at the instant of each positive-going zero crossing of the feedback signal C. The positive-going zero-crossing signal for resetting the flip-flop is derived from the feedback signal C by means of a square wave shaping circuit 537. At one of its output terminals the square wave shaper 537 produces a first square wave G which is in phase with the feedback signal C. The square wave G is fed to a unipolar differentiating circuit 539 whose output is connected to the reset input terminal R of the flip-flop 535. In response to each positive-going wave front of the square wave G, and hence at the positive-going zero crossings of the feedback signal C, the differentiating circuit 539 produces a triggering pulse which resets the flip-flop.

The flip-flop 535 has a pair of output terminals labeled 1 and 0. When the flip-flop is in its 1 state, the 0 output produces a logic signal which is at the logical 0 level and the 1 output produces a logic signal at the logical 1 level. In the embodiment illustrated in FIG. 9a, the logical 0 level is positive relative to the logical 1 signal level. When the flip-flop is reset into its 0 state, the logic signals at its outputs are reversed with a logical 1 signal appearing at the 0 output and a logical 0 signal appearing at the 1 output.

At a second output terminal, the square wave shaper 537 produces a complement of the square wave G, such complement being labeled $\overline{G}$. Thus, at all times, the square wave shaper produces at its two outputs a pair of bivalued logic signals, one signal $\overline{G}$ being at a relatively low, binary logic 1 level during each positive half-cycle of the feedback signal C and at a binary 0 level during each negative half-cycle of the feedback signal. The other square wave signal G is at a low, binary logic 1 level during each negative half-cycle and at a binary 0 level during each positive half-cycle of the feedback signal (FIG. 38a).

In order to produce a polarized DC signal which is indicative of the sign and magnitude of the error phase angle between the feedback signal C and the compare signal F, the complement output $\overline{G}$ of the square wave shaper 537 and the 1 output PH of the flip-flop 535 are applied to a first AND-gate 541, and the G output of the square wave shaper 537 and the 0 output $\overline{H}$ of the flip-flop 535 are applied to a second AND-gate 543.

The outputs of the AND-gates 541 and 543 are connected to control terminals 545 and 547 of two current generators respectively. The generators work into a common load resistor 553 but are oppositely poled so that when the negative current generator 549 is turned on, current flows from ground through the resistor 553 and through the generator 549 into a negative terminal 555, thus establishing a negative voltage K across the resistor. Conversely, when the positive current generator 551 is turned on, current flows from a positive terminal 557 through the generator 551 and the resistor 553 into ground, causing a positive voltage L to appear across the resistor. Regardless of which current generator is turned on, the size of the signal across the resistor 553 is kept at a predetermined magnitude by a bipolar Zener diode 559, having the same Zener voltage in both directions.

When the compare signal F leads the negative-going zero-crossing point $C_0$ of the feedback signal C, the first AND-gate 541, controlled by the $\overline{G}$ and H signal outputs of the wave shaper 537 and the flip-flop 535 produces a pulse, labeled in FIGS. 9a and 38b as "ENABLE K," and turns on the "negative" current generator 549 so as to produce a negative signal K across the resistor 553 for a time interval which is directly proportional to the amount of the phase lead.

Similarly, when the compare signal F lags the point $C_0$, the second AND-gate 543 under the control of the signals G and $\overline{H}$ produces a pulse shown as "ENABLE L" and turns on the "positive" current generator 551 to produce a positive signal L across the resistor 553, again for a time interval directly proportional to the amount of the phase lag.

The manner in which the square wave shaper 537, the flip-flop 535, the AND-gates 541 and 543 and the current generators 549 and 551 cooperate to produce the bipolar K and L signals is shown by the various signals in FIGS. 38a-c, but will not be described here. For a detailed explanation, reference should be made to the copending patent application of John K. McGee for Apparatus for Controlling the Instantaneous Positions and Velocities of Movable Elements According to Digital Numerical Commands, Ser. No. 555,048, filed June 3, 1966. Suffice it to say that, with the compare signal F leading the negative-going zero-crossing point $C_0$ of the feedback signal C, a negative signal, shown at K in FIG. 38b, is generated during a period which begins with the compare signal F and which ends with the next negative-going zero crossing of the feedback signal C.

If the compare signal F lags behind the same arbitrary point $C_0$ of the feedback signal C, a positive signal, shown at L in FIG. 38c, is generated during a period which commences with the negative-going zero crossing of the feedback signal C and ends with the occurrence of the compare signal F.

As the movable element 14 is being translated, the compare signal F representing the desired position and rate of change of position of the element 14 will lead or lag the negative-going zero crossing point $C_0$ of the feedback signal C through several cycles, depending upon whether the element is being driven in the +X or −X direction. To convert the variable width, constant amplitude pulses K or L into a smoothly variable control signal, e.g., a polarized variable DC voltage suitable for application to a servoamplifier and thence to the servomotor 21, they are averaged by a low-pass filter 561. The output of the low-pass filter 561 is thus a polarized DC signal representative of the sense and magnitude of the average error phase angle between the compare signal F and the negative-going zero crossing $C_0$ of the feedback signal C over several cycles. After amplification by the servoamplifier 521, the DC error signal is applied to the servomotor 21 causing it to drive the movable element 14 in a direction and at a velocity which conforms with the direction and rate of change in the phase of the compare pulse F, that is, in a sense and at a rate directed by the sequence of XSC microposition command signals developed by the system. As soon as the phase angle of the command phase pulse F begins to change, and the error phase angle departs from zero, the servomotor 21 begins to move, so that the phase of the feedback signal C is shifted by the resolver 523 in a direction to restore the error phase angle to zero. Thus, the instantaneous position error in practice does not exceed 0.05 inch and the single fine resolver 523 is sufficient to keep the system tracking the dynamically changing microposition along the X axis.

What has been described in the foregoing paragraphs is a particularly suitable filtering servo drive for moving the element 14 along the X axis in accordance with the digital command number XSC developed by the system. The means for driving the movable element 14 along the Y axis in accordance with the Y-axis microposition command signal YSC include a second compare circuit 563, shown in FIG. 9d, which may be identical to the compare circuit 533 also shown in that figure. In response to the YSC command signal received over the trunk lines 81, the compare circuit produces a compare pulse shown as the "Y-axis command" pulse. This pulse is applied to the Y-axis servomechanism 77, shown in 9a as a single block. Its construction may be identical to that of the X-axis servomechanism 75, as shown in FIG. 9a in detail. Thus, the Y-axis servomechanism 77 includes the motor 25 (FIG. 1) which is operative to move the element 14 vertically with the ram 15 through the drivescrew 24.

I claim:

1. A method of operating an iterative data processing apparatus to generate final digital signals which change with time to define a path along X- and Y-axes composed of a series of path segments joined at designated path segment end points P, any segment being either linear or circular, said method including the steps of a. representing by digital signals in said apparatus the X- and Y-components I and J of each linear path segment, and the X and Y coordinate distances I and J from the starting point of each circular path segment to the center of each said circular path segment,
   b. causing said apparatus to measure off successive periods of ΔT in actual time,
   c. processing the digital signals for the first of said path segments to derive therefrom first and second sets of digital signals representing target positions to be reached along said X- and Y-axes at the ends of successive ones of said periods ΔT,
   d. progressively changing said final digital signals during successive ones of said periods ΔT to extend the defined path along said X- and Y-axes to the target positions for said respective time periods,
   e. terminating the extension of said first path segment along both of said X- and Y-axes at the end of a period ΔT which is either
      1. the first time period ΔT for which the target point along a selected one of said X- and Y-axes is past the corresponding coordinate of the designated end point P of said path segment, or
      2. the time period ΔT preceding said first time period, said method being characterized by the additional steps of
   f. producing digital signals representing the I and J components of the next path segment altered respectively by the X and Y coordinate distances from the actual end point reached at the termination of said first path segment to the designated end point P of said first path segment,
   g. processing the digital signals representing the altered I and J components corresponding to said next path segment to derive therefrom first and second sets of signals representing the target positions to be reached along said X- and Y-axes at the end of successive ones of said time periods ΔT;
   h. performing steps (d) and (e) for said next path segment, and
   i. repeating steps (f), (g) and (h) for each succeeding path segment.

2. In a method of operating an iterative data processing apparatus to produce final digital signals which change with time to define a path along X- and Y-axes composed of a series of path segments joined at designated path segment end points P, any segment being either linear or circular, said method including the steps of a. representing by digital signals in said apparatus the X and Y components I and J of each linear path segment and the X and Y coordinate distances I and J from the starting point of each circular path segment to the center of each such circular path segment, b. deriving for the first of said path segments, from its signaled I and J components, digital signals representing successive target positions to be reached at regularly recurring successive time instants along the X and Y axes, c. progressively changing said final digital signals to extend the defined path through said first path segment along said X and Y axes toward its designated end point P in accordance with said target positions, and d. terminating said first path segment close to its designated end point P, the improvement comprising the steps of e. producing digital signals in said apparatus representing the I and J components of the next path segment altered respectively by the X and Y coordinate distances from the actual end point reached at the termination of said path segment to the designated end point P of the path segment being terminated, and f. utilizing said altered I and J components to produce digital signals representing successive target positions along the X and Y axes for the next path segment.

3. In a method of operating an iterative data processing apparatus to generate final digital signals which change with time to define a path along X and Y axes composed of a series of path segments joined at designated path segment end points P, any segment being either linear or circular, said method including the steps of a. representing by digital signals in said apparatus the X- and Y-components I and J of each linear path segment and the X- and Y-coordinate distances I and J from each circular path segment starting point to the center of each such circular path segment, b. deriving for the first of said path segments, from its signaled I and J components, digital signals representing successive target positions to be reached at regularly recurring instants along the X- and Y-axes, c. progressively changing said final digital signals to extend the defined path through said first path segment along said X and Y axes toward its designated end point P in accordance with said target positions, (c1) terminating said first path segment near its designated end point, and d. producing digital signals representing the I and J components $I_{next}$ and $J_{next}$ of the next path segment, the improvement comprising the additional steps of e. determining, and representing by digital signals, the X and Y coordinate departures $\Delta X$ and $\Delta Y$ from the actual end point reached at the termination of said first path segment to the designated end point P of the said first path segment, and f. processing the signals representing said components $I_{next}$ and $J_{next}$ and said departures $\Delta X$ and $\Delta Y$ to digitally signal therefrom a pair of modified components $I_n = I_{next} + \Delta X$ and $J_n = J_{next} + \Delta Y$, and utilizing the signaled components $I_n$ and $J_n$ to perform steps (b) and (c) for said next path segment, thereby compensating the next path segment for the error in termination of the first path segment.

4. In a method of operating an iterative data processing apparatus to generate final digital signals which change with time to define a path along X and Y axes composed of a series of path segments joined at designated path segment end points P, any segment being either linear or circular, said method including the steps of a. representing by digital signals in said apparatus the X and Y components I and J of each linear path segment and the X and Y coordinate distances I and J from the starting point of each circular path segment to the center of each such circular path segment;

b. deriving for the first of said path segments, from its signaled I and J components, digital signals representing successive target positions to be reached at regularly recurring instants along the X and Y axes, c. progressively changing said final digital signals to extend the defined path through said first path segment along said X and Y axes toward its designated end point P in accordance with said target positions, d. terminating said first path segment near its designated end point P and at an actual terminating end point which is one of said target positions e. producing digital signals representing the I and J components $I_{next}$ and $J_{next}$ of the next path segment, the composite vector of said components $I_{next}$ and $J_{next}$ extending from the designated end point of said first path segment, the improvement comprising the additional step of f. processing said $I_{next}$ and $J_{next}$ signals to derive therefrom digital signals representing said $I_{next}$ and $J_{next}$ components so modified as to change their composite vector until it extends from said actual terminating end point of said first path segment
  1. to the designated end point of the next path segment if said next path segment is to be linear and
  2. to the center of said next path segment if said next path segment is to be circular.

5. In a method of operating an iterative data processing apparatus to generate final digital signals which change with time to define a path along X and Y axes composed of a series of linear path segments joined at designated path segment end points P, said method including the steps of a. representing by digital signals in said apparatus the X and Y components I and J of the first of said path segments, b. deriving for said first path segment from the digital signals representing its I and J components further digital signals representing successive target positions to be reached at regularly recurring instants along the X and Y axes, c. progressively changing said final digital signals to extend the defined path through said first path segment along said X and Y axes toward its designated end point P in accordance with said target positions, and d. terminating said first path segment close to its designated end point and at an actual terminating end point which is one of said target positions, the improvement comprising the steps of e. producing digital signals representing the X and Y coordinate distances $I_n$ and $J_n$ from the actual point of termination of said first path segment to the designated end point P of the next path segment, and f. utilizing the digital signals representing said distances $I_n$ and $J_n$ to produce digital signals representing successive target positions along the X and Y axes for said next path segment.

6. The method set out in claim 1, further including the steps of:

d1. computing and digitally signaling, during each of the periods $\Delta T$, the forecasted overrun distance along one of said axes from (i) the designated end point P for said first segment to (ii) the target position to be reached at the end of the next succeeding period $\Delta T$, e1. carrying out said step (e) according to the phrase (e)(1) whenever said signaled forecasted overrun distance is greater than one-half the distance along said one axis between successive target points being signaled as defined in step (c), and e2. carrying out said step (e) according to the phrase (e)(2) whenever said signaled overrun distance is less than one-half the distance along said one axis between successive target points being signaled as defined in step (c).

7. The method set out in claim 1, wherein said step (e) includes:

e1. during each time period $\Delta T$, comparing for one of the X and Y axes, the coordinate of the designated end point P of the first segment with the coordinate of the target point to be reached at the end of the next period $\Delta T$, to detect and signal if a forecasted overrun may occur during such next period, e2. determining and signaling whether said forecasted overrun is greater or less than one-half the distance along said given one axis between successive target points, and e3. terminating the extension of said first path segment (i) at the end of the time period ΔT in which a forecasted overrun greater than said one-half is signaled, or (ii) at the end of the time period ΔT which next follows a period ΔT in which a forecasted overrun less than said one-half is signaled.

8. The method set out in claim 7 further characterized in that said one axis is that one of the X or Y axes for which the progressive change of said final digital signals occurs at the fastest rate.

9. The method defined in claim 2 further including the steps of c1. determining and signaling during the interval between each pair of time instants $t_a$ and $t_b$ whether the target position to be reached at the next succeeding instant $t_c$ will result in a forecasted overrun along the fast axis beyond the fast axis coordinate of the designated end point P for the first segment, c2. in response to such signaling of an overrun, carrying out said step (d) to terminate the extension of said first path segment either (i) at the instant $t_b$ if the forecasted overrun along the fast axis is greater than one-half the distance between successive target positions or (ii) at the instant $t_c$ if the forecasted overrun along the fast axis is less than one-half the distance between successive target positions.

10. The method defined in claim 9 further including operations to determine whether the path being defined by said progressively changing final digital signals is in fact approaching a designated end point P having coordinates $X_p$, $Y_p$ relative to orthogonal X and Y axes, and comprising the steps of c3. generating first and second digital signals representing first and second coordinates spaced apart along the slow axis of path progression and lying respectively farther than and nearer than the corresponding coordinate $X_p$ or $Y_p$ from the origin of said axes, c4. determining and signaling if said corresponding coordinate $X_p$ or $Y_p$ lies between said first and second spaced apart coordinates, and c5. executing said step (c2) as recited in claim 13 only if signaling is produced as a consequence of said step (c4).

11. The method determined by claim 3 wherein said steps (e) and (f) include:

f1. digitally signaling a pair of modified components $I_n = I_{next} + \Delta X$ and
   $J_n = J_{next} + \Delta Y$ wherein the respective additions of the terms ΔX and ΔY are performed in an algebraic sense taking into account the sign of such terms, and e1. determining and signaling the departures ΔX and ΔY by computations

ΔX=XCEP−SCP
   ΔY=YCEP−YCP where XCP and YCP are respectively the signed coordinates of the actual end point at termination of said first path segment, and XCEP and YCEP are respectively the signed coordinates of the designated end point P for the first path segment.

12. In a method of operating an iterative data processing apparatus to generate final digital signals which change with time to define a path relative to X and Y axes and composed of a series of circular arc path segments joined at designated segment end points P, the steps which include a. representing by digital signals in said apparatus the coordinates XCEP and YCEP of the successive end points P for the successive segments, b. representing by digital signals in said apparatus the X and Y components I and J of a radius vector extending from the beginning point on a first path segment to the center of the arc for such segment, c. deriving, from the digital signals representing said components I and J for the first segment, further digital signals representing successive target positions to be reached at regularly recurring time instants along the X and Y axes, d. progressively changing said final digital signals to extend the defined path through the first path segment relative to said axes toward its designated end point coordinates XCEP and YCEP, e. terminating said progressive change and the extension of the path along said first segment when the defined path reaches an actual terminating end point having coordinates XCP, YCP near the designated end point coordinates XCEP, YCEP for the first segment, f. producing digital signals representing the X and Y components $I_n$ and $J_n$ of a radius vector extending from said actual terminating end point coordinates XCP, YCP to the center of the arc for the next succeeding arcuate path segment, and g. utilizing said last-named digital signals representing $I_n$ and $J_n$ to produce digital signals representing successive target positions along the X and Y axes for said next succeeding path segment.

13. A method of operating an iterative data processing apparatus to determine and signal whether a path, defined by final digital signals which progressively change with time, along two mutually orthogonal axes is approaching a designated end point represented by digitally signaled coordinates XCEP and YCEP, said method comprising:

a. generating successively in said apparatus first and second digital signals representing first and second coordinates PL1 and PL2 spaced apart along one of said axes and which are respectively farther than and nearer than the corresponding one of the coordinates XCP or YCP of a point to be actually reached in the immediate future on the path defined by said final digital signals, b. determining by computation in said apparatus whether or not the corresponding one of the digitally signaled coordinates XCEP and YCEP lies between said first and second coordinates PL1 and PL2, and c. signaling the approach to the designated end point only if the determination in step (b) is affirmative.

14. The method defined in claim 13 further characterized in that said step (b) includes:

b1. processing said first digital signals representing the coordinate PL1 to produce an upper bracket signal $B_u$ only if the corresponding one of the designated end point coordinates XCEP or YCEP lies between said origin and said first coordinate PL1, b2. processing said second digital signals representing the coordinate PL2 to produce a lower bracket signal $B_l$ only if said coordinate PL2 lies between said origin and the corresponding one of the designated end point coordinates XCEP or YCEP, b3. affirmatively signaling—that the corresponding one of the coordinates XCEP or YCEP lies between said first and second coordinates PL1 and PL2,—only if both said upper and lower bracket signals $B_u$ and $B_l$ are produced.

15. The method set forth in claim 13 further characterized in that look-ahead overrun computations are made to determine and signal when an overrun is about to occur along the fast axis of the path, and said one axis recited in claim 17 is the slow axis of the path.

16. A method of operating an iterative data processing apparatus to determine and signal whether a path, defined by final digital signals which progressively change with time, along two mutually orthogonal axes is approaching a designated end point represented by digitally signaled coordinates XCEP and YCEP, said method comprising:

a. generating successively in said apparatus first and second digital signals representing first and second coordinates PL1 and PL2 spaced apart along one of said axes and which are respectively farther than and nearer than the corresponding one of the end point coordinates XCEP or YCEP, b. determining by computation in said apparatus whether or not the corresponding one of the coordinates XCP or YCP of a point to be actually reached in the immediate future on the path defined by said final digital signals lies between said first and second coordinates PL1 and PL2, and c. signaling the approach to the designated end point only if the determination in step (b) is affirmative.

17. The method defined in claim 16 further characterized in that said step (b) includes:

b1. processing said first digital signals representing the coordinate PL1 to produce an upper bracket signal $B_u$ only if the corresponding one of the path point coordinates XCP or YCP lies between said origin and said first coordinate PL1, b2. processing said second digital signals representing the coordinate PL2 to produce a lower bracket signal $B_l$, only if said coordinate PL2 lies between said origin and the corresponding one of the path point coordinates XCP or YCP, and b3. affirmatively signaling—that the corresponding one of the path point coordinates XCP or YCP lies between said first and second coordinates PL1 and PL2—only if both said upper and lower bracket signals $B_u$ and $B_l$ are produced.

* * * * *

PO-1050
(5/69)

UNITED STATES PATENT OFFICE
CERTIFICATE OF CORRECTION

Patent No. __3,634,661__   Dated __January 11, 1972__

Inventor(s) __Arthur O. Fitzner__   __Page 1 of 4__

It is certified that error appears in the above-identified patent and that said Letters Patent are hereby corrected as shown below:

Column 3, line 45, "he" is changed to ---the---.

Column 6, line 17, "moveable" is changed to --movable--.

Column 7, line 32, "bock" is changed to --block--.

Column 8, line 69, "pint" is changed to --point--.

Column 10, line 50, "△XN" is changed to --△YN--.

Column 14, line 3, before "four" --comprise-- is inserted.

Line 28, before "57" --registers-- is inserted.

Column 19, line 30, before "represent" --digitally-- is inserted.

Line 51, "to" is changed to --so--.

Column 20, line 67, "$\overline{T}$" is changed to --T--.

Column 24, line 15, "at" is changed to --as--.

Column 26, line 24, "gates" is changed to --gated--.

Column 29, line 55, "47GQ" is changed to --47Q--.

Column 38, line 29, before "of" --lines-- is inserted.

Column 42, line 64, "toll" is changed to --tool--.

UNITED STATES PATENT OFFICE
CERTIFICATE OF CORRECTION

Patent No. 3,634,661　　　　　　　　Dated January 11, 1972

Inventor(s) Arthur O. Fitzner　　　　　Page 2 of 4

It is certified that error appears in the above-identified patent and that said Letters Patent are hereby corrected as shown below:

Column 44, line 44, "Q9)" is changed to --Q(9)--.

Line 52, "$\Delta I$" is changed to --$\Delta T$--.

Column 47, line 52, before "G01" --4964-- is inserted.

Column 52, line 74, "iII" is changed to --III--.

Column 54, line 54, "It" is changed to --If--.

Column 60, line 68, "a" (first occurrence) should be deleted.

Column 61, line 52, "$SCEP_2$" is changed to --$XCEP_2$--.

Column 65, line 20, "XR" is changed to --$\Delta R$--.

Column 72, line 12, "$\Delta H_{01}$" is changed to --$\Delta Y_{01}$--.

Line 19, after "Y" --axis-- is inserted.

Line 51, "Yoordinate" is changed to --Y coordinate--.

Line 54, "P" is changed to --$P_0$--.

Column 75, line 46, "$Q \Delta\Delta D/R$" is changed to --$Q= \Delta D/R$--.

Column 76, line 44, "nd" is changed to --and--.

UNITED STATES PATENT OFFICE
CERTIFICATE OF CORRECTION

Patent No. 3,634,661          Dated January 11, 1972

Inventor(s) Arthur O. Fitzner          Page 3 of 4

It is certified that error appears in the above-identified patent and that said Letters Patent are hereby corrected as shown below:

Line 45, "G" is changed to --$G_{03}$--.

Line 53, "Z" is changed to -- + --.

Column 80, line 66, "$XCP_0$" is changed to --$YCP_0$--.

Line 77, after "of" the following is inserted: --the YCP number, which normally resides in digit stage 2 of the Answer Register 53a, is now in digit stage 1 of the Answer Register so that, in effect, the number presently in the Answer Register 53a is $10(YCP_0+2\Delta Y_{01})$.--

Column 81, erase lines 72 through 75.

Column 83, line 3, "by" is changed to --of--.

Column 85, line 17, erase "each of the following".

Line 18, "four columns of the present FIG. 31 iteration and during" is erased.

Column 86, line 12, "$T_2$" is changed to --$I_2$--.

Column 86, line 23, "$J_5Q$" is changed to --$J_5 \cdot Q$--.

PO-1050
(5/69)

UNITED STATES PATENT OFFICE
CERTIFICATE OF CORRECTION

Patent No. 3,634,661    Dated January 11, 1972

Inventor(s) Arthur O. Fitzner    Page 4 of 4

It is certified that error appears in the above-identified patent and that said Letters Patent are hereby corrected as shown below:

Column 88, line 55, "0.0J" is changed to --0.1J--.

Column 93, line 14, after "PGA" insert --479--.

Column 94, line 36, after "LIN" insert a minus symbol.

Column 100, line 8, before "disclosed" --exemplary-- is inserted.

Line 9, "exemplary" is erased.

Column 109, line 53, "SCP" is changed to --XCP--.

Signed and sealed this 6th day of March 1973.

(SEAL)
Attest:

EDWARD M. FLETCHER, JR.　　　　　　ROBERT GOTTSCHALK
Attesting Officer　　　　　　　　　　Commissioner of Patents